United States Patent
Lie et al.

(10) Patent No.: US 11,934,945 B2
(45) Date of Patent: *Mar. 19, 2024

(54) ACCELERATED DEEP LEARNING

(71) Applicant: Cerebras Systems Inc., Los Altos, CA (US)

(72) Inventors: Sean Lie, Los Gatos, CA (US); Michael Morrison, Sunnyvale, CA (US); Michael Edwin James, San Carlos, CA (US); Gary R. Lauterbach, Los Altos, CA (US); Srikanth Arekapudi, Santa Clara, CA (US)

(73) Assignee: Cerebras Systems Inc., Sunnyvale, CA (US)

( * ) Notice: Subject to any disclaimer, the term of this patent is extended or adjusted under 35 U.S.C. 154(b) by 1177 days.

This patent is subject to a terminal disclaimer.

(21) Appl. No.: 16/481,016

(22) PCT Filed: Feb. 23, 2018

(86) PCT No.: PCT/IB2018/051128
§ 371 (c)(1),
(2) Date: Jul. 25, 2019

(87) PCT Pub. No.: WO2018/154494
PCT Pub. Date: Aug. 30, 2018

(65) Prior Publication Data
US 2020/0005142 A1 Jan. 2, 2020

Related U.S. Application Data

(60) Provisional application No. 62/628,773, filed on Feb. 9, 2018, provisional application No. 62/628,784, filed
(Continued)

(51) Int. Cl.
*G06N 3/08* (2023.01)
*G06F 9/455* (2018.01)
(Continued)

(52) U.S. Cl.
CPC .......... *G06N 3/08* (2013.01); *G06F 9/45533* (2013.01); *G06N 3/02* (2013.01); *G06N 3/04* (2013.01);
(Continued)

(58) Field of Classification Search
CPC ..... G06F 9/45533; G06F 15/825; G06N 3/04; G06N 3/06; G06N 3/08; G06N 3/10
See application file for complete search history.

(56) References Cited

U.S. PATENT DOCUMENTS 5,361,334 A 11/1994 Cawley
5,481,688 A 1/1996 Takagi
(Continued)

FOREIGN PATENT DOCUMENTS

CN 101778049 A 7/2010
EP 0638867 A2 10/1995
(Continued)

OTHER PUBLICATIONS

Shen, Xiao-Wei, et al. "An efficient network-on-chip router for dataflow architecture." Journal of Computer Science and Technology 32.1 (2017): 11-25. (Year: 2017).*

(Continued)

*Primary Examiner* — Benjamin P Geib
(74) *Attorney, Agent, or Firm* — PatentVentures; Bennett Smith

(57) ABSTRACT

Techniques in advanced deep learning provide improvements in one or more of accuracy, performance, and energy efficiency, such as accuracy of learning, accuracy of prediction, speed of learning, performance of learning, and energy efficiency of learning. An array of processing elements performs flow-based computations on wavelets of data. Each processing element has a respective compute element and a respective routing element. Each compute element has
(Continued)

processing resources and memory resources. Each router enables communication via wavelets with at least nearest neighbors in a 2D mesh. Stochastic gradient descent, mini-batch gradient descent, and continuous propagation gradient descent are techniques usable to train weights of a neural network modeled by the processing elements. Reverse checkpoint is usable to reduce memory usage during the training.

47 Claims, 33 Drawing Sheets

Related U.S. Application Data on Feb. 9, 2018, provisional application No. 62/580,207, filed on Nov. 1, 2017, provisional application No. 62/542,645, filed on Aug. 8, 2017, provisional application No. 62/542,657, filed on Aug. 8, 2017, provisional application No. 62/522,081, filed on Jun. 19, 2017, provisional application No. 62/522,065, filed on Jun. 19, 2017, provisional application No. 62/520,433, filed on Jun. 15, 2017, provisional application No. 62/517,949, filed on Jun. 11, 2017, provisional application No. 62/486,372, filed on Apr. 17, 2017, provisional application No. 62/462,640, filed on Feb. 23, 2017.

(51) Int. Cl.
| | | |
|---|---|---|
| *G06N 3/00* | (2023.01) | |
| *G06N 3/02* | (2006.01) | |
| *G06N 3/04* | (2023.01) | |
| *G06N 3/048* | (2023.01) | |
| *G06N 3/063* | (2023.01) | |
| *G06N 3/084* | (2023.01) | |
| *G06N 3/10* | (2006.01) | |
| *G06N 3/045* | (2023.01) | |

(52) U.S. Cl.
CPC ............ *G06N 3/048* (2023.01); *G06N 3/063* (2013.01); *G06N 3/084* (2013.01); *G06N 3/10* (2013.01); *G06N 3/045* (2023.01)

(56) References Cited

U.S. PATENT DOCUMENTS

| | | |
|---|---|---|
| 5,710,549 A | 1/1998 | Horst et al. |
| 5,835,024 A | 11/1998 | Olnowich et al. |
| 5,870,396 A | 2/1999 | Abu-Amara et al. |
| 6,212,627 B1 | 4/2001 | Dulong et al. |
| 6,542,986 B1 | 4/2003 | White |
| 6,788,698 B1 | 9/2004 | Bandai et al. |
| 7,293,002 B2 | 11/2007 | Starzyk |
| 7,359,274 B2 | 4/2008 | Noguchi et al. |
| 7,401,333 B2 | 7/2008 | Vandeweerd |
| 7,453,810 B2 | 11/2008 | Zoranovic et al. |
| 7,565,657 B1 | 7/2009 | Leung et al. |
| 7,701,957 B1 | 4/2010 | Bicknell |
| 7,814,303 B2 | 10/2010 | Muff et al. |
| 8,151,088 B1 | 4/2012 | Bao et al. |
| 8,194,690 B1 | 6/2012 | Steele et al. |
| 8,311,057 B1 | 11/2012 | Attig et al. |
| 8,583,896 B2 | 11/2013 | Cadambi et al. |
| 8,738,860 B1 | 5/2014 | Griffin et al. |
| 8,745,626 B1 | 6/2014 | Sandstrom |
| 9,009,660 B1 | 4/2015 | Griffin et al. |
| 9,038,072 B2 | 5/2015 | Nollet et al. |
| 9,117,550 B2 | 8/2015 | Tran |
| 9,152,427 B2 | 10/2015 | Vorbach et al. |
| 9,170,812 B2 | 10/2015 | Vorbach et al. |
| 9,348,557 B1 | 5/2016 | Langhammer et al. |
| 9,373,073 B2 | 6/2016 | Arthur et al. |
| 9,390,461 B1 | 7/2016 | Jane et al. |
| 9,423,999 B1 | 8/2016 | Linzer |
| 9,627,095 B1 | 4/2017 | Xu et al. |
| 9,946,548 B2 | 4/2018 | Burger et al. |
| 10,067,796 B1 | 9/2018 | Metcalf |
| 10,127,043 B2 | 11/2018 | Sebexen et al. |
| 10,289,816 B1 | 5/2019 | Malassenet et al. |
| 10,355,975 B2 | 7/2019 | Sebexen et al. |
| 10,515,303 B2 | 12/2019 | Lie et al. |
| 10,614,357 B2 | 4/2020 | Lie et al. |
| 10,657,438 B2 | 5/2020 | Lie et al. |
| 10,699,189 B2 | 6/2020 | Lie et al. |
| 10,700,968 B2 | 6/2020 | Sebexen et al. |
| 10,726,329 B2 | 7/2020 | Lie et al. |
| 10,762,420 B2 | 9/2020 | Teig et al. |
| 10,963,780 B2 | 3/2021 | Nowatzyk et al. |
| 2002/0027813 A1 | 3/2002 | King et al. |
| 2002/0141427 A1 | 10/2002 | McAipine |
| 2002/0161986 A1 | 10/2002 | Kamigata et al. |
| 2004/0030712 A1 | 2/2004 | Sano et al. |
| 2004/0115995 A1 | 6/2004 | Sanders |
| 2004/0153623 A1 | 8/2004 | Buchty et al. |
| 2004/0160970 A1 | 8/2004 | Dally et al. |
| 2005/0257027 A1 | 11/2005 | Leijten |
| 2006/0069854 A1 | 3/2006 | Jain et al. |
| 2006/0179284 A1 | 8/2006 | Jensen et al. |
| 2006/0259713 A1 | 11/2006 | De Santis et al. |
| 2007/0058557 A1 | 3/2007 | Cuffaro et al. |
| 2007/0140240 A1 | 6/2007 | Dally et al. |
| 2008/0077926 A1 | 3/2008 | Jeter et al. |
| 2008/0107105 A1 | 5/2008 | Reilly et al. |
| 2008/0133889 A1 | 6/2008 | Glew |
| 2008/0186852 A1 | 8/2008 | Sami et al. |
| 2009/0003827 A1 | 1/2009 | Kai et al. |
| 2009/0094436 A1 | 4/2009 | Deng et al. |
| 2009/0119489 A1 | 5/2009 | Pechanek et al. |
| 2009/0135739 A1 | 5/2009 | Hoover et al. |
| 2009/0248941 A1 | 10/2009 | Morein et al. |
| 2009/0259713 A1 | 10/2009 | Blumrich et al. |
| 2019/0259713 A1 | 10/2009 | Blumrich et al. |
| 2009/0306804 A1 | 12/2009 | Chao et al. |
| 2009/0313195 A1 | 12/2009 | McDaid et al. |
| 2010/0061390 A1 | 3/2010 | Godbole et al. |
| 2010/0095098 A1 | 4/2010 | Gschwind |
| 2010/0106940 A1 | 4/2010 | Muff et al. |
| 2010/0208317 A1 | 8/2010 | Bogoni et al. |
| 2011/0022821 A1 | 1/2011 | Fei et al. |
| 2011/0028293 A1 | 2/2011 | Atkin et al. |
| 2011/0161626 A1 | 6/2011 | Mangione-Smith |
| 2011/0213950 A1 | 9/2011 | Mathieson et al. |
| 2011/0235531 A1 | 9/2011 | Vangal et al. |
| 2011/0310739 A1 | 12/2011 | Aybay |
| 2011/0313961 A1 | 12/2011 | Toscano et al. |
| 2011/0314255 A1 | 12/2011 | Krishna et al. |
| 2012/0084533 A1 | 4/2012 | Sperber et al. |
| 2012/0131288 A1 | 5/2012 | Box et al. |
| 2012/0137119 A1 | 5/2012 | Doerr et al. |
| 2012/0210324 A1 | 8/2012 | Truschin et al. |
| 2013/0031040 A1 | 1/2013 | Modha |
| 2013/0070588 A1 | 3/2013 | Steele et al. |
| 2013/0073498 A1 | 3/2013 | Izhikevich et al. |
| 2013/0086367 A1 | 4/2013 | Gschwind et al. |
| 2013/0198488 A1 | 8/2013 | Pechanek |
| 2013/0322459 A1 | 12/2013 | Xu |
| 2014/0046882 A1 | 2/2014 | Wood |
| 2014/0115208 A1 | 4/2014 | Willey et al. |
| 2014/0143470 A1 | 5/2014 | Dobbs et al. |
| 2014/0181501 A1 | 6/2014 | Hicok et al. |
| 2014/0211630 A1 | 7/2014 | Cavanna et al. |
| 2014/0282560 A1 | 9/2014 | Hutton et al. |
| 2014/0282580 A1 | 9/2014 | Zeng et al. |
| 2014/0313972 A1 | 10/2014 | Kim |
| 2014/0324934 A1 | 10/2014 | Hrdy et al. |
| 2015/0074162 A1 | 3/2015 | Carter et al. |
| 2015/0089095 A1 | 3/2015 | Stark |
| 2015/0124828 A1 | 5/2015 | Cj et al. |
| 2015/0127925 A1 | 5/2015 | Follett et al. |
| 2015/0188847 A1 | 7/2015 | Chopra et al. |

(56) References Cited

U.S. PATENT DOCUMENTS

| | | |
|---|---|---|
| 2015/0195182 A1 | 7/2015 | Mathur et al. |
| 2015/0242463 A1 | 8/2015 | Lin et al. |
| 2015/0242741 A1 | 8/2015 | Campos et al. |
| 2015/0302295 A1 | 10/2015 | Rivera et al. |
| 2015/0324684 A1 | 11/2015 | Alvarez-Icaza Rivera et al. |
| 2015/0324690 A1 | 11/2015 | Chilimbi et al. |
| 2015/0378734 A1 | 12/2015 | Hansen et al. |
| 2015/0379670 A1 | 12/2015 | Koker et al. |
| 2016/0014229 A1 | 1/2016 | Seedorf et al. |
| 2016/0019061 A1 | 1/2016 | Chatha et al. |
| 2016/0098296 A1 | 4/2016 | Ash |
| 2016/0182405 A1 | 6/2016 | Chen et al. |
| 2016/0203401 A1 | 7/2016 | Duranton et al. |
| 2016/0210381 A1 | 7/2016 | Singleton et al. |
| 2016/0224889 A1 | 8/2016 | Alvarez-Icaza Rivera et al. |
| 2016/0239647 A1 | 8/2016 | Johnson et al. |
| 2016/0246337 A1 | 8/2016 | Colgan et al. |
| 2016/0301618 A1 | 10/2016 | Labonte et al. |
| 2016/0328239 A1 | 11/2016 | Iyer et al. |
| 2016/0328647 A1 | 11/2016 | Lin et al. |
| 2016/0330112 A1 | 11/2016 | Raindel et al. |
| 2016/0379115 A1* | 12/2016 | Burger ................ G06F 15/7803 706/25 |
| 2016/0379137 A1 | 12/2016 | Burger et al. |
| 2017/0011288 A1 | 1/2017 | Brothers et al. |
| 2017/0061041 A1 | 3/2017 | Kumar et al. |
| 2017/0083315 A1 | 3/2017 | Burger et al. |
| 2017/0083335 A1 | 3/2017 | Burger et al. |
| 2017/0094527 A1 | 3/2017 | Shattil et al. |
| 2017/0102920 A1 | 4/2017 | Henry et al. |
| 2017/0102939 A1 | 4/2017 | Lutz et al. |
| 2017/0110968 A1 | 4/2017 | Shepard et al. |
| 2017/0118139 A1 | 4/2017 | Bandic et al. |
| 2017/0220342 A1 | 8/2017 | Bradbury et al. |
| 2017/0295061 A1 | 10/2017 | Wittenschlaeger |
| 2017/0295111 A1 | 10/2017 | Sadowski et al. |
| 2017/0300333 A1 | 10/2017 | Wang et al. |
| 2017/0316116 A1 | 11/2017 | Elliott |
| 2018/0013657 A1 | 1/2018 | Cantwell et al. |
| 2018/0046894 A1 | 2/2018 | Yao |
| 2018/0060244 A1 | 3/2018 | Godard |
| 2018/0077228 A1 | 3/2018 | Blagodurov |
| 2018/0088940 A1 | 3/2018 | Rubanovich et al. |
| 2018/0095751 A1 | 4/2018 | Aminot et al. |
| 2018/0132055 A1 | 5/2018 | Leedy |
| 2018/0157465 A1 | 6/2018 | Bittner et al. |
| 2018/0189056 A1 | 7/2018 | Turakhia et al. |
| 2018/0189063 A1 | 7/2018 | Fleming et al. |
| 2018/0189231 A1 | 7/2018 | Fleming, Jr. |
| 2018/0189633 A1 | 7/2018 | Henry et al. |
| 2018/0189642 A1 | 7/2018 | Boesch et al. |
| 2018/0218257 A1 | 8/2018 | Xu et al. |
| 2018/0218518 A1 | 8/2018 | Yan et al. |
| 2018/0302306 A1 | 10/2018 | Carroll et al. |
| 2018/0314941 A1 | 11/2018 | Lie et al. |
| 2019/0042377 A1 | 2/2019 | Teig et al. |
| 2019/0130250 A1 | 5/2019 | Park et al. |
| 2019/0132928 A1 | 5/2019 | Rodinger et al. |
| 2019/0138423 A1 | 5/2019 | Agerstam et al. |
| 2019/0244058 A1 | 8/2019 | Franca-Neto et al. |
| 2019/0244933 A1 | 8/2019 | Or-Bach et al. |
| 2019/0258919 A1 | 8/2019 | Lie et al. |
| 2019/0258920 A1 | 8/2019 | Lie et al. |
| 2019/0258921 A1 | 8/2019 | Lie et al. |
| 2019/0286987 A1 | 9/2019 | Lie et al. |
| 2019/0324759 A1 | 10/2019 | Yang et al. |
| 2019/0332926 A1 | 10/2019 | Lie et al. |
| 2019/0340064 A1 | 11/2019 | Sity et al. |
| 2019/0341091 A1 | 11/2019 | Sity et al. |
| 2019/0347555 A1 | 11/2019 | Park et al. |
| 2020/0125934 A1 | 4/2020 | Lie et al. |
| 2020/0133741 A1 | 4/2020 | Lie et al. |
| 2020/0336421 A1 | 10/2020 | Sebexen et al. |
| 2020/0380341 A1 | 12/2020 | Lie et al. |
| 2020/0380370 A1 | 12/2020 | Lie et al. |
| 2021/0004674 A1 | 1/2021 | Lie et al. |
| 2021/0056400 A1 | 2/2021 | Lie et al. |
| 2021/0072894 A1 | 3/2021 | Chawla et al. |
| 2021/0097376 A1 | 4/2021 | Lie et al. |
| 2021/0142155 A1 | 5/2021 | James et al. |
| 2021/0142167 A1 | 5/2021 | Lie et al. |
| 2021/0166109 A1 | 6/2021 | Lie et al. |
| 2021/0224639 A1 | 7/2021 | Lie et al. |
| 2021/0248453 A1 | 8/2021 | Lauterbach et al. |
| 2021/0255860 A1 | 8/2021 | Morrison et al. |
| 2021/0256362 A1 | 8/2021 | Lie et al. |
| 2022/0172030 A1 | 6/2022 | James |
| 2022/0172031 A1 | 6/2022 | Lie et al. |

FOREIGN PATENT DOCUMENTS

| | | |
|---|---|---|
| EP | 2051459 A1 | 7/2016 |
| EP | 3153996 A2 | 4/2017 |
| JP | H025173 A | 1/1990 |
| JP | 1991-175548 A | 7/1991 |
| JP | 1993-265996 A | 10/1993 |
| JP | 0668056 A | 3/1994 |
| JP | 06110864 A | 4/1994 |
| JP | 07-152722 A | 6/1995 |
| JP | 1995-234841 A | 9/1995 |
| JP | 2009-129447 A | 6/2009 |
| JP | 2015535630 A | 12/2015 |
| KR | 1020170099848 A | 9/2017 |
| NO | 2018193353 A1 | 10/2018 |
| WO | 9716792 A1 | 5/1997 |
| WO | 2014081457 A1 | 5/2014 |
| WO | 2014081461 A1 | 5/2014 |
| WO | 2015/126495 A2 | 8/2015 |
| WO | 2016186813 A | 11/2016 |
| WO | 2016210014 A1 | 12/2016 |
| WO | 2017003887 A1 | 1/2017 |
| WO | 2017048655 A1 | 3/2017 |
| WO | 2017129325 A1 | 8/2017 |
| WO | 2017214728 A1 | 12/2017 |
| WO | 2018154494 A1 | 8/2018 |
| WO | 2018189728 A1 | 10/2018 |
| WO | 2018193352 A1 | 10/2018 |
| WO | 2018193354 A1 | 10/2018 |
| WO | 2018193360 A1 | 10/2018 |
| WO | 2018193361 A1 | 10/2018 |
| WO | 2018193363 A1 | 10/2018 |
| WO | 2018193370 A1 | 10/2018 |
| WO | 2018193377 A1 | 10/2018 |
| WO | 2018193379 A1 | 10/2018 |
| WO | 2018193380 A1 | 10/2018 |
| WO | 2020021395 A1 | 1/2020 |
| WO | 2020044152 A1 | 3/2020 |
| WO | 2020044208 A1 | 3/2020 |
| WO | 2020044238 A1 | 3/2020 |
| WO | 2021084485 A1 | 5/2021 |
| WO | 2021084505 A1 | 5/2021 |
| WO | 2021084506 A1 | 5/2021 |
| WO | 2022034542 A1 | 2/2022 |

OTHER PUBLICATIONS

Farabet, Clément, et al. "Neuflow: A runtime reconfigurable dataflow processor for vision." CVPR 2011 workshops. IEEE, 2011. (Year: 2011).*

Farabet, Clément, et al. "Hardware accelerated convolutional neural networks for synthetic vision systems." Proceedings of 2010 IEEE International Symposium on Circuits and Systems. IEEE, 2010. (Year: 2010).*

Jul. 25, 2019 List of References Used in Art Rejections in Cases, Jul. 25, 2019, 2 pages.

Alex Krizhevsky et al, ImageNet Classification with Deep Convolutional Neural Networks, in Advances in Neural Information Processing Systems (NIPS), vol. 25, pp. 1106-1114, 2012, 9 pages.

Yann Lecun et al, Deep learning, in Nature, May 28, 2015, pp. 436-444, vol. 521, Macmillan Publishers Limited, 9 pages.

Christian Szegedy et al, Going deeper with convolutions, in arXiv. org (A Cornell University Library e-print service & repository)

(56) References Cited

OTHER PUBLICATIONS

[online], Sep. 17, 2014, arXiv:1409.4842v1 [cs.CV] (arXiv identifier & primary classification), [retrieved on Oct. 18, 2018]. Retrieved from the Internet <URL: https://arxiv.org/pdf/1409.4842.pdf>, 12 pages.
Karen Simonyan et al., Very Deep Convolutional Networks for Large-Scale Image Recognition, in arXiv.org (A Cornell University Library e-print service & repository) [online], Apr. 10, 2015, arXiv: arXiv:1409.1556v6 [cs.CV] (arXiv identifier & primary classification), [retrieved on Oct. 18, 2018]. Retrieved from the Internet <URL: https://arxiv.org/pdf/1409.1556.pdf>, 14 pages.
International Preliminary Report on Patentability (Ch II) in PCT/IB2018/052606, dated Apr. 1, 2019, 4 pages.
International Search Report in the related case PCT/IB2018/052607, dated Jul. 27, 2018, 8 pages.
Written Opinion of the International Searching Authority in the related case PCT/IB2018/052607, dated Jul. 27, 2018, 9 pages.
International Search Report in the related case PCT/IB2018/052606, dated Jul. 26, 2018, 3 pages.
Written Opinion of the International Searching Authority in the related case PCT/IB2018/052606, dated Jul. 26, 2018, 9 pages.
Salwa Said et al, 'Deep Wavelet Network for Image Classification', 2016 IEEE International Conference on Systems, Man, and Cybernetics (SMC 2016), Budapest, Oct. 9-12, 2016, pp. 000922-000927, 6 pages.
International Search Report in the related case PCT/IB2018/052610, dated Jul. 30, 2018, 3 pages.
Written Opinion of the International Searching Authority in the related case PCT/IB2018/052610, dated Jul. 30, 2018, 5 pages.
International Search Report in the related case PCT/IB2018/052667, dated Aug. 9, 2018, 7 pages.
Written Opinion of the International Searching Authority in the related case PCT/IB2018/052667, dated Aug. 9, 2018, 9 pages.
International Search Report in the related case PCT/IB2018/052638, dated Aug. 7, 2018, 3 pages.
Written Opinion of the International Searching Authority in the related case PCT/IB2018/052638, dated Aug. 7, 2018, 8 pages.
International Search Report in the related case PCT/IB2018/052640, dated Aug. 7, 2018, 5 pages.
Written Opinion of the International Searching Authority in the related case PCT/IB2018/052640, dated Aug. 7, 2018, 10 pages.
International Search Report in the related case PCT/IB2018/052602, dated Jul. 31, 2018, 3 pages.
Written Opinion of the International Searching Authority in the related case PCT/IB2018/052602, dated Jul. 31, 2018, 11 pages.
International Search Report in the related case PCT/IB2018/052643, dated Aug. 7, 2018, 4 pages.
Written Opinion of the International Searching Authority in the related case PCT/IB2018/052643, dated Aug. 7, 2018, 9 pages.
Xiao-Wei Shen et al., 'An Efficient Network-on-Chip Router for Dataflow Architecture', In: Journal of Computer Science and Technology [online & print], vol. 32, Jan. 2017, pp. 11-25, DOI 10.1007/s11390-017-1703-5 (International DOI Foundation compliant document identifier), [retrieved on Aug. 30, 2018]. Retrieved from the Internet <URL: https://link.springer.com/content/pdf/10.1007%2Fs11390-017-1703-5.pdf>. (15 sheets).
International Search Report in the related case PCT/IB2018/052666, dated Aug. 10, 2018, 4 pages.
Written Opinion of the International Searching Authority in the related case PCT/IB2018/052666, dated Aug. 10, 2018, 4 pages.
International Search Report in the related case PCT/IB2018/052651, dated Jul. 31, 2018, 3 pages.
Written Opinion of the International Searching Authority in the related case PCT/IB2018/052651 dated Jul. 31, 2018, 8 pages.
Ka-Ming Keung, 'A study of on-chip FPGA system with 2D mesh network', Iowa State University Digital Repository [online], Graduate Theses and Dissertations, 2010, pp. 1-131, [retrieved on Aug. 14, 2018]. Retrieved from the Internet <URL: https://lib.dr.iastate.edu/etd/11251>. (147 sheets).

International Search Report in the related case PCT /IB2018/052664, dated Aug. 13, 2018, 7 pages.
Written Opinion of the International Searching Authority in the related case PCT/IB2018/052664, dated Aug. 13, 2018, 6 pages.
International Search Report for PCT/IB2018/051128, dated Jun. 14, 2018, 3 pages.
Written Opinion of the International Searching Authority for PCT/IB2018/051128, dated Jun. 14, 2018, 8 pages.
International Preliminary Report on Patentability (Ch II) in PCT/IB2018/051128, dated Jun. 7, 2019, 4 pages.
Nov. 8, 2019 List of References Used in Art Rejections in Cases, Nov. 8, 2019, 1 page.
Murtagh, P., et al, Bit-serial systolic array implementation of a multilayer perceptron, in IEE Proceedings-E (Computers and Digital Techniques), Sep. 1993, pp. 277-288, vol. 140, Issue 5, IEE. (12 sheets).
Girones, R. G., et al, Systolic Implementation of a Pipelined On-Line Backpropagation, in Proceedings of the Seventh International Conference on Microelectronics for Neural, Fuzzy and Bio-Inspired Systems, Apr. 7-9, 1999, pp. 387-394, IEEE, Granada, Spain. (8 sheets).
Girones, R. G., et al, Forward-Backward Parallelism in On-Line Backpropagation, in Engineering Applications of Bio-Inspired Artificial Neural Networks, Proceedings of the International Work-Conference on Artificial and Natural Neural Networks vol. 2, Jun. 1999, pp. 157-165, Lecture Notes in Computer Science vol. 1607, Springer, Berlin, Germany. (9 sheets).
Gadea, R., et al, Artificial Neural Network Implementation on a single FPGA of a Pipelined On-Line Backpropagation, in Proceedings of the 13th International Symposium on System Synthesis, Sep. 2000, pp. 225-230, IEEE, Madrid, Spain. (6 sheets).
Gaunt, A. L., et al., AMPNet: Asynchronous Model-Parallel Training for Dynamic Neural Networks, in arXiv.org (A Cornell University Library e-print service & repository) [online], Jun. 22, 2017, arXiv:1705.09786v3 [cs.LG] (arXiv dentifier & primary classification), [retrieved on Jul. 20, 2018]. Retrieved from the Internet <URL: https://arxiv.org/pdf/1705.09786v3.pdf>, pp. 1-18. (18 sheets).
Sep. 27, 2019 List of References Used in Art Rejections in Cases, Sep. 27, 2019, 1 page.
International Preliminary Report on Patentability (Ch II) in the related PCT/IB2018/052667, dated Aug. 7, 2019, 4 pages.
International Preliminary Report on Patentability (Ch II) in the related PCT/IB2018/052602, dated Aug. 7, 2019, 4 pages.
International Preliminary Report on Patentability (Ch II) in the related PCT/IB2018/052607, dated Aug. 7, 2019, 4 pages.
International Preliminary Report on Patentability (Ch II) in the related PCT/IB2018/052651, dated Aug. 7, 2019, 4 pages.
International Preliminary Report on Patentability (Ch II) in the related PCT/IB2018/051128, dated Jun. 7, 2019, 4 pages.
Jouppi, N. P. et al. "In-Datacenter Performance Analysis of a Tensor Processing Unit", in arXiv.org (A Cornell University Library e-print service & repository) [online], Apr. 16, 2017, arXiv:1704.04760 [cs.AR] (arXiv identifier and primary classification), [retrieved on Apr. 7, 2018], Retrieved from the Internet <URL: https://arxiv.org/pdf/1704.04760.pdf >, 17 pages.
K. Ovtcharov, O. Ruwase, J.Y. Kim, J. Fowers, K. Strauss, E.S. Chung, "Accelerating Deep Convolutional Neural Networks Using Specialized Hardware", Microsoft Research Whitepaper [online], Feb. 22, 2015, Microsoft Corporation, Redmond, Washington, USA, [retrieved on Mar. 25, 2019], Retrieved from the Internet <URL: https://www.microsoft.com/en-us/research/wp-content/uploads/2016/02/CNN20Whitepaper.pdf >, 4 pages.
V. Sze, Y.-H. Chen, T.-J. Yang, and J. Emer, "Efficient Processing of Deep Neural Networks: A Tutorial and Survey", in arXiv.org (A Cornell University Library e-print service & repository) [online], Aug. 13, 2017, arXiv:1703.09039v2 [cs.CV] (arXiv identifier and primary classification), [retrieved on Mar. 25, 2019], Retrieved from the Internet <URL: https://arxiv.org/pdf/1703.09039.pdf >, 32 pages.
C. Farabet, B. Martini, P. Akselrod, S. Talay, Y. LeCun, E. Culurciello, "Hardware Accelerated Convolutional Neural Networks for Synthetic Vision Systems", Proc. of 2010 IEEE Int'l Symp. on Circuits and Systems, Paris, France, May 30-Jun. 2, 2010, IEEE, May 2010, 4 pages.

(56) References Cited

OTHER PUBLICATIONS

V. Gokhale, J. Jin, A. Dundar, B. Martini, E. Culurciello, "A 240 G-ops/s Mobile Coprocessor for Deep Neural Networks", 2014 IEEE Conf. on Comput. Vis. and Pattern Recognit. Workshops (CVPRW), Columbus, OH, USA, Jun. 23-28, 2014, IEEE, Jun. 2014, pp. 682-687, 6 pages.
Dominik Scherer, Hannes Schulz, Sven Behnke, "Accelerating Large-Scale Convolutional Neural Networks with Parallel Graphics Multiprocessors", 20th International Conference on Artificial Neural Networks (ICANN 2010). Proceedings, Part III, Sep. 15-18, 2010, Thessaloniki, Greece, European Neural Network Society (ENNS), 2010, 10 pages.
Joel Emer, Vivienne Sze, Yu-Hsin Chen, Tien-Ju Yang, "Hardware Architectures for Deep Neural Networks", a tutorial presented at the (44th) International Symposium on Computer Architecture (ISCA 2017), Jun. 24-28, 2017, Toronto, ON, Canada, ACM/IEEE, Jun. 24, 2017, 290 pages.
Joel Emer, Vivienne Sze, Yu-Hsin Chen, "Hardware Architectures for Deep Neural Networks", at tutorial presented at the (49th Annual) IEEE/ACM International Symposium on Microarchitecture (MICRO-49), Oct. 15-19, 2016, Taipei, Taiwan, IEEE/ACM, Oct. 16, 2016, 300 pages.
J. Jin, V. Gokhale, A. Dundar, B. Krishnamurthy, B. Martini, and E. Culurciello. "An Efficient Implementation of Deep Convolutional Neural Networks on a Mobile Coprocessor", 2014 IEEE 57th International Midwest Symposium on Circuits and Systems (MWSCAS 2014), Aug. 3-6, 2014, College Station, TX, USA, IEEE, Aug. 2014, 4 pages.
Pande, S., "Design Exploration of EMBRACE Hardware Spiking Neural Network Architecture and Applications". Dissertation (Doctoral Thesis), Feb. 5, 2014, National University of Ireland, Galway, Ireland, [retrieved on Mar. 30, 2018], Retrieved from the Internet <URL: https://aran.library.nuigalway.ie/handle/10379/4172 >, 176 pages.
Feb. 27, 2020 List of References Used in Art Rejections in Cases, Feb. 27, 2020, 1 page.
International Preliminary Report on Patentability (Ch II) in the related PCT/IB2018/052638, dated Aug. 7, 2019, 4 pages.
International Preliminary Report on Patentability (Ch II) in the related PCT/IB2018/052640, dated Aug. 7, 2019, 4 pages.
International Search Report in the related case PCT/IB2019/056118, dated Dec. 20, 2019, 3 pages.
Written Opinion of the International Searching Authority in the related case PCT/IB2019/056118, dated Dec. 20, 2019, 13 pages.
European search report in the related case PCT/IB2018/051128, dated Jan. 7, 2020, 8 pages.
Narayanamurthy N et al: "Evolving bio plausible design with heterogeneous Noc", The 15th International Conference on Advanced Communications Technology—ICACT2013, Jan. 27, 2013, (pp. 451-456), 6 pages.
Dong Y et al: "High dependable implementation of Neural Networks with networks on chip architecture and a backtracking routing algorithm", Jan. 19, 2009, (pp. 404-407), 4 pages.
International Search Report in the related case PCT/IB2019/057172, dated Jan. 23, 2020, 3 pages.
Written Opinion of the International Searching Authority in the related case PCT/IB2019/057172, dated Jan. 23, 2020, 6 pages.
Vivienne Sze et al. "Efficient Processing of Deep Neural Networks: A Tutorial and Survey", Proceedings of the IEEE, vol. 105, No. 12, Dec. 2017, See pp. 2297-2298, 35 pages.
International Search Report in the related case PCT/IB2019/057216, dated Jan. 23, 2020, 4 pages.
Written Opinion of the International Searching Authority in the related case PCT/IB2019/057216, dated Jan. 23, 2020, 10 pages.
International Search Report in the related case PCT/IB2019/056825, dated Jan. 28, 2020, 3 pages.
Written Opinion of the International Searching Authority in the related case PCT/IB2019/056825, dated Jan. 28, 2020, 7 pages.

Van Der Laan, D. "The Structure and Performance of Optimal Routing Sequences". Thomas Stieltjes Institute for Mathematics, Sep. 8, 1976 (Sep. 8, 1976), 208 pages.
Jul. 2023 IDS #14-7 List of References Used in Art Rejections in Cases, Jul. 27, 2023, 2 pages.
Canadian Intellectual Property Office, Canadian Patent Application No. 3,060,356, Office Action, dated Feb. 28, 2020, 7 pages.
Canadian Intellectual Property Office, Canadian Patent Application No. 3,051,990, Office Action, dated Mar. 9, 2020, 5 pages.
Japan Patent Office, Japanese Patent Application No. 2019-546879, Notice of reason for refusal, dated Mar. 10, 2020, 4 pages.
European search report, European Application No. 18788154.5, dated Mar. 16, 2020, 9 pages.
European search report European Application No. 18788046.3, dated Mar. 27, 2020, 10 pages.
European search report European Application No. 18788255.0, dated Apr. 1, 2020, 11 pages.
Xiao-Wei Shen et al: "An Efficient Network-on-Chip Router for Dataflow Architecture", Journal of Computer Science and Technology., vol. 32, No. 1, Jan. 1, 2017 (Jan. 1, 2017), pp. 11-25, XP055678469, 15 pages.
European search report European Application No. 18788260.0, dated Apr. 3, 2020, 10 pages.
Yiping Dong et al: "Network on Chip architecture for BP neural network", Communications, Circuits and Systems, 2008. ICCCAS 2008. International Conference On, IEEE, Piscataway, NJ, USA, May 25, 2008 (May 25, 2008), pp. 964-968, XP031353080, 5 pages.
Japan Patent Office, Japanese Patent Application No. 2019-556713, Notice of reason for refusal, dated Apr. 7, 2020, 14 pages.
Sam Fuller, "3.1 Processing Element Models", an excerpt from "RapidIO—The Embedded System Interconnect," Jan. 2005, John Wiley & Sons, Inc., 3 pages.
Kurt Shuler, "The Soc Interconnect Fabric: A Brief History", Arteris IP, Aug. 6, 2013, 9 pages.
Seth Copen Goldstein et al, "PipeRench: A Coprocessor for Streaming Multimedia Acceleration", Appeared in Proceedings of 26th International Symposium on Computer Architecture, ISCA 1999. 12 pages.
Japan Patent Office, Japanese Patent Application No. 2019-556705, Notice of reason for refusal, dated Jun. 30, 2020, 4 pages.
National Intellectual Property Administration, PRC, PRC Patent Application No. 2018800135043, Notification of the First Office Action, dated Jul. 13, 2020, 10 pages.
European search report European Application No. 18786968.0, dated Sep. 18, 2020, 10 pages.
Yiping Dong et al: "High dependable implementation of Neural Networks with networks on chip architecture and a backtracking routing algorithm", 2009 Asia Pacific Conference on Postgraduate Research in Microelectronics & Electronics (PrimeAsia), Jan. 19, 2009, 4 pages.
Korean Intellectual Property Office, Korean Patent Application No. 10-2019-7027495, Notice to File a Response, dated Jun. 3, 2021, 14 pages.
Japan Patent Office, Japananese Patent Application No. 2020-138494, Notice of Reasons for Refusal, dated Oct. 5, 2021, 3 pages.
Jul. 2023 IDS #14-9 List of References Used in Art Rejections in Cases, Jul. 27, 2023, 2 pages.
Daniel U. Becker, dissertation entitled "Efficient Microarchitecture for Network-On-Chip Routers", Submitted to the Department of Electrical Engineering, Thesis (Ph.D.)—Stanford University, Aug. 2012, 193 pages.
William J. Dally and Charles L. Seitz, "The Torus Routing Chip", Computer Science Department, California Institute of Technology 5208:TR:86, Jan. 24, 1985, 19 pages.
Alireza Monemi et al, "Low latency network-on-chip router microarchitecture using request masking technique", International Journal of Reconfigurable Computing, Jan. 1, 2015, Hindawi Publishing Corportation, vol. 2015, 13 pages.
"Cosmic Cubism", Engineering & Science, Mar. 1984, pp. 17-20, 4 sheets.

(56) References Cited

OTHER PUBLICATIONS

Heidi Pan et al, "Heads and Tails: A Variable-Length Instruction Format Supporting Parallel Fetch and Decode" CASES '01, Nov. 16-17, 2001, Atlanta, Georgia, USA. Copyright 2001 ACM 1-58113-399-5/01/0011, 8 sheets.
Charles L. Seitz, "The Cosmic Cube", Communications of the ACM, Jan. 1985, vol. 28 No. 2, 12 pages.
William J. Dally et al, "Route packets, not wires: On-chip interconnection networks", IEEE Xplore. Downloaded on Jan. 26, 2009 at 16:19 from IEEE Xplore, DAC 2001, Jun. 18-22, 2001, Las Vegas, Nevada, USA. pp. 684-689, 6 sheets.
Vinothkumar, M. et al, "Design and Implementation of Router Arbitration in Network on Chip", Jan. 2014, SSRN Electronic Journal, 6 sheets.
Jul. 2023 IDS #14-8 List of References Used in Art Rejections in Cases, 2 pages.
European search report, European Application No. 18788154.5, dated Dec. 12, 2020, 6 pages.
European search report, European Application No. 18787945.7, dated Feb. 3, 2021, 13 pages.
Japanese Notice of Reasons for Refusal Application No. 2019-556709, dated Mar. 2, 2021, 9 pages.
European search report, European Application No. 18788046.3, dated Feb. 22, 2021, 9 pages.
Canadian Intellectual Property Office, Canadian Patent Application No. 3,060,350, Office Action, dated Apr. 14, 2021, 4 pages.
Sep. 28, 2020 List of References Used in Art Rejections in Cases, Sep. 28, 2020, 2 pages.
Japan Patent Office, Japanese Patent Application No. 2019-556705, Notice of reason for refusal, Transmittal Date Jun. 30, 2020, 4 pages.
National Intellectual Property Administration, PRC, PRC Patent Application No. 2018800135043, Nnotification of the First Office Action, dated Jul. 13, 2020, 10 pages.
Jul. 2023 IDS #14-10 List of References Used in Art Rejections in Cases, Jul. 27, 2023, 3 pages.
International Search Report in the related case PCT/IB2021/057456, dated Nov. 19, 2021, 4 pages.
Written Opinion of the International Searching Authority in the related case PCT/IB2021/057456, dated Nov. 19, 2021, 4 pages.
International Preliminary Report on Patentability (Ch II) in PCT/IB2020/060231, dated Jan. 27, 2022, 5 pages.
International Preliminary Report On Patentability (Ch II) in PCT/IB2020/060232 dated Jan. 28, 2022, 5 pages.
International Preliminary Report On Patentability (Ch II) in PCT/IB2020/060188 dated Jan. 26, 2022, 5 pages.
International Search Report in the related case PCT/IB2020/060188, dated Feb. 22, 2021, 4 pages.
Written Opinion of the International Searching Authority in the related case PCT/IB2020/060188, dated Feb. 22, 2021, 4 pages.
International Search Report in the related case PCT/IB2020/060231, dated Feb. 22, 2021, 4 pages.
Written Opinion of the International Searching Authority in the related case PCT/IB2020/060231, dated Feb. 22, 2021, 5 pages.
European search report European Application No. 18756971.0, dated Feb. 18, 2022, 7 pages.
Carlos Zamarreno-Ramos et al: "Multicasting Mesh AER: A Scalable Assembly Approach for Reconfigurable Neuromorphic Structured AER Systems. Application to ConvNets", IEEE Transactions on Biomedical Circuits and Systems, IEEE, US, vol. 7, No. 1, Feb. 1, 2013 (Feb. 1, 2013 ), pp. 82-102, XP011495376, ISSN: 1932-4545, DOI: 10.1109/TBCAS.2012.2195725, 21 pages.
Japanese Patent Office, Patent Application No. 2019-556709, Notice of Reasons for Refusal, dated Feb. 15, 2022, 7 pages.
European Patent Office, Patent Application No. 18787945.7, Summons to attend oral proceedings, Mar. 25, 2022, 5 pages.
Japanese Patent Office, Patent Application No. 2021-014029, Notice of Reasons for Refusal, dated May 10, 2022, 10 pages.
Japanese Patent Office, Patent Application No. 2021-035889, Notice of Reasons for Refusal, dated May 17, 2022, 6 pages.
Canadian Patent Office, Patent Application No. 3,060,350, Notice of Reasons for Refusal, dated Jun. 1, 2022, 4 pages.
Mohammed Amine Meghabber et al., 'A Flexible Network on-Chip Router for Data-Flow Monitoring', The 5th International Conference on Electrical Engineering—Boumerdes (ICEE-B), Oct. 31, 2017 A pp. 4-5; and figure 7, 6 pages.
International Search Report in the related case PCT/IB2020/060232, dated Mar. 1, 2021, 4 pages.
Written Opinion of the International Searching Authority in the related case PCT/IB2020/060232, dated Mar. 1, 2021, 5 pages.
Ardavan Pedram, William Lynch, Gary Lauterbach, "Accelerating Training in the Cloud", a tutorial presented at Hot Chips: A Symposium on High Performance Chips, HC30 (2018), Cupertino, California, USA, Aug. 19-21, 2018, IEEE Technical Committee on Microprocessors and Microcomputers, [retrieved on Mar. 21, 2019], Retrieved from the Internet <URL: http://www.hotchips.org/hc30/4allsides/hc30_all_slides_v20180821_4.zip >, 65 pages.
Ardavan Pedram, William Lynch, Gary Lauterbach, "Accelerating Training in the Cloud", a tutorial presented at Hot Chips: A Symposium on High Performance Chips, H030 (2018), Cupertino, California, USA, Aug. 19-21, 2018, IEEE Technical Committee on Microprocessors and Microcomputers, pre-presentation version believed to be only available to attendees and as downloaded Aug. 19, 2018 via on-site private network at the conference, 65 pages.
A. H. Benyamina, B.Beldjilali S. Eltar, K. Dellal, "Mapping Real Time Applications on NoC Architecture with Hybrid Multi-objective PSO Algorithm," Actes du Septième Colloque sur l'Optimisation et les Systèmes d'Information—COSI'2010 (informally AKA Proceedings of the Seventh Symposium on Optimization and Information Systems—COSI'2010), Apr. 18-20, 2010, Ouargla, Algeria, KASDI Merbah University, pp. 505-511, [retrieved on Mar. 21, 2019], Retrieved from the Internet <URL:https://dspace.univ-ouargla.dz/jspui/handle/123456789/2336.
F. A. Samman, "Microarchitecture and Implementation of Networks-on-Chip with a Flexible Concept for Communication Media Sharing", Dissertation (Doctoral Thesis), Technische Universität Darmstadt: Fachbereich Elektrotechnik und Informationstechnik (informally AKA Department of Electrical Engineering and Information Technology of the TU Darmstadt), Darmstadt, Germany, 2010, 286 pages.
Paris Mesidis, "Mapping of Real-time Applications on Network-on-Chip based MPSOCS." Dissertation (Masters Thesis), The University of York, Department of Computer Science, Heslington, York, UK, Dec. 2011, 105 pages.
A. Agarwal, et al., "Survey of Network on Chip (NoC) Architectures & Contributions", Journal of Engineering, Computing and Architecture, vol. 3, Issue 1, Scientific Journals International, a division of Global Commerce & Communication, Inc., Saint Cloud, Minnesota, 2009, [retrieved on Mar. 25, 2019], Retrieved from the Internet <URL: https://www.ee.ryerson.ca/~courses/ee8205/Data-Sheets/noc/Survey-NoC-Arch09.pdf >, 15 pages.
S Han, X Liu, H Mao, J Pu, A Pedram, M Horowitz, B Dally, "Deep Compression and EIE: Efficient Inference Engine on Compressed Deep Neural Network", Hot Chips: A Symposium on High Performance Chips, HC28 (2016), Cupertino, California, Aug. 21-23, 2016, IEEE Technical Committee on Microprocessors and Microcomputers, [retrieved on Mar. 25, 2019], Retrieved from the Internet <URL: http://www.hotchips.org/wp-content/uploads/hc_archives/hc28/hc28_archive.zip >, 6 pages.
D. Moloney, "Embedded Deep Neural Networks: The Cost of Everything and the Value of Nothing", Hot Chips: A Symposium on High Performance Chips, HC28 (2016), Cupertino, California, USA, Aug. 21-23, 2016, IEEE Technical Committee on Microprocessors and Microcomputers, [retrieved on Mar. 25, 2019], Retrieved from the Internet <URL: http://www.hotchips.org/wp-content/uploads/hc_archives/hc28/hc28_archive.zip >, 20 pages.
G. Efland, S. Parkh, H. Sanghavi, and A. Farooqui. "High Performance DSP for Vision, Imaging and Neural Networks", Hot Chips: A Symposium on High Performance Chips, HC28 (2016), Cupertino, California, USA, Aug. 21-23, 2016, IEEE Technical Committee on Microprocessors and Microcomputers, [retrieved on Mar. 25, 2019], Retrieved from the Internet <URL: http://www.hotchips.org/wp-content/uploads/hc_archives/hc28/hc28_archive.zip >, 30 pages.

(56) References Cited

OTHER PUBLICATIONS

K. Guo et al., "From Model to FPGA: Software-Hardware Co-Design for Efficient Neural Network Acceleration", Hot Chips: A Symposium on High Performance Chips, HC28 (2016), Cupertino, California, USA, Aug. 21-23, 2016, IEEE Technical Committee on Microprocessors and Microcomputers, [retrieved on Mar. 25, 2019], Retrieved from the Internet <URL: http://www.hotchips.org/wp-content/uploads/hc_archives/hc28/hc28_archive.zip>, 27 pages.
S. Schmitt et al., "Neuromorphic Hardware in the Loop: Training a Deep Spiking Network on the BrainScaleS Wafer-Scale System", in arXiv.org (A Cornell University Library e-print service & repository) [online], Mar. 6, 2017, arXiv:1703.01909v1 [cs.NE] (arXiv identifier and primary classification), [retrieved on Apr. 7, 2018], Retrieved from the Internet <URL: https://arxiv.org/pdf/1703.01909.pdf>, 8 pages.

\* cited by examiner

| CH 2114 | SQ 2113 | SC 2112 | SA 2111 | SS 2110 | Type 2109 | US 2108 | CX 2107 | Term 2106 | AC 2105 | SW 2104 | UE 2103 | UTID 2102 | Length 2101 |
|---|---|---|---|---|---|---|---|---|---|---|---|---|---|

Fabric Input Data Structure Descriptor, 2100

Fig. 21A

| AC 2125 | Index High 2128.2 | WLI 2132 | SA 2131 | SS 2130 | Type 2129 | Index Low 2128.1 | C 2127 | Color 2126 | SW 2124 | UE 2123 | UTID 2122 | Length 2121 |
|---|---|---|---|---|---|---|---|---|---|---|---|---|

Fabric Output Data Structure Descriptor, 2120

Fig. 21B

| Stride 2153 | WLI 2152 | SA 2151 | SS 2150 | Type 2149 | Base Address 2142 | Length 2141 |
|---|---|---|---|---|---|---|

1D Memory Vector Data Structure Descriptor, 2140

Fig. 21C

Length, 2161

| Length Upper Bits 2161.2 | WLI 2172 | SA 2171 | SS 2170 | Type 2169 | Base Address 2162 | Length Lower Bits 2161.1 |
|---|---|---|---|---|---|---|

4D Memory Vector Data Structure Descriptor, 2160

Fig. 21D

| SW 2184 | WLI 2192 | SA 2191 | SS 2190 | Type 2189 | FW 2188 | Base Address 2182 | Length 2181 |
|---|---|---|---|---|---|---|---|

Circular Memory Buffer Data Structure Descriptor, 2180

Fig. 21E

| Pop Color 2216 | Push Color 2215 | FIFO 2214 | End Address 2213 | Start Address 2212 | Type 2211 |

Circular Memory Buffer Extended Data Structure Descriptor, 2210

Fig. 22A

| Stride 2245 | Stride Select 4 2244.4 | Stride Select 3 2244.3 | Stride Select 2 2244.2 | Stride Select 1 2244.1 | DF 2243 | Dimensions 2242 | Type 2241 |

4D Memory Vector Extended Data Structure Descriptor, 2240

Fig. 22B

Basic Operation
matrix $m$ x vector $v$ = vector $v'$

ACCELERATED DEEP LEARNING

CROSS REFERENCE TO RELATED APPLICATIONS

To the extent permitted by the type of the instant application, this application incorporates by reference for all purposes the following applications, all commonly owned with the instant application at the time the invention was made:

U.S. Provisional Application Ser. No. 62/628,784, filed 2018 Feb. 9, first named inventor Sean LIE, and entitled FABRIC VECTORS FOR DEEP LEARNING ACCELERATION;

U.S. Provisional Application Ser. No. 62/628,773, filed 2018 Feb. 9, first named inventor Sean LIE, and entitled DATA STRUCTURE DESCRIPTORS FOR DEEP LEARNING ACCELERATION;

U.S. Provisional Application Ser. No. 62/580,207, filed 2017 Nov. 1, first named inventor Sean LIE, and entitled NEURON SMEARING FOR ACCELERATED DEEP LEARNING;

U.S. Provisional Application Ser. No. 62/542,645, filed 2017 Aug. 8, first named inventor Sean LIE, and entitled DATAFLOW TRIGGERED TASKS FOR ACCELERATED DEEP LEARNING;

U.S. Provisional Application Ser. No. 62/542,657, filed 2017 Aug. 8, first named inventor Sean LIE, and entitled TASK SYNCHRONIZATION FOR ACCELERATED DEEP LEARNING;

U.S. Provisional Application Ser. No. 62/522,065, filed 2017 Jun. 19, first named inventor Sean LIE, and entitled WAVELET REPRESENTATION FOR ACCELERATED DEEP LEARNING;

U.S. Provisional Application Ser. No. 62/522,081, filed 2017 Jun. 19, first named inventor Sean LIE, and entitled CONTROL WAVELET FOR ACCELERATED DEEP LEARNING;

U.S. Provisional Application Ser. No. 62/520,433, filed 2017 Jun. 15, first named inventor Michael Edwin JAMES, and entitled INCREASED CONCURRENCY AND EFFICIENCY OF DEEP NETWORK TRAINING VIA CONTINUOUS PROPAGATION;

U.S. Provisional Application Ser. No. 62/517,949, filed 2017 Jun. 11, first named inventor Sean LIE, and entitled ACCELERATED DEEP LEARNING;

U.S. Provisional Application Ser. No. 62/486,372, filed 2017 Apr. 17, first named inventor Sean LIE, and entitled ACCELERATED DEEP LEARNING; and U.S. Provisional Application Ser. No. 62/462,640, filed 2017 Feb. 23, first named inventor Michael Edwin JAMES, and entitled INCREASED CONCURRENCY AND EFFICIENCY OF DEEP NETWORK TRAINING VIA CONTINUOUS PROPAGATION.

BACKGROUND

Field

Advancements in accelerated deep learning are needed to provide improvements in one or more of accuracy, performance, and energy efficiency.

Related Art

Unless expressly identified as being publicly or well known, mention herein of techniques and concepts, including for context, definitions, or comparison purposes, should not be construed as an admission that such techniques and concepts are previously publicly known or otherwise part of the prior art. All references cited herein (if any), including patents, patent applications, and publications, are hereby incorporated by reference in their entireties, whether specifically incorporated or not, for all purposes.

Synopsis

The invention may be implemented in numerous ways, e.g., as a process, an article of manufacture, an apparatus, a system, a composition of matter, and a computer readable medium such as a computer readable storage medium (e.g., media in an optical and/or magnetic mass storage device such as a disk, an integrated circuit having non-volatile storage such as flash storage), or a computer network wherein program instructions are sent over optical or electronic communication links. The Detailed Description provides an exposition of one or more embodiments of the invention that enable improvements in cost, profitability, performance, efficiency, and utility of use in the field identified above. The Detailed Description includes an Introduction to facilitate understanding of the remainder of the Detailed Description. The Introduction includes Example Embodiments of one or more of systems, methods, articles of manufacture, and computer readable media in accordance with concepts described herein. As is discussed in more detail in the Conclusions, the invention encompasses all possible modifications and variations within the scope of the issued claims.

BRIEF DESCRIPTION OF DRAWINGS

FIG. 21A illustrates selected details of an embodiment of a Fabric Input Data Structure Descriptor.

FIG. 21B illustrates selected details of an embodiment of a Fabric Output Data Structure Descriptor.

FIG. 21C illustrates selected details of an embodiment of a 1D Memory Vector Data Structure Descriptor.

FIG. 21D illustrates selected details of an embodiment of a 4D Memory Vector Data Structure Descriptor.

FIG. 21E illustrates selected details of an embodiment of a Circular Memory Buffer Data Structure Descriptor.

FIG. 22A illustrates selected details of an embodiment of a Circular Memory Buffer Extended Data Structure Descriptor.

FIG. 22B illustrates selected details of an embodiment of a 4D Memory Vector Extended Data Structure Descriptor.

Figure 1:
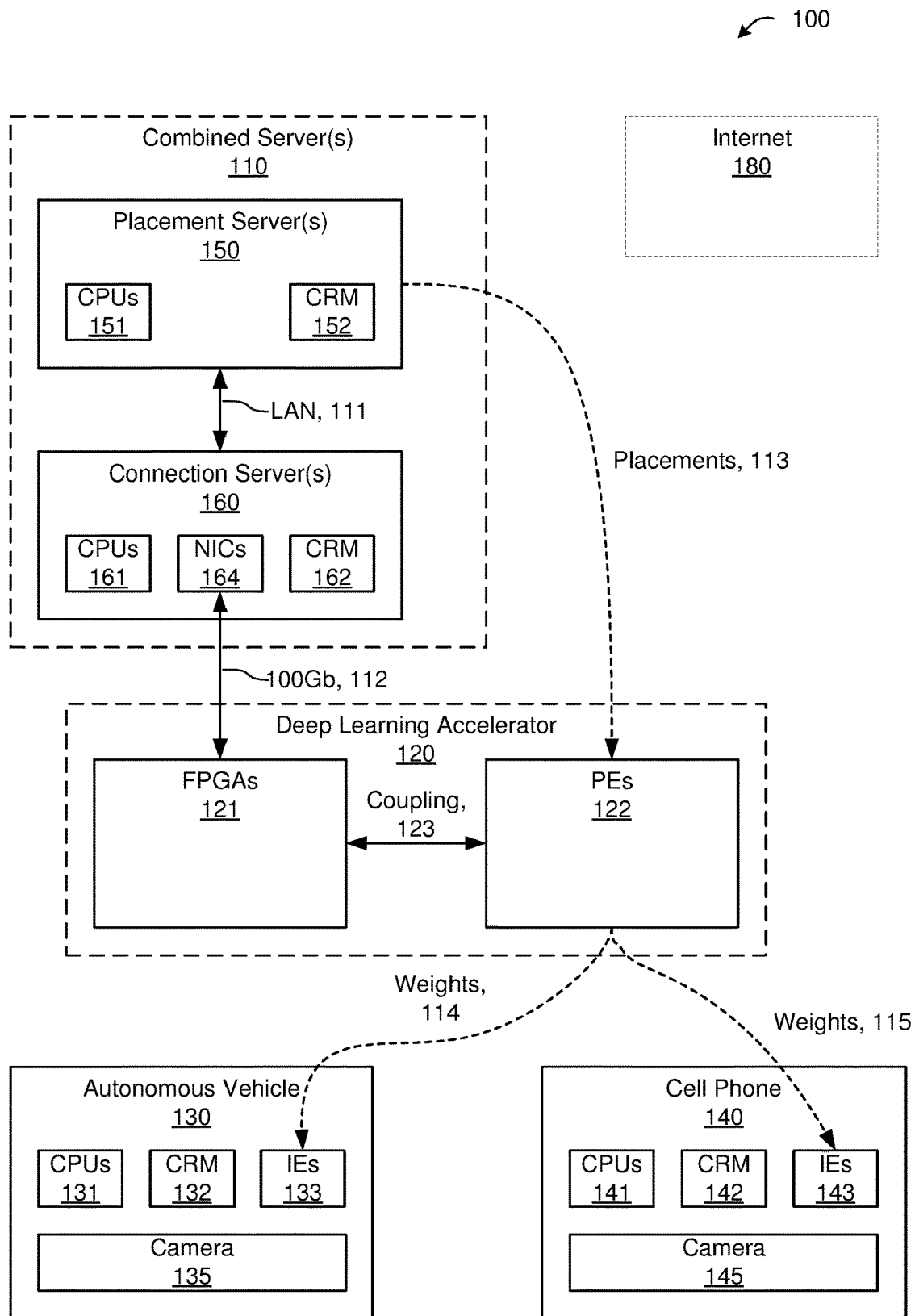
FIG. 1 illustrates selected details of an embodiment of a system for neural network training and inference, using a deep learning accelerator.

| List of Reference Symbols in Drawings | |
|---|---|
| Ref. Symbol | Element Name |
| 100 | Neural Network System |
| 110 | Combined Server(s) |
| 111 | LAN |
| 112 | 100 Gb |
| 113 | Placements |
| 114 | Weights |
| 115 | Weights |
| 120 | Deep Learning Accelerator |
| 121 | FPGAs |
| 122 | PEs |
| 123 | Coupling |
| 130 | Autonomous Vehicle |
| 131 | CPUs |
| 132 | CRM |
| 133 | IEs |
| 135 | Camera |
| 140 | Cell Phone |
| 141 | CPUs |
| 142 | CRM |
| 143 | IEs |
| 145 | Camera |
| 150 | Placement Server(s) |
| 151 | CPUs |
| 152 | CRM |
| 160 | Connection Server(s) |
| 161 | CPUs |
| 162 | CRM |
| 164 | NICs |
| 180 | Internet |
| 200 | Neural Network Software |
| 210 | Placement Server(s) SW |
| 212 | Neuron to PE Mapping SW |
| 220 | Connection Server(s) SW |
| 224 | 100 Gb NIC Driver |
| 225 | Training Info Provider SW |
| 226 | Weight Receiver SW |
| 230 | Autonomous Vehicle SW |
| 232 | Video Camera SW |
| 233 | Inference Engine(s) SW |
| 234 | Navigating SW |
| 240 | Cell Phone SW |
| 242 | Still Camera SW |
| 243 | Inference Engine(s) SW |
| 244 | Posting SW |
| 250 | Misc SW on FPGAs |
| 260 | Task SW on PEs |
| 300 | Neural Network Training/Inference, Overall |
| 310 | Place Neurons |
| 320 | Initialize FPGAs |
| 330 | Initialize PEs |
| 340 | Training Data => PEs |
| 350 | Forward Pass, Delta Pass, Chain Pass, Update Weights |
| 360 | Training Complete? |
| 370 | Weights Out |
| 380 | Use Weights for Inference |
| 400 | Deep Learning Accelerator |
| 401 | Forward |
| 402 | Delta |
| 403 | Chain |
| 410 | ASIC |
| 411 | ASIC |
| 412 | Wafer |
| 420 | I/O FPGAs |
| 430 | North coupling |
| 431 | East coupling |
| 432 | South coupling |
| 433 | West coupling |
| 497 | Particular PE |
| 498 | Particular PE |
| 499 | PE |
| 500 | PE |
| 510 | Router |
| 511 | West |
| 512 | Skip West |
| 513 | North |
| 514 | Skip East |

List of Reference Symbols in Drawings

| Ref. Symbol | Element Name |
|---|---|
| 515 | East |
| 516 | South |
| 520 | Compute Element |
| 521 | Off Ramp |
| 522 | On Ramp |
| 600 | Router |
| 610 | Data In |
| 611 | skipX+ |
| 612 | skipX− |
| 613 | X+ |
| 614 | X− |
| 615 | Y+ |
| 616 | Y− |
| 617 | On Ramp |
| 620 | Data Out |
| 621 | skipX+ |
| 622 | skipX− |
| 623 | X+ |
| 624 | X− |
| 625 | Y+ |
| 626 | Y− |
| 627 | Off Ramp |
| 630 | Stall Out |
| 631 | skipX+ |
| 632 | skipX− |
| 633 | X+ |
| 634 | X− |
| 635 | Y+ |
| 636 | Y− |
| 637 | On Ramp |
| 640 | Sources |
| 641 | skipX+ |
| 642 | skipX− |
| 643 | X+ |
| 644 | X− |
| 645 | Y+ |
| 646 | Y− |
| 647 | Off Ramp |
| 650 | Data Queues |
| 651 | Write Dec |
| 652 | Out |
| 653 | Sources |
| 654 | Router Sched |
| 656 | Gen Stall |
| 657 | Stall |
| 660 | Control Info |
| 661 | Dest |
| 662 | Sent |
| 670 | Src |
| 710 | Wavelet Ingress |
| 711 | Wait for Wavelet |
| 712 | Receive Wavelet |
| 713 | Wavelet => Router Q |
| 720 | Stall Info |
| 721 | Router Q Full? |
| 722 | DeAssert Stall |
| 723 | Assert Stall |
| 730 | Wavelet Egress |
| 731 | Q Empty? |
| 732 | Choose? |
| 733 | Stalled? |
| 734 | Send Wavelet |
| 800 | CE |
| 812 | Terminate |
| 820 | Off Ramp |
| 822 | Hash |
| 824 | Qdistr |
| 830 | Picker |
| 834 | PC |
| 836 | I-Seq |
| 840 | Dec |
| 842 | RF |
| 844 | D-Seq |
| 846 | DSRs |
| 848 | D-Store |
| 852 | Data Path |
| 854 | Memory |
| 860 | On Ramp |
| 890 | Base |
| 896 | Scheduling Info |
| 897 | Qs |
| 897.0 | Q0 |
| 897.N | QN |
| 898 | Active Bits |
| 898.0 | Active Bit 0 |
| 898.N | Active Bit N |
| 899 | Block Bits |
| 899.0 | Block Bit 0 |
| 899.N | Block Bit N |
| 900 | Processing a Wavelet for Task Initiation, Overall |
| 901 | Start |
| 905 | Select Ready Wavelet for Task Initiation |
| 908 | Control/Data? |
| 920 | Add (Color * 4) to Base Register to Form Instruction Address |
| 930 | Add Lower Index Bits to Base Register to Form Instruction Address |
| 950 | Fetch Instructions From Memory at Instruction Address |
| 960 | Execute Fetched Instruction(s) |
| 961 | Not Terminate |
| 962 | Terminate |
| 990 | End |
| 1000 | Instruction Processing, Overall |
| 1010 | Check Control Inputs |
| 1012 | Branch Stall? |
| 1014 | Do Nothing |
| 1016 | Terminate => Scheduler |
| 1020 | EX Branch Resolution? |
| 1022 | D-Seq Stall? |
| 1024 | I-Seq Mode? |
| 1026 | Fetch Instr |
| 1028 | Terminate Instr? |
| 1030 | Branch Instr? |
| 1032 | Update PC Instr => Decode |
| 1040 | Process Next Task/Branch PC Task Addr => PC |
| 1042 | Stall Sequencer |
| 1100 | Dependency Management, Overall |
| 1101 | Activations From Prior Layer |
| 1102 | Receive and Accumulate Activations |
| 1110 | Closeout From Prior Layer |
| 1111 | Receive Activation Closeout |
| 1112 | Start Partial Sums |
| 1113 | Calculate Partial Sum |
| 1114 | Propagate Partial Sums |
| 1120 | Transmit Activations |
| 1121 | Activations to Next Layer |
| 1122 | Closeout to Next Layer |
| 1123 | Reschedule |
| 1131 | Flow Control Dependency |
| 1132 | Output Wavelet to Different PE |
| 1133 | Wake Wavelet to Self |
| 1200 | Activation Accumulation/Closeout and Partial Sum Computation/Closeout, Overall |
| 1201 | Start |
| 1202 | Receive Activation |
| 1203 | Accumulate Activations |
| 1204 | Receive Activation Closeout |
| 1205 | Start Partial Sum Ring |
| 1206 | Receive Partial Sum |
| 1207 | Compute Partial Sum |
| 1208 | Transmit Partial Sum |
| 1209 | Transmit Activations |
| 1210 | Transmit Closeout |
| 1211 | End |
| 1301 | Sparse Wavelet |
| 1302 | Sparse Wavelet Payload |

List of Reference Symbols in Drawings

| Ref. Symbol | Element Name |
|---|---|
| 1320 | Control Bit |
| 1321 | Index |
| 1321.1 | Lower Index Bits |
| 1321.2 | Upper Index Bits |
| 1322 | Sparse Data |
| 1324 | Color |
| 1331 | Dense Wavelet |
| 1332 | Dense Wavelet Payload |
| 1340 | Control Bit |
| 1343.1 | Dense Data |
| 1343.2 | Dense Data |
| 1344 | Color |
| 1400 | Wavelet Creation Flow, Overall |
| 1401 | Start |
| 1402 | Initialize PEs |
| 1403 | Set Source |
| 1404 | Set Destination (Fabric) DSR |
| 1404.5 | Fetch/Decode Instruction with Destination DSR |
| 1404.6 | Read DSR(s) |
| 1405 | Read (Next) Source Data Element(s) from Queue/Memory |
| 1406 | Provide Data Element(s) as Wavelet to Router |
| 1407 | More Data Elements? |
| 1408 | Transmit Wavelet(s) to Fabric |
| 1409 | Receive Wavelet(s) from Fabric |
| 1410 | End |
| 1420 | CE of Transmitting PE |
| 1430 | Router of Transmitting PE |
| 1440 | Router of Receiving PE |
| 1500 | Wavelet Receive Flow, Overall |
| 1501 | Start |
| 1502 | Initialize PEs |
| 1503 | Receive Wavelet at Router |
| 1504 | To Other PE(s)? |
| 1505 | Transmit Wavelet to Output(s) |
| 1506 | For Local CE? |
| 1507 | Write Wavelet to Picker Queue |
| 1510 | End |
| 1520 | Router of Receiving PE |
| 1530 | CE of Receiving PE |
| 1550 | Wavelet Consumption Flow, Overall |
| 1551 | Start |
| 1552 | Picker Selects Wavelet for Processing |
| 1553 | Fetch, Execute Instructions |
| 1554 | End |
| 1600 | Block and Unblock Instruction Processing Flow, Overall |
| 1601 | Start |
| 1602 | Fetch, Decode Instruction |
| 1603 | Block Instruction? |
| 1604 | Block Color(s) |
| 1610 | Unblock Instruction? |
| 1611 | Unblock Color(s) |
| 1620 | Execute Instruction |
| 1630 | End |
| 1700 | Neural Network |
| 1710 | Input Layer |
| 1711 | N11 |
| 1712 | N12 |
| 1713 | N13 |
| 1720 | Internal Layers |
| 1721 | N21 |
| 1721.1, 1721.2 | ½ N21 portions, respectively |
| 1722 | N22 |
| 1722.1, 1722.2 | ½ N22 portions, respectively |
| 1723 | N23 |
| 1723.1, 1723.2 | ½ N23 portions, respectively |
| 1724 | N24 |
| 1724.1, 1724.2 | ½ N24 portions, respectively |
| 1731 | N31 |
| 1731.1, 1731.2, 1731.3, 1731.4 | ¼ N31 portions, respectively |
| 1732 | N32 |
| 1732.1, 1732.2, 1732.3, 1732.4 | ¼ N32 portions, respectively |
| 1733 | N33 |
| 1740 | Output Layer |
| 1741 | N41 |
| 1742 | N42 |
| 1791 | communication |
| 1791.1 | communication portion |
| 1792 | communication |
| 1792.1 | communication portion |
| 1793 | communication |
| 1793.1 | communication portion |
| 1820 | PE0 |
| 1821 | PE1 |
| 1822 | PE2 |
| 1823 | PE3 |
| 1824 | PE4 |
| 1825 | PE5 |
| 1910 | in0 |
| 1911 | in1 |
| 1912 | in2 |
| 1913 | in3 |
| 1914 | in4 |
| 1915 | in5 |
| 1920 | out0 |
| 1921 | out1 |
| 1922 | out2 |
| 1923 | out3 |
| 1924 | out4 |
| 1925 | out5 |
| 1930.1 | ½ Local Compute |
| 1930.2 | ½ Local Compute |
| 1940.1 | ½ Local Storage |
| 1940.2 | ½ Local Storage |
| 1950.1 | Additional Compute |
| 1950.2 | Additional Compute |
| 1960.1 | Additional Storage |
| 1960.2 | Additional Storage |
| 1970 | Additional Communication |
| 2000 | Wafer Portion |
| 2040, 2041, 2043, 2044 | coupling between adjacent PEs, respectively |
| 2050, 2051, 2052, 2053, 2054, 2055, 2056, 2057 | portion of coupling between adjacent PEs, respectively |
| 2060 | communication |
| 2100 | Fabric Input Data Structure Descriptor |
| 2101 | Length |
| 2102 | UTID (Microthread Identifier) |
| 2103 | UE (Microthread Enable) |
| 2104 | SW (SIMD Width) |
| 2105 | AC (Activate Color) |
| 2106 | Term (Terminate Microthread on Control Wavelet) |
| 2107 | CX (Control Wavelet Transform Enable) |
| 2108 | US (Microthread Sparse Mode) |
| 2109 | Type |
| 2110 | SS (Single Step) |
| 2111 | SA (Save Address/Conditional Single Step Mode) |
| 2112 | SC (Color Specified, Normal Mode) |
| 2113 | SQ (Queue Specified, Normal Mode) |
| 2114 | CH (Color, High Bits) |
| 2120 | Fabric Output Data Structure Descriptor |
| 2121 | Length |
| 2122 | UTID (Microthread Identifier) |
| 2123 | UE (Microthread Enable) |
| 2124 | SW (SIMD Width) |
| 2125 | AC (Activate Color) |
| 2126 | Color |
| 2127 | C (Output Control Bit) |
| 2128.1 | Index Low |
| 2128.2 | Index High |
| 2129 | Type |
| 2130 | SS (Single Step) |
| 2131 | SA (Save Address/Conditional Single Step Mode) |
| 2132 | WLI (Wavelet Index Select) |
| 2140 | 1D Memory Data Structure Descriptor |
| 2141 | Length |

List of Reference Symbols in Drawings

| Ref. Symbol | Element Name |
| --- | --- |
| 2142 | Base Address |
| 2149 | Type |
| 2150 | SS (Single Step) |
| 2151 | SA (Save Address/Conditional Single Step Mode) |
| 2152 | WLI (Wavelet Index Select) |
| 2153 | Stride |
| 2160 | 4D Memory Data Structure Descriptor |
| 2161 | Length |
| 2161.1 | Length Lower Bits |
| 2161.2 | Length Upper Bits |
| 2162 | Base Address |
| 2169 | Type |
| 2170 | SS (Single Step) |
| 2171 | SA (Save Address/Conditional Single Step Mode) |
| 2172 | WLI (Wavelet Index Select) |
| 2180 | Circular Memory Buffer Data Structure Descriptor |
| 2181 | Length |
| 2182 | Base Address |
| 2184 | SW (SIMD Width) |
| 2188 | FW (FIFO Wrap Bit) |
| 2189 | Type |
| 2190 | SS (Single Step) |
| 2191 | SA (Save Address/Conditional Single Step Mode) |
| 2192 | WLI (Wavelet Index Select) |
| 2210 | Circular Memory Buffer Extended Data Structure Descriptor |
| 2211 | Type |
| 2212 | Start Address |
| 2213 | End Address |
| 2214 | FIFO |
| 2215 | Push (Activate) Color |
| 2216 | Pop (Activate) Color |
| 2240 | 4D Memory Vector Extended Data Structure Descriptor |
| 2241 | Type |
| 2242 | Dimensions |
| 2243 | DF (Dimension Format) |
| 2244.1 | Stride Select (for Dimension) 1 |
| 2244.2 | Stride Select (for Dimension) 2 |
| 2244.3 | Stride Select (for Dimension) 3 |
| 2244.4 | Stride Select (for Dimension) 4 |
| 2245 | Stride |
| 2300 | Data Structure Descriptor Flow, Overall |
| 2301 | Start |
| 2302 | Set DSR(s) |
| 2303 | Fetch/Decode Instruction with DSR(s) |
| 2304 | Read DSR(s) |
| 2305 | (optional) Set XDSR(s) |
| 2306 | (optional) Read XDSR(s) |
| 2310 | Read (Next) Source Data Element(s) from Queue/Memory |
| 2311 | Perform (Next) Operation(s) on Data Element(s) |
| 2312 | Write (Next) Destination Data Element(s) to Queue/Memory |
| 2313 | More Data Element(s)? |
| 2316 | End |
| 2400 | Data Structure Descriptor Decode Flow, Overall |
| 2401 | Start |
| 2410 | Fabric Vector |
| 2411 | Type = Fabric? |
| 2412 | Access via DSD |
| 2420 | Memory Vector |
| 2421 | Type = XDSR? |
| 2422 | Read XDSR Specified via DSD |
| 2423 | Type = 4D Vector? |
| 2424 | (optional) Read Stride Register(s) |
| 2427 | Access 1D via DSD |
| 2428 | Access 4D via XDSD |
| 2429 | Access Circular Buffer via XDSD |
| 2499 | End |
| 2510 | Multiple Operand Instruction |
| 2511 | Instruction Type |
| 2512 | Opcode |
| 2513 | Operand 0 Encoding |
| 2513.1 | Operand 0 Type |
| 2513.2 | Operand 0 |
| 2514 | Operand 1 Encoding |
| 2514.1 | Operand 1 Type |
| 2514.2 | Operand 1 |
| 2515 | Terminate |
| 2520 | One Source, No Destination Operand Instruction |
| 2521 | Instruction Type |
| 2522 | Opcode |
| 2523 | Operand 1 Encoding |
| 2523.1 | Operand 1 Type |
| 2523.2 | Operand 1 |
| 2524 | Immediate |
| 2525 | Terminate |
| 2530 | Immediate Instruction |
| 2531 | Instruction Type |
| 2532 | Opcode |
| 2533.2 | Operand 0 |
| 2534.1 | Immediate Low |
| 2534.2 | Immediate High |
| 2534 | Immediate |
| 2611 | First Forward Pass |
| 2612 | Second Forward Pass |
| 2621 | First Backward Pass |
| 2622 | Second Backward Pass |
| 2631 | Mini-Batch Size (N) |
| 2632 | Overhead |
| 2633 | Update Interval (U) |
| 2651 | Forward Pass |
| 2661 | Backward Pass |
| 2665 | Forward Pass |
| 2666 | Backward Pass |
| 2667 | Weight Update Use |
| 2671 | Forward Pass |
| 2681 | Backward Pass |
| 2685 | Activation Storage |
| 2686 | Recomputed Activation Storage |
| 2701 | Previous Layer |
| 2702 | Subsequent Layer |
| 2703 | Previous Layer |
| 2704 | Subsequent Layer |
| 2710 | Compute |
| 2711 | F |
| 2712 | B |
| 2715 | Storage |
| 2716 | A |
| 2717 | W |
| 2718 | W |
| 2720 | Compute |
| 2721 | F |
| 2722 | B |
| 2725 | Storage |
| 2726 | A |
| 2727 | W |
| 2728 | W |
| 2729 | A |
| 2730 | Compute |
| 2735 | Storage |
| 2740 | Compute |
| 2745 | Storage |
| 2781 | $A_{1,t}$ |
| 2782 | $A_{2,t}$ |
| 2783 | $A_{3,t}$ |
| 2784 | $A'_{2,t}$ |
| 2791 | $\Delta_{1,t}$ |
| 2792 | $\Delta_{2,t}$ |
| 2793 | $\Delta_{3,t}$ |
| 2794 | $\Delta'_{1,t}$ |
| 2795 | $\Delta'_{2,t}$ |
| 2796 | $\Delta'_{3,t}$ |
| 2901 | f_rxact:acc |
| 2902 | f_rxact:close |
| 2903 | f_psum:prop |
| 2904 | f_txact:tx |
| 2911 | Activations |

-continued

| List of Reference Symbols in Drawings | |
|---|---|
| Ref. Symbol | Element Name |
| 2912 | Closeouts |
| 2913 | Flow |
| 2914 | Wake |
| 2915 | Reschedule |
| 2916 | Start Psums |
| 2921 | Activations |
| 2922 | Closeouts |
| 2930 | Prop Psums |
| 2931 | Prop Psums |

DETAILED DESCRIPTION

A detailed description of one or more embodiments of the invention is provided below along with accompanying figures illustrating selected details of the invention. The invention is described in connection with the embodiments. The embodiments herein are understood to be merely exemplary, the invention is expressly not limited to or by any or all of the embodiments herein, and the invention encompasses numerous alternatives, modifications, and equivalents. To avoid monotony in the exposition, a variety of word labels (such as: first, last, certain, various, further, other, particular, select, some, and notable) may be applied to separate sets of embodiments; as used herein such labels are expressly not meant to convey quality, or any form of preference or prejudice, but merely to conveniently distinguish among the separate sets. The order of some operations of disclosed processes is alterable within the scope of the invention. Wherever multiple embodiments serve to describe variations in process, system, and/or program instruction features, other embodiments are contemplated that in accordance with a predetermined or a dynamically determined criterion perform static and/or dynamic selection of one of a plurality of modes of operation corresponding respectively to a plurality of the multiple embodiments. Numerous specific details are set forth in the following description to provide a thorough understanding of the invention. The details are provided for the purpose of example and the invention may be practiced according to the claims without some or all of the details. For the purpose of clarity, technical material that is known in the technical fields related to the invention has not been described in detail so that the invention is not unnecessarily obscured.

INTRODUCTION

This introduction is included only to facilitate the more rapid understanding of the Detailed Description; the invention is not limited to the concepts presented in the introduction (including explicit examples, if any), as the paragraphs of any introduction are necessarily an abridged view of the entire subject and are not meant to be an exhaustive or restrictive description. For example, the introduction that follows provides overview information limited by space and organization to only certain embodiments. There are many other embodiments, including those to which claims will ultimately be drawn, discussed throughout the balance of the specification.

In an aspect conceptually related to continuous propagation for accelerated deep learning, techniques in advanced deep learning provide improvements in one or more of accuracy, performance, and energy efficiency, such as accuracy of learning, accuracy of prediction, speed of learning, performance of learning, and energy efficiency of learning. An array of processing elements performs flow-based computations on wavelets of data. Each processing element has a respective compute element and a respective routing element. Each compute element has processing resources and memory resources. Each router enables communication via wavelets with at least nearest neighbors in a 2D mesh. Stochastic gradient descent, mini-batch gradient descent, and continuous propagation gradient descent are techniques usable to train weights of a neural network modeled by the processing elements. Reverse checkpoint is usable to reduce memory usage during the training.

In an aspect conceptually related to fabric vectors for accelerated deep learning, techniques in advanced deep learning provide improvements in one or more of accuracy, performance, and energy efficiency. An array of processing elements performs flow-based computations on wavelets of data. Each processing element has a respective compute element and a respective routing element. Each compute element has memory. Each router enables communication via wavelets with at least nearest neighbors in a 2D mesh. Routing is controlled by respective virtual channel specifiers in each wavelet and routing configuration information in each router. Instructions executed by the compute element include one or more operand specifiers, some of which specify a data structure register storing a data structure descriptor. The data structure descriptor describes an operand as a fabric vector or a memory vector. The data structure descriptor further describes the length of the fabric vector, whether the fabric vector is eligible for microthreading, and a number of data elements of the fabric vector to receive, transmit, and/or process in parallel. The data structure descriptor further specifies virtual channel and task identification information relating to processing the fabric vector, whether to terminate upon receiving a control wavelet, and whether to mark an outgoing wavelet as a control wavelet.

In an aspect conceptually related to data structure descriptors for accelerated deep learning, techniques in advanced deep learning provide improvements in one or more of accuracy, performance, and energy efficiency. An array of processing elements performs flow-based computations on wavelets of data. Each processing element has a respective compute element and a respective routing element. Each compute element has memory. Each router enables communication via wavelets with at least nearest neighbors in a 2D mesh. Routing is controlled by respective virtual channel specifiers in each wavelet and routing configuration information in each router. Instructions executed by the compute element include one or more operand specifiers, some of which specify a data structure register storing a data structure descriptor. The data structure descriptor describes an operand as a fabric vector or a memory vector. The data structure descriptor further describes the memory vector as one of a one-dimensional vector, a four-dimensional vector, or a circular buffer vector. Optionally, the data structure descriptor specifies an extended data structure register storing an extended data structure descriptor. The extended data structure descriptor specifies parameters relating to a four-dimensional vector or a circular buffer vector.

In an aspect conceptually related to neuron smearing for accelerated deep learning, techniques in advanced deep learning provide improvements in one or more of accuracy, performance, and energy efficiency. An array of processing elements performs flow-based computations on wavelets of data. Each processing element has a respective compute element and a respective routing element. Each compute element has memory. Each router enables communication via wavelets with at least nearest neighbors in a 2D mesh. Routing is controlled by respective virtual channel specifiers in each wavelet and routing configuration information in each router. At least a first single neuron is implemented using resources of a plurality of the array of processing elements. At least a portion of a second neuron is implemented using resources of one or more of the plurality of processing elements. In some usage scenarios, the foregoing neuron implementation enables greater performance by enabling a single neuron to use the computational resources of multiple processing elements and/or computational load balancing across the processing elements while maintaining locality of incoming activations for the processing elements.

In an aspect conceptually related to task synchronization for accelerated deep learning, techniques in advanced deep learning provide improvements in one or more of accuracy, performance, and energy efficiency. An array of processing elements performs flow-based computations on wavelets of data. Each processing element has a respective compute element and a respective routing element. Each compute element has memory. Each router enables communication via wavelets with at least nearest neighbors in a 2D mesh. Routing is controlled by respective virtual channel specifiers in each wavelet and routing configuration information in each router. A particular one of the compute elements conditionally selects for task initiation a previously received wavelet specifying a particular one of the virtual channels. The conditional selecting excludes the previously received wavelet for selection until at least block/unblock state maintained for the particular virtual channel is in an unblock state. The compute elements execute block/unblock instructions to modify the block/unblock state.

In an aspect conceptually related to dataflow triggered tasks for accelerated deep learning, techniques in advanced deep learning provide improvements in one or more of accuracy, performance, and energy efficiency. An array of processing elements performs flow-based computations on wavelets of data. Each processing element has a respective compute element and a respective routing element. Each compute element has memory. Each router enables communication via wavelets with at least nearest neighbors in a 2D mesh. Routing is controlled by respective virtual channel specifiers in each wavelet and routing configuration information in each router. A particular one of the compute elements receives a particular wavelet comprising a particular virtual channel specifier and a particular data element. Instructions are read from the memory of the particular compute element based at least in part on the particular virtual channel specifier. The particular data element is used as an input operand to execute at least one of the instructions.

In an aspect conceptually related to control wavelet for accelerated deep learning, techniques in advanced deep learning provide improvements in one or more of accuracy, performance, and energy efficiency. An array of processing elements performs flow-based computations on wavelets of data. Each processing element has a respective compute element and a respective routing element. Each compute element has a memory. Each router enables communication via wavelets with at least nearest neighbors in a 2D mesh. A particular one of the compute elements receives a wavelet. If a control specifier of the wavelet is a first value, then instructions are read from the memory of the particular compute element in accordance with an index specifier of the wavelet. If the control specifier is a second value, then instructions are read from the memory of the particular compute element in accordance with a virtual channel specifier of the wavelet. Then the particular compute element initiates execution of the instructions.

In an aspect conceptually related to wavelet representation for accelerated deep learning, techniques in advanced deep learning provide improvements in one or more of accuracy, performance, and energy efficiency. An array of processing elements performs flow-based computations on wavelets of data. Each processing element has a respective compute element and a respective routing element. Each compute element has dedicated storage. Each router enables communication with at least nearest neighbors in a 2D mesh. The communication is via wavelets in accordance with a representation comprising an index specifier, a virtual channel specifier, an index specifier, a data element specifier, and an optional control/data specifier. The virtual channel specifier and the index specifier are associated with one or more instructions. The index specifier is associated with at least a first instruction operand of the one or more instructions. The data element is associated with at least a second instruction operand of the one or more instructions.

A first example of accelerated deep learning is using a deep learning accelerator to train a neural network. A second example of accelerated deep learning is using a deep learning accelerator to operate a trained neural network to perform inferences. A third example of accelerated deep learning is using a deep learning accelerator to train a neural network and subsequently perform inference with any one or more of the trained neural network, information from same, and a variant of same.

Examples of neural networks include Fully Connected Neural Networks (FCNNs), Recurrent Neural Networks (RNNs), Convolutional Neural Networks (CNNs), Long Short-Term Memory (LSTM) networks, autoencoders, deep belief networks, and generative adversarial networks.

An example of training a neural network is determining one or more weights associated with the neural network, such as by hardware acceleration via a deep learning accelerator. An example of making an inference is using a trained neural network to compute results by processing input data based on weights associated with the trained neural network.

A neural network processes data according to a dataflow graph comprising layers of neurons. Stimuli (e.g., input data) is received by an input layer of neurons and the computed results of the data flow graph (e.g., output data) are provided by an output layer of neurons. Example layers of neurons include input layers, output layers, rectified linear unit layers, fully connected layers, recurrent layers, long short-term memory layers, convolutional layers, kernel layers, dropout layers, and pooling layers. A neural network is conditionally and/or selectively trained, subject to hardware acceleration. After being trained, a neural network is conditionally and/or selectively used for inference, subject to hardware acceleration.

An example of a deep learning accelerator is one or more relatively specialized hardware elements operating in conjunction with one or more software elements to train a neural network and/or perform inference with a neural network relatively more efficiently than using relatively less specialized hardware elements. Some implementations of the relatively specialized hardware elements include one or more hardware logic circuitry elements such as transistors, resistors, inductors, capacitors, wire interconnects, combinatorial logic (e.g., NAND, NOR) gates, latches, register files, memory arrays, tags for memory arrays, content-addressable memories, flash, ROM, DRAM, SRAM, Serializer/Deserializer (SerDes), I/O drivers, and the like, such as implemented via custom logic, synthesized logic, ASICs, and/or FPGAs. Some of the relatively less specialized hardware elements include conventional CPUs and conventional GPUs.

An example implementation of a deep learning accelerator is enabled to process dataflow in accordance with computations performed for training of a neural network and/or inference with a neural network. Some deep learning accelerators comprise processing elements coupled via a fabric and enabled to communicate with each other via the fabric. Sometimes the processing elements and the fabric are collectively referred to as a fabric of processing elements.

An example implementation of a processing element is enabled to communicate and process wavelets. In various circumstances, the wavelets correspond to dataflow and/or instruction flow in accordance with communication and/or processing enabling computations performed for training of and/or inference using a neural network.

An example processing element comprises a router to communicate wavelets via the fabric and a compute element to process the wavelets. An example router is coupled to a plurality of elements: a fabric, an off ramp to the compute element, and an on ramp from the compute element. An example coupling between the router and the fabric enables communication between the router and, e.g., four logically and/or physically adjacent processing elements. The router variously receives wavelets from the fabric and the on ramp. The router variously transmits wavelets to the fabric and the off ramp.

An example implementation of a compute element is enabled to process wavelets by initiating tasks and executing instructions associated with the wavelets, and accessing data associated with the wavelets and/or the instructions. The instructions are in accordance with an instruction set architecture comprising arithmetic instructions, control flow instructions, datatype conversion instructions, configuration instructions, fabric management instructions, and load/store instructions. The instructions operate on operands comprising various datatypes, e.g., integer datatypes and floating-point datatypes of various widths. The operands variously comprise scalar operands and vector operands. In various embodiments and/or usage scenarios, a vector variously represents weights of a neural network, inputs or stimuli of a neural network, activations of a neural network, and/or partial sums of a neural network. In some scenarios, a vector is a sparse vector (e.g., a vector of neuron activations) and comprises sparse data elements (e.g., only non-zero elements). In some other scenarios, a vector is a dense vector (e.g., pixel values) and comprises dense data elements (e.g., all elements of the vector, including zero elements).

An example compute element comprises hardware elements that collectively execute the instructions associated with a wavelet by performing operations specified by the instructions (e.g., arithmetic operations, control flow operations, and load/store operations). Examples of the hardware elements include picker queues, a picker, a task definition table, an instruction sequencer, an instruction decoder, a data sequencer, a register file, a memory, a pseudo-random number generator, and an ALU. Some implementations of the hardware elements are in accordance with hardware logic circuitry elements as described elsewhere herein. Sometimes a compute element is referred to as a compute engine. Sometimes the compute scheduler is referred to as a picker and the compute scheduler queues are referred to as picker queues.

An example fabric is a collection of logical and/or physical couplings between processing elements and/or within a single processing element. The fabric is usable to implement logical and/or physical communication topologies such as a mesh, a 2D mesh, a 3D mesh, a hypercube, a torus, a ring, a tree, or any combination thereof. An example of a physical coupling between processing elements is a set of physical interconnects (comprising optional and/or selective buffering) between physically-coupled processing elements. A first example of physically-coupled processing elements is immediately physically adjacent processing elements, such as a first processing element located directly beside (such as 'north', 'south', 'east', or 'west') of a second processing element. A second example of physically-coupled processing elements is relatively physically nearby processing elements, such as a first processing element located within a relatively small number of intervening processing elements, e.g., one or two 'rows' and/or 'columns' away from a second processing element. A third example of physically-coupled processing elements is relatively physically far away processing elements, such as a first processing element located physical relatively far away from a second processing element, such as a distance limited by signal propagation (with or without optional and/or selective buffering) within a clock cycle and/or clock sub-cycle associated with the processing elements. An example of physical coupling within a single processing element (having, e.g., a compute element and a router) is an on ramp coupling output information from the compute element to the router, and an off ramp coupling input information from the router to the compute element. In some situations, the router routes information from the on ramp to the off ramp.

An example of a logical coupling between processing elements is a virtual channel as implemented by routers within processing elements. A route between a first processing element and a second processing element is implemented, e.g., by routers within processing elements along the route forwarding in accordance with the virtual channel and routing configuration information. An example of a logical coupling within a single particular processing element (having, e.g., a router) is a virtual channel as implemented by the router, enabling the particular processing element to send information via the virtual channel to the particular processing element. The router forwards "internally" with respect to the particular processing element in accordance with the virtual channel and routing configuration information.

An example wavelet is a bundle of information communicated between processing elements via the fabric. An example wavelet comprises a wavelet payload and a color. A wavelet payload comprises data and is associated with instructions. A first response to a wavelet received by a compute element of a processing element comprises the compute element initiating a task, such as corresponding to processing of instructions associated with the wavelet. A second response to a wavelet received by a compute element of a processing element comprises the compute element processing data of the wavelet. Example types of wavelets include dense wavelets and sparse wavelets, as well as data wavelets and control wavelets.

Wavelets are used, for example, for communicating between processing elements. In a first scenario, a first processing element transmits wavelets to a second processing element. In a second scenario, an external device (e.g., an FPGA) transmits wavelets to a processing element. In a third scenario, a processing element transmits wavelets to an external device (e.g., an FPGA).

An example virtual channel is one or more communication pathways specified by a color and enabled, e.g., by a fabric and one or more routers. A wavelet comprising a particular color is sometimes referred to as being associated with a particular virtual channel associated with the particular color. A first example of a color is a fabric color specifying a virtual channel between two different processing elements. In some embodiments, a fabric color is a 5-bit integer. A second example of a color is a local color specifying a virtual channel from a processing element to the processing element. In some embodiments, a color is a 6-bit integer and specifies one of a fabric color and a local color.

An example task comprises a collection of instructions executed in response to a wavelet. An example instruction comprises an operation and optionally one or more operands specifying locations of data elements to be processed in accordance with the operation. A first example of an operand specifies data elements in memory. A second example of an operand specifies data elements communicated (e.g., received or transmitted) via the fabric. An example of a data sequencer determines the locations of data elements. An example of an instruction sequencer determines an address in memory of instructions associated with a wavelet.

An example picker queue is enabled to hold wavelets received via an off ramp of the fabric for processing in the compute element. An example of a picker selects a wavelet from the picker queue for processing.

An example of an Integrated Circuit (IC) is a collection of circuitry implemented on a single portion of semiconductor material. An example of an Application-Specific Integrated Circuit (ASIC) is an IC designed for a particular use. An example of wafer-scale integration is implementing a system using all or a significant portion of a wafer as an element of the system, e.g., by leaving the wafer whole or substantially whole.

In some embodiments and/or usage scenarios, wafer-scale integration enables connecting multiple elements in a system via wafer interconnect formed using silicon fabrication processes instead of via inter-chip interconnect, and thus improves any one or more of improved performance, cost, reliability, and energy efficiency. As a specific example, a system implemented using wafer-scale integration technology enables implementation of three million PEs on a single wafer, each of the PEs having bandwidth to nearest physical neighbors that is greater than a comparable system using other-than wafer-scale integration technology. The greater bandwidth enables the system implemented using wafer-scale integration technology to relatively efficiently train and/or perform inferences for larger neural networks than the system implemented using other-than wafer-scale integration technology.

Acronyms

At least some of the various shorthand abbreviations (e.g., acronyms) defined here refer to certain elements used herein.

| Acronym | Description |
|---------|-------------|
| ASIC | Application Specific Integrated Circuit |
| CE | Compute Element |
| CNN | Convolutional Neural Network |
| CPGD | Continuous Propagation Gradient Descent |
| CPU | Central Processing Unit |
| CRM | Computer Readable Media |
| DSD | Data Structure Descriptor |
| DSP | Digital Signal Processor |
| DSR | Data Structure Register |
| FCNN | Fully Connected Neural Network |
| FPGA | Field-Programmable Gate Array |
| GPU | Graphics Processing Unit |
| HPC | High-Performance Computing |

-continued

| Acronym | Description |
|---------|-------------|
| HW | HardWare |
| IC | Integrated Circuit |
| IE | Inference Engine |
| LFSR | Linear Feedback Shift Register |
| LSB | Least Significant Bit |
| LSTM | Long Short-Term Memory |
| MBGD | Mini-Batch Gradient Descent |
| ML | Machine Learning |
| MSB | Most Significant Bit |
| PE | Processing Element |
| PRNG | Pseudo Random Number Generator |
| RNN | Recurrent Neural Network |
| RCP | Reverse CheckPoint |
| SGD | Stochastic Gradient Descent |
| SW | SoftWare |
| XDSD | eXtended Data Structure Descriptor |
| XDSR | eXtended Data Structure Register |

EXAMPLE EMBODIMENTS

In concluding the introduction to the detailed description, what follows is a collection of example embodiments, including at least some explicitly enumerated as "ECs" (Example Combinations), providing additional description of a variety of embodiment types in accordance with the concepts described herein; these examples are not meant to be mutually exclusive, exhaustive, or restrictive; and the invention is not limited to these example embodiments but rather encompasses all possible modifications and variations within the scope of the issued claims and their equivalents.

EC100) A system comprising:
a fabric of processor elements, each processor element comprising a fabric router and a compute engine enabled to perform dataflow-based and instruction-based processing;
wherein each processor element selectively communicates fabric packets with others of the processor elements; and
wherein each compute engine selectively performs the processing in accordance with a virtual channel specifier and a task specifier of each fabric packet the compute engine receives.

EC100b) A system comprising:
a fabric of processor elements, each processor element comprising a fabric router and a compute engine;
wherein each processor element selectively communicates fabric packets with others of the processor elements; and
wherein each compute engine selectively performs dataflow processing and instruction processing respectively in accordance with a dataflow field and an instruction field of each fabric packet the compute engine receives.

EC100c) The system of EC100, wherein the processing is in accordance with a dataflow graph.

EC100d) The system of EC100, wherein a workload is executed comprising predominantly dataflow-based processing with minimal instruction-based processing.

EC100e) The system of EC100d, wherein the system implements a Long Short Term Memory (LSTM) neural network model.

EC100f) The system of EC100, wherein a workload is executed comprising predominantly instruction-based processing with minimal dataflow-based processing.

EC100g) The system of EC100, wherein the system is implemented at least in part using wafer-scale integration.

EC100h) The system of EC100, wherein the fabric of processor elements is implemented at least in part using VLSI fabrication.

EC101) The system of EC100, wherein the virtual channel specifier selects independent respective routing paths in the fabric.

EC101b) The system of EC100, wherein the virtual channel specifier selects routing paths in the fabric to perform multicast.

EC101c) The system of EC100, wherein the virtual channel specifier selects routing paths in the fabric to perform load splitting.

EC102) The system of EC100, wherein the task specifier selects one or more operations to perform.

EC103) The system of EC100, wherein the fabric comprises a 2D array of the processor elements.

EC103b) The system of EC100, wherein the fabric comprises a processor element interconnection topology selected from the group consisting of fully connected, star, ring, array, mesh, hypercube, torus, and tree.

EC103c) The system of EC100, wherein the fabric comprises a processor element interconnection topology dimension selected from the group consisting of 1D, 2D, 3D, and a dimension greater than 3D.

EC104) The system of EC100, wherein the system is enabled to execute machine learning workloads.

EC105) The system of EC100, wherein the system is trained to perform an inference application.

EC105b) The system of EC100, wherein the system performs an inference application.

EC106) The system of EC100, wherein the system implements a deep neural network trained to perform object classification and/or detection.

EC107) The system of EC100, wherein the system implements a deep neural network trained to perform an inference application selected from the group consisting of text translation, optical character recognition, image classification, facial recognition, scene recognition for a self-driving car, speech recognition, data analysis for high energy physics, and drug discovery.

EC108) The system of EC100, wherein the fabric is organized as a plurality of periphery processor elements and a plurality of interior processor elements, and each of the interior processor elements is coupled in at least four logical directions respectively to at least four others of the plurality of processor elements.

EC109) The system of EC100, wherein each compute engine comprises a memory, a data path, and a hybrid dataflow and instruction execution controller.

EC110) The system of EC109, wherein each compute engine operates in accordance with a multi-stage compute engine pipeline having a plurality of compute engine pipeline stages.

EC111) The system of EC109, wherein the instruction execution controller comprises an instruction sequencer implemented using one or more of microcode, PLAs, one or more counters, and a gate-level state machine.

EC112) The system of EC109, wherein each compute engine further comprises a register file, an instruction decoder, an instruction cache, and a data cache.

EC112b) The system of EC109, wherein each compute engine further comprises a register file, an instruction decoder, an instruction buffer, and a data buffer.

EC113) The system of EC100, wherein:
each compute engine is configured to perform a predefined set of basic operations in response to receiving a corresponding basic instruction selected from a predefined native instruction set of codes; and further comprising
a training workload comprising
a first set of machine codes selected from the native instruction set for performing a mapping of at least a part of a neuron onto the compute engine of the processor element, the mapping comprising managing at least one partial-neuron weight,
a second set of machine codes selected from the native instruction set for performing a forward pass to propagate activations in a forward logical direction based at least in part on the at least one partial-neuron weight, the forward pass initiated responsive to an input sample,
a third set of machine codes selected from the native instruction set for performing a delta pass in a backward logical direction to generate deltas, the delta pass initiated responsive to completion of the forward pass,
a fourth set of machine codes selected from the native instruction set for performing a chain pass to calculate gradients based on the deltas, and
a fifth set of machine codes selected from the native instruction set for performing a selective update of the at least one partial-neuron weight in accordance with a predetermined learning rule and based at least in part on the deltas; and
wherein each compute engine comprises storage for the at least one partial-neuron weight.

EC113a) The system of EC113, wherein each basic instruction is performed in accordance with the task specifier of a respective fabric packet of the fabric packets.

EC113b) The system of EC113, wherein the fabric comprises a 2D array of the processor elements comprising a first, second, third, and fourth physical directions, the first and second physical directions being collinear and opposite, the third and fourth physical directions being collinear and opposite, the first and third physical directions being orthogonal, and the forward logical direction is in the first physical direction and the backward logical direction is in the second physical direction.

EC113c) The system of EC113, wherein the training workload further comprises a sixth set of machine codes selected from the native instruction set for performing a nonlinear activation function.

EC113d) The system of EC113c, wherein the nonlinear activation function is selected from the group consisting of sigmoid, tanh, and ReLU.

EC114) The system of EC113, wherein the mapping is in accordance with initializing the fabric to implement a partitioning of a neural network into a plurality of layers, the neuron is a first neuron of a plurality of neurons of the neural network, the first neuron is comprised in a first layer of the plurality of layers, and each of the plurality of neurons is mapped in a distributed manner across a plurality of the processor elements of the fabric.

EC115) The system of EC114, wherein the mapping is in accordance with each input sample of a training set completing all of the passes for each layer in the same amount of time.

EC115b) The system of EC114, wherein the mapping is in accordance with each input sample of a training set completing all of the passes for each layer within a same predetermined amount of time.

EC115c) The system of EC114, wherein the mapping is in accordance with each input sample of a training set completing all of the passes for each layer within a same time period determined in real time.

EC116) The system of EC114, wherein the plurality of layers operates as a logical fabric pipeline comprising logical fabric pipeline stages, each logical fabric pipeline stage comprising completion of all of the passes for each layer, the completion for each layer taking a time step comprising the same amount of time.

EC116b) The system of EC114, wherein each of the plurality of layers operates as a logical fabric pipeline stage of a respective logical fabric pipeline of each of the passes, the completion for each layer taking a time step comprising the same amount of time.

EC117) The system of EC114, wherein as each input sample of a training set streams through at least a first plurality of the processor elements across the plurality of layers, the neuron weights are selectively updated in the first plurality of the processor elements across the plurality of layers.

EC117b) The system of EC118, wherein as each input sample of a training set streams through at least a first plurality of the processor elements across the plurality of layers, the neuron weights are selectively updated in the first plurality of the processor elements across the plurality of layers, and the streaming and updating is ongoing for each time step over a plurality of time steps.

EC119) The system of EC120, further comprising a digital clock, and wherein the time step is an integral multiple of a clock-cycle of the digital clock.

EC118b) The system of EC120, further comprising a digital clock, and wherein the time step is a variable amount of time.

EC118c) The system of EC121 or EC118b, wherein the time step is determined in real-time.

EC122) The system of EC114, further comprising:
wherein each compute engine operates in accordance with a multi-stage compute engine pipeline having a plurality of compute engine pipeline stages, a compute engine machine cycle comprising the time to complete each compute engine pipeline stage, a compute engine pipeline cycle comprising the time to complete the plurality of compute engine pipeline stages;
wherein the compute engine machine cycle comprises a first multiple of a clock-cycle of a digital clock;
wherein the plurality of layers operates as a logical fabric pipeline comprising logical fabric pipeline stages, each logical fabric pipeline stage comprising completion of all of the passes for each layer, a time step comprising the time to complete each logical fabric pipeline stage; and wherein the time step comprises a second multiple of the compute engine pipeline cycle.

EC123) The system of EC122, wherein the first multiple is one.

EC124) The system of EC122, wherein the second multiple is in the hundreds to thousands.

EC125) The system of EC120, wherein for each time step over a plurality of time steps while forward propagation of activations are ongoing, the at least one partial-neuron weight is selectively updated within a first plurality of the processor elements in response to changes in backward propagating data within the first plurality of the processor elements.

EC126) The system of EC120, wherein the at least one partial-neuron weight is selectively updated each time step over a plurality of time steps.

EC123b) The system of EC117, EC117b, EC122, or EC123, wherein the selective updating is in accordance with a continuous propagation gradient descent process.

EC127) The system of EC114, wherein the neural network comprises over a thousand layers.

EC128) The system of EC114, wherein the plurality of neurons comprises billions of neurons.

EC125b) The system of EC114, wherein the plurality of neurons comprises millions of neurons.

EC125c) The system of EC114, wherein the neural network comprises at least 10 weights per neuron for at least some of the plurality of neurons.

EC125d) The system of EC114, wherein the neural network comprises at least 1000 weights per neuron for at least some of the plurality of neurons.

EC129) The system of EC114, wherein the neural network comprises billions of weights per layer.

EC126b) The system of EC114, wherein the neural network comprises millions of weights per layer.

EC130) The system of EC114, wherein for each layer of the neural network, incoming activations are weighted to create partial sums that are accumulated to generate output activations for the layer, and the accumulated weighted partial sums represent the neurons and associated synapses of the neural network.

EC127b) The system of EC127, wherein each weight corresponds to a synapse, each partial sum corresponds to a stimulus, the accumulated weighted partial sums correspond to a total stimulus, and each output activation for the layer corresponds to a neuron output.

EC131) The system of EC113, wherein an iteration of the training workload is performed for each of a plurality of input samples collectively comprising a training set.

EC132) The system of EC131, wherein the predetermined learning rule specifies that the at least one partial-neuron weight is updated after the completion of all the passes for the entire training set.

EC129b) The system of EC129, wherein the predetermined learning rule is in accordance with a stochastic gradient descent process.

EC129c) The system of EC129, wherein the predetermined learning rule is in accordance with a mini-batch gradient descent process.

EC129d) The system of EC129, wherein the predetermined learning rule is in accordance with a continuous propagation gradient descent process.

EC133) The system of EC131, wherein the training set is partitioned into a plurality of so-called mini-batches and the predetermined learning rule specifies that the at least one partial-neuron weight is updated after the completion of all the passes for the input samples comprised in each of the mini-batches.

EC134) The system of EC131, wherein the training set is partitioned into a plurality of so-called mini-batches and the predetermined learning rule specifies that the at least one partial-neuron weight is updated after the completion of all the passes for each input sample of each of the mini-batches.

EC131b) The system of EC131, wherein the predetermined learning rule is in accordance with a continuous propagation gradient descent process.

EC135) The system of EC134, wherein the forward pass incorporates weight updates within a first plurality of the processor elements while the mini-batch learning is ongoing within the first plurality of the processor elements.

EC136) The system of EC113, wherein the storage is comprised in a memory local to the compute engine.

EC133b) The system of EC113, wherein the storage is comprised in the compute engine.

EC133b) The system of EC113, wherein the storage is a respective memory attached to each compute engine.

EC137) The system of EC113, wherein the storage is enabled to store a 2D matrix data structure.

EC134b) The system of EC113, wherein the storage is enabled to store a multidimensional data structure.

EC134c) The system of EC113, wherein the storage is enabled to store a tensor data structure comprising a dimension selected from the group consisting of 2D, 3D, 4D, 5D, and 6D.

EC138) The system of EC113, wherein each compute engine further comprises storage for gradient accumulation, forward partial sums, delta partial sums, and forward pass activations.

EC139) The system of EC114, wherein data propagates to a logical end of the neural network during the forward pass and circulates back in a reverse logical direction during the delta and chain passes.

EC140) The system of EC113, wherein the forward pass saves the activations for use by the delta and chain passes.

EC141) The system of EC113, wherein each processor element is time shared across the forward, delta and chain passes.

EC142) The system of EC131, wherein for each input sample, the system is enabled to selectively update the at least one partial-neuron weight in accordance with the predetermined learning rule responsive to completion of the forward pass, the delta pass, and the chain pass corresponding to the input sample.

EC139b) The system of EC139, wherein the predetermined learning rule is in accordance with a continuous propagation gradient descent process.

EC143) The system of EC142, wherein the system is enabled for each forward pass to use weight information provided by the most recent selective update of the at least one partial-neuron weight.

EC144) The system of EC143, wherein the system is enabled to initiate a forward pass of a particular iteration of the training workload independent of whether the selective update of the at least one partial-neuron weight corresponding to a prior iteration of the training workload has occurred.

EC145) The system of EC143, wherein the system is enabled to initiate a forward pass of a particular iteration of the training workload independent of whether the delta pass of a prior iteration of the training workload has begun.

EC146) The system of EC143, wherein at least one compute engine is enabled to perform at least a portion of a forward pass for a subsequent iteration of the training workload after performing at least a portion of a forward pass for a prior iteration of the training workload and before performing a portion of the selective update of the at least one partial-neuron weight corresponding to the prior iteration of the training workload.

EC147) The system of EC143, wherein the system is enabled to perform the delta pass and the chain pass for each input sample based at least in part on activations that are recomputed based at least in part on a first partial-neuron weight.

EC148) The system of EC147, wherein the first partial-neuron weight is the partial-neuron weight produced by the most recent selective update.

EC145b) The system of EC145, wherein the recomputed activations need not be stored between computations, thereby decreasing the total memory required for a given system training configuration.

EC145c) The system of EC139, EC140, EC141, or EC142, wherein concurrent layer training enables achieving a predetermined accuracy goal at a faster convergence rate, thereby decreasing total training time required for a given system training configuration.

EC145d) The system of EC139, EC140, EC141, or EC142, wherein concurrent layer training enables increased accuracy for a given total training time and system training configuration.

EC149) The system of EC143, wherein each compute element is enabled to perform portions of a delta pass and portions of a chain pass for an input sample based at least in part on activations that are recomputed based at least in part on a first partial-neuron weight.

EC150) The system of EC149, wherein the first partial-neuron weight is the partial-neuron weight produced by the most recent selective update.

EC200) A method comprising:
in each of a fabric of processor elements, selectively communicating fabric packets with others of the processor elements, each processor element comprising a fabric router and a compute engine enabled to perform dataflow-based and instruction-based processing; and
in each compute engine, selectively performing the processing in accordance with a virtual channel specifier and a task specifier of each fabric packet the compute engine receives.

EC200b) A method comprising:
in each of a fabric of processor elements, selectively communicating fabric packets with others of the processor elements, each processor element comprising a fabric router and a compute engine; and
in each compute engine, selectively performing dataflow processing and instruction processing respectively in accordance with a dataflow field and an instruction field of each fabric packet the compute engine receives.

EC200c) The method of EC200, wherein the processing is in accordance with a dataflow graph.

EC200d) The method of EC200, further comprising executing a workload comprising predominantly dataflow-based processing with minimal instruction-based processing.

EC200e) The method of EC200d, wherein performing the method implements a Long Short Term Memory (LSTM) neural network model.

EC200f) The method of EC200, further comprising executing a workload comprising predominantly instruction-based processing with minimal dataflow-based processing.

EC200g) The method of EC200, wherein the fabric of processor elements is implemented at least in part using wafer-scale integration.

EC200h) The method of EC200, wherein the fabric of processor elements is implemented at least in part using VLSI fabrication.

EC201) The method of EC200, wherein the virtual channel specifier selects independent respective routing paths in the fabric.

EC201b) The method of EC200, wherein the virtual channel specifier selects routing paths in the fabric to perform multicast.

EC201c) The method of EC200, wherein the virtual channel specifier selects routing paths in the fabric to perform load splitting.

EC202) The method of EC200, wherein the task specifier selects one or more operations to perform.

EC203) The method of EC200, wherein the fabric comprises a 2D array of the processor elements.

EC203b) The method of EC200, wherein the fabric comprises a processor element interconnection topology selected from the group consisting of fully connected, star, ring, array, mesh, hypercube, torus, and tree.

EC203c) The method of EC200, wherein the fabric comprises a processor element interconnection topology dimension selected from the group consisting of 1D, 2D, 3D, and a dimension greater than 3D.

EC204) The method of EC200, wherein performing the method enables executing machine learning workloads.

EC205) The method of EC200, wherein performing the method enables training an inference application.

EC205b) The method of EC200, wherein performing the method performs an inference application.

EC206) The method of EC200, wherein performing the method implements a deep neural network trained to perform object classification and/or detection.

EC207) The method of EC200, wherein performing the method implements a deep neural network trained to perform an inference application selected from the group consisting of text translation, optical character recognition, image classification, facial recognition, scene recognition for a self-driving car, speech recognition, data analysis for high energy physics, and drug discovery.

EC208) The method of EC200, wherein the fabric is organized as a plurality of periphery processor elements and a plurality of interior processor elements, and each of the interior processor elements is coupled in at least four logical directions respectively to at least four others of the plurality of processor elements.

EC209) The method of EC200, wherein each compute engine comprises a memory, a data path, and a hybrid dataflow and instruction execution controller.

EC210) The method of EC209, wherein each compute engine operates in accordance with a multi-stage compute engine pipeline having a plurality of compute engine pipeline stages.

EC211) The method of EC209, wherein the instruction execution controller comprises an instruction sequencer implemented using one or more of microcode, PLAs, one or more counters, and a gate-level state machine.

EC212) The method of EC209, wherein each compute engine further comprises a register file, an instruction decoder, an instruction cache, and a data cache.

EC212b) The method of EC209, wherein each compute engine further comprises a register file, an instruction decoder, an instruction buffer, and a data buffer.

EC213) The method of EC200, wherein:
each compute engine is configured to perform a predefined set of basic operations in response to receiving a corresponding basic instruction selected from a predefined native instruction set of codes; and further comprising
processing a training workload comprising
a first set of machine codes selected from the native instruction set for performing a mapping of at least a part of a neuron onto the compute engine of the processor element, the mapping comprising managing at least one partial-neuron weight,
a second set of machine codes selected from the native instruction set for performing a forward pass to propagate activations in a forward logical direction based at least in part on the at least one partial-neuron weight, the forward pass initiated responsive to an input sample,
a third set of machine codes selected from the native instruction set for performing a delta pass in a backward logical direction to generate deltas, the delta pass initiated responsive to completion of the forward pass,
a fourth set of machine codes selected from the native instruction set for performing a chain pass to calculate gradients based on the deltas, and
a fifth set of machine codes selected from the native instruction set for performing a selective update of the at least one partial-neuron weight in accordance with a predetermined learning rule and based at least in part on the deltas; and wherein each compute engine comprises storage for the at least one partial-neuron weight.

EC213a) The method of EC213, wherein each basic instruction is performed in accordance with the task specifier of a respective fabric packet of the fabric packets.

EC213b) The method of EC213, wherein the fabric comprises a 2D array of the processor elements comprising a first, second, third, and fourth physical directions, the first and second physical directions being collinear and opposite, the third and fourth physical directions being collinear and opposite, the first and third physical directions being orthogonal, and the forward logical direction is in the first physical direction and the backward logical direction is in the second physical direction.

EC213c) The method of EC213, wherein the training workload further comprises a sixth set of machine codes selected from the native instruction set for performing a nonlinear activation function.

EC213d) The method of EC213c, wherein the nonlinear activation function is selected from the group consisting of sigmoid, tanh, and ReLU.

EC214) The method of EC213, wherein the mapping is in accordance with initializing the fabric to implement a partitioning of a neural network into a plurality of layers, the neuron is a first neuron of a plurality of neurons of the neural network, the first neuron is comprised in a first layer of the plurality of layers, and each of the plurality of neurons is mapped in a distributed manner across a plurality of the processor elements of the fabric.

EC215) The method of EC214, wherein the mapping is in accordance with each input sample of a training set completing all of the passes for each layer in the same amount of time.

EC215b) The method of EC214, wherein the mapping is in accordance with each input sample of a training set completing all of the passes for each layer within a same predetermined amount of time.

EC215c) The method of EC214, wherein the mapping is in accordance with each input sample of a training set completing all of the passes for each layer within a same time period determined in real time.

EC216) The method of EC214, wherein the plurality of layers operates as a logical fabric pipeline comprising logical fabric pipeline stages, each logical fabric pipeline stage comprising completion of all of the passes for each layer, the completion for each layer taking a time step comprising the same amount of time.

EC216b) The method of EC214, wherein each of the plurality of layers operates as a logical fabric pipeline stage of a respective logical fabric pipeline of each of the passes, the completion for each layer taking a time step comprising the same amount of time.

EC217) The method of EC214, wherein as each input sample of a training set streams through at least a first plurality of the processor elements across the plurality of layers, the neuron weights are selectively updated in the first plurality of the processor elements across the plurality of layers.

EC217b) The method of EC216, wherein as each input sample of a training set streams through at least a first plurality of the processor elements across the plurality of layers, the neuron weights are selectively updated in the first plurality of the processor elements across the plurality of layers, and the streaming and updating is ongoing for each time step over a plurality of time steps.

EC218) The method of EC216, wherein at least one of the processor elements comprises a digital clock, and the time step is an integral multiple of a clock-cycle of the digital clock.

EC218b) The method of EC216, wherein at least one of the processor elements comprises a digital clock, and wherein the time step is a variable amount of time.

EC218c) The method of EC218 or EC218b, wherein the time step is determined in real-time.

EC219) The method of EC214, further comprising:
operating each compute engine in accordance with a multi-stage compute engine pipeline having a plurality of compute engine pipeline stages, a compute engine machine cycle comprising the time to complete each compute engine pipeline stage, a compute engine pipeline cycle comprising the time to complete the plurality of compute engine pipeline stages;
wherein the compute engine machine cycle comprises a first multiple of a clock-cycle of a digital clock;
wherein the plurality of layers operates as a logical fabric pipeline comprising logical fabric pipeline stages, each logical fabric pipeline stage comprising completion of all of the passes for each layer, a time step comprising the time to complete each logical fabric pipeline stage; and
wherein the time step comprises a second multiple of the compute engine pipeline cycle.

EC220) The method of EC219, wherein the first multiple is one.

EC221) The method of EC219, wherein the second multiple is in the hundreds to thousands.

EC222) The method of EC216, further comprising, for each time step over a plurality of time steps while forward propagation of activations are ongoing, selectively updating the at least one partial-neuron weight within a first plurality of the processor elements in response to changes in backward propagating data within the first plurality of the processor elements.

EC223) The method of EC216, further comprising selectively updating the at least one partial-neuron weight each time step over a plurality of time steps.

EC223b) The method of EC217, EC217b, EC222, or EC223, wherein the selectively updating is in accordance with a continuous propagation gradient descent process.

EC224) The method of EC214, wherein the neural network comprises over a thousand layers.

EC225) The method of EC214, wherein the plurality of neurons comprises billions of neurons.

EC225b) The method of EC214, wherein the plurality of neurons comprises millions of neurons.

EC225c) The method of EC214, wherein the neural network comprises at least 10 weights per neuron for at least some of the plurality of neurons.

EC225d) The method of EC214, wherein the neural network comprises at least 1000 weights per neuron for at least some of the plurality of neurons.

EC226) The method of EC214, wherein the neural network comprises billions of weights per layer.

EC226b) The method of EC214, wherein the neural network comprises millions of weights per layer.

EC227) The method of EC214, further comprising, for each layer of the neural network, weighting incoming activations to create partial sums that are accumulated to generate output activations for the layer, and wherein the accumulated weighted partial sums represent the neurons and associated synapses of the neural network.

EC227b) The method of EC227, wherein each weight corresponds to a synapse, each partial sum corresponds to a stimulus, the accumulated weighted partial sums correspond to a total stimulus, and each output activation for the layer corresponds to a neuron output.

EC228) The method of EC213, further comprising performing an iteration of the training workload for each of a plurality of input samples collectively comprising a training set.

EC229) The method of EC228, wherein the predetermined learning rule specifies that the at least one partial-neuron weight is updated after the completion of all the passes for the entire training set.

EC229b) The method of EC229, wherein the predetermined learning rule is in accordance with a stochastic gradient descent process.

EC229c) The method of EC229, wherein the predetermined learning rule is in accordance with a mini-batch gradient descent process.

EC229d) The method of EC229, wherein the predetermined learning rule is in accordance with a continuous propagation gradient descent process.

EC230) The method of EC228, further comprising partitioning the training set into a plurality of so-called mini-batches and the predetermined learning rule specifies that the at least one partial-neuron weight is updated after the completion of all the passes for the input samples comprised in each of the mini-batches.

EC231) The method of EC228, further comprising partitioning the training set into a plurality of so-called mini-batches and the predetermined learning rule specifies that the at least one partial-neuron weight is updated after the completion of all the passes for each input sample of each of the mini-batches.

EC231b) The method of EC231, wherein the predetermined learning rule is in accordance with a continuous propagation gradient descent process.

EC232) The method of EC231, wherein the forward pass incorporates weight updates within a first plurality of the processor elements while the mini-batch learning is ongoing within the first plurality of the processor elements.

EC233) The method of EC213, wherein the storage is comprised in a memory local to the compute engine.

EC233b) The method of C213, wherein the storage is comprised in the compute engine.

EC233b) The method of C213, wherein the storage is a respective memory attached to each compute engine.

EC234) The method of EC213, wherein the storage is enabled to store a 2D matrix data structure.

EC234b) The method of C213, wherein the storage is enabled to store a multidimensional data structure.

EC234c) The method of C213, wherein the storage is enabled to store a tensor data structure comprising a dimension selected from the group consisting of 2D, 3D, 4D, 5D, and 6D.

EC235) The method of EC213, wherein each compute engine further comprises storage for gradient accumulation, forward partial sums, delta partial sums, and forward pass activations.

EC236) The method of EC214, wherein data propagates to a logical end of the neural network during the forward pass and circulates back in a reverse logical direction during the delta and chain passes.

EC237) The method of EC213, wherein the forward pass saves the activations for use by the delta and chain passes.

EC238) The method of EC213, further comprising time sharing each processor element across the forward, delta and chain passes.

EC239) The method of EC228, further comprising, for each input sample, selectively updating the at least one partial-neuron weight in accordance with the predetermined learning rule responsive to completion of the forward pass, the delta pass, and the chain pass corresponding to the input sample.

EC239b) The method of EC239, wherein the predetermined learning rule is in accordance with a continuous propagation gradient descent process.

EC240) The method of EC239, further comprising, for each forward pass, selectively using weight information provided by the most recent selective update of the at least one partial-neuron weight.

EC241) The method of EC240, further comprising initiating a forward pass of a particular iteration of the training workload independent of whether the selective update of the at least one partial-neuron weight corresponding to a prior iteration of the training workload has occurred.

EC242) The method of EC240, further comprising selectively initiating a forward pass of a particular iteration of the training workload independent of whether the delta pass of a prior iteration of the training workload has begun.

EC243) The method of EC240, further comprising, in at least one of the compute engines, performing at least a portion of a forward pass for a subsequent iteration of the training workload after performing at least a portion of a forward pass for a prior iteration of the training workload and before performing a portion of the selective update of the at least one partial-neuron weight corresponding to the prior iteration of the training workload.

EC244) The method of EC240, further comprising selectively performing the delta pass and the chain pass for each input sample based at least in part on activations that are recomputed based at least in part on a first partial-neuron weight.

EC245) The method of EC244, wherein the first partial-neuron weight is the partial-neuron weight produced by the most recent selective update.

EC245b) The method of EC245, wherein the recomputed activations need not be stored between computations, thereby decreasing the total memory required for a given system training configuration.

EC245c) The method of EC239, EC240, EC241, or EC242, wherein concurrent layer training enables achieving a predetermined accuracy goal at a faster convergence rate, thereby decreasing total training time required for a given system training configuration.

EC245d) The method of EC239, EC240, EC241, or EC242, wherein concurrent layer training enables increased accuracy for a given total training time and system training configuration.

EC246) The method of EC240, further comprising, in each compute element, selectively performing portions of a delta pass and portions of a chain pass for an input sample based at least in part on activations that are recomputed based at least in part on a first partial-neuron weight.

EC247) The method of EC246, wherein the first partial-neuron weight is the partial-neuron weight produced by the most recent selective update.

EC300) A system comprising:
in each of a fabric of processor elements, means for selectively communicating fabric packets with others of the processor elements, each processor element comprising a fabric router and a compute engine enabled to perform dataflow-based and instruction-based processing; and
in each compute engine, means for selectively performing the processing in accordance with a virtual channel specifier and a task specifier of each fabric packet the compute engine receives.

EC300b) A system comprising:
in each of a fabric of processor elements, means for selectively communicating fabric packets with others of the processor elements, each processor element comprising a fabric router and a compute engine; and
in each compute engine, means for selectively performing dataflow processing and instruction processing respectively in accordance with a dataflow field and an instruction field of each fabric packet the compute engine receives.

EC300c) The system of EC300, wherein the processing is in accordance with a dataflow graph.

EC300d) The system of EC300, further comprising means for executing a workload comprising predominantly dataflow-based processing with minimal instruction-based processing.

EC300e) The system of EC300d, wherein the system implements a Long Short Term Memory (LSTM) neural network model.

EC300f) The system of EC300, further comprising means for executing a workload comprising predominantly instruction-based processing with minimal dataflow-based processing.

EC300g) The system of EC300, wherein the system is implemented at least in part using wafer-scale integration.

EC300h) The system of EC300, wherein the fabric of processor elements is implemented at least in part using VLSI fabrication.

EC301) The system of EC300, wherein the virtual channel specifier selects independent respective routing paths in the fabric.

EC301b) The system of EC300, wherein the virtual channel specifier selects routing paths in the fabric to perform multicast.

EC301c) The system of EC300, wherein the virtual channel specifier selects routing paths in the fabric to perform load splitting.

EC302) The system of EC300, wherein the task specifier selects one or more operations to perform.

EC303) The system of EC300, wherein the fabric comprises a 2D array of the processor elements.

EC303b) The system of EC300, wherein the fabric comprises a processor element interconnection topology selected from the group consisting of fully connected, star, ring, array, mesh, hypercube, torus, and tree.

EC303c) The system of EC300, wherein the fabric comprises a processor element interconnection topology dimension selected from the group consisting of 1D, 2D, 3D, and a dimension greater than 3D.

EC304) The system of EC300, wherein the system is enabled to execute machine learning workloads.

EC305) The system of EC300, wherein the system is trained to perform an inference application.

EC305b) The system of EC300, wherein the system performs an inference application.

EC306) The system of EC300, wherein the system implements a deep neural network trained to perform object classification and/or detection.

EC307) The system of EC300, wherein the system implements a deep neural network trained to perform an inference application selected from the group consisting of text translation, optical character recognition, image classification, facial recognition, scene recognition for a self-driving car, speech recognition, data analysis for high energy physics, and drug discovery.

EC308) The system of EC300, wherein the fabric is organized as a plurality of periphery processor elements and a plurality of interior processor elements, and each of the interior processor elements is coupled in at least four logical directions respectively to at least four others of the plurality of processor elements.

EC309) The system of EC300, wherein each compute engine comprises a memory, a data path, and a hybrid dataflow and instruction execution controller.

EC310) The system of EC309, wherein each compute engine operates in accordance with a multi-stage compute engine pipeline having a plurality of compute engine pipeline stages.

EC311) The system of EC309, wherein the instruction execution controller comprises an instruction sequencer implemented using one or more of microcode, PLAs, one or more counters, and a gate-level state machine.

EC312) The system of EC309, wherein each compute engine further comprises a register file, an instruction decoder, an instruction cache, and a data cache.

EC312b) The system of EC309, wherein each compute engine further comprises a register file, an instruction decoder, an instruction buffer, and a data buffer.

EC313) The system of EC300, wherein:
  each compute engine is configured to perform a predefined set of basic operations in response to receiving a corresponding basic instruction selected from a predefined native instruction set of codes; and further comprising
  a training workload comprising
    a first set of machine codes selected from the native instruction set for performing a mapping of at least a part of a neuron onto the compute engine of the processor element, the mapping comprising managing at least one partial-neuron weight,
    a second set of machine codes selected from the native instruction set for performing a forward pass to propagate activations in a forward logical direction based at least in part on the at least one partial-neuron weight, the forward pass initiated responsive to an input sample,
    a third set of machine codes selected from the native instruction set for performing a delta pass in a backward logical direction to generate deltas, the delta pass initiated responsive to completion of the forward pass,
    a fourth set of machine codes selected from the native instruction set for performing a chain pass to calculate gradients based on the deltas, and
    a fifth set of machine codes selected from the native instruction set for performing a selective update of the at least one partial-neuron weight in accordance with a predetermined learning rule and based at least in part on the deltas; and
  wherein each compute engine comprises storage for the at least one partial-neuron weight.

EC313a) The system of EC313, wherein each basic instruction is performed in accordance with the task specifier of a respective fabric packet of the fabric packets.

EC313b) The system of EC313, wherein the fabric comprises a 2D array of the processor elements comprising a first, second, third, and fourth physical directions, the first and second physical directions being collinear and opposite, the third and fourth physical directions being collinear and opposite, the first and third physical directions being orthogonal, and the forward logical direction is in the first physical direction and the backward logical direction is in the second physical direction.

EC313c) The system of EC313, wherein the training workload further comprises a sixth set of machine codes selected from the native instruction set for performing a nonlinear activation function.

EC313d) The system of EC313c, wherein the nonlinear activation function is selected from the group consisting of sigmoid, tanh, and ReLU.

EC314) The system of EC313, wherein the mapping is in accordance with initializing the fabric to implement a partitioning of a neural network into a plurality of layers, the neuron is a first neuron of a plurality of neurons of the neural network, the first neuron is comprised in a first layer of the plurality of layers, and each of the plurality of neurons is mapped in a distributed manner across a plurality of the processor elements of the fabric.

EC315) The system of EC314, wherein the mapping is in accordance with each input sample of a training set completing all of the passes for each layer in the same amount of time.

EC315b) The system of EC314, wherein the mapping is in accordance with each input sample of a training set completing all of the passes for each layer within a same predetermined amount of time.

EC315c) The system of EC314, wherein the mapping is in accordance with each input sample of a training set completing all of the passes for each layer within a same time period determined in real time.

EC316) The system of EC314, wherein the plurality of layers operates as a logical fabric pipeline comprising logical fabric pipeline stages, each logical fabric pipeline stage comprising completion of all of the passes for each layer, the completion for each layer taking a time step comprising the same amount of time.

EC316b) The system of EC314, wherein each of the plurality of layers operates as a logical fabric pipeline stage of a respective logical fabric pipeline of each of the passes, the completion for each layer taking a time step comprising the same amount of time.

EC317) The system of EC314, wherein as each input sample of a training set streams through at least a first plurality of the processor elements across the plurality of layers, the neuron weights are selectively updated in the first plurality of the processor elements across the plurality of layers.

EC317b) The system of EC316, wherein as each input sample of a training set streams through at least a first plurality of the processor elements across the plurality of layers, the neuron weights are selectively updated in the first plurality of the processor elements across the plurality of layers, and the streaming and updating is ongoing for each time step over a plurality of time steps.

EC318) The system of EC316, further comprising a digital clock, and wherein the time step is an integral multiple of a clock-cycle of the digital clock.

EC318b) The system of EC316, further comprising a digital clock, and wherein the time step is a variable amount of time.

EC318c) The system of EC318 or EC318b, wherein the time step is determined in real-time.

EC319) The system of EC314, further comprising:
means for operating each compute engine in accordance with a multi-stage compute engine pipeline having a plurality of compute engine pipeline stages, a compute engine machine cycle comprising the time to complete each compute engine pipeline stage, a compute engine pipeline cycle comprising the time to complete the plurality of compute engine pipeline stages;
wherein the compute engine machine cycle comprises a first multiple of a clock-cycle of a digital clock;
wherein the plurality of layers operates as a logical fabric pipeline comprising logical fabric pipeline stages, each logical fabric pipeline stage comprising completion of all of the passes for each layer, a time step comprising the time to complete each logical fabric pipeline stage; and
wherein the time step comprises a second multiple of the compute engine pipeline cycle.

EC320) The system of EC319, wherein the first multiple is one.

EC321) The system of EC319, wherein the second multiple is in the hundreds to thousands.

EC322) The system of EC316, further comprising means for selectively updating the at least one partial-neuron weight within a first plurality of the processor elements in response to changes in backward propagating data within the first plurality of the processor elements for each time step over a plurality of time steps while forward propagation of activations are ongoing.

EC323) The system of EC316, further comprising means for selectively updating the at least one partial-neuron weight each time step over a plurality of time steps.

EC323b) The system of EC317, EC317b, EC322, or EC323, wherein the selectively updating is in accordance with a continuous propagation gradient descent process.

EC324) The system of EC314, wherein the neural network comprises over a thousand layers.

EC325) The system of EC314, wherein the plurality of neurons comprises billions of neurons.

EC325b) The system of EC314, wherein the plurality of neurons comprises millions of neurons.

EC325c) The system of EC314, wherein the neural network comprises at least 10 weights per neuron for at least some of the plurality of neurons.

EC325d) The system of EC314, wherein the neural network comprises at least 1000 weights per neuron for at least some of the plurality of neurons.

EC326) The system of EC314, wherein the neural network comprises billions of weights per layer.

EC326b) The system of EC314, wherein the neural network comprises millions of weights per layer.

EC327) The system of EC314, further comprising, for each layer of the neural network, means for weighting incoming activations to create partial sums that are accumulated to generate output activations for the layer, and wherein the accumulated weighted partial sums represent the neurons and associated synapses of the neural network.

EC327b) The system of EC327, wherein each weight corresponds to a synapse, each partial sum corresponds to a stimulus, the accumulated weighted partial sums correspond to a total stimulus, and each output activation for the layer corresponds to a neuron output.

EC328) The system of EC313, further comprising means for performing an iteration of the training workload for each of a plurality of input samples collectively comprising a training set.

EC329) The system of EC328, wherein the predetermined learning rule specifies that the at least one partial-neuron weight is updated after the completion of all the passes for the entire training set.

EC329b) The system of EC329, wherein the predetermined learning rule is in accordance with a stochastic gradient descent process.

EC329c) The system of EC329, wherein the predetermined learning rule is in accordance with a mini-batch gradient descent process.

EC329d) The system of EC329, wherein the predetermined learning rule is in accordance with a continuous propagation gradient descent process.

EC330) The system of EC328, further comprising means for partitioning the training set into a plurality of so-called mini-batches and the predetermined learning rule specifies that the at least one partial-neuron weight is updated after the completion of all the passes for the input samples comprised in each of the mini-batches.

EC331) The system of EC328, further means for comprising partitioning the training set into a plurality of so-called mini-batches and the predetermined learning rule specifies that the at least one partial-neuron weight is updated after the completion of all the passes for each input sample of each of the mini-batches.

EC331b) The system of EC331, wherein the predetermined learning rule is in accordance with a continuous propagation gradient descent process.

EC332) The system of EC331, wherein the forward pass incorporates weight updates within a first plurality of the processor elements while the mini-batch learning is ongoing within the first plurality of the processor elements.

EC333) The system of EC313, wherein the storage is comprised in a memory local to the compute engine.

EC333b) The system of EC313, wherein the storage is comprised in the compute engine.

EC333b) The system of EC313, wherein the storage is a respective memory attached to each compute engine.

EC334) The system of EC313, wherein the storage is enabled to store a 2D matrix data structure.

EC334b) The system of EC313, wherein the storage is enabled to store a multidimensional data structure.

EC334c) The system of EC313, wherein the storage is enabled to store a tensor data structure comprising a dimension selected from the group consisting of 2D, 3D, 4D, 5D, and 6D.

EC335) The system of EC313, wherein each compute engine further comprises storage for gradient accumulation, forward partial sums, delta partial sums, and forward pass activations.

EC336) The system of EC314, wherein data propagates to a logical end of the neural network during the forward pass and circulates back in a reverse logical direction during the delta and chain passes.

EC337) The system of EC313, wherein the forward pass saves the activations for use by the delta and chain passes.

EC338) The system of EC313, further comprising means for time sharing each processor element across the forward, delta and chain passes.

EC339) The system of EC328, further comprising, for each input sample, means for selectively updating the at least one partial-neuron weight in accordance with the predetermined learning rule responsive to completion of the forward pass, the delta pass, and the chain pass corresponding to the input sample.

EC339b) The system of EC339, wherein the predetermined learning rule is in accordance with a continuous propagation gradient descent process.

EC340) The system of EC339, further comprising means for selectively using weight information provided by the most recent selective update of the at least one partial-neuron weight for each forward pass.

EC341) The system of EC340, further comprising means for initiating a forward pass of a particular iteration of the training workload independent of whether the selective update of the at least one partial-neuron weight corresponding to a prior iteration of the training workload has occurred.

EC342) The system of EC340, further comprising means for selectively initiating a forward pass of a particular iteration of the training workload independent of whether the delta pass of a prior iteration of the training workload has begun.

EC343) The system of EC340, further comprising, in at least one of the compute engines, means for performing at least a portion of a forward pass for a subsequent iteration of the training workload after performing at least a portion of a forward pass for a prior iteration of the training workload and before performing a portion of the selective update of the at least one partial-neuron weight corresponding to the prior iteration of the training workload.

EC344) The system of EC340, further comprising means for selectively performing the delta pass and the chain pass for each input sample based at least in part on activations that are recomputed based at least in part on a first partial-neuron weight.

EC345) The system of EC344, wherein the first partial-neuron weight is the partial-neuron weight produced by the most recent selective update.

EC345b) The system of EC345, wherein the recomputed activations need not be stored between computations, thereby decreasing the total memory required for a given system training configuration.

EC345c) The system of EC339, EC340, EC341, or EC342, wherein concurrent layer training enables achieving a predetermined accuracy goal at a faster convergence rate, thereby decreasing total training time required for a given system training configuration.

EC345d) The system of EC339, EC340, EC341, or EC342, wherein concurrent layer training enables increased accuracy for a given total training time and system training configuration.

EC346) The system of EC340, further comprising, in each compute element, means for selectively performing portions of a delta pass and portions of a chain pass for an input sample based at least in part on activations that are recomputed based at least in part on a first partial-neuron weight.

EC347) The system of EC346, wherein the first partial-neuron weight is the partial-neuron weight produced by the most recent selective update.

EC400) A method comprising:
training a neural network comprising a plurality of ordered, connected layers;
wherein the order identifies for each respective layer which others of the layers are prior to the respective layer and which others of the layers are subsequent to the respective layer;
wherein each layer comprises one or more neurons, each neuron comprising weights and connected to at least one of at least one prior neuron of a prior layer, and at least one subsequent neuron of a subsequent layer; and
wherein each neuron is implemented by one or more processing elements, each processing element comprising
at least one coupling to a fabric the processing element being enabled to communicate via the fabric via a plurality of virtual channels,
a first memory enabled to store instructions corresponding to at least computations of the neuron,
a second memory enabled to store the weights, and
hardware execution resources enabled to execute instructions from the respective first memory and access data from the respective second memory.

EC401) The method of EC400, wherein the training comprises:
based on a first activation and first weights, determining a second activation;
based on a first delta and the first weights, determining and saving second weights,
based on a third activation and selected weights, determining a fourth activation, wherein the selected weights are dynamically selected from the first weights and the second weights; and
based on a second delta and the selected weights, determining and saving third weights.

EC402) The method of EC401, wherein the determining the second activation comprises:
receiving the first activation via the fabric from the at least one prior neuron;
computing the second activation based at least in part on the first activation and first weights by at least executing first instructions stored in the first memory and accessing the first weights in the second memory; and
selectively transmitting the second activation via the fabric to the at least one subsequent neuron.

EC403) The method of EC401, wherein the determining and saving the second weights comprises:
receiving the first delta that is partially based on the second activation via the fabric from the at least one subsequent neuron;
computing a first gradient based at least in part on the first delta and the second activation by at least executing second instructions stored in the first memory;
computing the second weights based at least in part on the first gradient, a learning rule, and the first weights by at least executing third instructions stored in the first memory and accessing the first weights in the second memory; and
storing the second weights in the second memory.

EC404) The method of EC402, wherein the determining the fourth activation comprises:
receiving the third activation via the fabric from the at least one prior neuron;
computing the fourth activation based at least in part on the third activation and the selected weights by at least executing the first instructions and accessing the selected weights in the second memory; and
selectively transmitting the fourth activation via the fabric to the at least one subsequent neuron.

EC405) The method of EC403, wherein the determining and saving third weights comprises:
  receiving the second delta that is partially based on the fourth activation via the fabric from the at least one subsequent neuron;
  computing a second gradient based at least in part on a third delta and the fourth activation by at least executing the second instructions stored in the first memory;
  computing the third weights based at least in part on the second gradient, the learning rule and the selected weights by at least executing the third instructions stored and accessing the selected weights in the second memory; and
  storing the third weights in the second memory.

EC406) The method of EC404, wherein the determining and saving the second weights comprises:
  receiving the first delta that is partially based on the second activation via the fabric from the at least one subsequent neuron;
  computing a first gradient based at least in part on the first delta and the second activation by at least executing second instructions stored in the first memory;
  computing the second weights based at least in part on the first gradient, a learning rule, and the first weights by at least executing third instructions stored in the first memory and accessing the first weights in the second memory; and
  storing the second weights in the second memory.

EC407) The method of EC406, wherein the determining and saving third weights comprises:
  receiving the second delta that is partially based on the fourth activation via the fabric from the at least one subsequent neuron;
  computing a second gradient based at least in part on a third delta and the fourth activation by at least executing the second instructions stored in the first memory;
  computing the third weights based at least in part on the second gradient, the learning rule and the selected weights by at least executing the third instructions stored and accessing the selected weights in the second memory; and
  storing the third weights in the second memory.

EC408) The method of EC403, wherein the selected weights are dynamically selected in accordance with which of the first weights and the second weights was stored most recently.

EC409) The method of EC401, wherein the determining the fourth activation is enabled to be performed after the determining the second activation and before the determining and saving the second weights.

EC410) The method of EC404, wherein the selectively transmitting the second activation and the fourth activation is selectively based upon the respective values of the second activation and fourth activation.

EC411) The method of EC404, wherein the selectively transmitting the second activation and the fourth activation is selectively based upon the respective absolute values of the second activation and the fourth activation exceeding respective first and second thresholds.

EC412) The method of EC400, wherein at least one neuron is implemented by a plurality of processing elements.

EC413) The method of EC405, wherein the determining the fourth activation additionally comprises storing the fourth activation in the second memory and the computing the second gradient additionally comprises accessing the fourth activation in the second memory.

EC414) The method of EC407, wherein the computing the second gradient additionally comprises optionally recomputing the fourth activation based at least in part upon the selected weights.

EC415) The method of EC407, wherein the computing the first gradient additionally comprises optionally recomputing the second activation based at least in part upon the first weights.

EC416) The method of EC400, wherein each processing element is enabled to perform dataflow-based processing.

EC417) The method of EC400, wherein each processing element comprises a fabric router.

EC418) The method of EC400, wherein each processing element is enabled to selectively communicate fabric packets with others of the processing elements.

EC419) The method of EC418, wherein each processing element is enabled to perform processing in accordance with a virtual channel specifier and a task specifier of each fabric packet the processing element receives.

Selected Embodiment Details

Embodiments relating to neural network training and inference, comprising deep learning accelerator hardware elements and software elements are described herein (see, e.g., FIGS. 1-4 and section "Deep Learning Accelerator Overview"). The deep learning accelerator comprises hardware processing elements (see, e.g., FIGS. 5-8 and section "Processing Element: Compute Element and Router"). The deep learning accelerator implements and/or uses various techniques such as task initiation and closeout (see, e.g., FIGS. 9-12 and section "Tasks"), wavelet processing (see, e.g., FIGS. 13A-15B and section "Wavelets"), task blocking and unblocking (see, e.g., FIG. 16 and section "Block and Unblock"), neuron smearing (see, e.g., FIGS. 17-20 and section "Neuron Smearing"), fabric vectors, memory vectors, and associated data structure descriptors (see, e.g., FIGS. 21A-24 and section "Vectors and Data Structure Descriptors"), and instruction formats (see, e.g., FIGS. 25A-25C and section "Instruction Formats"). The deep learning accelerator is usable in a variety of scenarios (see, e.g., FIGS. 26A-27E and section "Deep Learning Accelerator Example Uses" as well as FIGS. 28A-29 and section "Example Workload Mapping"). The deep learning accelerator is contemplated in various embodiments (see, e.g., section "Other Embodiment Details"). The deep learning accelerator is variously implementable (see, e.g., section "Example Implementation Techniques").

Deep Learning Accelerator Overview

FIG. 1 illustrates selected details of an embodiment of a system for neural network training and inference, using a deep learning accelerator, as Neural Network System 100. Conceptually a neural network is trained using the deep learning accelerator. One or more results of the training (e.g., weights) are then used for inferences. For example, the training comprises mapping neurons of the neural network onto PEs of the deep learning accelerator. Then training data is applied to the PEs. The PEs process the training data (e.g., via forward, delta, and chain passes) and update weights until the training is complete. Then the weights are used for inference.

Referring to the figure, Deep Learning Accelerator 120 comprises FPGAs 121 and PEs 122, enabled to communicate with each other, as illustrated by Coupling 123. Placement Server(s) 150, (comprising CPUs 151 and CRM 152) is coupled to Connection Server(s) 160 (comprising CPUs 161, CRM 162, and NICs 164) via LAN 111. Connection Server(s) 160 is enabled to communicated with FPGAs 121 via NICs 164 and 100 Gb 112. Autonomous Vehicle 130 comprises CPUs 131, CRM 132, IEs 133, and Camera 135. Cell Phone 140 comprises CPUs 141, CRM 142, IEs 143, and Camera 145.

Internet 180 provides for coupling (not explicitly illustrated) between any combination of Placement Server(s) 150, Connection Server(s) 160, Autonomous Vehicle 130, and/or Cell Phone 140, according to various embodiments and/or usage scenarios.

Dashed-arrow Placements 113 conceptually indicates placement information communicated from Placement Server(s) 150 to PEs 122 (e.g., via LAN 111, Connection Server(s) 160/NICs 164, 100 Gb 112, FPGAs 121, and Coupling 123). In some embodiments and/or usage scenarios, Placements 113 is implicit, reflected in initialization information provided to router elements of PEs 122 and compute elements of PEs 122. In some embodiments and/or usage scenarios, a portion of initialization information of Placements 113 is provided to FPGAs 121 to configure elements of FPGAs 121 for operation with PEs 122.

Dashed-arrow Weights 114 and dashed-arrow Weights 115 conceptually indicate weight information communicated from PEs 122 respectively to Autonomous Vehicle 130 and Cell Phone 140 (e.g., via Coupling 123, FPGAs 121, 100 Gb 112, Connection Server(s) 160/NICs 164 and Internet 180). In some embodiments and/or usage scenarios, the weight information is any one or more of all or any portions of weight information as directly produced as a result of training, a sub-sampling thereof, a quantization thereof, and/or other transformations thereof.

Deep Learning Accelerator 120 is enabled to perform training of neural networks, such as by computing weights in response to placement information and training information received via 100 Gb 112. Deep Learning Accelerator 120 is further enabled to, upon training completion, provide the weights as results via 100 Gb 112. The weights are then usable for inference, such as in Autonomous Vehicle 130 and/or in Cell Phone 140. PEs 122 comprises a relatively large number of PEs (e.g., 10,000 or more) each enabled to independently perform routing and computations relating to training In some embodiments and/or usage scenarios, PEs 122 is implemented via wafer-scale integration, such as respective pluralities of PEs implemented on respective dice of a single wafer. FPGAs 121 is enabled to interface PEs 122 to information provided via 100 Gb 112. The interfacing includes conversion to/from modified Ethernet frames from/to Wavelets, as communicated on Coupling 123.

Placement Server(s) 150 is enabled to programmatically determine placements of neurons (e.g., as indicated by Placements 113) via one or more placement programs. The placement programs are stored in CRM 152 and executed by CPUs 151. The placement information is communicated to Connection Server(s) 160 via LAN 111. An example of a placement is a mapping of logical neurons of a neural network onto physical memory and execution hardware resources (e.g., PEs 122).

Connection Server(s) 160 is enabled to communicate with FPGAs 121 and indirectly with PEs 122 via FPGAs 121/Coupling 123, via NICs 164 and programmed control thereof via driver programs. In various embodiments and/or usage scenarios, the communication comprises placement information (e.g., from Placement Server(s) 150), training information (e.g., from sources not illustrated but accessible via Internet 180) and/or results of training (e.g., weights from PEs 122). The driver programs are stored in CRM 162 and executed by CPUs 161.

Autonomous Vehicle 130 is enabled to use Weights 114 to perform inferences using IEs 133 as programmatically controlled and/or assisted by CPUs 131 executing programs stored in CRM 132. The inferences are optionally and/or selectively performed using information obtained from Camera 135. For example, a car is operable as an autonomous vehicle. The car comprises cameras enabled to provide video to an inference engine. The inference engine is enabled to recognize objects related to navigating the car, such as traffic lanes, obstructions, and other objects. The car is enabled to navigate using results of the object recognition. Any combination of the providing, the recognizing, and the navigating are controlled and/or performed at least in part via one or more CPUs executing programs stored in a CRM.

Cell Phone 140 is enabled to use Weights 115 to perform inferences using IEs 143 as programmatically controlled and/or assisted by CPUs 141 executing programs stored in CRM 142. The inferences are optionally and/or selectively performed using information obtained from Camera 145. For example, the cell phone is operable to post tagged photos on a social networking web site. The cell phone comprises a camera enabled to provide image data to an inference engine. The inference engine is enabled to tag objects (e.g., by type such as 'cat', 'dog', and so forth, or by name such as 'Bob', 'Mary', and so forth) in the image. The cell phone is enabled to post the image and results of the tagging to the social networking web site. Any combination of the providing, the tagging, and the posting are controlled and/or performed at least in part via one or more CPUs executing programs stored in a CRM.

In various embodiments and/or usage scenarios, all or any portions of weight information determined via a deep learning accelerator is post-processed outside of the accelerator before inference usage. For example, all or any portions of information represented by Weights 114 and/or Weights 115, is processed in whole or in part by Placement Server(s) 150 before inference usage by Autonomous Vehicle 130 and/or Cell Phone 140. In various embodiments and/or usage scenarios, an example of post-processing comprises quantizing Weights 114 and/or Weights 115 (e.g., converting from a floating-point number format to a fixed-point number format). In various embodiments and/or usage models, Camera 135 and Camera 145 are respective examples of sensors that provide input to IEs 133 and IEs 143. Other examples of sensors are location sensors, orientation sensors, magnetic sensors, light sensors, and pressure sensors.

CPUs 151 comprises one or more CPUs that are compatible with respective instruction set architectures. CPUs 151 is enabled to fetch and execute instructions from CRM 152 in accordance with the instruction set architectures. CPUs 161 comprises one or more CPUs that are compatible with respective instruction set architectures. CPUs 161 is enabled to fetch and execute instructions from CRM 162 in accordance with the instruction set architectures. In some embodiments, at least one of the instruction set architectures of CPUs 151 is compatible with at least one of the instruction set architectures of CPUs 161.

CPUs 131 comprises one or more CPUs that are compatible with respective instruction set architectures. CPUs 131 is enabled to fetch and execute instructions from CRM 132 in accordance with the instruction set architectures. CPUs 141 comprises one or more CPUs that are compatible with respective instruction set architectures. CPUs 141 is enabled to fetch and execute instructions from CRM 142 in accordance with the instruction set architectures. In some embodiments, at least one of the instruction set architectures of CPUs 131 is compatible with at least one of the instruction set architectures of CPUs 141. In some embodiments, any one or more of CPUs 151, CPUs 161, CPUs 131, and CPUs 141 have instruction set architectures that are compatible with each other.

At least a respective portion of each of CRM 152 and CRM 162 CRM 132, and CRM 142, is non-volatile and comprised of any one or more of flash memory, magnetic memory, optical memory, phase-change memory, and other non-volatile memory technology elements.

In various embodiments and/or usage scenarios, IEs 133 and/or IEs 143 comprise one or more inference engines enabled to use weight information as determined by Deep Learning Accelerator 120 (and indicated conceptually by Weights 114 and/or Weights 115). In various embodiments and/or usage scenarios, IEs 133 operates in conjunction with and/or under control of programs executed by CPUs 131 and stored in CRM 132. In various embodiments and/or usage scenarios, IEs 143 operates in conjunction with and/or under control of programs executed by CPUs 141 and stored in CRM 142. In various embodiments and/or usage scenarios, all or any portions of IEs 133 and/or IEs 143 are implemented via various combinations of HW and/or SW techniques. In some embodiments, all or any portions of functionality provided by IEs 133 and/or IEs 143 is implemented using techniques such as implemented by and/or associated with Deep Learning Accelerator 120. In various embodiments and/or usage scenarios, all or any portions of IEs 133 and/or IEs 143 are variously implemented via techniques comprising various combinations of conventional CPUs, conventional GPUs, conventional DSPs, conventional FPGAs, and specialized hardware.

In various embodiments, 100 Gb 112, is variously a 100 Gb Ethernet coupling for sending standard Ethernet frames, a 100 Gb Ethernet coupling for sending modified Ethernet frames, a 100 GB modified Ethernet coupling for sending modified Ethernet frames, a 100 Gb serial coupling of other-than Ethernet technology, or some other relatively high-speed serial coupling.

In some embodiments and/or usage scenarios, Coupling 123 communicates information as wavelets.

In various embodiments, LAN 111 is implemented using techniques such as Ethernet, Fibre Channel, and/or other suitable interconnection technologies.

In some embodiments and/or usage scenarios, Placement Server(s) 150 and Connection Server(s) 160 are implemented and/or operated as a combined element (e.g., sharing CPU, CRM, and/or NIC resources), as illustrated conceptually by Combined Server(s) 110. In some embodiments and/or usage scenarios, Placement Server(s) 150 and Connection Server(s) 160 are coupled via Internet 180 rather than (or in addition to) LAN 111.

Figure 2:
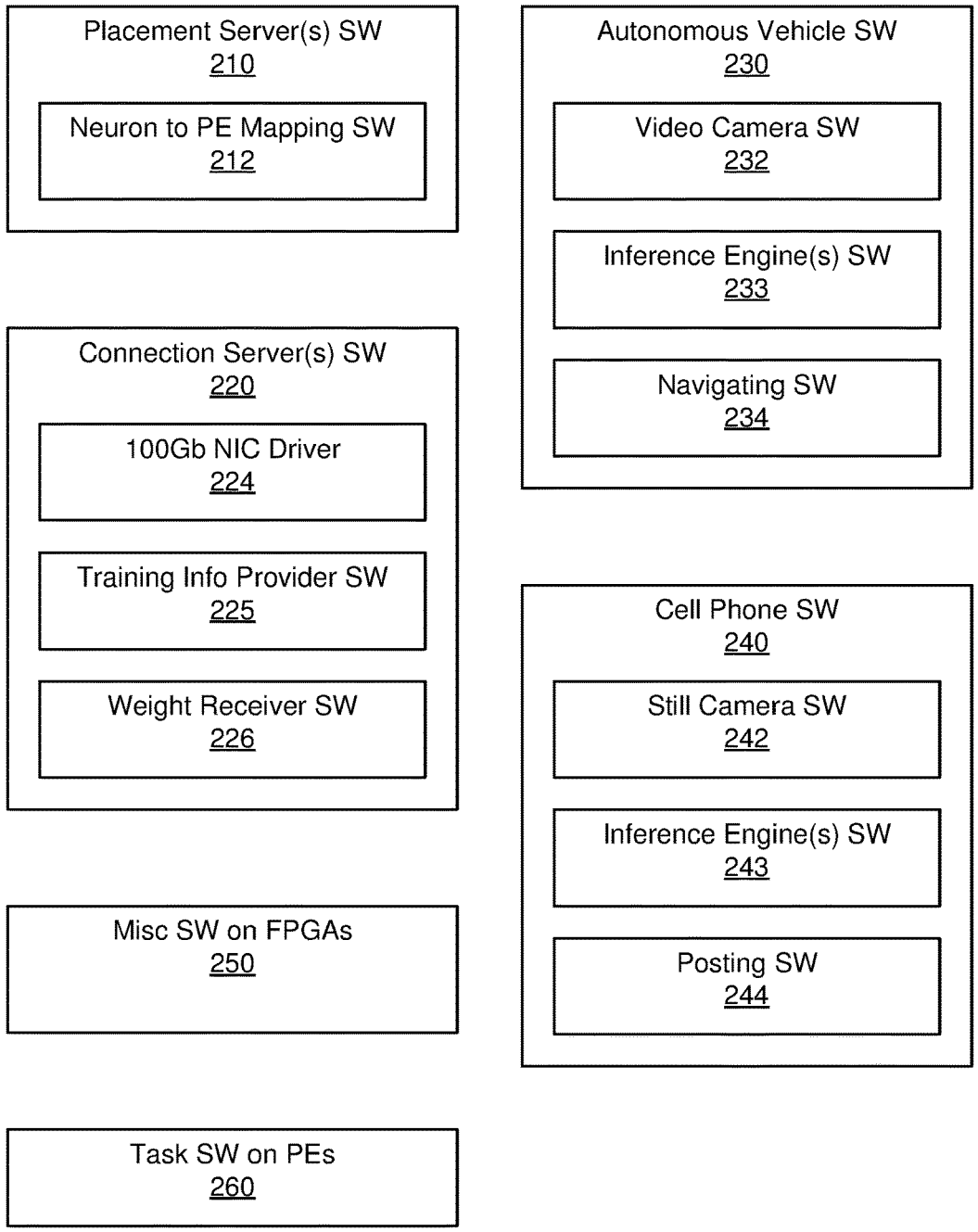
FIG. 2 illustrates selected details of an embodiment of software elements associated with neural network training and inference, using a deep learning accelerator.

FIG. 2 illustrates selected details of an embodiment of software elements associated with neural network training and inference, using a deep learning accelerator, as Neural Network Software 200. Placement Server(s) SW 210 comprises Neuron to PE Mapping SW 212, as well as other elements not illustrated, according to embodiment. In various embodiments and/or usage scenarios, all or any portions of Placement Server(s) SW 210 is stored in CRM 152 and executable by CPUs 151 of FIG. 1. One or more programs of Neuron to PE Mapping SW 212 enable determining placements of neurons of a neural network onto specific PEs of PEs 122 of FIG. 1.

Connection Server(s) SW 220 comprises 100 Gb NIC Driver 224, Training Info Provider SW 225, and Weight Receiver SW 226, as well as other elements not illustrated, according to embodiment. In various embodiments and/or usage scenarios, all or any portions of Connection Server(s) SW 220 is stored in CRM 162 and executable by CPUs 161 of FIG. 1. One or more programs of 100 Gb NIC Driver 224 enable communication between Connection Server(s) 160 and Deep Learning Accelerator 120, both of FIG. 1 (via NICs 164 and 100 Gb 112, also of FIG. 1). One or more programs of Training Info Provider SW 225 enable determination of training information for application under control of 100 Gb NIC Driver 224 for communication to Deep Learning Accelerator 120 of FIG. 1 (via NICs 164 and 100 Gb 112). In various embodiments and/or usage scenarios, the training information is variously determined from, e.g., non-volatile storage accessible to Connection Server(s) 160 and/or Internet 180, both of FIG. 1. One or more programs of Weight Receiver SW 226 enable receiving weight information under control of 100 Gb NIC Driver 224 as determined by Deep Learning Accelerator 120 (via NICs 164 and 100 Gb 112).

In various embodiments and/or usage scenarios, Misc SW on FPGAs 250 conceptually represents SW executed by one or more CPUs comprised in FPGAs 121 of (FIG. 1). The CPUs of the FPGAs are, e.g., hard-coded during manufacturing of one or more elements of FPGAs 121, and/or soft-coded during initialization of one or more elements of FPGAs 121. In various embodiments and/or usage scenarios, all or any portions of Misc SW on FPGAs 250 and/or a representation thereof is stored in non-volatile memory comprised in FPGAs 121 and/or accessible to Connection Server(s) 160. In various embodiments and/or usage scenarios, Misc SW on FPGAs 250 enables performing various housekeeping functions, such as relating to initialization and/or debugging of PEs 122 of FIG. 1.

In various embodiments and/or usage scenarios, Task SW on PEs 260 conceptually represents distributed SW executed as tasks on various PEs of PEs 122. In various embodiments and/or usage scenarios, all or any portions of Task SW on PEs 260 and/or a representation thereof is stored in non-volatile memory comprised in PEs 122 and/or accessible to Connection Server(s) 160. In various embodiments and/or usage scenarios, Task SW on PEs 260 enables performing processing of training data such as to determine weights of a neural network (e.g., via forward, delta, and chain passes).

Autonomous Vehicle SW 230 comprises Video Camera SW 232, Inference Engine(s) SW 233, and Navigating SW 234, as well as other elements not illustrated, according to embodiment. In various embodiments and/or usage scenarios, all or any portions of Autonomous Vehicle SW 230 is stored in CRM 132 and executable by CPUs 131 of FIG. 1. One or more programs of Video Camera SW 232 enable controlling and/or operating Camera 135 of FIG. 1 to provide video information to Inference Engine(s) SW 233. One or more programs of Inference Engine(s) SW 233 enable controlling and/or operating IEs 133 of FIG. 1 to determine navigational information, such as objects to avoid and/or traffic lanes to follow, from the video information. One or more programs of Navigating SW 234 enable navigating Autonomous Vehicle SW 230 in response to the navigational information.

Cell Phone SW 240 comprises Still Camera SW 242, Inference Engine(s) SW 243, Posting SW 244, as well as other elements not illustrated, according to embodiment. In various embodiments and/or usage scenarios, all or any portions of Cell Phone SW 240 is stored in CRM 142 and executable by CPUs 141 of FIG. 1. One or more programs of Still Camera SW 242 enable controlling and/or operating Camera 145 of FIG. 1 to provide still image information to Inference Engine(s) SW 243. One or more programs of Inference Engine(s) SW 243 enable controlling and/or operating IEs 143 of FIG. 1 to determine tag information from the still image information. One or more programs of Posting SW 244 enable posting to a social networking web site in response to the still image information and/or the tag information.

In various embodiments and/or usage scenarios, any one or more of SW collections Placement Server(s) SW 210, Connection Server(s) SW 220, Autonomous Vehicle SW 230, and/or Cell Phone SW 240 optionally and/or selectively comprise one or more operating system elements, e.g., one or more real-time operating systems, one or more non-real-time operating systems, and/or one or more other control programs to coordinate elements of each respective SW collection.

Figure 3:
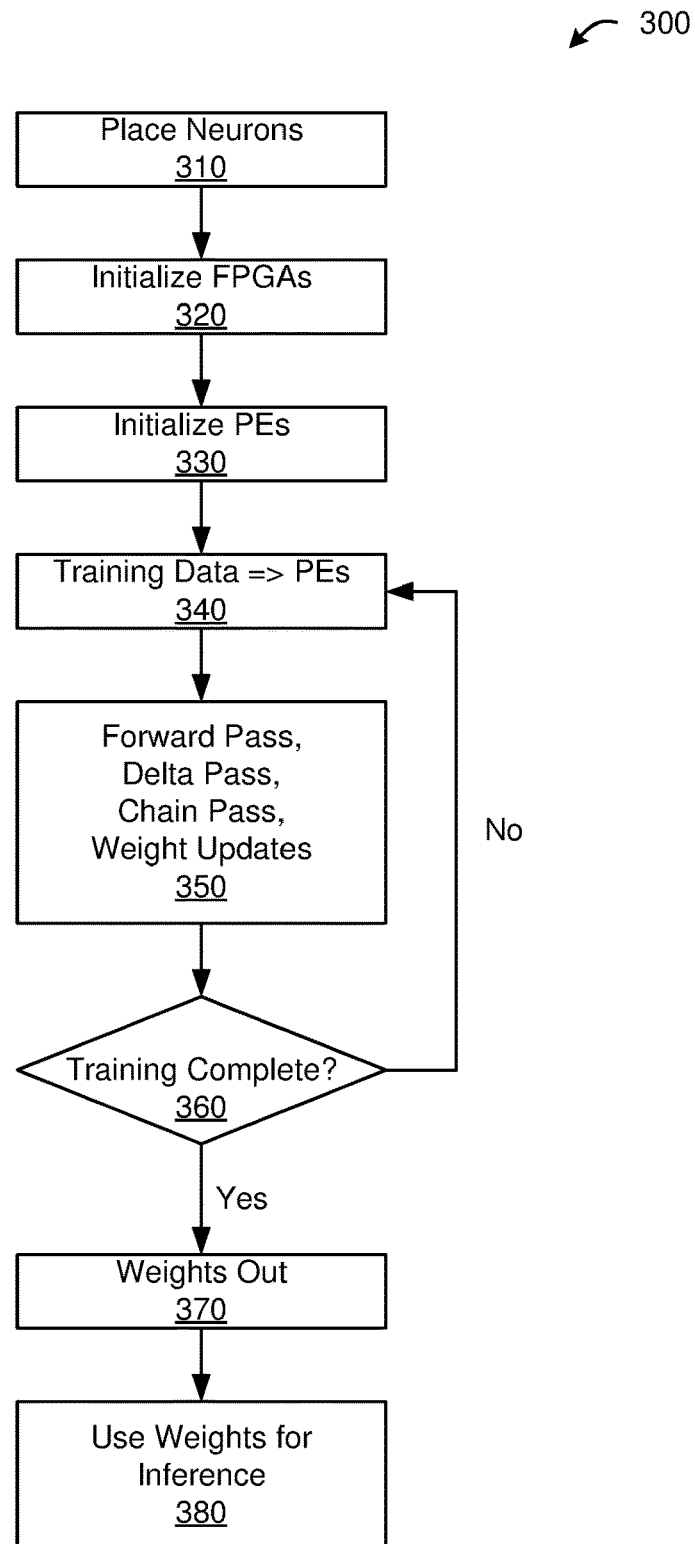
FIG. 3 illustrates selected details of an embodiment of processing associated with training a neural network and performing inference using the trained neural network, using a deep learning accelerator.

FIG. 3 illustrates selected details of an embodiment of processing associated with training a neural network and performing inference using the trained neural network, using a deep learning accelerator, as Neural Network Training/Inference 300. As illustrated, neurons of the neural network are placed, e.g., allocated and/or associated with specific PE resources in action 310. Then FPGA resources are initialized in preparation for training of the neural network in action 320. Then the PE resources are initialized in preparation for training of the neural network in action 330.

After the FPGA resources and PE resources are initialized in preparation for the training, training data is applied to the PEs in action 340. The PE resources process the training data in action 350. Then a check is made to determine if training is complete, e.g., because application of the training data is complete and/or one or more completion criteria are met (such as an inference error below a predetermine bound) in action 360. If not, then flow passes back to action 340 for application of further training data. In some scenarios, the training does not complete and in some embodiments, control instead passes to another action (not illustrated) to enable changing the neural network (e.g., adding layers of neurons, removing layers of neurons). The changed neural network is then trained in accordance with actions 310, 320, 330, 340, 350, and 360.

If training is complete, then flow continues to provide weights that are results of the training for use in inferences in 370. In some embodiments and/or usage scenarios, the weights are quantized, e.g., transformed to an integer data format. In some embodiments and/or usage scenarios, the integer data format is a reduced precision number format (e.g., 8-bit or 16-bit). The weights are then provided to one or more inference engines, and used to make inferences in action 380.

In various embodiments and/or usage scenarios, the inference engines correspond to one or more inference applications, e.g., text translation, optical character recognition, image classification, facial recognition, scene recognition for a self-driving car, speech recognition, data analysis for high energy physics, and drug discovery.

In various embodiments and/or usage scenarios, the PE resources correspond, e.g., to PEs 122 of FIG. 1, and the FPGAs resources correspond, e.g., to FPGAs 121 of FIG. 1.

In various embodiments and/or usage scenarios, any one or more of all or any portions of actions of Neural Network Training/Inference 300 are performed by and/or related to all or any portions of any one or more elements of Neural Network System 100 of FIG. 1 and/or Neural Network Software 200 of FIG. 2. For example, all or any portions of action 310 are performed by Placement Server(s) 150 via execution of Neuron to PE Mapping SW 212. For another example, all or any portions of action 320 are performed by Placement Server(s) 150 via execution of Neuron to PE Mapping SW 212. For another example, all or any portions of action 330 are performed by Placement Server(s) 150 via execution of Neuron to PE Mapping SW 212. For another example, all or any portions of action 330 are performed by PEs 122 via execution of Task SW on PEs 260. For another example, all or any portions of action 340 are performed by Connection Server(s) 160 via execution of Training Info Provider SW 225. For another example, all or any portions of action 350 are performed by PEs 122 via execution of Task SW on PEs 260. For another example, all or any portions of action 350 are performed by Combined Server(s) 110, Placement Server(s) 150 and/or Connection Server(s) 160. For another example, all or any portions of 370 are performed by Connection Server(s) 160 via execution of Weight Receiver SW 226. For another example, all or any portions of action 370 are performed by FPGAs 121 via execution of Misc SW on FPGAs 250. For another example, all or any portions of 380 are performed by IEs 133 such as under control of Inference Engine(s) SW 233. For another example, all or any portions of action 380 are performed by IEs 143 such as under control of Inference Engine(s) SW 243.

In various embodiments and/or usage scenarios, any one or more of all or any portions of actions of Neural Network Training/Inference 300 are performed in conjunction with communicating information between various elements of Neural Network System 100 of FIG. 1. For example, various actions of Neural Network Training/Inference 300 are performed at least in part via NICs 164 and 100 Gb 112 communicating information between Connection Server(s) 160 and FPGAs 121. For another example, various actions of Neural Network Training/Inference 300 are performed in conjunction with FPGAs 121 and Coupling 123 communicating information between Connection Server(s) 160 and PEs 122. For another example, various actions of Neural Network Training/Inference 300 performed in conjunction with any one or more of Placement Server(s) 150, Connection Server(s) 160, Autonomous Vehicle 130, and Cell Phone 140 communicating information as enabled at least in part by Internet 180.

Figure 4:
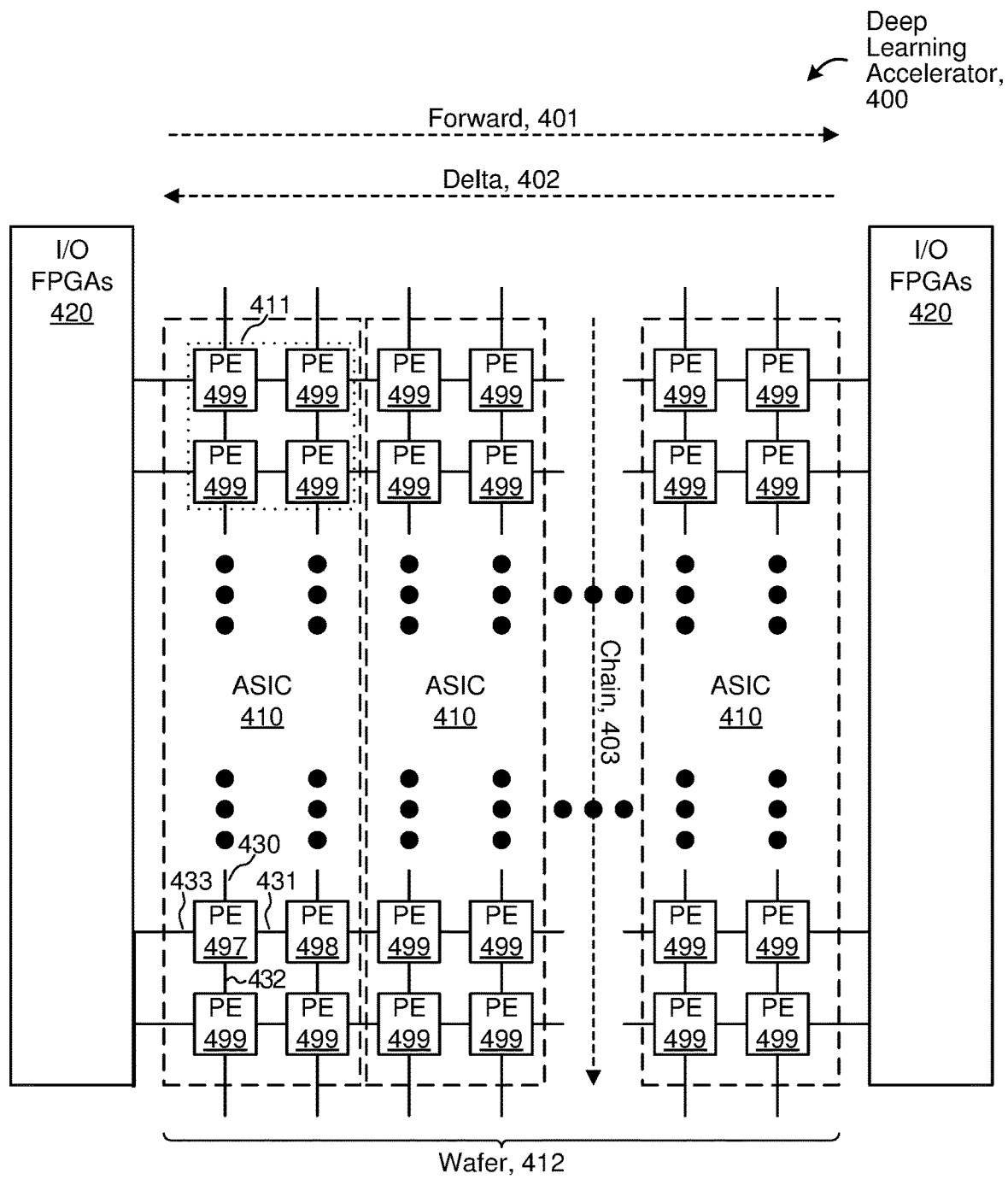
FIG. 4 illustrates selected details of an embodiment of a deep learning accelerator.

FIG. 4 illustrates selected details of an embodiment of a deep learning accelerator as Deep Learning Accelerator 400. Each of PE 499 elements has couplings to other of PE 499 elements. Two of the PE elements (PE 497 and PE 498) are illustrated with unique identifiers, and are otherwise respectively identical to a instances of PE 499. PE 497 is illustrated with identifiers for each of four couplings (North coupling 430, East coupling 431 with PE 498, and South coupling 432) to others of the PEs and one of the I/O FPGAs (West coupling 433), but is otherwise identical to others of the PE elements illustrated. In some embodiments and/or usage scenarios, the couplings are logical and/or physical. In various embodiments and/or usage scenarios, the couplings are usable to communicate wavelets, backpressure information, or both. In various embodiments and/or usage scenarios, all or any portions of the physical couplings are to physically adjacent PEs. In some embodiments and/or usage scenarios, the PEs are physically implemented in a 2D grid. In some embodiments and/or usage scenarios, the PEs are physically implemented in a 2D grid of aligned rectangles, and physically adjacent PEs correspond to PEs sharing a horizontal boundary (North/South PEs with respect to each other) and PEs sharing a vertical boundary (East/West PEs with respect to each other).

In some embodiments and/or usage scenarios, an array of identical instances of a same ASIC is formed on a wafer, and each of the same ASICs comprises a plurality of identical instances of a same PE (e.g., PE 499), forming a wafer (e.g., Wafer 412) usable in wafer-scale integration techniques. In some embodiments and/or usage scenarios, a peripheral portion of the PEs are coupled to I/O FPGAs 420. Example ASICs are illustrated as ASIC 410, comprising a column-organized section of PEs (replicated, e.g., in a one-dimensional fashion to form a wafer), and ASIC 411, comprising a square-organized section or a rectangular-organized section of PEs (replicated, e.g., in a two-dimensional fashion to form a wafer). Other organizations of ASICs on a wafer are contemplated.

In some embodiments and/or usage scenarios, neurons associated with layers in a neural network are generally placed on PE 499 elements in a left to right fashion, with earlier layers (e.g., the input layer) on the left and subsequent layers (e.g., the output layer) on the right. Accordingly, data flow during training is illustrated conceptually as dashed-arrows Forward 401, Delta 402, and Chain 403. During Forward 401, stimuli is applied to the input layer and activations from the input layer flow to subsequent layers, eventually reaching the output layer and producing a forward result. During Delta 402, deltas (e.g., differences between the forward result and the training output data) are propagated in the backward direction. During Chain 403, gradients are calculated based on the deltas (e.g., with respect to the weights in the neurons) as they are generated during Delta 402. In some embodiments and/or usage scenarios, processing for Delta 402 is substantially overlapped with processing for 403.

In some embodiments and/or usage scenarios, Deep Learning Accelerator 400 is an implementation of Deep Learning Accelerator 120 of FIG. 1. In some embodiments and/or usage scenarios, individual PE 499 elements correspond to individual PEs of PEs 122 of FIG. 1. In some embodiments and/or usage scenarios, each ASIC 410 element or alternatively each ASIC 411 element corresponds to all or any portions of PEs of PEs 122 implemented as individual integrated circuits. In some embodiments and/or usage scenarios, each ASIC 410 element or alternatively each ASIC 411 element corresponds to (optionally identical) portions of PEs 122 implemented via respective dice of a wafer. In some embodiments and/or usage scenarios, I/O FPGAs 420 elements collectively correspond to FPGAs 121 of FIG. 1.

In some embodiments and/or usage scenarios, the placement of neurons (e.g., associated with layers in a neural network) onto PE 499 elements is performed in whole or in part by all or any portions of Placement Server(s) SW 210 of FIG. 2.

Processing Element: Compute Element and Router

Figure 5:
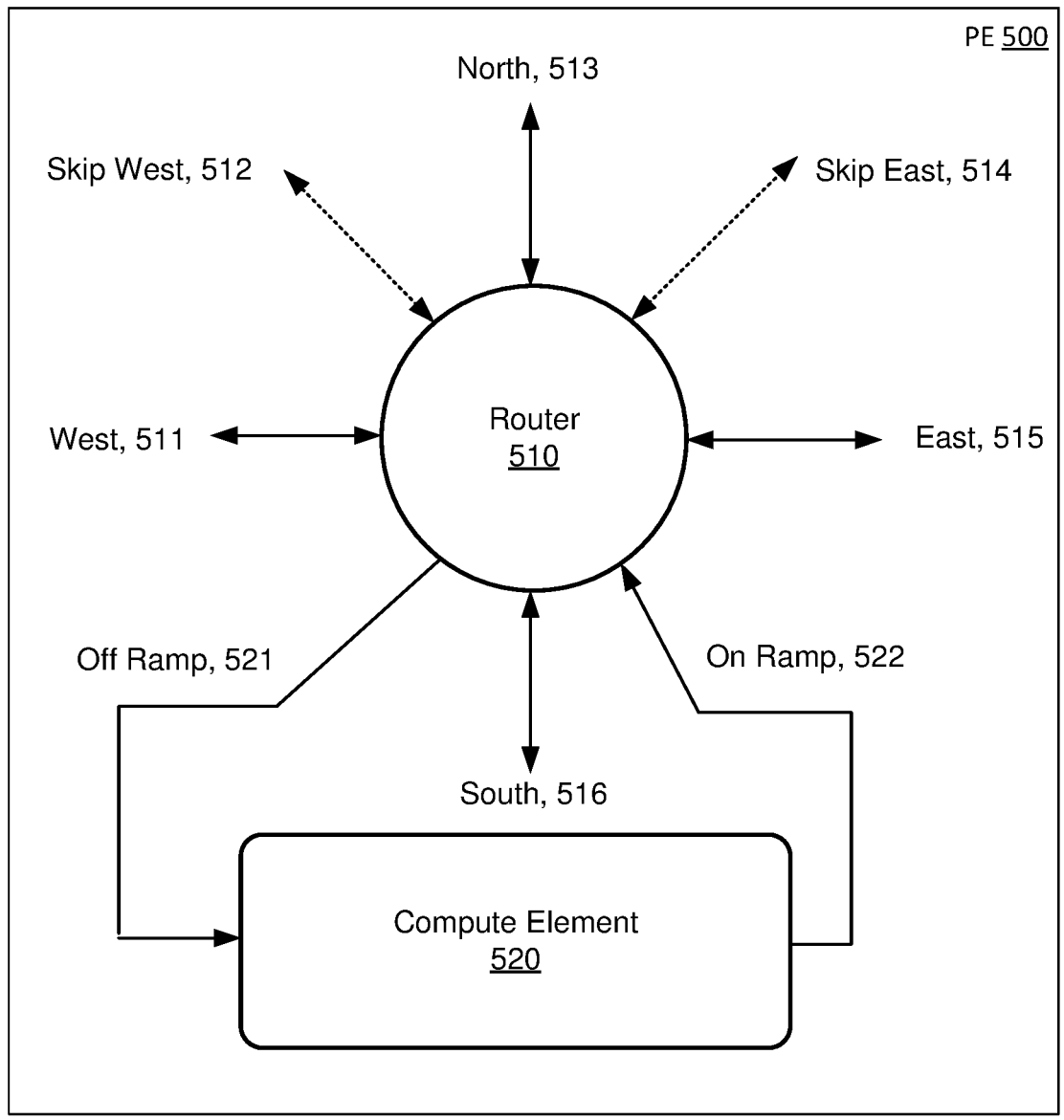
FIG. 5 illustrates selected details of an embodiment of a processing element of a deep learning accelerator.

FIG. 5 illustrates selected details of an embodiment of a PE as PE 500 of a deep learning accelerator. PE 500 comprises Router 510 and Compute Element 520. Router 510 selectively and/or conditionally communicates wavelets between other PEs (e.g., logically adjacent and/or physically adjacent PEs) and the instant PE via couplings 511-516. Router 510 selectively and/or conditionally communicates wavelets to the instant PE via Off Ramp 521 and communicates wavelets from the instant PE via On Ramp 522. Compute Element 520 performs computations on data embodied in the wavelets according to instruction address information derivable from the wavelets. The instruction address information is used to identify starting addresses of tasks embodied as instructions stored in memory of the compute element.

In various embodiments, any one or more of 511-516 are omitted.

In some embodiments and/or usage scenarios, PE 500 is an embodiment of PE 499 of FIG. 4, and/or elements of PE 500 correspond to an implementation of PE 499. In some embodiments and/or usage scenarios, North 513, East 515, South 516, and West 511 correspond respectively to North coupling 430, East coupling 431, South coupling 432, and West coupling 433 of FIG. 4.

Figure 6:
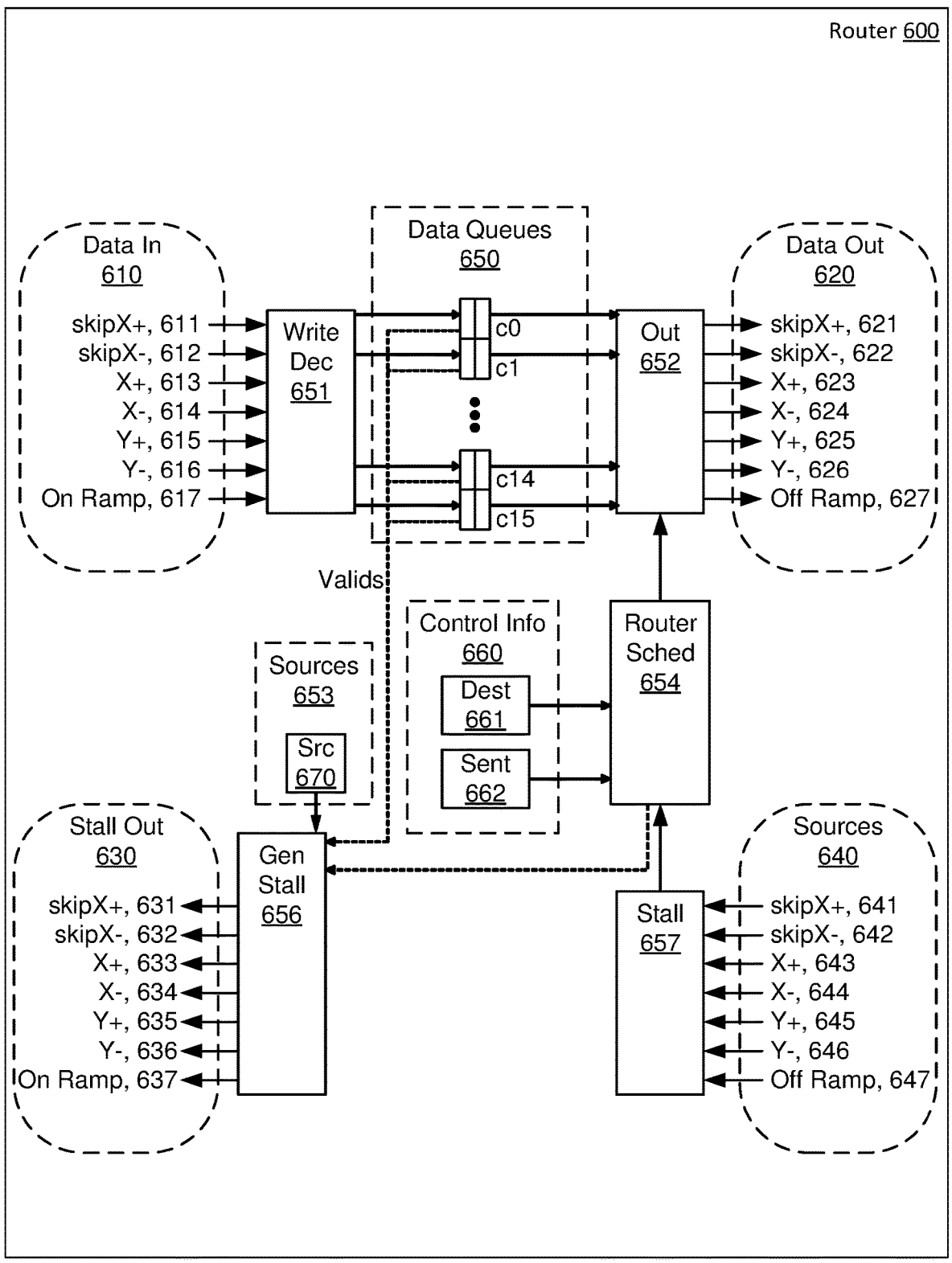
FIG. 6 illustrates selected details of an embodiment of a router of a processing element.

FIG. 6 illustrates selected details of an embodiment a router of a PE, as Router 600. Consider that there are a plurality of PEs, each comprising a respective router and a respective CE. Router 600 is an instance of one of the respective routers. Router 600 routes wavelets, in accordance with color information of the wavelets and routing configuration information, to the CE of the PE that the instant router is comprised in, as well as others of the routers. The routed wavelets are variously received by the instant router and/or generated by the CE of the PE that the instant router is comprised in. The routing enables communication between the PEs. Stall information is communicated to prevent overflowing of wavelet storage resources in Router 600.

Router 600 comprises four groups of interfaces, Data In 610, Data Out 620, Stall Out 630, and Sources 640. Data In 610, Data Out 620, Stall Out 630, and Sources 640 respectively comprise interface elements 611-617, 621-627, 631-637, and 641-647. Router 600 further comprises Write Dec 651, Out 652, Gen Stall 656, and Stall 657, respectively coupled to Data In 610, Data Out 620, Stall Out 630, and Sources 640. Router 600 further comprises Sources 653 comprising Src 670 coupled to Gen Stall 656. Router 600 further comprises Data Queues 650, Control Info 660, and Router Sched 654. Control Info 660 comprises Dest 661 and Sent 662.

Data Queues 650 is coupled to Write Dec 651 to receive incoming wavelet information, and coupled to Out 652 to provide outgoing wavelet information. Data Queues 650 is further coupled to Gen Stall 656 to provide data queue validity information. Router Sched 654 is coupled to Control Info 660 to receive control information relevant to scheduling queued wavelets. Router Sched 654 is further coupled to Stall 657 to receive stall information relevant to scheduling queued wavelets. Router Sched 654 is further coupled to Out 652 to direct presentation of queued wavelets on one or more of 621-627. Router Sched 654 is further coupled to Gen Stall 656 to partially direct generation of stall information.

In various embodiments, each of interface elements 611-617, 621-627, 631-637, and 641-647 is variously implemented via passive interconnect (e.g., wire(s) without buffering), active interconnect (e.g., wire(s) with selective and/or optional buffering), and coupling with logic to accommodate additional functionality between one instance of Router 600 and another instance of Router 600.

In some embodiments and/or usage scenarios, Router 600 is an implementation of Router 510 of FIG. 5.

In some embodiments, ones of Data In 610 and ones of Data Out 620 correspond to portions of West 511, Skip West 512, North 513, Skip East 514, East 515, South 516, Off Ramp 521, and On Ramp 522. For example, On Ramp 617 corresponds to On Ramp 522 and Off Ramp 627 corresponds to Off Ramp 521. As another example, Y+ 615 comprises the portion of North 513 enabled to receive data, and Y+ 625 comprises the portion of North 513 enabled to transmit data.

Figure 7:
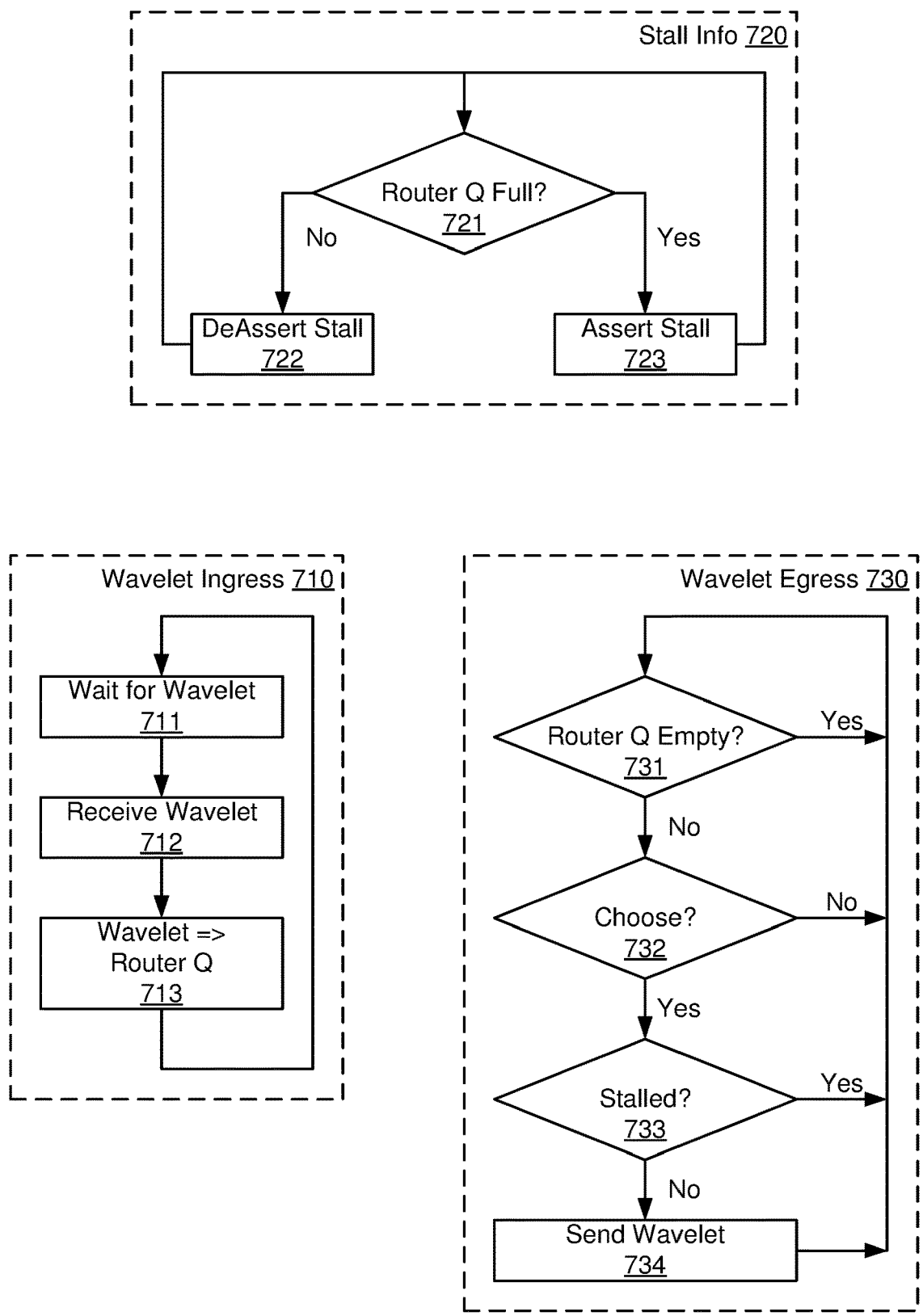
FIG. 7 illustrates selected details of an embodiment of processing associated with a router of a processing element.

FIG. 7 illustrates selected details of an embodiment of processing associated with a router of a processing element, as Wavelet Ingress 710, Stall Info 720, and Wavelet Egress 730. Conceptually, the router accepts as many wavelets as possible from ingress ports, queuing as necessary and as queue space is available, and routes as many wavelets as possible to egress ports per unit time (e.g., clock cycle). Wavelet Ingress 710 comprises actions 711-713 corresponding to wavelet ingress from (logically and/or physically) adjacent PEs and/or an instant PE, for each respective queue. Stall Info 720 comprises actions 721-723 correspond to providing stall information, for each respective queue. Wavelet Egress 730 comprises actions 731-734 that correspond to wavelet egress to (logically and/or physically) adjacent PEs and/or the instant PE, for each respective queue. In some circumstances, in accordance with color information of a wavelet and routing configuration information, Send Wavelet 734 sends a wavelet from a single queue entry to a single destination (e.g., unicast). In some circumstances, in accordance with color information of a wavelet and routing configuration information, Send Wavelet 734 sends a wavelet from a single queue entry to a plurality of destinations (e.g., multicast). In various embodiments and/or usage scenarios, any one or more of all or any portions of actions of 710, 720, and/or 730 correspond to actions performed by and/or related to all or any portions of any one or more elements of Router 600 of FIG. 6.

Figure 8:
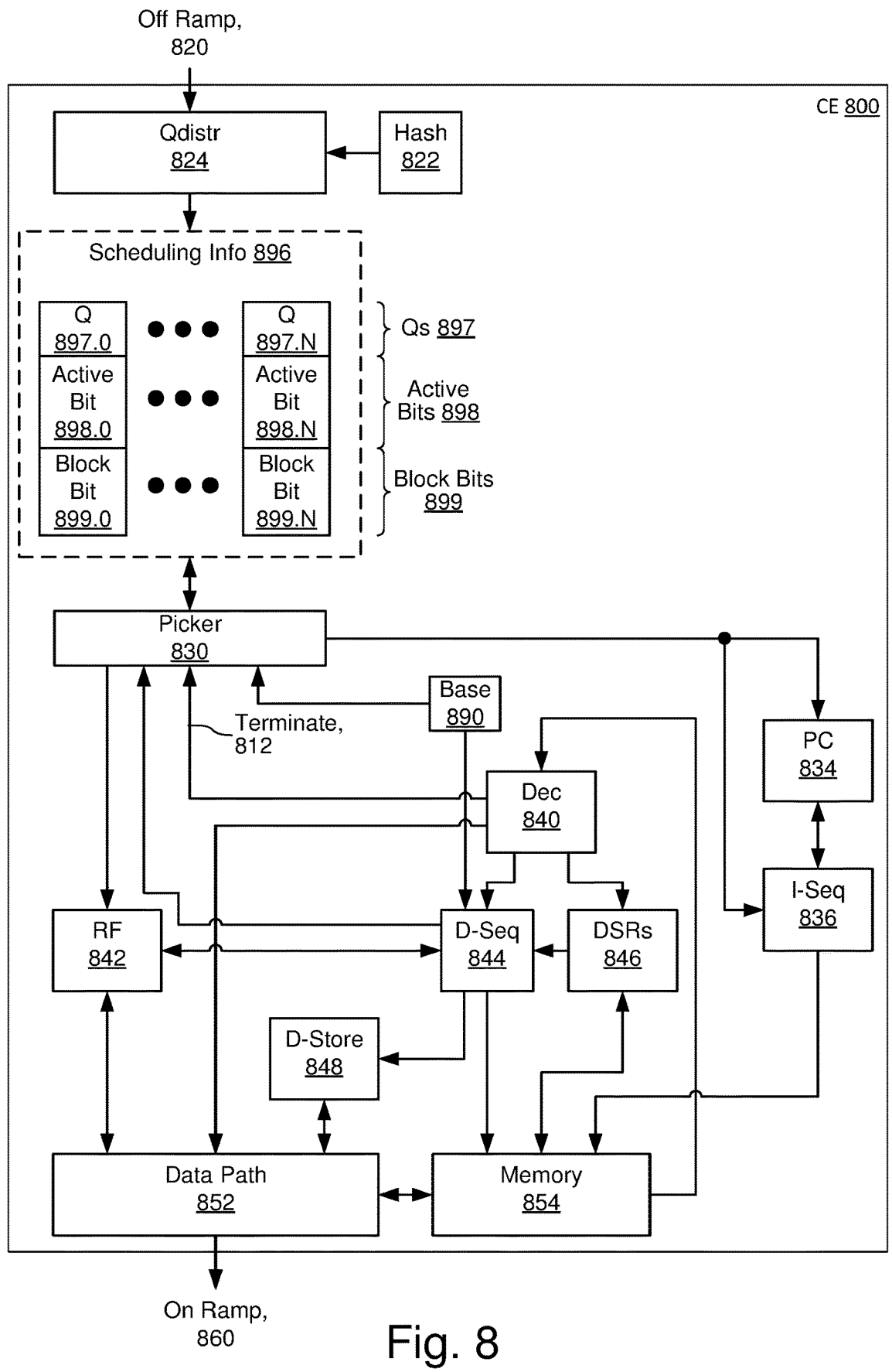
FIG. 8 illustrates selected details of an embodiment of a compute element of a processing element.

FIG. 8 illustrates selected details of an embodiment of a compute element of a processing element, as CE 800.

In various embodiments, CE 800 is coupled via Off Ramp 820 and On Ramp 860 to a router. CE 800 comprises Qdistr 824 coupled to receive wavelets via Off Ramp 820. Qdistr 824 is coupled to transmit wavelets to Scheduling Info 896. Scheduling Info 896 comprises Qs 897, Active Bits 898, and Block Bits 899.

In various embodiments, Qs 897 comprises a queue for each fabric color (e.g., to hold wavelets created by other processing elements and associated with the respective color) and each local color (e.g., to hold wavelets created by CE 800 and associated with the respective color), e.g., Q0 897.0, . . . , and QN 897.N. Each one of Qs 897 (e.g., Q0 897.0) is associated with a respective one of Active Bit 898 (e.g., Active Bit 0 898.0) and Block Bits 899 (e.g., Block Bit 0 899.0). Each one of Active Bits 898 and each one of Block Bits 899 contain information about the respective one of Qs 897, e.g., Block Bit N 899.N indicates whether QN 897.N is blocked.

In various embodiments, there is variously a physical Q for each color, one or more physical Qs for a predetermined subset of colors, and one or more physical Qs for a dynamically determined subset of colors. In various embodiments, there is variously one or more physical Qs of a same size (e.g., each enabled to hold a same number of wavelets) and one or more physical Qs of differing sizes (e.g., each enabled to hold a different number of wavelets). In various embodiments, there are one or more physical Qs that are variously mapped to virtual Qs, each of the virtual Qs being associated with one or more colors. For example, there are N logical Qs and less than N physical Qs. For another example, some of Qs 897 are enabled to hold 8 wavelets and others of Qs 897 are enabled to hold 3 wavelets. In some embodiments, traffic for one or more colors associated with a particular one of Qs 897 is estimated and/or measured, and the particular one of Qs 897 is enabled to hold a particular number of wavelets based on the traffic.

Hash 822 is coupled to Qdistr 824 and selects a physical queue to store a wavelet, based at least in part on the color of the wavelet (e.g., by applying a hash function to the color). In some embodiments, the color associated with a wavelet payload is stored explicitly with the wavelet payload in a queue, such that an entry in the queue holds an entire wavelet (payload with color). In some embodiments, the color associated with a wavelet payload is not stored explicitly with the wavelet payload in a queue, such that an entry in the queue stores a wavelet payload without storing an associated color. The color of the wavelet payload is inferred, such as from the specific queue the wavelet payload is stored in.

In some embodiments, one or more of Active Bits 898 and Block Bits 899 are implemented as respective bit vectors with N entries, one entry for each color. In various embodiments, one or more of Active Bits 898 and Block Bits 899 are implemented as respective bit fields in a table comprising one entry for each color.

Picker 830 is coupled to Scheduling Info 896, RF 842, Dec 840, Base 890, PC 834, I-Seq 836, and D-Seq 844. Picker 830 is enabled to select a wavelet for processing from one of Qs 897. In some embodiments, Picker 830 selects a wavelet by selecting one of Qs 897, and selecting the oldest wavelet in the selected queue. In some scenarios, Picker 830 selects a new wavelet for processing when Dec 840 signals that a terminate instruction has been decoded. In some other scenarios (e.g., an instruction accessing fabric input), Picker 830 selects a new wavelet for processing from one of Qs 897 in response to a queue identifier received from D-Seq 844.

Picker 830 receives the selected wavelet from one of Qs 897 and is enabled to send one or more of data and index from the selected wavelet to RF 842. In some embodiments, Qs 897 is coupled to Data Path 852, and the Data Path is enabled to receive data directly from one of the Qs. Picker 830 is enabled to read a base address from Base 890 and calculate an instruction address to send to PC 834 and I-Seq 836. Base 890 stores a base address and is also coupled to D-Seq 844. PC 834 stores the address of the next instruction to fetch. In various embodiments, Base 890 and PC 834 are implemented as registers. In some embodiments, D-Seq 844 is enabled to read a base address from Base 890 and request data at one or more addresses from Memory 854 and D-Store 848, based at least in part upon the value read from Base 890.

I-Seq 836 is coupled to PC 834 and is enabled to read and modify PC 834 (e.g., increment for a sequential instruction or non-sequentially for a branch instruction). I-Seq 836 is also coupled to Memory 854 and is enabled to provide an instruction fetch address to Memory 854 (e.g., based upon PC 834).

Memory 854 is further coupled to Dec 840, Data Path 852, and D-Seq 844. In response to an instruction fetch address from I-Seq 836, Memory 854 is enabled to provide instructions located at the instruction fetch address to Dec 840 (an instruction decoder). In various embodiments, Memory 854 is enabled to provide up to three instructions in response to each instruction fetch address. In some embodiments, an instruction is formatted in accordance with one or more of FIGS. 25A, 25B, and 25C.

Dec 840 is enabled to determine one or more characteristics of instructions, according to various embodiments and/or usage scenarios. For example, Dec 840 is enabled to parse instructions into an opcode (e.g., Opcode 2512 of FIG. 25A) and zero or more operands (e.g., source and/or destination operands). For another example, Dec 840 is enabled to identify an instruction according to instruction type (e.g., a branch instruction, or a multiply-accumulate instruction, and so forth). For yet another example, Dec 840 is enabled to determine that an instruction is a specific instruction and activates one or more signals accordingly.

Dec 840 is coupled to Picker 830 via Terminate 812 and is enabled to signal that one of the decoded instructions is a terminate instruction that ends a task (e.g., the last instruction of the instructions executed in response a task initiated in response to the selected wavelet).

In some scenarios, Dec 840 is enabled to decode a branch instruction. Examples of branch instructions include: conditional branch instructions that conditionally modify PC 834 and jump instructions that unconditionally modify PC 834. A branch instruction is executed by I-Seq 836 and optionally and/or conditionally modifies PC 834. In some scenarios, a branch instruction implements software control flow (e.g., a loop) by conditionally modifying PC 834.

In response to decoding an instruction (e.g., a multiply-accumulate instruction), Dec 840 is enabled to transmit an opcode to Data Path 852. Dec 840 is coupled to DSRs 846 and enabled to transmit one or more operand identifiers to DSRs 846. Dec 840 is also coupled to D-Seq 844 and enabled to transmit one or more operand type identifiers to D-Seq 844.

DSRs 846 comprise registers that hold Data Structure Descriptors (DSDs) and is coupled to and enabled to send one or more DSDs to D-Seq 844. In some embodiments, DSRs comprise source DSRs, destination DSRs, extended DSRs, and stride registers. In response to receiving an operand identifier from Dec 840, DSRs 846 is enabled to read the DSD specified by the operand identifier, and to transmit the DSD to D-Seq 844. In various embodiments, DSRs 846 is enabled to receive up to two source operand identifiers and one destination operand identifier, read two source DSRs and one destination DSR, and transmit two source DSDs and one destination DSD to D-Seq 844. In some embodiments, the CE is enabled to explicitly write a DSD to DSRs from memory in response to load DSR instructions and the CE is enabled to explicitly write a DSD to memory from DSRs in response to store DSR instructions. In some embodiments, DSRs 846 is coupled to and enabled to receive data from and transmit data to Memory 854.

In some embodiments, DSRs 846 comprise three sets of DSRs: 12 DSRs for source0 operands (sometimes referred to as S0DSRs), 12 DSRs for source1 operands (sometimes referred to as S1DSRs), and 12 DSRs for destination operands (sometimes referred to as DDSRs). In addition, DSRs 846 also comprises six extended DSRs (sometimes referred to as XDSRs) and six stride registers. In some embodiments, DSRs comprise 48 bits, XDSRs comprise 51 bits, and stride registers comprise 15 bits. In various embodiments, respective instructions load 48 bits of data from memory (e.g., D-Store 848 or Memory 854) into respective DSRs (e.g., LDS0WDS, LDS1WDS, and LDDWDS instructions respectively load source0, source1, and destination DSRs). In various embodiments, respective instructions store 48 bits of data from respective DSRs to memory (e.g., STS0WDS, STS1WDS, and STDWDS instructions respectively store source0, source1, and destination DSRs to memory). In some embodiments, instructions (e.g., LDXDS) load data from memory into XDSRs and other instructions (e.g., STXDS) store data from XDSRs to memory. Instructions that move data between memory and XDSRs (e.g., LDXDS and STXDS) access 64 bits of memory, and only use the lower 51 bits. In some embodiments, instructions (e.g., LDSR) load data from memory into stride registers, and other instructions (e.g., STSR) store data from stride registers to memory. In some embodiments, instructions that move data between memory and stride registers access 16 bits of memory, and only use the lower 15 bits.

D-Seq 844 is also coupled to D-Store 848, RF 842, and Picker 830, and is enabled to initiate accessing vector data at various sources in response to DSDs received from DSRs 846. In some scenarios (e.g., in response to receiving a DSD describing one of a 1D memory vector, 4D memory vector, and circular memory buffer), D-Seq 844 is enabled to calculate a sequence of memory addresses to access (e.g., in Memory 854 and/or D-Store 848). In some other scenarios, (e.g., in response to receiving a DSD describing a fabric input), D-Seq 844 is enabled to initiate reading fabric data from one of Qs 897 via Picker 830. In yet other scenarios, (e.g., in response to receiving a DSD describing a fabric output), D-Seq 844 is enabled to initiate transforming data into wavelet(s) and transmitting wavelet(s) to fabric via On Ramp 860. In some embodiments, D-Seq 844 is enabled to simultaneously access vector data at three sources (e.g., read vector data from memory, read vector data from a fabric input, and write vector data to a fabric output).

In some embodiments, D-Seq 844 is enabled to access data in one or more registers in RF 842 (e.g., an instruction with one or more input operands and/or one output operand). In some scenarios, D-Seq 844 is enabled to request operands from registers in RF 842. In yet other scenarios, D-Seq 844 is enabled to request data from a register (e.g., an index) in RF 842 as an input for calculating a sequence of memory addresses to access in accordance with a DSD.

Data Path 852 is coupled to RF 842 and D-Store 848. In various embodiments, any one or more of Memory 854, RF 842, Qs 897, and D-Store 848 are enabled to provide data to Data Path 852 (e.g., in response to a request from D-Seq 844) and to receive data from Data Path 852 (e.g., results of operations). Data Path 852 is also coupled via On Ramp 860 to the router, and enabled to send data via On Ramp 860 to the router. Data Path 852 comprises execution resources (e.g., ALUs) enabled to perform operations (e.g., specified by an opcode decoded and/or provided by Dec 840, according to embodiment). In some embodiments, RF 842 comprises sixteen general-purpose registers sometimes referred to as GPR0-GPR15. Each of the GPRs is 16-bits wide and is enabled to store integer or floating-point data.

In some embodiments, D-Store 848 is a type of memory that is smaller and more efficient (e.g., lower joules per bit of data read) than Memory 854. In some embodiments, D-Store 848 is a type of memory of relatively lower capacity (e.g., retaining less information) and relatively lower access latency and/or relatively higher throughput than Memory 854. In some scenarios, more frequently used data is stored in D-Store 848, while less frequently used data is stored in Memory 854. In some embodiments, D-Store 848 comprises a first address range and Memory 854 comprises a second, non-overlapping address range.

In some embodiments and/or usage scenarios, elements of the figure correspond to an implementation of Compute Element 520 of FIG. 5, and Off Ramp 820 and On Ramp 860 correspond respectively to Off Ramp 521 and On Ramp 522 of FIG. 5.

The partitioning and coupling illustrated in FIG. 8 are illustrative only, as other embodiments are contemplated with different partitioning and/or coupling. For example, in other embodiments, RF 842 and DSRs 846 are combined into one module. In yet other embodiments, DSRs 846 and Data Path 852 are coupled.

Tasks

Figure 9:
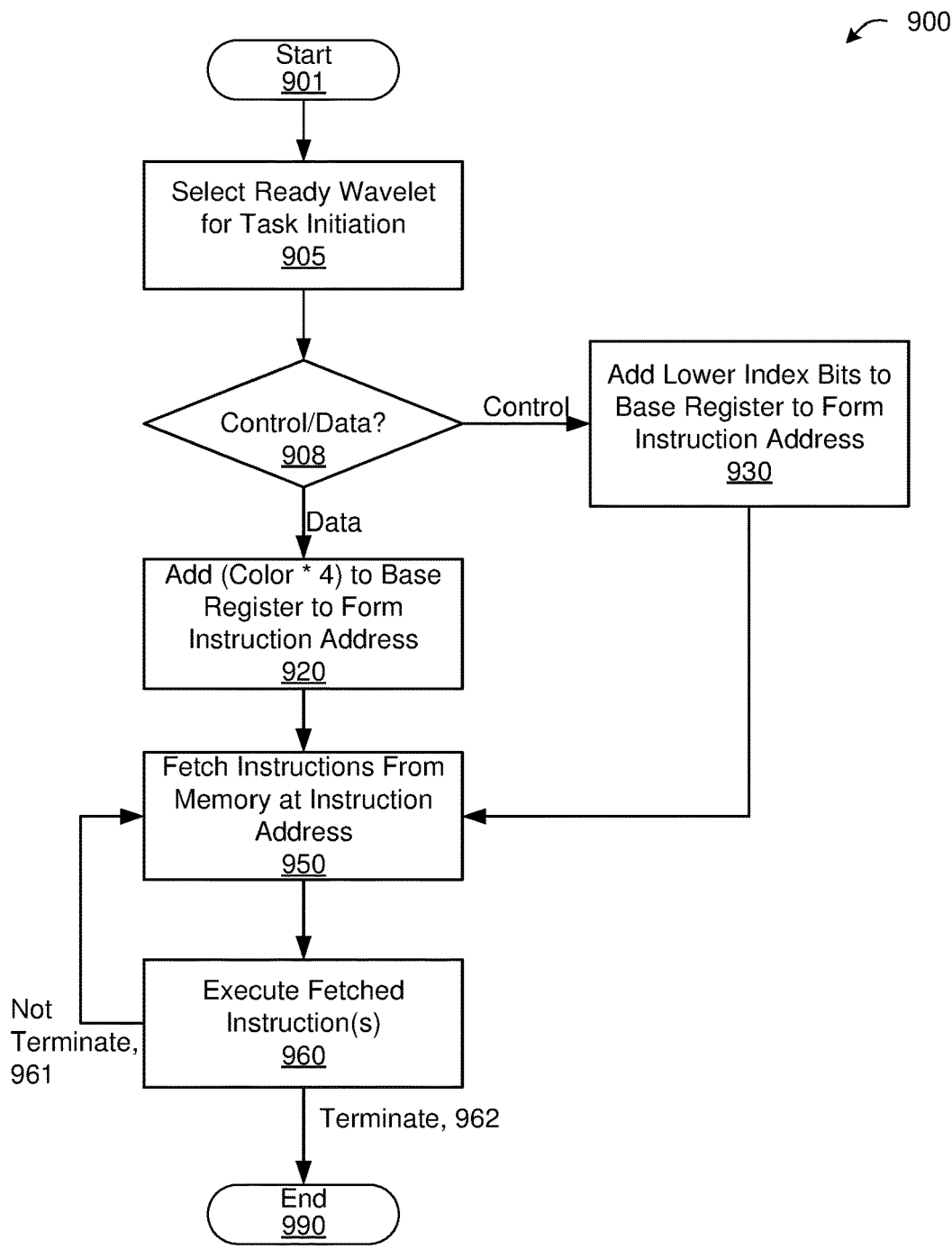
FIG. 9 illustrates selected details of an embodiment of processing a wavelet for task initiation.

FIG. 9 illustrates selected details of an embodiment of processing a wavelet for task initiation as flow 900. Conceptually, the processing comprises initiating a task by determining an address to begin fetching and executing instructions of the task. The address is determined based at least in part on information the wavelet comprises.

In some embodiments, processing a wavelet for task initiation begins (Start 901) by selecting a ready wavelet from among, e.g., one or more queues for processing (Select Ready Wavelet for Task Initiation 905). In some embodiments, the wavelet is selected based upon one or more of: block/unblock state associated with each queue, active/inactive state associated with each queue, color(s) of previously selected wavelets, and a scheduling algorithm.

After selecting the ready wavelet, the wavelet is checked to determine if the wavelet is a control wavelet or a data wavelet (Control/Data? 908). If the wavelet is a control wavelet, then a starting address of a task associated with the control wavelet is calculated by adding the lower six bits of the index of the wavelet to a base register (Add Lower Index Bits to Base Register to Form Instruction Address 930). If the wavelet is not a control wavelet, then the wavelet is a data wavelet. The starting address of a task associated with the data wavelet is calculated by adding the base register to the color of the wavelet multiplied by four (Add (Color*4) to Base Register to Form Instruction Address 920). The starting address of the task, either as calculated for a control wavelet or as calculated for a data wavelet, corresponds to a starting address of instructions for the task.

Once the starting address of the instructions has been calculated, the instructions are fetched from the starting instruction address (Fetch Instructions From Memory at Instruction Address 950). One or more of the fetched instructions are decoded and executed (Execute Fetched Instruction(s) 960). Fetching and executing (as illustrated by actions 950 and 960) continue (Not Terminate 961) until a Terminate instruction is executed (Terminate 962), and then processing associated with the initiated task is complete (End 990). In some embodiments, a terminate instruction is the last instruction associated with processing a wavelet. After the initiated task is complete, flow optionally and/or selectively proceeds to process another wavelet for task initiating, beginning with Start 901.

According to various usage scenarios, the executing (Execute Fetched Instruction(s) 960) comprises executing sequential and/or control-flow instructions, and the instruction address used for fetching varies accordingly (Fetch Instructions From Memory at Instruction Address 950).

The ready wavelet selected for task initiation is comprised of a particular color. In some embodiments and/or usage scenarios, once a ready wavelet has been selected for task initiation (Select Ready Wavelet for Task Initiation 905), further wavelets, if any, received of the particular color are consumed as operands for execution of instructions (Execute Fetched Instruction(s) 960). The consuming of the wavelets comprising the particular color as operands continues until fetching and executing of a terminate instruction (Terminate 962).

In some embodiments and/or usage scenarios, all or any portions of the actions of flow 900 correspond conceptually to and/or are related conceptually to operations performed by and/or elements of a CE of a PE, e.g., CE 800 of FIG. 8. As an example, Block Bits 899 corresponds to block/unblock state associated with each queue. Active Bits 898 corresponds to active/inactive state associated with each queue. As another example, portions of action 905 are performed by Picker 830. Picker 830 selects the oldest wavelet from one of Qs 897 that is ready (e.g., the associated one of Block Bits 899 is not set and the associated one of Active Bits 898 is set), according to a scheduling policy such as round-robin or pick-from-last. The wavelet selected by Picker 830 comprises a color and a wavelet payload formatted in accordance with one of FIG. 13A and FIG. 13B.

As another example, action 908 is performed by elements of CE 800. If the control bit of the wavelet payload (e.g., Control Bit 1320 of FIG. 13A) is asserted (determined e.g., by Picker 830), then the wavelet is a control wavelet. Subsequently, action 930 is performed by CE 800, such as by Picker 830 adding contents of Base 890 to the 6 lowest bits of Lower Index Bits 1321.1 of FIG. 13A to form the instruction fetch address for instructions of the task associated with the control wavelet. Picker 830 then provides the instruction fetch address to PC 834. If the control bit of the wavelet payload (e.g., Control Bit 1320 of FIG. 13A) is deasserted (determined e.g., by Picker 830), then the wavelet is a data wavelet. Subsequently, action 920 is performed by CE 800, such as by Picker 830 adding contents of Base 890 to the color of the wavelet (e.g., corresponding to Color 1324 of FIG. 13A and FIG. 13B) multiplied by 4 to form the instruction fetch address for instructions of the task associated with the data wavelet. Picker 830 then provides the instruction fetch address to PC 834.

As another example, action 950 is performed by elements of CE 800, e.g., PC 834, I-Seq 836, and Memory 854. Action 960 is performed by elements of CE 800, e.g., Dec 840, D-Seq 844, Memory 854, RF 842, and Data Path 852, among others. Execution comprises execution of a terminate instruction. An example of a terminate instruction is an instruction with a terminate bit asserted. In the context of the example, when Dec 840 decodes a terminate instruction, Dec 840 signals Picker 830 via Terminate 812 that the wavelet is finished, and Picker 830 selects another wavelet for processing, corresponding, e.g., to action 905.

In various embodiments and/or usage scenarios, all or any portions of elements of Processing a Wavelet for Task Initiation 900 conceptually correspond to all or any portions of executions of instructions of Task SW on PEs 260 of FIG. 2.

Figure 15A:
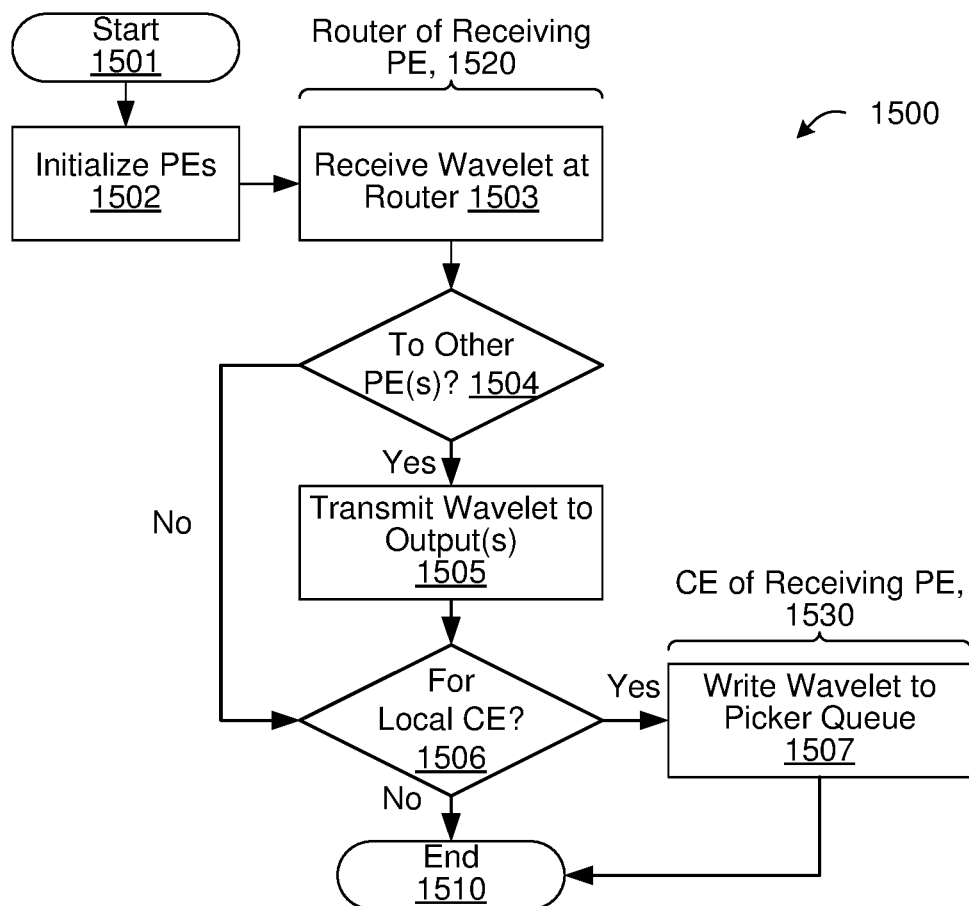
FIG. 15A illustrates selected details of an embodiment of receiving a wavelet.
Figure 15B:
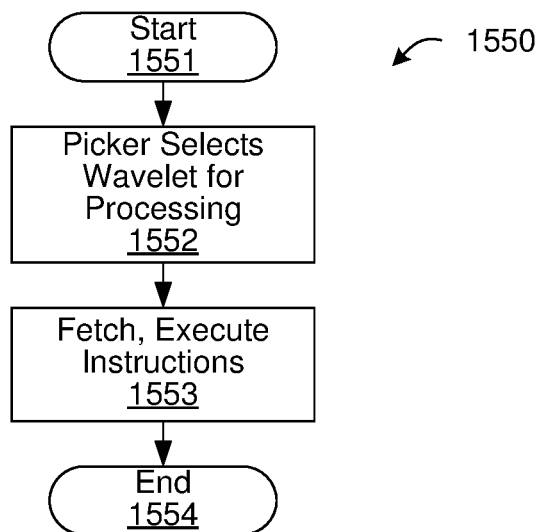
FIG. 15B illustrates selected details of an embodiment of consuming a wavelet.

In various embodiments and/or usage scenarios, all or any portions of the actions comprising flow 900 conceptually variously correspond to all or any portions of flow 1500 of FIG. 15A and/or flow 1550 of FIG. 15B. E.g., action 905 comprises all or any portions of action 1552, and actions 908, 920, 930, 950, and 960 comprise all or any portions of action 1553.

Figure 10:
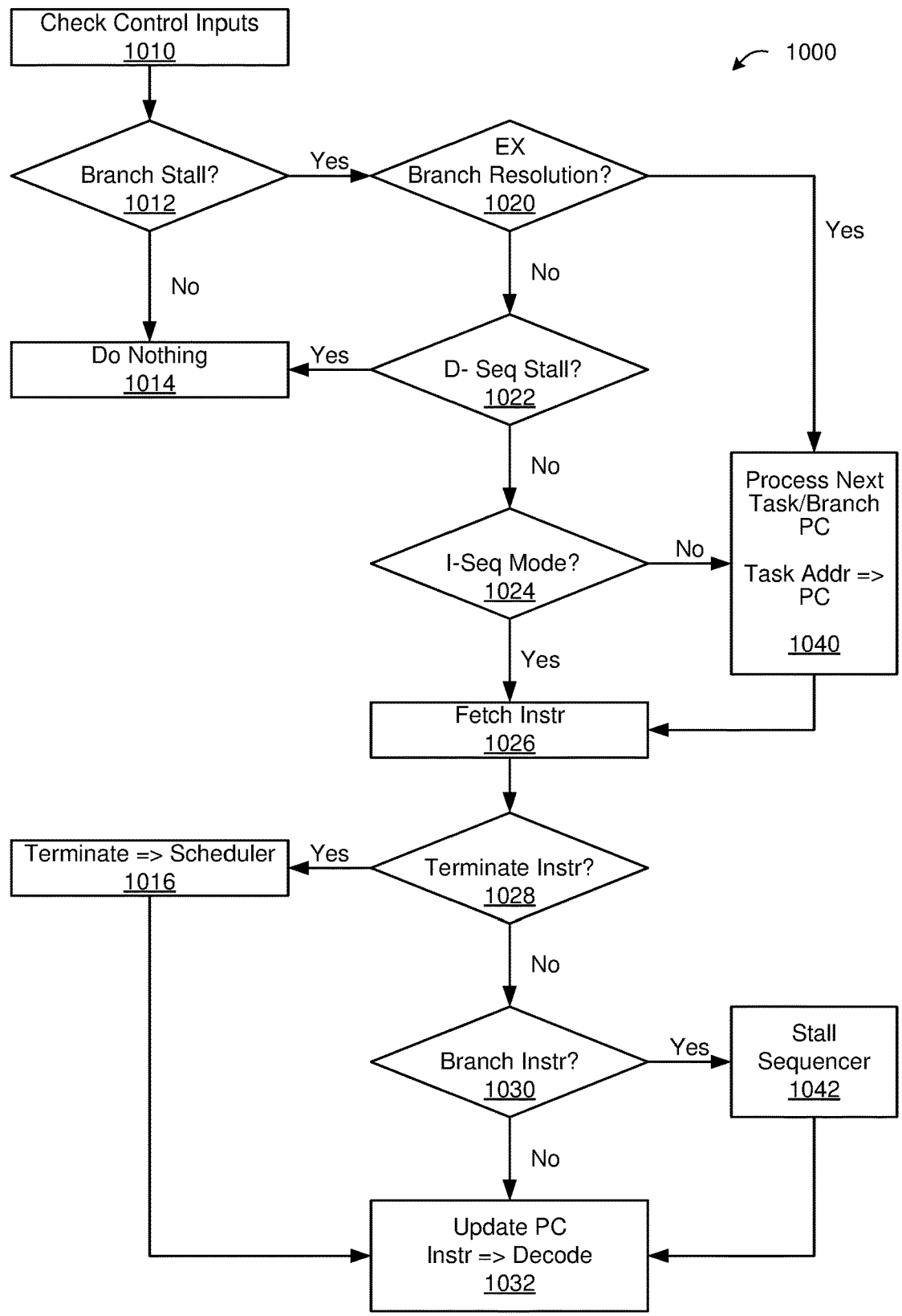
FIG. 10 illustrates selected details of an embodiment of instruction processing associated with a compute element of a processing element.

FIG. 10 illustrates selected details of an embodiment of instruction processing associated with a compute element of a processing element, as Instruction Processing 1000.

In some embodiments and/or usage scenarios, all or any portions of the actions of Instruction Processing 1000 correspond or are related conceptually to operations performed by and/or elements of a CE of a PE, e.g., CE 800 of FIG. 8.

Figure 11:
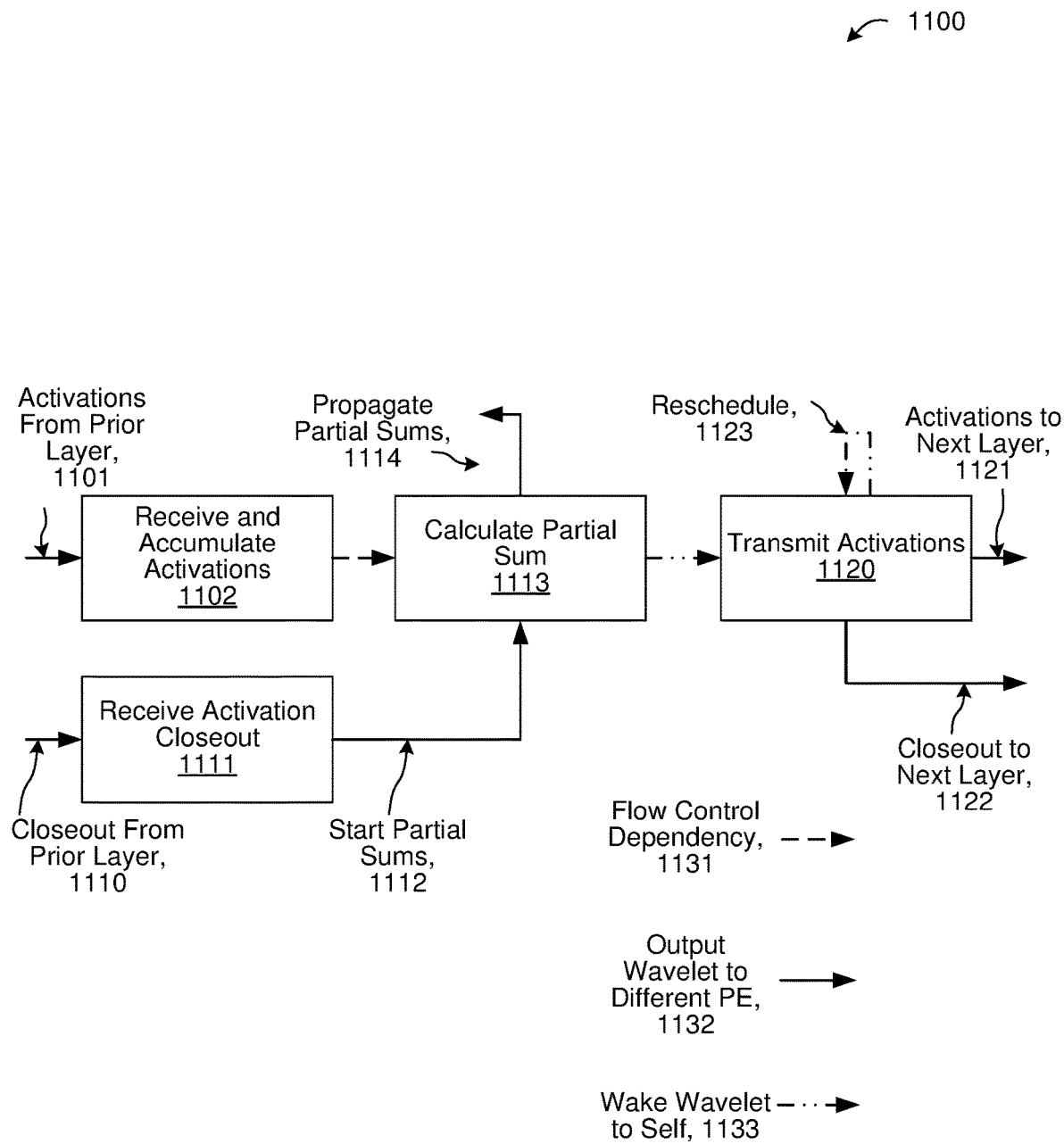
FIG. 11 illustrates selected details of an embodiment of flow associated with dependency management via closeouts.

FIG. 11 illustrates selected details of an embodiment of flow associated with dependency management via closeouts, as Dependency Management 1100.

In some embodiments and/or usage scenarios, all or any portions of the actions of Dependency Management 1100 correspond or are related conceptually to operations performed by and/or elements of PEs 122 of FIG. 1. In some embodiments and/or usage scenarios, all or any portions of elements of Dependency Management 1100 conceptually correspond to all or any portions of executions of instructions of Task SW on PEs 260 of FIG. 2.

Figure 12:
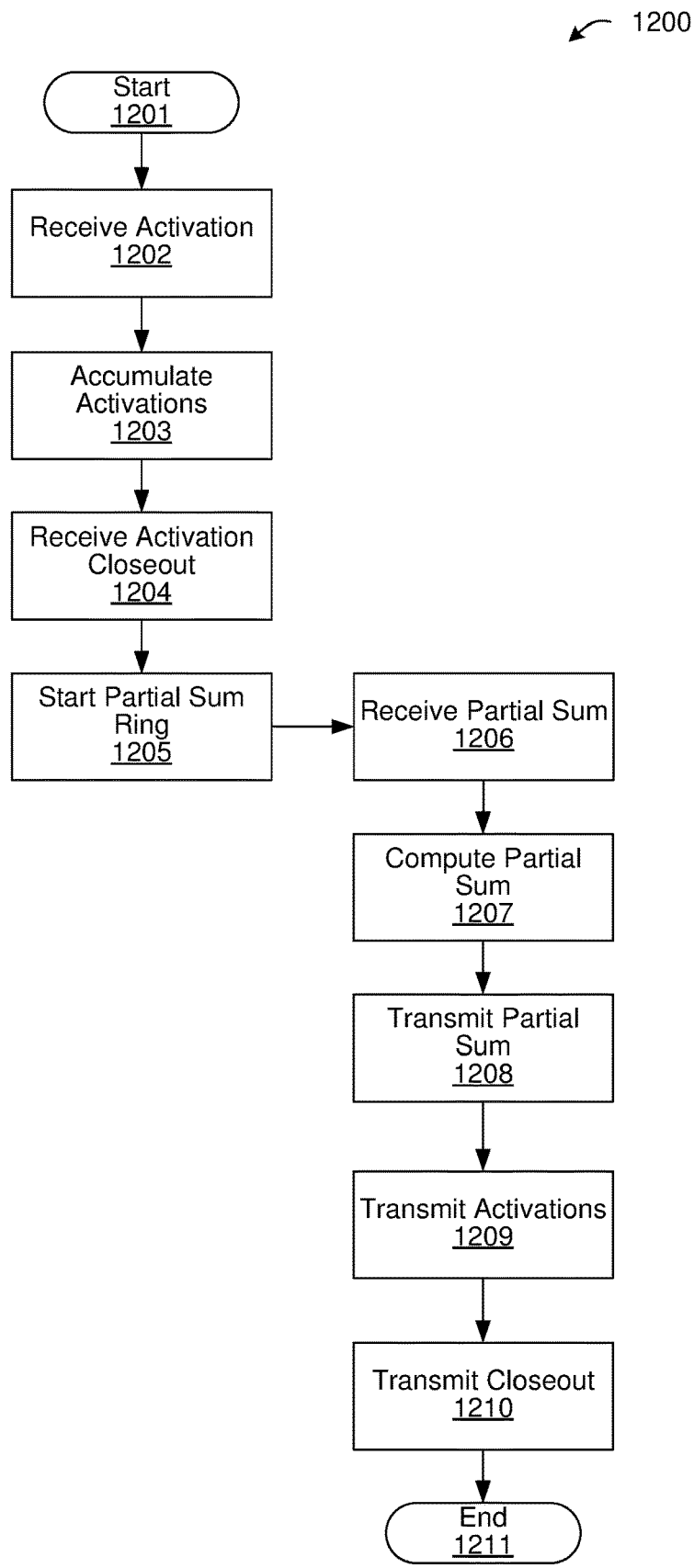
FIG. 12 illustrates selected details of an embodiment of flow associated with activation accumulation and closeout, followed by partial sum computation and closeout.

FIG. 12 illustrates selected details of an embodiment of flow associated with activation accumulation and closeout, followed by partial sum computation and closeout as Activation Accumulation/Closeout and Partial Sum Computation/Closeout 1200.

In some embodiments and/or usage scenarios, all or any portions of the actions of Activation Accumulation/Closeout and Partial Sum Computation/Closeout 1200 correspond or are related conceptually to operations performed by and/or elements of PEs 122 of FIG. 1. In some embodiments and/or usage scenarios, all or any portions of elements of Activation Accumulation/Closeout and Partial Sum Computation/Closeout 1200 conceptually correspond to all or any portions of executions of instructions of Task SW on PEs 260. In various embodiments and/or usage scenarios, a closeout (e.g., associated with action 1210) is an example of a control wavelet.

Wavelets

Figure 13A:
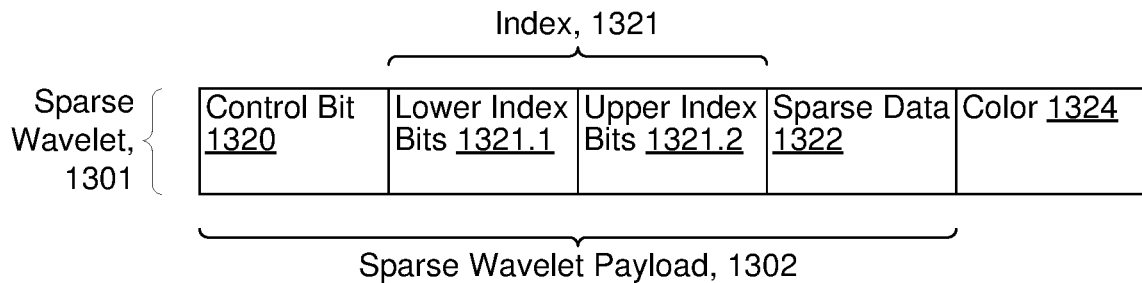
FIG. 13A illustrates selected details of an embodiment of a sparse wavelet.

FIG. 13A illustrates selected details of an embodiment of a sparse wavelet, as Sparse Wavelet 1301. Sparse Wavelet 1301 comprises Sparse Wavelet Payload 1302 and Color 1324. Sparse Wavelet Payload 1302 comprises Index 1321, Sparse Data 1322, and Control Bit 1320. Index 1321 comprises Lower Index Bits 1321.1 and Upper Index Bits 1321.2.

In some embodiments, Sparse Data 1322 comprises a field for a 16-bit floating-point number or a 16-bit integer number. In various scenarios, Sparse Data 1322 variously represents a weight of a neural network, an input or stimulus of a neural network, an activation of a neural network, or a partial sum of a neural network.

In some embodiments, Index 1321 comprises a 16-bit field. In some scenarios, Index 1321 is an integer number and is an index that explicitly indicates a specific neuron of a neural network. In some embodiments, Lower Index Bits 1321.1 is 6-bits, and Upper Index Bits 1321.2 is 10-bits.

In some embodiments, Control Bit 1320 is 1-bit field. In some scenarios, Control Bit 1320 indicates whether Sparse Wavelet Payload 1302 triggers control activity or data activity. In some scenarios, control activity comprises computing the last activation of a neuron and data activity comprises computing activations of a neuron that are not the last activation. In some embodiments and/or usage scenarios, the control activity comprises a closeout activity, such as associated with any one or more of Closeout From Prior Layer 1110 and/or Closeout to Next Layer 1122 of FIG. 11, as well as any one or more of Receive Activation Closeout 1204 and/or Transmit Closeout 1210 of FIG. 12.

In some embodiments, Color 1324 comprises a 5-bit field. In some embodiments, a color corresponds to a virtual channel over a shared physical channel, such as via routing in accordance with the color. In some scenarios, a color is used for a specific purpose such as sending configuration information to processing elements or sending input of a neural network to a neuron that is mapped to a processing element.

Figure 13B:
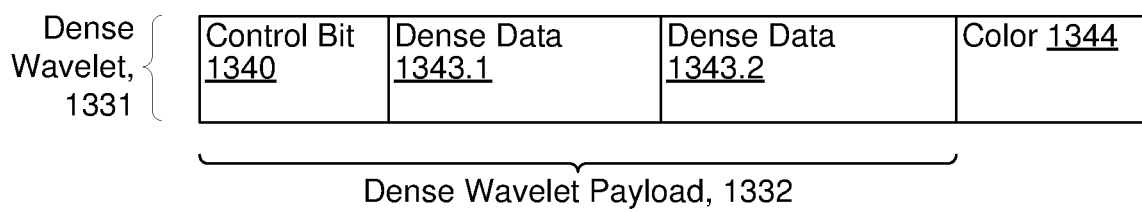
FIG. 13B illustrates selected details of an embodiment of a dense wavelet.

FIG. 13B illustrates selected details of an embodiment of a dense wavelet, as Dense Wavelet 1331. Dense Wavelet 1331 comprises Dense Wavelet Payload 1332 and Color 1344. Dense Wavelet Payload 1332 comprises Dense Data 1343.1, Dense Data 1343.2, and Control Bit 1340.

In some embodiments, Control Bit 1340 is a 1-bit field and is functionally identical to Control Bit 1320.

In some embodiments, Color 1344 comprises a 5-bit field and is functionally identical to Color 1324.

In some scenarios, Dense Data 1343.1 and Dense Data 1343.2 comprise fields for respective 16-bit floating-point numbers or respective 16-bit integer numbers. In various scenarios, Dense Data 1343.1 and Dense Data 1343.2 variously represent weights of a neural network, inputs or stimuli of a neural network, activations of a neural network, or partial sums of a neural network. In some scenarios, Dense Data 1343.1 and Dense Data 1343.2 collectively comprise a 32-bit floating-point number (e.g., Dense Data 1343.1 comprises a first portion of a 32-bit floating-point number and Dense Data 1343.2 comprises a second portion of a 32-bit floating-point number).

In various embodiments and/or usage scenarios, usage of sparse wavelets vs. dense wavelets is variously predetermined, dynamically determined, and/or both. In various embodiments and/or usage scenarios, usage of sparse wavelets vs. dense wavelets is determined by software.

Figure 14:
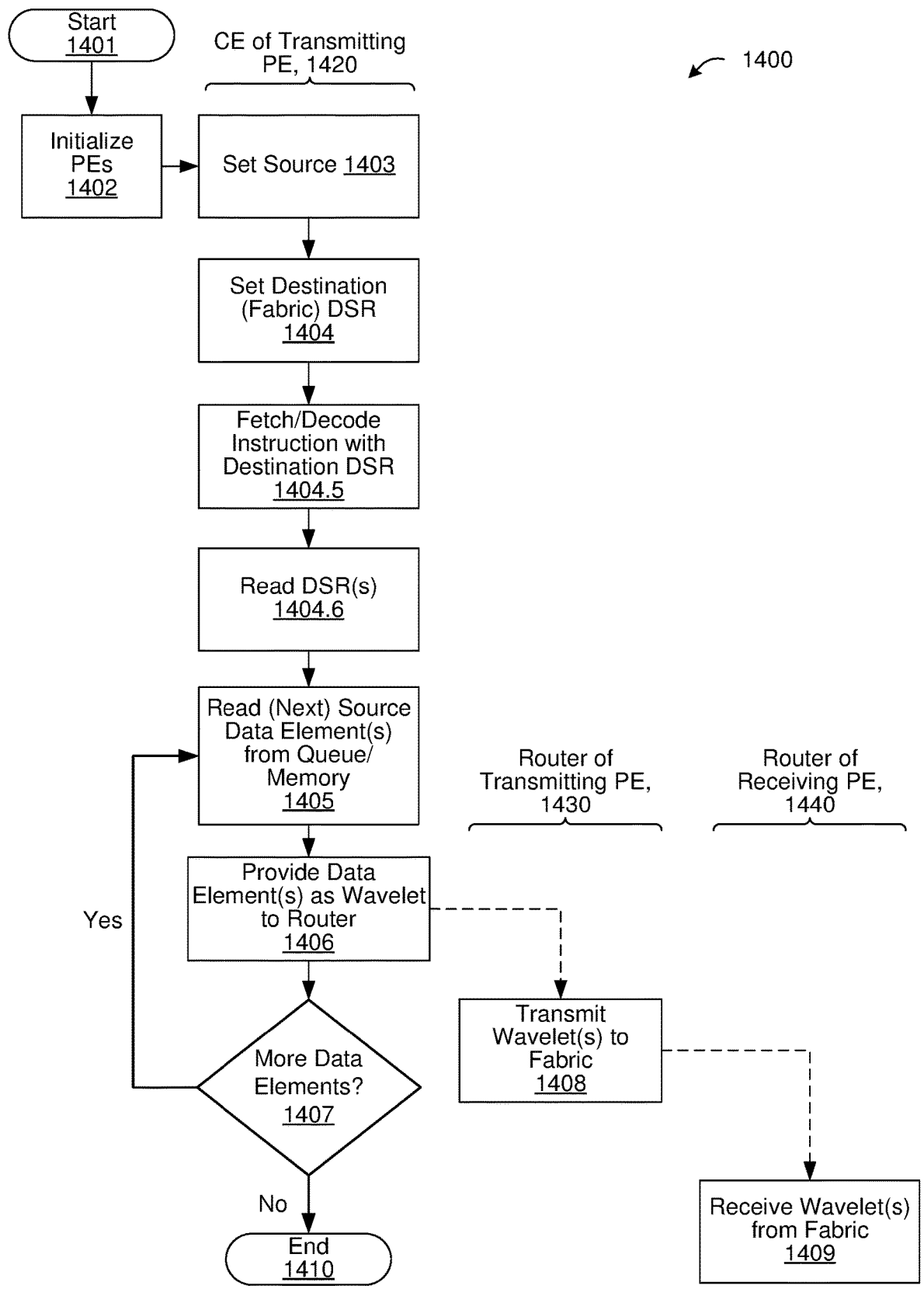
FIG. 14 illustrates selected details of an embodiment of creating and transmitting a wavelet.

FIG. 14 illustrates selected details of an embodiment of creating and transmitting a wavelet, as Wavelet Creation Flow 1400. Actions of Wavelet Creation Flow 1400 are performed by various agents. A transmitting PE comprises a CE that performs actions 1403-1407, as illustrated by CE of Transmitting PE 1420. The transmitting PE further comprises a router that performs action 1408, as illustrated by Router of Transmitting PE 1430. A receiving PE comprises a router that performs action 1409, as illustrated by Router of Receiving PE 1440.

Creating and transmitting a wavelet begins (Start 1401) by initializing at least one transmitting PE and one or more receiving PEs, as well as any PEs comprising routers implementing fabric coupling the transmitting PEs and the receiving PEs (Initialize PEs 1402). Each of the PEs comprises a respective router (e.g., Router 510 of FIG. 5) and a respective CE (e.g., Compute Element 520 of FIG. 5). In some scenarios, initializing a PE enables the CE of the PE to perform computations and enables the router of the PE to transmit, receive, and/or forward wavelets over the fabric.

In various embodiments, a DSR holds a DSD comprising information about an operand such as location of data elements (e.g., memory, fabric input, and/or fabric output), number of the data elements (e.g., length), an address or addresses of the data elements (e.g., start address and stride in memory). For fabric output operands (e.g., wavelets sent via the fabric), the DSD comprises a color for the wavelet(s) on the fabric, a control bit, and optionally a value or location of an index.

In some embodiments, the CE of the transmitting PE configures a source (Set Source 1403). In some scenarios, the source is a source DSD describing a source operand. In various embodiments, the source DSD describes one or more data elements stored in one of: cache and memory. In other embodiments, the source DSD describes one or more data elements received via the fabric (e.g., the data elements are payloads of wavelets arriving via the fabric). In some other scenarios, the source comprises a source register (e.g., one of RF 842). In yet other scenarios, the source comprises an immediate specified in an instruction.

The CE also configures a destination DSD in a destination DSR describing a fabric destination operand (Set Destination (Fabric) DSR 1404). In some embodiments, the destination DSD describes one or more data elements transmitted via the fabric. In various embodiments, the source and the destination DSDs are configured via one or more instructions.

Subsequently, the CE fetches and decodes an instruction (e.g., FMACH, MOV, LT16) comprising a destination operand specified by the DSD in the destination DSR (Fetch/Decode Instruction with Destination DSR 1404.5). In some embodiments, the operand type fields of the instruction specify whether an operand is specified by a DSD.

The CE reads the destination DSD from the destination DSR and any source DSRs in source DSRs (Read DSR(s) 1404.6). Based on the DSDs, the CE determines the type of data structure, the source of the data element(s), whether multiple data elements are read together (e.g., for a SIMD operation), and a total number of data elements for each operand. In some scenarios, DSRs are read for one or more of: a source0 operand, a source1 operand, and a destination operand. In some embodiments and/or usage scenarios, the DSRs are read entirely or partially in parallel, and in other embodiments and/or usage scenarios, the DSRs are read entirely or partially sequentially.

Then the CE of the transmitting PE reads the data elements described by the source (e.g., a source DSD or a register) and creates a wavelet comprising the data elements based on the destination DSD. The CE reads (e.g., from memory) the first data element(s) specified by the source (Read (Next) Data Elements(s) from Queue/Memory 1405). The data element(s) are used to form a wavelet payload. The control bit of the wavelet payload and the color of the wavelet are specified by the destination DSD. The wavelet payload and the color are provided to the router of the transmitting CE (Provide Data Element(s) as Wavelet to Router 1406). In some embodiments and/or usage scenarios, a single data element is used to create the payload of a sparse wavelet. In other embodiments and/or usage scenarios, two data elements are used to create the payload of a dense wavelet.

The CE of the transmitting PE determines if additional data element(s) are specified by the destination DSD (More Data Elements? 1407). If additional data element(s) are specified by the destination DSD, then the CE creates additional wavelet(s) via actions Read (Next) Source Data Element(s) from Queue/Memory 1405, Provide Data Element(s) as Wavelet to Router 1406, and More Data Elements? 1407 until no additional data element(s) are specified by the destination DSD. If no additional data element(s) are specified by the destination DSD, then flow concludes (End 1410). In some embodiments, the wavelets created via action 1406 are of the same color as specified by the destination DSR.

The router of the transmitting PE transmits the wavelet(s) formed by the CE of the transmitting PE in accordance with the color of the wavelet(s) (Transmit Wavelet(s) to Fabric 1408), in accordance with respective colors of the wavelets. In some embodiments and/or usage scenarios, the transmitting is directly to the router of the receiving PE. In some embodiments and/or usage scenarios, the transmitting is indirectly to the router of the receiving PE, e.g., via one or more intervening PEs acting to forward the wavelet(s) in accordance with the colors. The router of the receiving PE receives the wavelet(s) in accordance with the color (Receive Wavelet(s) from Fabric 1409).

In various embodiments, action 1408 is performed asynchronously with respect to any one or more of actions 1405, 1406, and 1407. For example, a plurality of wavelets is produced by action 1406 before any of the produced wavelets is transmitted as illustrated by action 1408.

In various embodiments, Receive Wavelet(s) from Fabric 1409 corresponds in various respects to Receive Wavelet at Router 1503 of FIG. 15.

In various embodiments and/or usage scenarios, all or any portions of any one or more of elements of Wavelet Creation Flow 1400 correspond conceptually to and/or are related conceptually to operations performed by and/or elements of a PE, e.g., PE 499 of FIG. 4.

In various embodiments and/or usage scenarios, all or any portions of any one or more of elements of Wavelet Creation Flow 1400 (e.g., any one or more of actions 1403-1407) correspond conceptually to and/or are related conceptually to operations performed by and/or elements of a compute element, such as all or any portions of a CE of a PE, e.g., Compute Element 520 of FIG. 5 and/or CE 800 of FIG. 8. As an example, the destination DSR (associated with Set DSR Destination (Fabric) DSR 1404) is one of DSRs 846. In some scenarios, the source DSR (associated with Set Source 1403) is one of DSRs 846; in other scenarios the source register (associated with Set Source 1403) is one of RF 842.

As another example, CE 800 as the CE of the transmitting PE performs action 1403 in response to a load DSR instruction copying information from Memory 854 into the source DSR (e.g., one of DSRs 846). In various embodiments, the source DSR specifies the location of the data elements as one of Memory 854, D-Store 848, and RF 842. In some scenarios, the source DSR specifies an address of a first data element in Memory 854 (e.g., address 0x0008), a number of data elements (e.g., nine data elements), and a stride between subsequent data elements (e.g., 12 bytes). As another example, CE 800 performs action 1403 by writing data into a register of RF 842.

As another example, CE 800 as the CE of the transmitting PE performs action 1404 in response to a load DSR instruction copying information from Memory 854 into the destination DSR (e.g., one of DSRs 846). In various embodiments, the destination DSR specifies transformation of one or more data elements into one or more wavelets and transmitted by Router 510 via a fabric-coupled egress port (e.g., North 513). The destination DSR specifies a color for the wavelet(s), a control bit for the wavelet(s), a number of data elements (e.g., length), and information about an index of the wavelet(s). In some scenarios, the destination DSR specifies the value of the index and in other scenarios the destination DSR specifies a location of the value of the index (e.g., in a register of RF 842).

As another example, CE 800 as the CE of the transmitting PE performs actions 1404.6, 1405, 1406, and 1407 in response to fetching and decoding an instruction specifying a destination DSR as a destination operand (action 1404.5). In some embodiments and/or usage scenarios, D-Seq 844 reads the source DSR and accesses one or two data elements specified by the source DSR, e.g., from Memory 854 or D-Store 848, thereby performing action 1405. In various embodiments, Memory 854 and/or D-Store 848 provide the one or two data elements to Data Path 852. The Data Path transforms the data into a wavelet and sends the wavelet via On Ramp 860, e.g., for storage into an element of Data Queues 650 (of Router 600 of FIG. 6), thereby performing action 1406. In some embodiments, On Ramp 860 comprises storage to buffer one or more wavelets. In some embodiments, CE 800 of the transmitting PE reads a color from the destination DSR. Based on the color, CE 800 sends the wavelet payload via On Ramp 860, e.g., for storage into an element of Data Queues 650, thereby completing action 1406. In some embodiments, CE 800 of the transmitting PE performs action 1407 by comparing a number of data elements specified in the destination DSR (e.g., a length) against the number of data elements sent via action 1406 (e.g., tracked by a counter).

As another example, CE 800 as the CE of the transmitting PE performs action 1406. The CE transforms the one or two data element(s) into a wavelet payload, according to the destination DSR. In some embodiments and/or usage scenarios, the CE transforms a single data element into a wavelet payload formatted in accordance with Sparse Wavelet 1301 of FIG. 13A. The single data element is transformed into an instantiation of Sparse Data 1322, an index value specified by the destination DSR is transformed into an instantiation of Index 1321, and a control bit from the destination DSR is transformed into an instantiation of Control Bit 1320, thereby forming an instantiation of Sparse Wavelet Payload 1302.

As another example, CE 800 as the CE of the transmitting PE transforms two data elements into a wavelet payload formatted in accordance with Dense Wavelet 1331 of FIG. 13B. The first data element is transformed into an instantiation of Dense Data 1343.1 and the second data element is transformed into an instantiation of Dense Data 1343.2. The control bit from the destination DSR is transformed into an instantiation of Control Bit 1340, thereby forming an instantiation of Dense Wavelet Payload 1332.

In various embodiments and/or usage scenarios, all or any portions of any one or more of elements of Wavelet Creation Flow 1400 (e.g., any one or more of actions 1408 and 1409) correspond conceptually to and/or are related conceptually to operations performed by and/or elements of a router, such as all or any portions of a router of a PE, e.g., Router 510 of FIG. 5 and/or Router 600 of FIG. 6.

As an example, Transmit Wavelet(s) to Fabric 1408 is performed by Router 600 Router of Transmitting PE 1430 as follows. Router 600 determines the destination(s) of a wavelet in Data Queues 650, e.g., by reading Dest 661. For each color, Dest 661 indicates the output destination(s), e.g., one or more of Data Out 620. Router 600 transmits the wavelet payload and the color (collectively the wavelet) to the fabric, via Out 652 and one or more of Data Out 620. In various embodiments, Router 600 of the transmitting PE performs action 1408 asynchronously with any one or more of actions 1405, 1406, and 1407.

As another example, Receive Wavelet(s) from Fabric 1409 is performed by Router 600 as Router of Receiving PE 1440 as follows. Router 600 receives transmitted wavelet(s) at Data Queues 650 via one of Data In 610 and Write Dec 651. The received wavelet(s) are stored in one or more locations of Data Queues 650.

In some embodiments and/or usage scenarios, all or any portions of elements of Wavelet Creation Flow 1400 conceptually correspond to all or any portions of executions of instructions of Task SW on PEs 260 of FIG. 2.

FIG. 15A illustrates selected details of an embodiment of receiving a wavelet as Wavelet Receive Flow 1500. Actions of Wavelet Receive Flow 1500 are performed by various agents. A receiving PE comprises a router performing actions 1503-1506, as illustrated by Router of Receiving PE 1520. The receiving PE further comprises a CE performing action 1507, as illustrated by CE of Receiving PE 1530.

Receiving a wavelet begins (Start 1501) by initializing at least one transmitting PE and one or more receiving PEs as well any PEs comprising routers implementing fabric coupling the transmitting PEs and the receiving PEs (Initialize PEs 1502). Each of the PEs comprises a respective router (e.g., Router 510 of FIG. 5) and a respective CE (e.g., Compute Element 520 of FIG. 5). In some scenarios, initializing a PE enables the CE of the PE to perform computations and enables the router of the PE to transmit, receive, and/or forward wavelets over the fabric.

The following description assumes there is a single receiving PE. In usage scenarios where there is plurality of receiving PEs, the respective routers and CEs of each of the receiving PEs perform processing in accordance with FIG. 15A.

The router of the receiving PE receives a wavelet 'on a color' (e.g., the wavelet comprises the color) of the fabric (Receive Wavelet at Router 1503), as transmitted by the transmitting PE. The router checks the destination(s) of the wavelet based on the color, e.g., by reading a configuration register. If the destination(s) of the wavelet includes other PEs (To Other PE(s)? 1504), then the router transmits the wavelet to the destination PE(s). The router sends the wavelet to output(s) of the router (Transmit Wavelet to Output(s) 1505), and the wavelet is transmitted from the output across the fabric to the destination PE(s). If the destination(s) of the wavelet does not include other PEs, then the transmitting is omitted.

If the destination(s) of the wavelet do not include the local CE (For Local CE? 1506), then no further action is taken (End 1510). If one of the destination(s) of the wavelet is the local CE, then the router provides the wavelet to the local CE via the Off Ramp and the wavelet is written into a picker queue associated with the color that the wavelet was received on (Write Wavelet to Picker Queue 1507), thereby receiving the wavelet (End 1510).

In various embodiments and/or usage scenarios, all or any portions of any one or more of elements of Wavelet Receive Flow 1500 (e.g., any one or more of actions 1503-1506) correspond conceptually to and/or are related conceptually to operations performed by and/or elements of a router, such as all or any portions of a router of a PE, e.g., Router 510 of FIG. 5 and/or Router 600 of FIG. 6.

As an example, Receive Wavelet at Router 1503 is performed by Router 600 as Router of Receiving PE 1520 when a wavelet is received on one of Data In 610. Subsequently, To Other PE(s)? 1504 and For Local CE? 1506 are performed by Router 600, using the color of the wavelet to determine the destination(s) of the wavelet, e.g., by reading Dest 661. For each input color, Dest 661 indicates the output destination(s), e.g., one or more of Data Out 620. If Dest 661 indicates that the output includes other PEs (e.g., via one of SkipX+ 621, SkipX− 622, X+ 623, X− 624, Y+ 625, and Y− 626), then the wavelet is sent to other PEs by Router Sched 654. If Dest 661 indicates that the output includes the CE of the PE (e.g., Offramp 627), then the wavelet is sent to the CE by Router Sched 654. The wavelet remains in one of Data Queues 650 until action 1505 is performed by scheduling the wavelet (e.g., by Router Sched 654) to be sent to one or more of Data Out 620.

In various embodiments and/or usage scenarios, all or any portions of any one or more of elements of Wavelet Receive Flow 1500 (e.g., action 1507) correspond conceptually to and/or are related conceptually to operations performed by and/or elements of a compute element, such as all or any portions of a CE of a PE, e.g., Compute Element 520 of FIG. 5 and/or CE 800 of FIG. 8. As an example, Write Wavelet to Picker Queue 1507 is performed by sending the wavelet via Off Ramp 820 to CE 800 and writing the wavelet into one of Qs 897.

In some embodiments and/or usage scenarios, wavelets are received by the router, queued, and routed to router output ports without any specific determination that a wavelet is for a local CE. Instead, wavelets destined for the local CE are routed to the off ramp and are then written into the picker queue. Wavelets not destined for the local CE are routed to other-than the off ramp router outputs.

FIG. 15B illustrates selected details of an embodiment of consuming a wavelet as Wavelet Consumption Flow 1550. Actions of Wavelet Consumption Flow 1550 are performed by a CE of a PE.

Consuming a wavelet begins (Start 1551) by the picker selecting the wavelet from a queue for processing (Picker Selects Wavelet for Processing 1552), and then the CE processes the wavelet. The CE fetches and executes instructions associated with the wavelet (Fetch, Execute Instructions 1553), thereby consuming the wavelet (End 1554). In some embodiments and/or usage scenarios, fetching and executing instructions associated with the wavelet ends with fetching and executing a terminate instruction.

In some embodiments, Picker Selects Wavelet for Processing 1552 is performed by Picker 830 of FIG. 8. In various scenarios, Picker 830 selects one of Qs 897 that is ready (e.g., Block Bits 899 and Active Bits 898 are set to certain values), according to a scheduling policy such as round-robin or pick-from-last. In some embodiments, portions of Wavelet Consumption Flow 1550 correspond to portions of Processing a Wavelet for Task Initiation 900 of FIG. 9. As an example, action 1552 corresponds to action 905. As another example, action 1553 corresponds to actions 908, 920, 930, 950, and 960.

Figure 23:
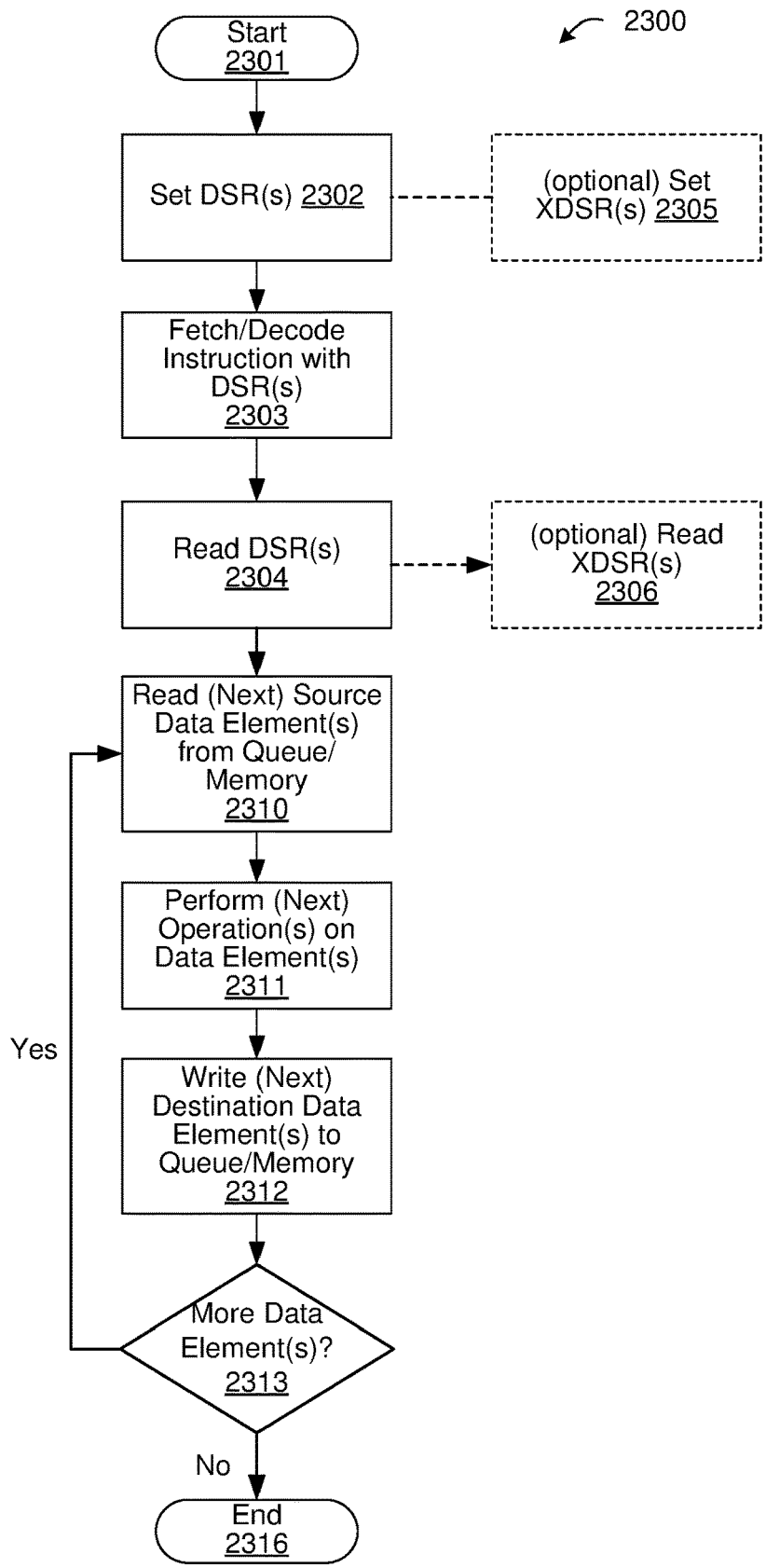
FIG. 23 illustrates selected details of accessing operands in accordance with data structure descriptors.

In some other scenarios, the wavelet is accessed as an operand by an instruction (e.g., FMACH) executing on the CE and the wavelet is consumed by the CE during the execution of the instruction, e.g., as illustrated in FIG. 23.

Block and Unblock

Figure 16:
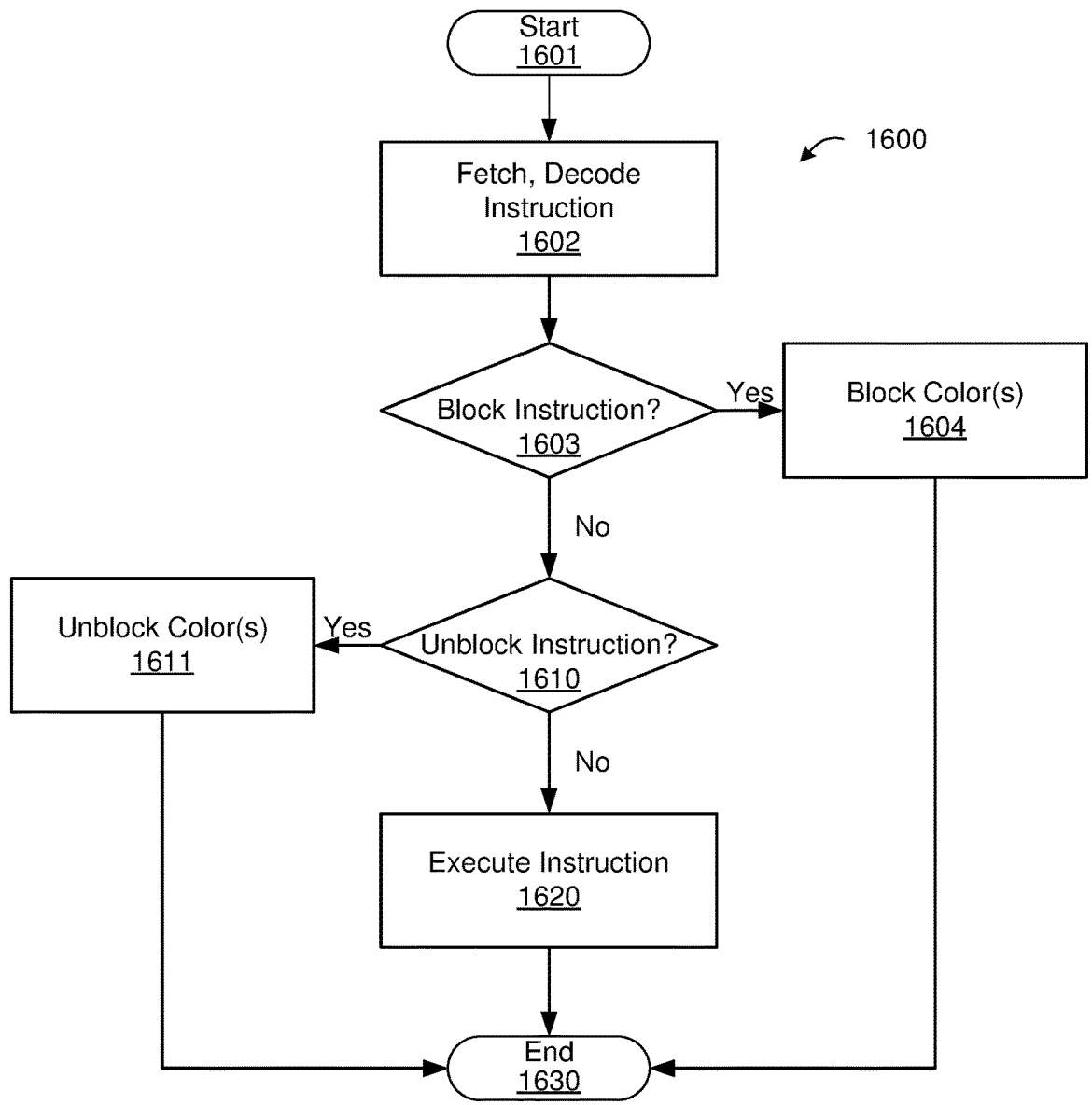
FIG. 16 illustrates selected details of an embodiment of block instruction and unblock instruction execution.

FIG. 16 illustrates selected details of an embodiment of block instruction and unblock instruction execution as flow 1600. Conceptually, executing a block instruction specifying a particular color prevents execution of instructions associated with the particular color at least until execution of an unblock instruction specifying the particular color.

Referring to the figure, executing an instruction begins (Start 1601) by fetching the instruction from memory and decoding the instruction (Fetch, Decode Instruction 1602). If the instruction decodes to a block instruction (Block Instruction? 1603), then a block operation is performed (Block Color(s) 1604). The source operand of the block instruction specifies one or more colors to block with respect to instruction processing associated with blocked/unblocked colors. In various embodiments and/or usage scenarios, the block operation is performed by setting one or more block indicators to a blocked state for the one or more colors specified by the source operand, and execution is complete (End 1630). In various scenarios, the source operand variously specifies blocking a single color, blocking all colors, and blocking an arbitrary plurality of colors. In subsequent operation, wavelets comprised of colors with respective block indicators set to the blocked state are not selected for processing.

If the instruction decodes to an unblock instruction (Unblock Instruction? 1610), then an unblock operation is performed (Unblock Color(s) 1611). The source operand of the unblock instruction specifies one or more colors to unblock with respect to instruction processing associated with blocked/unblocked colors. In various embodiments and/or usage scenarios, the unblock operation is performed by resetting a block indicator to an unblocked state for the one or more colors specified by the source operand, and execution is complete (End 1630). In various scenarios, the source operand variously specifies unblocking a single color, unblocking all colors, and unblocking an arbitrary plurality of colors. In subsequent operation, wavelets comprised of colors with respective block indicators set to the unblocked state are selectable for processing.

If the instruction decodes to an instruction that is not a block instruction and that is not an unblock instruction, then the instruction is otherwise executed (Execute Instruction 1620) and execution is complete (End 1630).

In some embodiments, if the source operand of a block operation is an immediate (e.g., an 8-bit immediate), then the value of the immediate specifies the color to be blocked. If the source operand is not an immediate, then all colors are blocked.

In some embodiments, the source operand of an unblock operation is an immediate (e.g., an 8-bit immediate) and the value of the immediate specifies the color to be unblocked. In various embodiments, an unblock operation with particular operands unblocks multiple colors.

In various embodiments and/or usage scenarios, all or any portions of any one or more of elements of Block and Unblock Instruction Processing Flow 1600 correspond conceptually to and/or are related conceptually to operations performed by and/or elements of a compute element, such as all or any portions of a CE of a PE, e.g., Compute Element 520 of FIG. 5 and/or CE 800 of FIG. 8.

As an example, Block Bits 899 comprise a bit for each color (e.g., as entries in a table, or as a bit-mask). The block operation (Block Color(s) 1604) is performed by setting Block Bits 899 to a specific blocked value (e.g., '1') for the one or more colors specified by the source operand. In some embodiments, Picker 830 selects a wavelet for processing from a color where Block Bits 899 match an unblocked value (e.g., '0'). As another example, the unblock operation (Unblock Color(s) 1611) is performed by setting Block Bits 899 to a specific unblocked value (e.g., '0') for the color specified by the source operand. In some embodiments, Picker 830 selects a wavelet comprising a color where Block Bits 899 match an unblocked value (e.g., '0').

In some embodiments, portions of Block and Unblock Instruction Processing Flow 1600 correspond to portions of Processing a Wavelet for Task Initiation 900 of FIG. 9. As an example, actions 1602 1603, 1604, 1610, 1611, and 1620 correspond to portions of actions 950 and 960 of FIG. 9.

In various embodiments and/or usage scenarios, all or any portions of elements of Block and Unblock Instruction Processing Flow 1600 conceptually correspond to all or any portions of executions of instructions of Task SW on PEs 260 of FIG. 2.

Neuron Smearing

Figure 17:
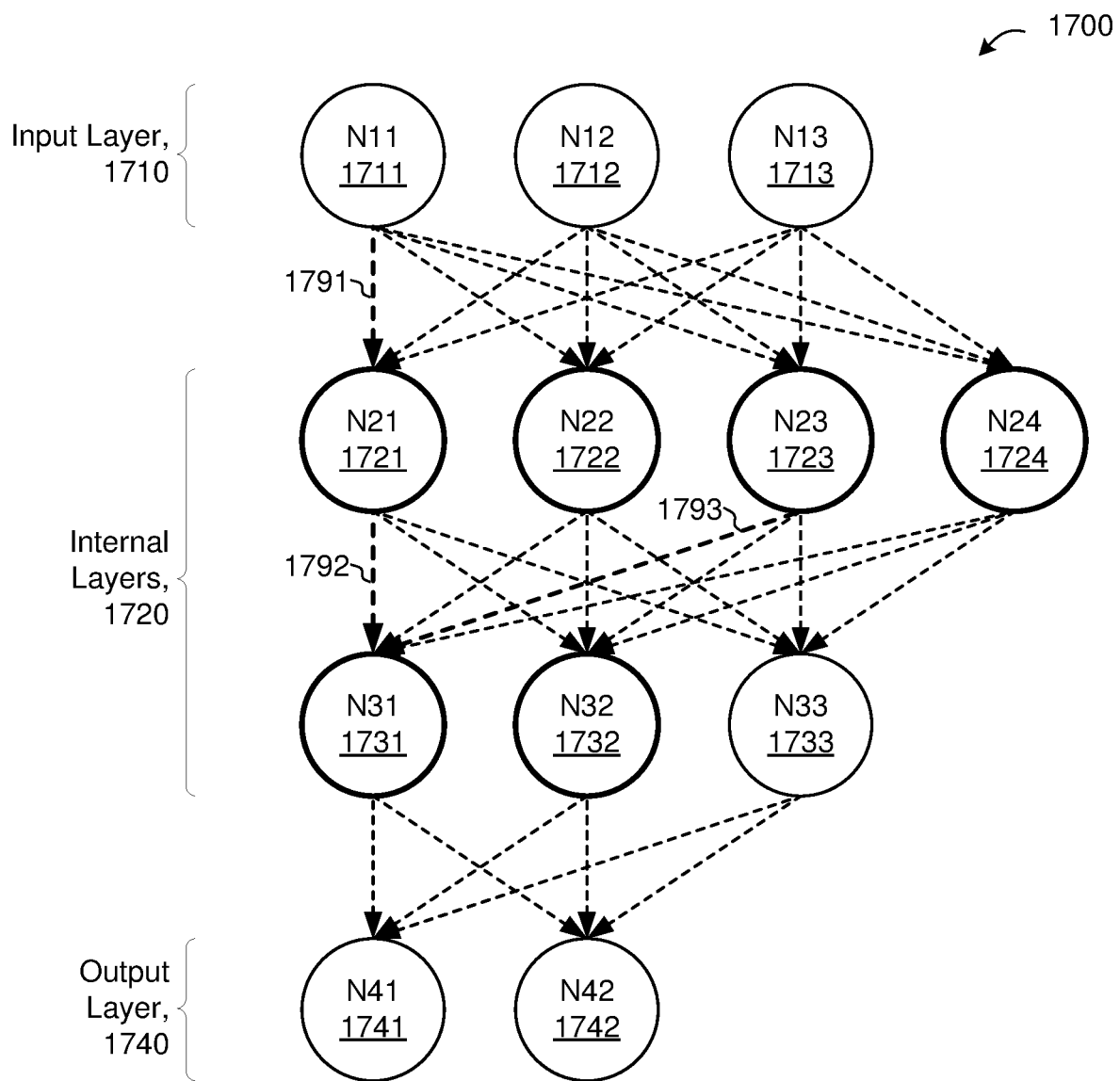
FIG. 17 illustrates selected details of an embodiment of a neural network.

FIG. 17 illustrates selected details of an embodiment of a neural network as Neural Network 1700. Network 1700 comprises three portions Input Layer 1710, Internal Layers 1720, and Output Layer 1740. Each layer comprises a plurality of neurons. Input Layer 171, comprises neurons N11 1711, N12 1712, and N13 1713. Internal Layers 1720 comprises a first layer of neurons N21 1721, N22 1722, N23 1723, and N24 1724, followed by a second layer of neurons N31 1731, N32 1732, and N33 1733. Output Layer 1740 comprises neurons N41 1741 and N42 1742.

Selected neurons (N21 1721, N22 1722, N23 1723, and N24 1724 as well as N31 1731 and N32 1732) and communications (1791, 1792, and 1793) between the selected neurons are highlighted in the figure. The selected neurons and pathways are discussed in more detail following.

Figure 18A:
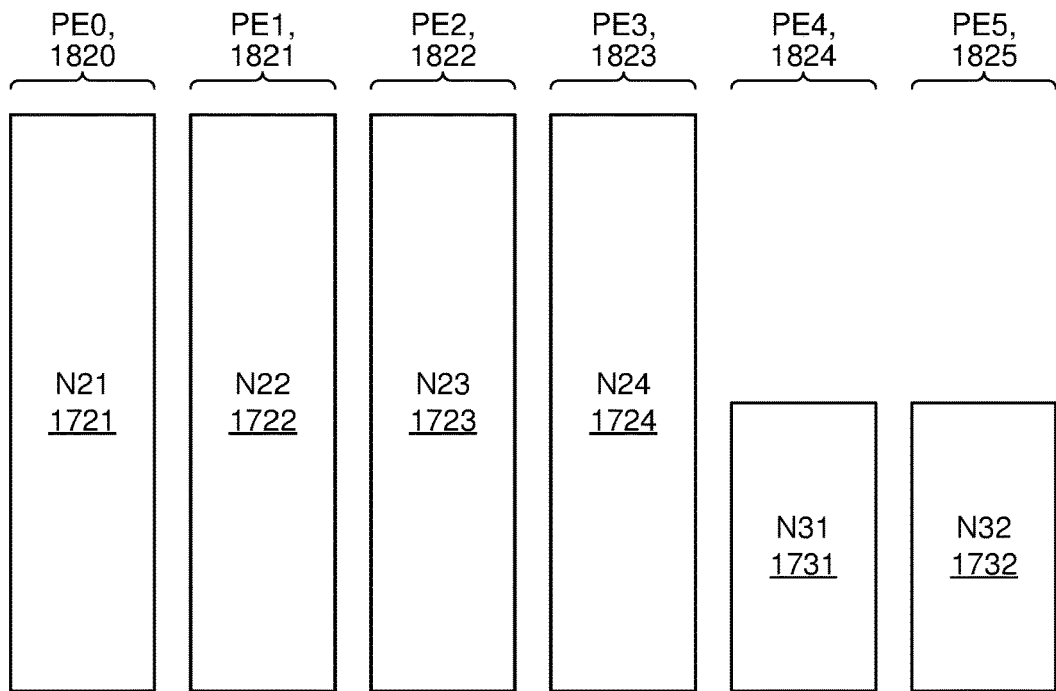
FIG. 18A illustrates selected details of a first embodiment of an allocation of processing elements to neurons.

FIG. 18A illustrates selected details of a first embodiment of an allocation of processing elements to neurons. Sometimes allocation of processing elements to neurons is referred to as placing neurons in processing elements or alternatively placement of neurons. Like numbered elements of FIG. 18A correspond to like numbered elements of FIG. 17 A first allocation of processing elements to a subset of neurons of FIG. 17 (the highlighted neurons N21 1721, N22 1722, N23 1723, and N24 1724 as well as N31 1731 and N32 1732) is conceptually illustrated. Vertical distance in the figure indicates relative usage of computational resources of each of five processing elements PE0 1820, PE1 1821, PE2 1822, PE3 1823, PE4 1824, and PE5 1825.

Each of neurons N21 1721, N22 1722, N23 1723, and N24 1724 represents approximately an equal amount of computational resources, e.g., M operations, K storage capacity, and J bandwidth to and from the storage. Each of neurons N31 1731 and N32 1732 represents approximately an equal amount of computational resources, e.g., M/2 operations, K/2 storage, and J/2 bandwidth. Thus, each of N31 1731 and N32 1732 represents approximately one half the computational resources of each of N21 1721, N22 1722, N23 1723, and N24 1724. In various embodiments, examples of computational resources comprise compute operations, storage capacity, read bandwidth from storage, write bandwidth to storage, input connections from other neurons, and output connections to other neurons.

In the illustrated embodiment, neuron processing is allocated such that each of the foregoing neurons is allocated to an entire PE. More specifically, N21 1721 is allocated to PE0 1840, N22 1722 is allocated to PE1 1841, N23 1723 is allocated to PE2 1842, N24 1724 is allocated to PE3 1843, N31 1731 is allocated to PE4 1844, and N32 1732 is allocated to PE5 1845. Therefore, four of the six processing elements are fully subscribed (PE0 1820, PE1 1821, PE2 1822, and PE3 1823), while two of the six processing elements are only one-half subscribed (PE4 1824 and PE5 1825).

Figure 18B:
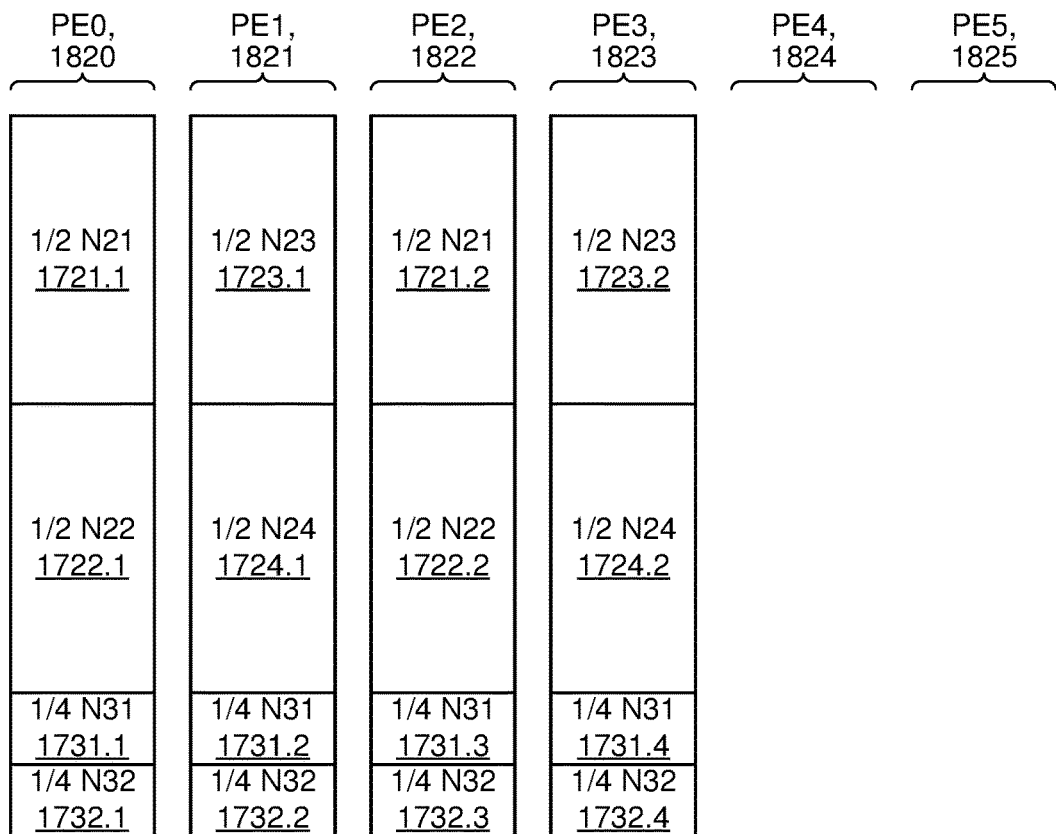
FIG. 18B illustrates selected details of a second embodiment of an allocation of processing elements to neurons.

FIG. 18B illustrates selected details of a second embodiment of an allocation of processing elements to neurons. Like numbered elements of FIG. 18B correspond to like numbered elements of FIG. 17 and FIG. 18A. A second allocation of processing elements to a subset of neurons of FIG. 17 (the highlighted neurons N21 1721, N22 1722, N23 1723, and N24 1724 as well as N31 1731 and N32 1732) is conceptually illustrated. As in FIG. 18A, vertical distance in the figure indicates relative usage of computational resources of each of five processing elements PE0 1820, PE1 1821, PE2 1822, PE3 1823, PE4 1824, and PE5 1825. Also as in FIG. 18A, each of N31 1731 and N32 1732 represents approximately one half the computational resources of each of N21 1721, N22 1722, N23 1723, and N24 1724.

In the illustrated embodiment, neuron processing is allocated such that processing for respective neurons is "smeared" across processing elements. Conceptually, neurons are "split" into portions suitable for processing elements to be allocated to. As illustrated in the figure, neurons are split and processing elements allocated so that four of the six processing elements are equally (and fully) subscribed (PE0 1820, PE1 1821, PE2 1822, and PE3 1823), while two of the six processing elements are completely unsubscribed and therefore available for other uses (PE4 1824, and PE5 1825). In some embodiments and/or usage scenarios, unsubscribed processing elements remain unused and consume little or no active and/or static power (e.g., via one or more of clock gating and power gating). More specifically, N21 1721 is allocated in two halves (½ N21 1721.1 and ½ N21 1721.2) to two respective processing elements (PE0 1820 and PE2 1822). Similarly, N22 1722 is allocated in two halves (½ N22 1722.1 and ½ N22 1722.2) to two respective processing elements (PE0 1820 and PE2 1822). N23 1723 is allocated in two halves (½ N23 1723.1 and ½ N23 1723.2) to two respective processing elements (PE1 1821 and PE3 1823) and N24 1724 is allocated in two halves (½ N24 1724.1 and ½ N24 1724.2) to two respective processing elements (PE1 1821 and PE3 1823). N31 1731 is allocated in four fourths (¼ N31 1731.1, ¼ N31 1731.2, ¼ N31 1731.3, and ¼ N31 1731.4) to four respective processing elements (PE0 1820, PE1 1821, PE2 1822, and PE3 1823). Similarly, N32 1732 is allocated in four fourths (¼ N32 1732.1, ¼ N32 1732.2, ¼ N32 1732.3, and ¼ N32 1732.4) to four respective processing elements (PE0 1820, PE1 1821, PE2 1822, and PE3 1823). In various embodiments, neurons are split and processing elements allocated based on one or more computational resources associated with the neurons. In some embodiments, neurons are split and processing elements allocated based on the hardware resources available in the processing elements (e.g., some neurons require specific hardware resources such as PRNGs).

Figure 19:
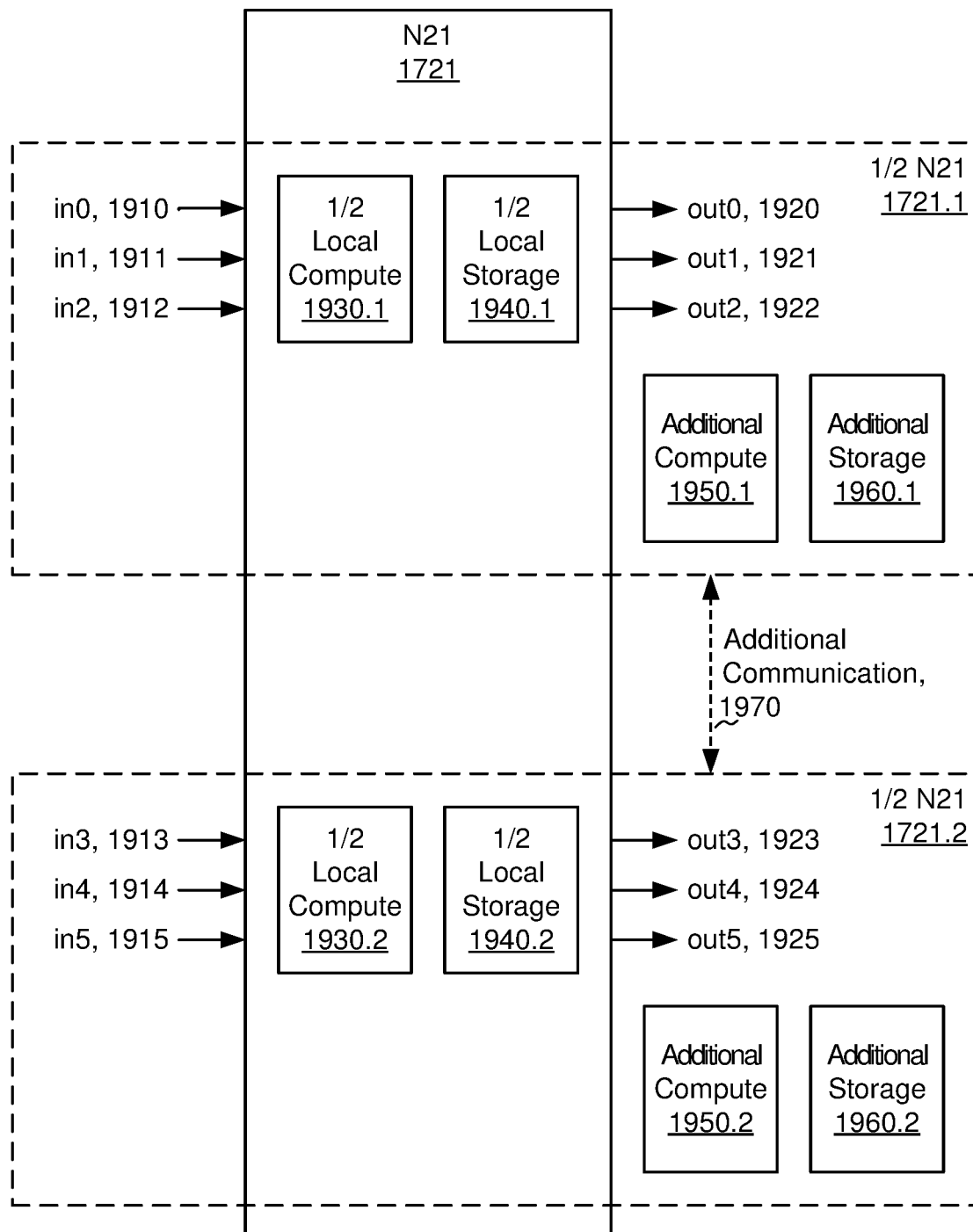
FIG. 19 illustrates selected details of an embodiment of smearing a neuron across a plurality of processing elements.

FIG. 19 illustrates selected details of an embodiment of smearing a neuron across a plurality of processing elements. The splitting results in portions of the split neuron that are then smeared across processing elements. Like numbered elements of FIG. 19 correspond to like numbered elements of FIG. 17, FIG. 18A, and FIG. 18B. As illustrated by FIG. 18B, N21 1721 is split into two portions ½ N21 1721.1 and ½ N21 1721.2 implemented respectively by PE0 1820 and PE2 1822.

Conceptually, N21 1721 is considered to comprise local compute and local storage, as well as inputs and outputs. Respective elements of N21 1721 are partitioned respectively. The local compute of N21 is partitioned into ½ Local Compute 1930.1 and ½ Local Compute 1930.2. The local storage of N21 is partitioned into ½ Local Storage 1940.1 and ½ Local Storage 1940.2. The inputs of N21 are partitioned into a first half in0 1910, in1 1911 and in2 1912 as well as a second half in3 1913, in4 1914, and in5 1915. The outputs of N21 are partitioned into a first half out0 1920, out1 1921, out2 1922 as well as a second half out3 1923, out4 1924, and out5 1925.

½ Local Compute 1930.1, ½ Local Storage 1940.1, in0 1910 with in1 1911, and out0 1920 are implemented by PE0 1820. ½ Local Compute 1930.2, ½ Local Storage 1940.2, in2 1912 with in3 1913, and out1 1921 are implemented by PE0 1822.

In some embodiments and/or usage scenarios, smearing a neuron across more than one processing element is implemented at least in part by additional computation, additional storage, and/or additional communication not otherwise performed/used by the neuron. The additional computation, additional storage, and/or additional communication, enables, e.g., combining partial results from the portions of the neuron into results corresponding to results of the entire neuron. Additional Compute 1950.1 and Additional Storage 1960.1 are representative of additional compute and additional storage for ½ N21 1721.1, and are implemented by PE0 1820. Additional Compute 1950.2 and Additional Storage 1960.2 are representative of additional compute and additional storage for ½ N21 1721.2, and are implemented by PE0 1822.

Additional Communication 1970 is representative of additional communication between ½ N21 1721.1 and ½ N21 1721.2, and is implemented by fabric connectivity between PE0 1820 and PE0 1822. In some embodiments and/or usage scenarios, all or any portions of Additional Communication 1970 is representative of communications that would occur internally to a single processing element if the single processing element entirely implemented N21 1721.

Figure 20:
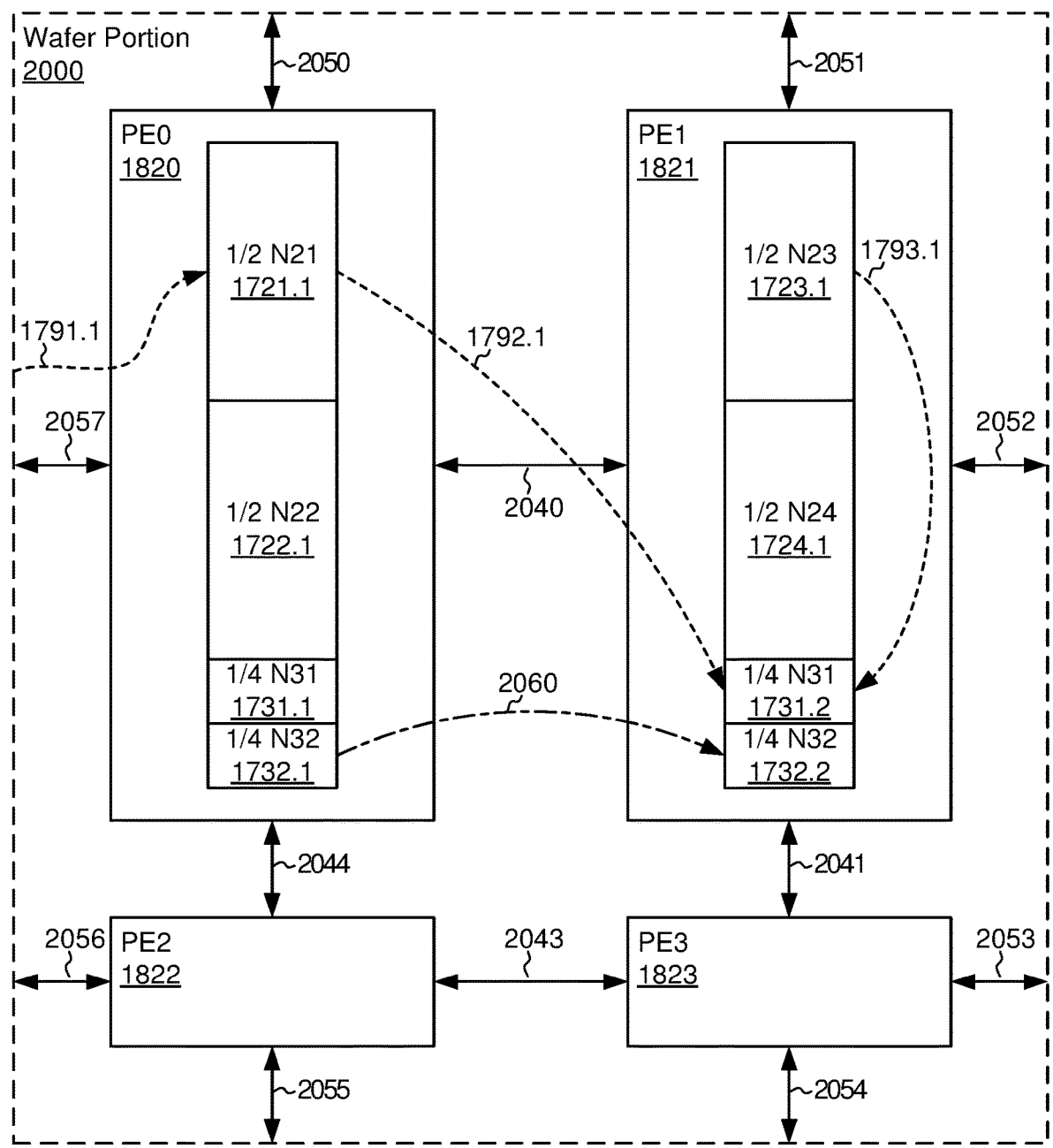
FIG. 20 illustrates selected details of an embodiment of communication between portions of split neurons.

FIG. 20 illustrates selected details of an embodiment of communication between portions of split neurons. Like numbered elements of FIG. 20 correspond to like numbered elements of FIG. 17, FIG. 18A, FIG. 18B, and FIG. 19. Allocations of PE0 1820, PE1 1821, PE2 1822, and PE3 1823 to neuron portions are as illustrated by FIG. 18B. For clarity, only allocations specific to PE0 1820 and PE1 1821 are illustrated.

Wafer Portion 2000 comprises PE0 1820, PE1 1821, PE2 1822, and PE3 1823. Couplings between PEs of Wafer Portion 2000 are illustrated as (coupling between adjacent PEs) 2040 coupling PE0 1820 and PE1 1821, 2041 coupling PE1 1821 and PE3 1823, 2043 coupling PE3 1823 and PE2 1822, and 2044 coupling PE2 1822 and PE0 1820. Couplings to PEs adjacent to Wafer Portion 2000 are illustrated as (portion of coupling between adjacent PEs) 2050, 2051, 2052, 2053, 2054, 2055, 2056, and 2057. The couplings to adjacent PEs are 'portions' since in some embodiments and/or usage scenarios, all or any portions of the couplings are comprised in wafer portions adjacent to Wafer Portion 2000, rather than entirely in Wafer Portion 2000.

As a first example, communication portion 1791.1 conceptually represents a portion of communication 1791 between N11 1711 and N21 1721 (of FIG. 17), e.g., from an input layer to an internal layer, with portions of a split neuron in respective processing elements. More specifically, recall that N21 1721 is split into two portions (½ N21 1721.1 and ½ N21 1721.2; see FIG. 18B). Thus, communication 1791 is split into two portions. Communication portion 1791.1 is illustrative specifically of the portion that is with respect to ½ N21 1721.1. Communication portion 1791.1 is transported via (portion of coupling between adjacent PEs) 2057 between a PE adjacent to Wafer Portion 2000 to PE0 1820 (allocated to ½ N21 1721.1). In some embodiments and/or usage scenarios, communication 1791 is split into two portions, communication portion 1791.1 (illustrated) and communication portion 1791.2 (not illustrated). In some embodiments and/or usage scenarios, transport of communication portion 1791.1 and communication portion 1791.2 are via a same virtual channel. In some embodiments and/or usage scenarios, transport of communication portion 1791.1 and communication portion 1791.2 are via respective unique virtual channels.

As a second example, communication portion 1792.1 conceptually represents a portion of communication 1792 between N21 1721 and N31 1731 (of FIG. 17), e.g., from a first internal layer to a second internal layer, with portions of split neurons in respective processing elements. More specifically, recall that N21 1721 is split into two portions (½ N21 1721.1 and ½ N21 1721.2; see FIG. 18B). Further recall that N31 1731 is split into four portions (¼ N31 1731.1, ¼ N31 1731.2, ¼ N31 1731.3, and ¼ N31 1731.4; see FIG. 18B). Thus, communication 1792 is split into portions. Communication portion 1792.1 is illustrative specifically of the portion that is with respect to ½ N21 1721.1 and ¼ N31 1731.2. Communication portion 1792.1 is transported via (coupling between adjacent PEs) 2040 between PE0 1820 (allocated to ½ N21 1721.1) and PE1 1821 (allocated to ¼ N31 1731.2). In various embodiments and/or usage scenarios, transport of communication portion 1792.1 (illustrated) and, e.g., other portions (not illustrated) of communication 1792 are via a same virtual channel, via unique virtual channels per portion, via virtual channels per portion associated with a particular neuron, and/or via virtual channels per portion associated with a particular processing element.

As a third example, communication portion 1793.1 conceptually represents a portion of communication 1793 between N23 1723 and N31 1731 (of FIG. 17), e.g., from a first internal layer to a second internal layer, with portions of split neurons in a same processing element. More specifically, recall that N23 1723 is split into two portions (½ N23 1723.1 and ½ N23 1723.2); see FIG. 18B). Further recall that N31 1731 is split into four portions (¼ N31 1731.1, ¼ N31 1731.2, ¼ N31 1731.3, and ¼ N31 1731.4; see FIG. 18B). Thus, communication 1793 is split into portions. Communication portion 1793.1 is illustrative specifically of the portion that is with respect to ½ N23 1723.1 and ¼ N31 1731.2. Communication portion 1793.1 is transported via one or more mechanisms internal to PE1 1821 (allocated to ½ N23 1723.1 and ¼ N31 1731.2). E.g., PE1 1821 uses internal resources (such as a router) to internally feedback an output as an input, and/or to internally provide an input from an output. In some embodiments and/or usage scenarios, transport of communication portion 1793.1 is via a virtual channel that results in an output being used as an input, and/or an input being provided from an output.

As a fourth example, communication 2060 conceptually represents all or any portions of Additional Communication 1970 (of FIG. 19), e.g., communications within a neuron that is split across processing elements. More specifically, communication 2060 illustrates specifically communications between two of the four portions that N32 1732 is split into (¼ N32 1732.1 and ¼ N32 1732.2; see FIG. 18B). Communication 2060 is transported via (coupling between adjacent PEs) 2040 between PE0 1820 (allocated to ¼ N32 1732.1) and PE1 1821 (allocated to ¼ N32 1732.2). In various embodiments and/or usage scenarios, communication 2060 is via virtual channel dedicated to communication 2060, a virtual channel shared with communication 2060 and communications between other portions of N32 1732, and a virtual channel shared with communication 2060 and all or any portions of neurons split across processing elements.

In some embodiments and/or usage scenarios, all or any portion of Wafer Portion 2000 comprises PEs 122 of FIG. 1. In some embodiments and/or usage scenarios, any one of PE0 1820, PE1 1821, PE2 1822, and PE3 1823 correspond to PE 497 of FIG. 4. In some embodiments and/or usage scenarios, any one or more of coupling between adjacent PEs 2041, 2042, 2043, and 2044 and/or portion of coupling between adjacent PEs 2050, 2051, 2052, 2053, 2054, 2055, 2056, and 2057 correspond to any one or more of North coupling 430, East coupling 431, South coupling 432, and West coupling 433 of FIG. 4.

Concepts relating to neuron smearing (e.g., as described with respect to and illustrated by FIG. 17, FIG. 18A, FIG. 18B, FIG. 19, and FIG. 20) are applicable to neural networks of various topologies and types, such as FCNNs, RNNs, CNNs, LSTM networks, autoencoders, deep belief networks, and generative adversarial networks.

In various embodiments and/or usage scenarios, neurons are split into same-sized portions, e.g., halves, fourths, eights, and so forth. In various embodiments and/or usage scenarios, neurons are split into different-sized portions, e.g., a first portion that is a half, and second and third portions that are respectively each fourths. In various embodiments and/or usage scenarios, neurons are split into arbitrarily-sized portions.

In various embodiments and/or usage scenarios, a multiplicity of PEs are allocated to a single neuron. In various embodiments and/or usage scenarios, a single PE is allocated to the respective entireties of a multiplicity of neurons.

In various embodiments and/or usage scenarios, allocation of PEs to neurons is entirely or partially responsive to static and/or dynamic measurements of computational and/or storage requirements. In various embodiments and/or usage scenarios, allocation of PEs to neurons is entirely or partially responsive to dimensionality of data to be processed.

In various embodiments and/or usage scenarios, dataflow as represented by directions of arrows is unidirectional (as illustrated by drawn arrowhead), bidirectional, and/or reverse-direction (against drawn arrowhead). As a specific example, in various embodiments and/or usage scenarios, communication 1792 (of FIG. 17) is representative of dataflow from N21 1721 to N31 1731 (e.g., during forward propagation) or in reverse from N31 1731 to N21 1721 (e.g., during back propagation). Thus, communication portion 1792.1 and therefore communication on (portion of coupling between adjacent PEs) 2057 occurs from PE0 1820 to PE1 1821 (e.g., during forward propagation) and in reverse from PE1 1821 to PE0 1820 (e.g., during back propagation).

Vectors and Data Structure Descriptors

In various embodiments and/or usages scenarios, processing of one or more vectors, each vector comprising respective one or more data elements, is performed. A vector is variously read from memory (e.g., of a CE of a PE, such as Memory 854 or D-Store 848 of FIG. 8), written to the memory, received from a fabric, or transmitted to the fabric. Vectors read from or written to the memory are sometimes referred to as 'memory vectors'. Vectors received from or transmitted to the fabric (e.g., as wavelets) are sometimes referred to as 'fabric vectors'. DSDs from DSRs (as well as XDXDs from XDSRs) are usable to determine addressing patterns for memory vectors and accessing patterns for fabric vectors.

Each element identifier in the description of FIGS. 21A-E, FIGS. 22A-B, and FIGS. 23-24 having a first digit of "8" refers to an element of FIG. 8, and for brevity is not otherwise specifically identified as being an element of FIG. 8.

FIG. 21A illustrates selected details of an embodiment of a Fabric Input Data Structure Descriptor (aka Fabric Input DSD), as Fabric Input Data Structure Descriptor 2100. In some embodiments, Fabric Input Data Structure Descriptor 2100 describes a fabric vector received by a PE from the fabric, as well as various parameters relating to processing of the fabric vector. In various embodiments and/or usage scenarios, either a source0 operand or a source1 operand of an instruction refers to a DSR containing an instance of a DSD in accordance with Fabric Input Data Structure Descriptor 2100.

Fabric Input Data Structure Descriptor 2100 comprises Length 2101, UTID (Microthread Identifier) 2102, UE (Microthread Enable) 2103, SW (SIMD Width) 2104, AC (Activate Color) 2105, Term (Terminate Microthread on Control Wavelet) 2106, CX (Control Wavelet Transform Enable) 2107, US (Microthread Sparse Mode) 2108, Type 2109, SS (Single Step) 2110, SA (Save Address/Conditional Single Step Mode) 2111, SC (Color Specified/Normal Mode) 2112, SQ (Queue Specified/Normal Mode) 2113, and CH (Color High) 2114.

In some embodiments, Length 2101 comprises a 15-bit integer specifying the length of the vector, e.g., the number of data elements in the vector.

In some embodiments, UE (Microthread Enable) 2103 comprises a 1-bit field indicating whether, under at least some conditions, microthreading is enabled during processing of the fabric vector, sometimes referred to as the fabric vector 'enabling microthreading'. If at least one operand (source or destination) of an instruction is a fabric vector enabling microthreading, then on either an input or output stall during processing of the instruction, processing is enabled to switch (provided sufficient microthreading resource are available) to another instruction of another task. When the stall is cleared, then processing (eventually) returns to the previously stalled instruction. An example input stall is when at least one element of an input fabric vector operands is not available. An example output stall is when there is insufficient space to buffer results associated with an element of an output fabric vector. In some scenarios, a fabric vector that does not enable microthreading is processed synchronously and stalls processing on either an input or output stall. In some scenarios, a fabric vector that enables microthreading is processed asynchronously and reduces or avoids stalling the processing element on either an input or output stall. If a fabric vector enables microthreading, then the processing element is enabled to conditionally switch to processing a different instruction (instead of stalling) and subsequently resume processing the fabric vector at a later point in time (e.g., when data is available).

In some embodiments, UTID (Microthread Identifier) 2102 comprises a 3-bit field identifying one of a plurality of microthreads and/or resources associated with one of a plurality of microthreads. The microthreads and/or the resources are associated, e.g., with a fabric vector that enables microthreading. In some embodiments, the hardware provides resources for eight microthreads. In some embodiments and/or usage scenarios, UTID 2102 identifies or partially identifies one of Qs 897.

In some embodiments, SW (SIMD Width) 2104 comprises a 2-bit field specifying the number of operations (e.g., one, two, or four) that are, in some implementations, executed in parallel. For example, an FMACH, FADDH, FMULH or MOV16 instruction performs multiple (up to four) operations in parallel on respective operands. In some implementation, the SW field is used to determine how to parse wavelets into data versus index information. For example, when the SW field is four, then two wavelets, each having two data values (and no index values) provide four operands, e.g., in parallel. Continuing with the example, when the SW field is two, then a single wavelet having two data values (and no index value) provides two operands, e.g., in parallel. Continuing with the example, when the SW field is one, then a single wavelet having a single data value and a single index value provides a single operand.

In some embodiments, AC (Activate Color) 2105 comprises a 6-bit field specifying a color to activate (e.g., via an activate operation). In some scenarios, when processing is complete for a fabric vector that enables microtheading, the color specified by the AC field is activated and a task initiated based on the activated color. The completion of processing occurs, e.g., when all elements of the fabric vector have been processed, or when Term 2106 indicates to terminate upon encountering a control wavelet and a control wavelet is encountered while processing the fabric vector. In some embodiments, AC 2105 is enabled to specify one of: a local color and a fabric color.

In some embodiments, Term (Terminate Microthread on Control Wavelet) 2106 comprises a 1-bit field specifying whether to terminate upon receiving a control wavelet. If the wavelet at the head of the queue specified by Fabric Input Data Structure Descriptor 2100 (e.g., one of Qs 897 as variously specified by various functions of any combination of UTID 2102, SC 2112, and/or SQ 2113, as described elsewhere herein) is a control wavelet (e.g., Control Bit 1320 of FIG. 13A or Control Bit 1340 of FIG. 13B is set) and Term 2106 is set, then the instruction is terminated and the color specified by AC 2105 is activated.

In some embodiments, CX (Control Wavelet Transform Enable) 2107 comprises a 1-bit field specifying whether to transform control wavelets. If CX 2107 is set, then in response to receiving a control wavelet in the fabric vector, bits 15:6 of the index register are set to all "1" s. In some embodiments and/or usage scenarios, if bits 15:6 of the index register are all "1" s, then the control bits of any output wavelets associated with an output fabric vector referencing the index register are set.

In some embodiments, US (Microthread Sparse Mode) 2108 comprises a 1-bit field specifying whether a fabric vector that enables microthreading (e.g., via the UE field) is processed in a sparse mode. If US 2108 is set, then the fabric vector comprises a vector of sparse data elements and respective wavelet indices of the operand described by Fabric Input Data Structure Descriptor 2100. The indices are optionally and/or selectively used for address calculation of memory operands, dependent on WLI 2152 (of FIG. 21C).

In some embodiments, Type 2109 comprises a 3-bit field specifying a data structure type and/or how to interpret other fields of Fabric Input Data Structure Descriptor 2100. Type 2109 is "0" for all instances of Fabric Input Data Structure Descriptor 2100.

In some embodiments, SS (Single Step) 2110 comprises a 1-bit field specifying whether single step mode operation is enabled, under at least some conditions, for operations using the DSD as an operand. In some scenarios, an instruction with one or more operands that enable single step mode operates in single step mode.

In some embodiments, SA (Save Address/Conditional Single Step Mode) 2111 comprises a 1-bit field specifying whether save address mode operation is enabled, under at least some conditions, for operations using the DSD as an operand.

In some embodiments and/or usage scenarios, a color is activated and in response a task is initiated at an address based at least in part on the color. Once initiated, the task executes. In some scenarios, an input fabric vector is provided from the queue associated with the color of the currently executing task. In some embodiments, SC (Color Specified, Normal Mode) 2112 comprises a 1-bit field that if set, specifies that the input fabric vector is provided from a specific queue (e.g., one of Qs 897) associated with a specific fabric color. The specific fabric color is specified (e.g., as a 5-bit color) as a concatenation of lower bits UTID 2102 (comprising a 3-bit field) and upper bits CH 2114 (comprising a 2-bit field). In some embodiments, SQ (Queue Specified, Normal Mode) 2113 comprises a 1-bit field that if set, specifies that the input fabric vector is provided from a specific queue (e.g., one of Qs 897). If SQ 2113 is set, then the input fabric vector is provided from the one of Qs 897 specified by UTID 2102.

FIG. 21B illustrates selected details of an embodiment of a Fabric Output Data Structure Descriptor (aka Fabric Output DSD), as Fabric Output Data Structure Descriptor 2120. In some embodiments, Fabric Output Data Structure Descriptor 2120 describes a fabric vector created by a PE and transmitted over the fabric, as well as various parameters relating to processing of the fabric vector. In various embodiments and/or usage scenarios, a destination operand of an instruction refers to a DSR containing an instance of a DSD in accordance with Fabric Output Data Structure Descriptor 2120.

Fabric Output Data Structure Descriptor 2120 comprises Length 2121, UTID (Microthread Identifier) 2122, UE (Microthread Enable) 2123, SW (SIMD Width) 2124, Color 2126, C (Output Control Bit) 2127, Index Low 2128.1, Type 2129, SS (Single Step) 2130, SA (Save Address/Conditional Single Step Mode) 2131, WLI (Wavelet Index Select) 2132, Index High 2128.2, and AC (Activate Color) 2125.

In some embodiments, the elements of Fabric Output Data Structure Descriptor 2120 (Length 2121, UTID 2122, UE 2123, SW 2124, SS 2130, SA 2131, and AC 2125) are respectively similar in function and/or operation with respect to the elements of Fabric input Data Structure Descriptor 2100 (Length 2101, UTID 2102, UE 2103, SW 2104, SS 2110, SA 2111, and AC 2105).

In some embodiments, Color 2126 comprises a 5-bit field specifying the fabric color used to transmit wavelets associated with the fabric vector.

In some embodiments, C (Output Control Bit) 2127 comprises a 1-bit field specifying whether a wavelet is a control wavelet. If C 2127 is set, then any wavelets created based on the DSD are control wavelets (e.g., Control Bit 1320 of FIG. 13A is set).

In some embodiments, Index Low 2128.1 comprises a 3-bit field and Index High 2128.2 comprises a 3-bit field. The concatenation of Index Low 2128.1 and Index High 2128.2 is collectively referred to as Index 2128. In some scenarios, Index 2128 is used to form an index for a wavelet (e.g., Index 1321 of FIG. 13A).

In some embodiments, Type 2129 comprises a 3-bit field specifying a data structure type and/or how to interpret other fields of Fabric Output Data Structure Descriptor 2120. Type 2129 is "0" for all instances of Fabric Output Data Structure Descriptor 2120.

In some embodiments, WLI (Wavelet Index Select) 2132 comprises a 1-bit field specifying in part the index of the fabric vector. In some scenarios, if WLI 2132 is "1", then the index is the value from a register (e.g., GPR4 of RF 842). In some scenarios, if WLI 2132 is "0", then the index is a zero-extension to 16-bits of Index 2128.

FIG. 21C illustrates selected details of an embodiment of a 1D Memory Vector Data Structure Descriptor (aka 1D Memory Vector DSD), as 1D Memory Vector Data Structure Descriptor 2140. In some embodiments, 1D Memory Vector Data Structure Descriptor 2140 describes a one-dimensional memory vector stored in the memory, as well as various parameters relating to processing of the memory vector. In various embodiments and/or usage scenarios, any one or more of a source0 operand, a source1 operand, and a destination operand of an instruction refer to respective DSRs containing respective instances of DSDs in accordance with 1D Memory Vector Data Structure Descriptor 2140.

1D Memory Vector Data Structure Descriptor 2140 comprises Length 2141, Base Address 2142, Type 2149, SS (Single Step) 2150, SA (Save Address/Conditional Single Step Mode) 2151, WLI (Wavelet Index Select) 2152, and Stride 2153.

In some embodiments, some of the elements of 1D Memory Vector Data Structure Descriptor 2140 (Length 2141, SS 2150, and SA 2151) are respectively similar in function and/or operation with respect to some of the elements of Fabric Input Data Structure Descriptor 2100 (Length 2101, SS 2110, and SA 2111). In some scenarios, if the length of the memory vector is more than 15-bits, then 4D Memory Vector Data Structure Descriptor 2140 is used.

In some embodiments, Base Address 2142 comprises a 15-bit integer specifying the base address of the memory vector.

In some embodiments, Type 2149 comprises a 3-bit field specifying a data structure type and/or how to interpret other fields of 1D Memory Vector Data Structure Descriptor 2140. Type 2149 is "1" for all instances of 1D Memory Vector Data Structure Descriptor 2140.

In some embodiments, WLI (Wavelet Index Select) 2152 comprises a 1-bit field specifying in part the index of the vector. If WLI 2152 is "0", then the index is 0. In some scenarios, if WLI 2152 is "1", then the index is the value from a register (e.g., GPR4 of RF 842) or the index of a sparse wavelet (e.g., Index 1321 of FIG. 13A).

In some embodiments, Stride 2153 comprises a 9-bit signed integer specifying the stride of the vector. In some scenarios, Base Address 2142, an index specified by WLI 2153, and Stride 2153 enable calculating addresses of data elements in a 1D memory vector. The address of the first data element in the 1D memory vector is Base Address 2142+the index specified by WLI 2153. The address of the next data element in the 1D vector is the address of the first data element+Stride 2153. For example, Base Address 2142 is 136, WLI 2153 is 1, GPR4 holds the value 6, Stride 2153 is −2, and Length 2141 is 10, then the memory vector comprises data located at addresses {142, 140, 138, . . . , 124}. In some scenarios, if the stride of the memory vector is more than 9-bits, then 4D Memory Vector Data Structure Descriptor 2140 is used.

FIG. 21D illustrates selected details of an embodiment of a 4D Memory Vector Data Structure Descriptor (aka 4D Memory Vector DSD), as 4D Memory Vector Data Structure Descriptor 2160. In some embodiments, 4D Memory Vector Data Structure Descriptor 2160, in conjunction with 4D Memory Vector Extended Data Structure Descriptor 2240 of FIG. 22B, describe a 4-dimensional memory vector stored in the memory, as well as various parameters relating to processing of the memory vector. In some embodiments, 4D Memory Vector Data Structure Descriptor 2160, in conjunction with 4D Memory Vector Extended Data Structure Descriptor 2240 of FIG. 22B, describe a two-dimensional or three-dimensional memory vector stored in the memory, as well as various parameters relating to processing of the memory vector. In various embodiments and/or usage scenarios, any one or more of a source0 operand, a source1 operand, and a destination operand of an instruction refer to respective DSRs containing respective instances of DSDs in accordance with 4D Memory Vector Data Structure Descriptor 2160.

4D Memory Vector Data Structure Descriptor 2160 comprises Length Lower Bits 2161.1, Base Address 2162, Type 2169, SS (Single Step) 2170, SA (Save Address/Conditional Single Step Mode) 2171, WLI (Wavelet Index Select) 2172, and Length Upper Bits 2161.2.

In some embodiments, some of the elements of 4D Memory Vector Data Structure Descriptor 2160 (Base Address 2162, SS 2170, SA 2171, and WLI 2172) are respectively similar in function and/or operation with respect to 1D Memory Vector Data Structure Descriptor 2140 (Base Address 2142, SS 2150, SA 2151, and WLI 2152).

In some embodiments, Lower Bits 2161.1 comprises a 15-bit field and Length Upper Bits 2161.2 comprises a 9-bit field. The concatenation of Lower Bits 2161.1 and Length Upper Bits 2161.2 is collectively referred to (and illustrated as) Length 2161 (a 24-bit field) interpreted in conjunction with 4D Memory Vector Extended Data Structure Descriptor 2240.

In some embodiments, Type 2169 comprises a 3-bit field specifying an extended DSR (XDSR), storing, e.g., an extended DSD (XDSD). The XDSD specifies and describes one of: a circular memory buffer (e.g., Circular Memory Buffer Extended Data Structure Descriptor 2210 of FIG. 22A) and a four-dimensional memory vector (e.g., 4D Memory Vector Extended Data Structure Descriptor 2240 of FIG. 22B).

FIG. 21E illustrates selected details of an embodiment of a Circular Memory Buffer Data Structure Descriptor (aka Circular Memory Buffer DSD), as Circular Memory Buffer Data Structure Descriptor 2180. In some embodiments, Circular Memory Buffer Data Structure Descriptor 2180, in conjunction with Circular Memory Buffer Extended Data Structure Descriptor 2210, describes one of: a circular buffer of data elements stored in the memory and a FIFO of data elements stored in the memory; as well as various parameters relating to processing of the data elements. In various embodiments and/or usage scenarios, any one or more of a source0 operand, a source1 operand, and a destination operand of an instruction refer to respective DSRs containing respective instances of DSDs in accordance with Circular Memory Buffer Data Structure Descriptor 2180.

Circular Memory Buffer Data Structure Descriptor 2180 comprises Length 2181, Base Address 2182, FW (FIFO Wrap Bit) 2188, Type 2189, SS (Single Step) 2190, SA (Save Address/Conditional Single Step Mode) 2191, WLI (Wavelet Index Select) 2192, and SW (SIMD Width) 2184. In some embodiments, a circular memory buffer access always has an index of zero and a stride of one.

In some embodiments, some of the elements of Circular Memory Buffer Data Structure Descriptor 2180 (Length 2181, Base Address 2182, SS 2190, and SA 2191) are respectively similar in function and/or operation with respect to some of the elements of 1D Memory Vector Data Structure Descriptor 2140 (Length 2141, Base Address 2142, SS 2150, and SA 2151). In some embodiments, Type 2189 is similar in function and/or operation to Type 2169 of 4D Memory Vector Data Structure Descriptor 2160. In some embodiments, SW 2184 of Circular Memory Buffer Data Structure Descriptor 2180 is similar in function and/or operation to SW 2104 of Fabric Input Data Structure Descriptor 2100.

In some embodiments, FW (FIFO Wrap Bit) 2188 comprises a 1-bit field enabling distinguishing between a full FIFO and an empty FIFO. FW (FIFO Wrap Bit) 2188 is toggled when an access wraps around the address range of the FIFO.

In some embodiments, WLI 2192 has no impact on the index of a circular buffer.

FIG. 22A illustrates selected details of an embodiment of a Circular Memory Buffer Extended Data Structure Descriptor, as Circular Memory Buffer Extended Data Structure Descriptor 2210. Circular Memory Buffer Extended Data Structure Descriptor 2210 comprises Type 2211, Start Address 2212, End Address 2213, FIFO 2214, Push (Activate) Color 2215, and Pop (Activate) Color 2216.

In some embodiments, Type 2211 comprises a 1-bit field specifying the type of data structure. Type 2211 is "1" for all instances of Circular Memory Buffer Extended Data Structure Descriptor 2210.

In some embodiments, Start Address 2212 comprises a 15-bit field specifying the start address of the circular buffer in the memory. In some embodiments, End Address 2213 comprises a 15-bit integer specifying the end address of the circular buffer in the memory. When an address is incremented (e.g., by the stride to initiate the next access) and equals End Address 2213, the address is reset to Base Address 2212, thereby providing circular access behavior.

In some embodiments, FIFO 2214 comprises a 1-bit field specifying whether the circular buffer is a FIFO. If FIFO 2214 is "0", then the circular buffer is not a FIFO. If FIFO 2214 is "1", then the circular buffer is a FIFO.

In some embodiments, Push (Activate) Color 2215 and Pop (Activate) Color 2216 comprise 6-bit fields specifying colors to activate (e.g., via an activate operation). In some embodiments, Push (Activate) Color 2215 and Pop (Activate) Color 2216 are enabled to specify ones of: a local color and a fabric color.

In various embodiments, two circular memory buffer DSRs are enabled to describe a FIFO of data elements stored in a same region of the memory. A destination DSR (e.g., DDSR8) describes a write pointer of the FIFO, and a source1 DSR (e.g., S1DSR8) describes a read pointer of the FIFO. In some embodiments, destination and source1 DSRs have a same identifier. In various embodiments, only some of DSRs 846 are enabled to describe FIFOs, (e.g., DDSR8-DDSR11 and S1DSR8-S1DSR11).

FW (FIFO Wrap Bit) 2188 of the two DSRs enables detecting if a FIFO is full or empty. When a FIFO is used as a destination, Base Address 2182 and FW 2188 of the associated S1DSR is read and compared to values from the DDSR. If Base Address 2182 of the two DSRs are the same, but FW 2188 are different, then the FIFO is full. When a FIFO is used as a source, Base Address 2182 and FW 2188 of the associated DDSR are read and compared to values from the S1DSR. If Base Address 2182 of the two DSRs are the same and FW 2188 are the same, then the FIFO is empty. In some scenarios (e.g., microthreading), in response to a read accessing an empty FIFO or a write accessing a full FIFO, processing is switched to an instruction in another task until the FIFO is respectively not empty or not full.

FIG. 22B illustrates selected details of an embodiment of a 4D Memory Vector Extended Data Structure Descriptor, as 4D Memory Vector Extended Data Structure Descriptor 2240. In some embodiments, 4D Memory Vector Extended Data Structure Descriptor 2240 partially describes a four-dimensional vector of data elements stored in the memory. 4D Memory Vector Extended Data Structure Descriptor 2240 comprises Type 2241, Dimensions 2242, DF (Dimension Format) 2243, Select Stride 1 2244.1, Select Stride 2 2244.2, Select Stride 3 2244.3, Select Stride 4 2244.4, and Stride 2245. In some embodiments, 4D Memory Vector Extended Data Structure Descriptor 2240 comprises 51 bits.

In some embodiments, Type 2241 comprises a 1-bit field specifying the type of data structure. Type 2241 is "0" for all instances of 4D Memory Vector Extended Data Structure Descriptor 2240.

In some embodiments, Dimensions 2242 comprises a 20-bit field used to initialize the length of the next dimension of the vector.

In some embodiments, DF (Dimension Format) 2243 comprises a 5-bit field that, in conjunction with Length 2161 of FIG. 21D, specifies the length of each dimension of the N-dimensional vector. Conceptually, Length 2161 is divided into 6 consecutive 4-bit nibbles and each dimension is expressed using one or more of the nibbles. Bits are set in DF 2243 to indicate demarcations between the dimensions in Length 2161. For example, DF 2242 is "01110" (binary), indicating that the first dimension is expressed using two nibbles, e.g., bits [7:0], and represents a length between 1 and 128. Similarly, the second dimension is expressed using one nibble, e.g., bits [11:8], and represents a length between 1 and 4. An N-dimension vector is represented by setting (N-1) bits in DF 2242, and only the last dimension uses more than four nibbles. In some embodiments and/or usage scenarios, a one-dimensional vector is described using this format, e.g., if the vector is too long for Length 2141 (of FIG. 21C) to describe. In some embodiments and/or usage scenarios, a two-dimensional or three-dimensional vector is described using this format.

In some embodiments, Select Stride 1 2244.1 comprises a 1-bit field specifying a stride for the first dimension of the vector. If Select Stride 1 2244.1 is "0", then the stride is 1. If Select Stride 1 2244.1 is "1", then the stride is specified by Stride 2245.

In some embodiments, Select Stride 2 2244.2 comprises a 3-bit field and encodes a stride for the second dimension of the vector. If Select Stride 2 2244.2 is "0", then the stride is 1. If Select Stride 2 2244.2 is "1", then the stride is specified by Stride 2245. If Stride Select 2 2244.2 is 2-7, then the stride is specified by a corresponding (DSR) stride register (e.g., of the six stride registers of DSRs 846.

In some embodiments, Select Stride 3 2244.3 and Select Stride 4 2244.4 comprise respective 3-bit fields. In some embodiments, Select Stride 3 2244.3 and Select Stride 4 2244.4 are respectively similar in function and/or operation with respect to the third and fourth dimension as Select Stride 2 2244.2 is with respect to the second dimension.

In some embodiments, Stride 2245 comprises a 15-bit field specifying a stride of the vector in the memory. In some scenarios, Stride 2245 enables using a longer stride for a one-dimensional vector than Stride 2153 (of FIG. 21C).

FIG. 23 illustrates selected details of an embodiment of accessing operands in accordance with data structure descriptors, as Data Structure Descriptor Flow 2300. In some embodiments, actions of Data Structure Descriptor Flow 2300 are performed by a CE (e.g., CE 800).

Accessing a source operand via a data structure descriptor begins (Start 2301) by initializing one or more DSRs of a CE of a PE with respective DSDs (Set DSR(s) 2302) and optionally initializing respective XDSDs and/or stride values of the CE ((optional) Set XDSR(s) 2305). In some embodiments, the initialized DSRs (as well as the optionally initialized XDSRs and stride registers holding the stride values) are initialized by instructions that move data from memory to the DSRs. Subsequently, the CE fetches and decodes an instruction (e.g., FMACH, MOV, or LT16) comprising one or more operands specified by the initialized DSRs and optionally one or more XDSRs and/or stride registers (Fetch/Decode Instruction with DSR(s) 2303). In some embodiments, the operand type fields of the instruction specify whether an operand is specified by a DSR.

The CE reads one or more DSDs from the DSRs (Read DSR(s) 2304) and determines one or more of: the type of data structure, the source of the data element(s), whether multiple data elements are read together (e.g., for a SIMD operation), and the total number of data elements for each operand. Depending on the determination, for each DSD read, an XDSR and one or more stride registers are also optionally read ((optional) Read XDSR(s) 2306), as described with respect to FIG. 24. In some scenarios, DSRs are read for one or more of: a source0 operand, a source1 operand, and a destination operand, and are identified by respective operand fields of the instruction obtained in action 2303. In some embodiments and/or usage scenarios, any one or more of the DSRs, the XDSRs and the stride registers are read entirely or partially in parallel, and in other embodiments and/or usage scenarios, any one or more of the DSRs, the XDSRs and the stride registers are read entirely or partially sequentially.

Based upon the DSDs obtained in action 2304 (and optional XDSRs and stride values obtained in action 2306), the CE reads one or more source data element(s) from the fabric and/or memory (Read (Next) Source Data Element(s) from Queue/Memory 2310). For each source specified by the instruction obtained in action 2303 (e.g., each of source0 and source1), the CE reads sufficient elements for an iteration of the operation specified in the instruction, and in accordance with SIMD width information in the DSDs. Data element(s) from the fabric (e.g., a source data structure is a fabric vector) are accessed via one or more queues of the CE. In some embodiments and/or usage scenarios, the CE also reads data element(s) from registers.

After reading the source data element(s), the CE performs the operation using the data element(s) as inputs (Perform (Next) Operation(s) on Data Element(s) 2311). The operation is specified by the instruction obtained in action 2303 (e.g., a multiply-accumulate operation for an FMACH instruction, a move operation for a MOV instruction, or a less than integer comparison for LT16).

In some scenarios, the operation (e.g., a multiply-accumulate operation or a move operation) produces one or more output data element(s). The CE writes the output data element(s) to the fabric or the memory (Write (Next) Destination Data Element(s) to Queue/Memory 2312), based upon the DSDs obtained in action 2304 (and optional XDSRs and stride values obtained in action 2306). Data element(s) sent to the fabric (e.g., the destination data structure is a fabric vector) are formed into wavelets and transmitted to the fabric via the router of the PE. In some other scenarios, there are no output data elements (e.g., some comparison operations).

After writing any results from the operation, the CE determines if there are additional data element(s) to process (More Data Element(s)? 2313). In some embodiments, the DSD specifies the total number of data elements to access (e.g., the length of the vector) and the CE compares the number of data element(s) that have been accessed (e.g., tracked via a counter) to the total number of data element(s) specified by the length. If there are additional data element(s) to process, the CE repeats actions 2310-2313 until all data element(s) have been processed and flow concludes (End 2316).

In various embodiments and/or usage scenarios, all or any portions of any one or more of elements of Data Structure Descriptor Flow 2300 (e.g., any one or more actions of 2302-2312) correspond conceptually to and/or are related conceptually to operations performed by and/or elements of a CE, e.g., CE 800.

As an example, the source DSRs holding source DSDs (associated with Set DSR(s) 2302 and Read DSR(s) 2304) are one or more of DSRs 846 (e.g., S0DSRs, S1DSRs, DDSRs, XDSRs, and stride registers). In some embodiments, CE 800 performs Set DSR(s) 2302 responsive to instruction(s) that write DSDs into DSRs, e.g., LDS0WDS, LDS1WDS, LDXDS, and LDSR.

As another example, CE 800 performs Fetch/Decode Instruction with DSR(s) 2303. In various embodiments, PC 834 and I-Seq 836 fetch instructions from Memory 854 and Dec 840 decodes fetched instructions. In some embodiments, instructions are formatted in accordance with one of: Multiple Operand Instruction 2510 of FIG. 25A, One Source, No Destination Operand Instruction 2520 of FIG. 25B, and Immediate Instruction 2530 of FIG. 25C. In some embodiments, decoding includes detecting that an instruction operand is specified by a DSD, e.g., that the value of Operand 1 Type 2514.1 is "1".

As another example, CE 800 performs Read DSR(s) 2304 in response to an instruction with one or more operands specified by a DSR. In various embodiments, D-Seq 844 reads the DSR(s) specified by the instruction obtained in action 2303 from DSRs 846. In some embodiments, DSDs read from the DSRs are formatted in accordance with one or more of: Fabric Input Data Structure Descriptor 2100 of FIG. 21A, Fabric Output Data Structure Descriptor 2200 of FIG. 21B, 1D Memory Vector Data Structure Descriptor 2140 of FIG. 21C, 4D Memory Vector Data Structure Descriptor 2160 of FIG. 21D, and Circular Memory Buffer Data Structure Descriptor 2180 of FIG. 21E. In some embodiments and/or usage scenarios, D-Seq 844, e.g., responsive to DSDs having Type 2169 or Type 2189 specifying an XDSR, performs (optional) Read XDSR(s) 2306. In various embodiments, XDSDs read from the XDSRs are formatted in accordance with one of: Circular Memory Extended Buffer Data Structure Descriptor 2180 of FIG. 22A and 4D Memory Vector Extended Data Structure Descriptor 2160 of FIG. 22B.

As another example, CE 800 performs Read (Next) Source Data Element(s) from Queue/Memory 2310 based upon the source DSD(s) read in action 2304 and optionally XDSD(s) read in action 2306. In some scenarios, a source DSD specifies (e.g., via Type 2149) that an operand originates from memory, and D-Seq 844 reads data element(s) from D-Store 848 or Memory 854 at address(es) specified by the DSD (e.g., based in part upon one or more of: Base Address 2142, WLI 2152, and Stride 2153). In some scenarios, a source DSD specifies (e.g., via Type 2109) that an operand originates from the fabric and CE 800 reads data element(s) from one of Qs 897. In some embodiments and/or usage scenarios, data elements are directly transmitted from one of Qs 897 to Data Path 852. In other embodiments and/or usage scenarios, data elements are transmitted from one of Qs 897 to RF 842 and from RF to Data Path 852. In some embodiments, the one of Qs 897 is implicitly specified by portions of the DSD (e.g., one or more of: UTID 2102, SC 2112, and SQ 2113). In some scenarios, the CE reads from the queue associated with the color of the current task (e.g., the task associated with the instruction obtained in action 2303). In some scenarios (e.g., SQ 2113 is "1"), the CE reads from a queue specified by UTID 2102. In some scenarios (e.g., SC 2112 is "1"), the CE reads from a queue associated with the color specified by UTID 2102 concatenated with CH 2114. In some scenarios, the CE reads one, two, or four data elements from the specified queue based upon SW 2104.

In some embodiments and/or usage scenarios, when CE 800 attempts to read more data element(s) than are available in the specified queue of Qs 897, or alternatively attempts to read from an empty FIFO (e.g., as implemented in accordance with a DSD in accordance with FIG. 21E), then CE 800 stalls. In some embodiments and/or usage scenarios (e.g., microthreading), Picker 830 is enabled to select a different task from Qs 897 while waiting for the data element(s), thereby enabling CE 800 to avoid stalling.

As another example, CE 800 performs Perform (Next) Operation(s) on Data Element(s) 2311. In some embodiments, Data Path 852 uses the data element(s) read in action 2310 as inputs to the operation specified by the instruction obtained in action 2303. In some scenarios (e.g., a computational operation), action 2311 produces output data element(s), while in other scenarios (e.g., a comparison operation), action 2311 produces no output data element. In some embodiments, Data Path 852 is enabled to perform more than one operation simultaneously, e.g., performing two or four multiply-accumulate operations simultaneously using SIMD execution resources.

As another example, CE 800 performs Write (Next) Source Data Element(s) to Queue/Memory 2312 based upon the destination DSD read in action 2304 and optionally XDSD(s) read in action 2306. In some scenarios, the destination DSD specifies (e.g., via Type 2149) that an operand is destined for memory, and D-Seq 844 writes data element(s) to D-Store 848 or Memory 854 at address(es) specified by the destination DSD (e.g., based in part upon one or more of: Base Address 2142, WLI 2152, and Stride 2153).

In various embodiments and/or usage scenarios, portions of action 2312 (e.g., writing destination data elements to the fabric) correspond conceptually to and/or are related conceptually to Provide Data Element(s) as Wavelet to Router 1406 of FIG. 14. In some scenarios, a destination DSD specifies (e.g., via Type 2129) that an operand is sent to the fabric and CE 800 creates wavelet(s) (e.g., based in part upon Fabric Output Data Structure Descriptor 2120) from the data element(s) and transmits them via On Ramp 860 to Router 600 (of FIG. 6) to the fabric. In some scenarios, the CE transmits one, two, or four data elements as wavelets, based upon SW 2124 of the destination DSD.

In some embodiments and/or usage scenarios, when CE 800 attempts to transmit more wavelets than resources available in Router 600 (e.g., there are insufficient resources in Data Queues 650 of FIG. 6), or alternatively attempts to write to a full FIFO (e.g., as implemented in accordance with a DSD in accordance with FIG. 21E), then CE 800 stalls. In some embodiments and/or usage scenarios (e.g., microthreading), Picker 830 is enabled to select a different task from Qs 897 while waiting for more resources, thereby enabling CE 800 to avoid stalling.

As another example, CE 800 performs action 2313. In some embodiments, D-Seq 844 determines how many data element(s) have been processed (e.g., by incrementing a counter for each data element) and compares this against the length of the vector (e.g., Length 2101).

Figure 24:
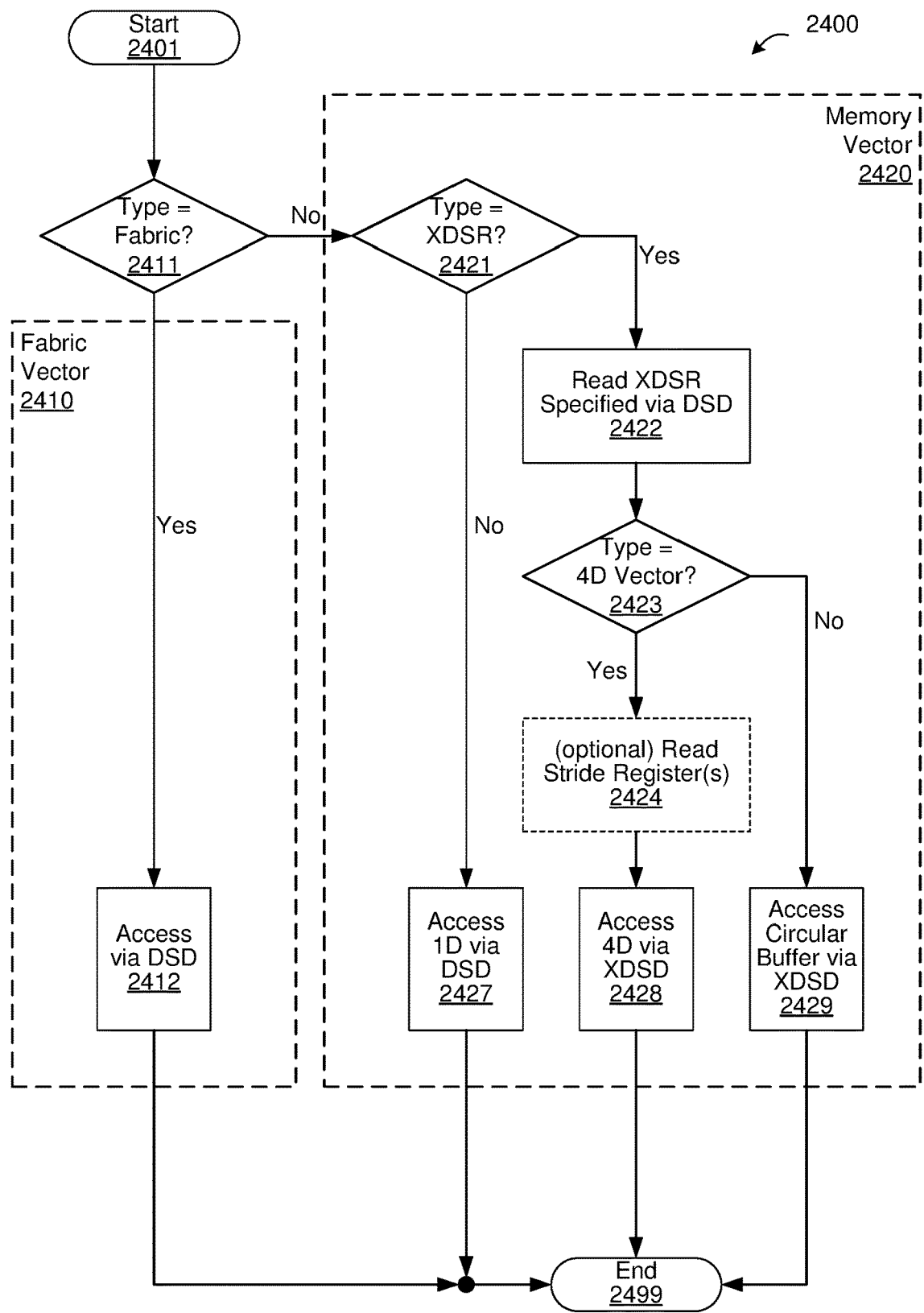
FIG. 24 illustrates selected details of an embodiment of decoding a data structure descriptor.

FIG. 24 illustrates selected details of an embodiment of decoding a data structure descriptor, as Data Structure Descriptor Decode Flow 2400. In various embodiments and/or usage scenarios, Memory Data Structure Descriptor Flow 2400 is a conceptual representation of all or any portions of actions 2304, 2306, 2310, and 2312 (of FIG. 23) as performed for each DSR describing a fabric or a memory vector. In summary, FIG. 23 illustrates fetching and decoding an instruction comprising one or more operands specified by initialized DSRs, reading the DSRs to obtain and decode corresponding DSDs, reading (next) source data elements in accordance with the DSDs, performing an operation on the source data elements, writing output data elements of the operation in accordance with the DSDs, and iterating back to reading the next source data elements until complete. FIG. 24 illustrates, for fabric vectors (Fabric Vector 2410) and memory vectors (Memory Vector 2420), further details regarding decoding the DSDs obtained from the DSRs, as well as optionally reading one or more XDSRs and stride registers to obtain and decode corresponding XDSDs and stride values, to determine memory access patterns used to access data elements of the memory vectors of the instruction (e.g., any one or more of source0, source1, and destination). Conceptually, the actions illustrated in FIG. 24 are performed for each DSD obtained via action 2304 of FIG. 23. In some embodiments, actions of Memory Data Structure Descriptor Flow 2400 are performed by a CE (e.g., CE 800).

Decoding a DSD (e.g., as obtained via action 2304 of FIG. 23) begins (Start 2401) by the CE determining whether the DSD corresponds to a fabric vector (Type=Fabric? 2411), e.g., in accordance with FIG. 21A or FIG. 21B. If so, then accesses of the operand described by the DSD proceed as a fabric vector using the DSD (Access via DSD 2412), e.g., if the operand is a source (FIG. 21A), then action 2310 (of FIG. 23) reads from the fabric in accordance with the DSD, and if the operand is a destination (FIG. 21B), then action 2312 (of FIG. 23) writes to the fabric in accordance with the DSD.

If the DSD does not correspond to a fabric vector, then the DSD corresponds to a memory vector. The CE then determines whether the DSD corresponds to a 1D memory vector (Type=XDSR? 2421), e.g., in accordance with FIG. 21C. If so, then accesses of the operand described by the DSD proceed as a 1D memory vector using the DSD (Access 1D via DSD 2427). E.g., if the operand is a source, then action 2310 reads the source from the memory in accordance with a 1D memory vector described by the DSD, and if the operand is a destination, then action 2312 writes to the memory in accordance with a 1D memory vector described by the DSD. Each iteration of data elements in FIG. 23 (actions 2310-2313) advances the operand memory addresses in accordance with the 1D memory vector described by the DSD.

If the DSD does not correspond to a 1D memory vector, then the DSD corresponds to either a 4D memory vector (e.g., in accordance with FIG. 21D) or a circular buffer (e.g., in accordance with FIG. 21E). The CE reads an XDSR specified by the DSD (Read XDSR Specified via DSD 2422, also conceptually corresponding to (optional) Read XDSR(s) 2306 of FIG. 23) to obtain an XDSD. The XDSR is specified by Type 2169 (of FIG. 21D) or Type 2189 (of FIG. 21E).

The CE then determines whether the XDSD specifies a 4D memory vector (e.g., in accordance with FIG. 22B). If so, then the CE optionally reads one or more stride registers ((optionally) Read Stride Register(s) 2424, also conceptually corresponding to (optional) Read XDSR(s) 2306 of FIG. 23), as optionally specified by the XDSD. Accesses of the operand described by the DSD, the XDSD, and any optional stride values (obtained from the stride registers) proceed as a 4D memory vector using the DSD, the XDSD, and the optional stride values (Access 4D via XDSD 2428). E.g., if the operand is a source, then action 2310 reads the source from the memory in accordance with the 4D memory vector, and if the operand is a destination, then action 2312 writes to the memory in accordance with the 4D memory vector. Each iteration of data elements in FIG. 23 (actions 2310-2313) advances the operand memory addresses in accordance with the 4D memory vector described by the DSD.

If the XDSD does not correspond to a 4D memory vector, then the XDSD corresponds to a circular buffer (e.g., in accordance with FIG. 22A). Accesses of the operand described by the DSD and the XDSD proceed as a circular buffer using the DSD and the XDSD (Access Circular Buffer via XDSD 2429). E.g., if the operand is a source, then action 2310 reads the source from the memory in accordance with the circular buffer, and if the operand is a destination, then action 2312 writes to the memory in accordance with the circular buffer. Each iteration of data elements in FIG. 23

(actions 2310-2313) advances the operand memory addresses in accordance with the circular buffer described by the DSD.

In various embodiments, D-Seq 844 performs Type=Fabric? 2411 and/or Type=XDSD? 2421 based upon a DSD read in action 2304 (of FIG. 23). In some embodiments, a type field of the DSD (e.g., Type 2109 of FIG. 21A, Type 2129 of FIG. 21B, Type 2149 of FIG. 21C, Type 2169 of FIG. 21D, and Type 2189 of FIG. 21E) determines if the data structure is one of: a fabric vector (e.g., the Type="0"), a 1D vector (e.g., the Type="1"), and an XDSD type (e.g., the Type="2-7"). In various embodiments (e.g., the Type="2-7"), the value of the type field specifies which XDSR of DSRs 846 to read for action 2422. In some embodiments, D-Seq 844 performs action 2422 and receives the XDSD from DSRs 846. In some other embodiments, DSRs 846 performs actions 2421 and 2422 and transmits the DSD and the XDSD to D-Seq 844.

As another example, D-Seq 844 performs Type=4D Vector? 2423 based upon the XDSD of action 2422. In some embodiments, the type field of the XDSD (e.g., Type 2211 of FIG. 22A or Type 2241 of FIG. 22B) read from the XDSR determines if the data structure is one of a 4D vector (e.g., the XDSD Type="0") and a circular buffer (the XDSD Type="1").

As another example, D-Seq 844 generates memory access(es) in accordance with action 2427 by computing the memory address(es) based upon the DSD (e.g., of action 2304), using e.g., Base Address 2142, WLI 2152, Length 2141, and Stride 2153 of the DSD, as described elsewhere herein. Similarly, D-Seq 844 generates memory access(es) in accordance with action 2428 by computing the memory address(es) based upon the DSD (e.g., of action 2404) and XDSD of action 2422 using e.g., Base Address 2162, Length 2161, WLI 2172, Stride 2245, Stride Select 1 2244.1, and DF 2243 of the DSD and the XDSD, as described elsewhere herein. Similarly, D-Seq 844 generates memory access(es) in accordance with action 2429 by computing the memory address(es) based upon the DSD (e.g., of action 2404) and XDSD of action 2422 using e.g., Base Address 2182, Length 2181, WLI 2192, Start Address 2212, and End Address 2213 of the DSD and the XDSD, as described elsewhere herein.

In some embodiments, D-Seq 844 sends each computed address to one of D-Store 848 and Memory 854. In response to receiving a computed address, the D-Store and/or the Memory accesses two bytes of data at the computed address.

Instruction Formats

Figure 25A:
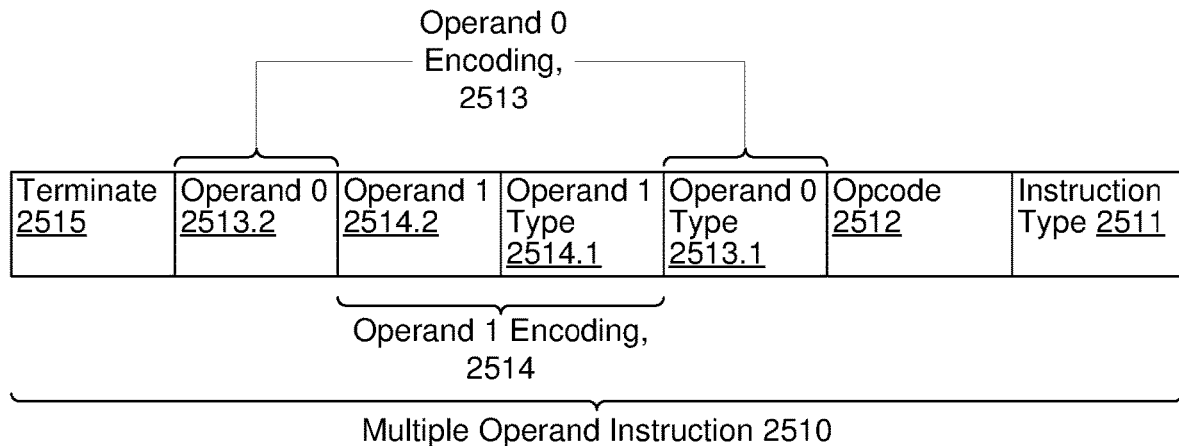
FIG. 25A illustrates selected details of an embodiment of a multiple operand instruction.
Figure 25B:
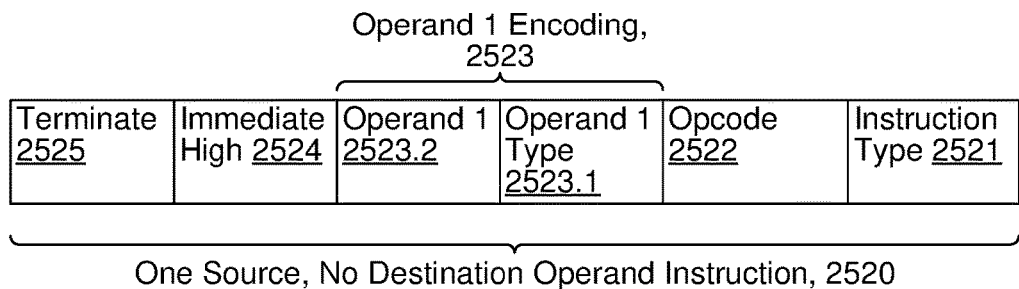
FIG. 25B illustrates selected details of an embodiment of a one source, no destination operand instruction.
Figure 25C:
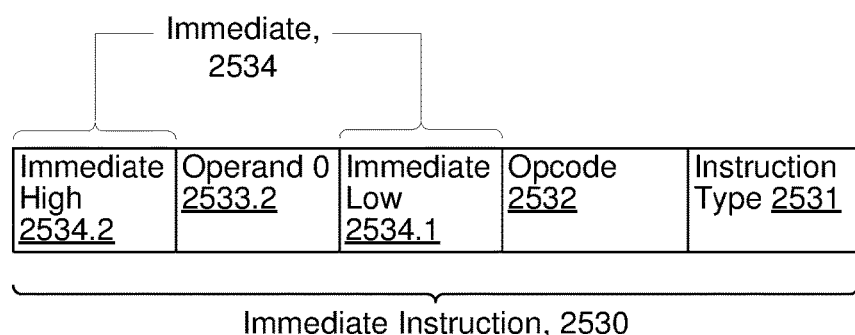
FIG. 25C illustrates selected details of an embodiment of an immediate instruction.

Each element identifier in the description of FIGS. 25A-C having a first digit of "8" refers to an element of FIG. 8, and for brevity is not otherwise specifically identified as being an element of FIG. 8.

FIG. 25A illustrates selected details of an embodiment of a multiple operand instruction, as Multiple Operand Instruction 2510. Multiple Operand Instruction 2510 is one of: a two/three source, one destination operand instruction (e.g., a multiply-add such as FMACH), a two source, no destination operand instruction (e.g., a comparison such as LT16), and a one source, one destination operand instruction (e.g., a move instruction such as MOV16).

Multiple Operand Instruction 2510 comprises various fields: Instruction Type 2511, Opcode 2512, Operand 0 Encoding 2513, Operand 1 Encoding 2514, and Terminate 2515. Operand 0 Encoding 2513 comprises Operand 0 Type 2513.1 and Operand 0 2513.2. Operand 1 Encoding 2514 comprises Operand 1 Type 2514.1 and Operand 1 2514.2. In some embodiments, Multiple Operand Instruction 2510 comprises 20 bits.

In some embodiments, the value of Instruction Type 2511 distinguishes between different types of instructions (e.g., two/three source, one destination and one source, and one destination instruction types) according to the table following. In various embodiments, the value of Opcode 2512 specifies a particular operation (e.g., multiply, add, or subtract). The length of Opcode 2512 varies between different types of instructions as described in the table following.

| Instruction Family | Value of Instruction Type 2511 | Length of Opcode 2522 |
|---|---|---|
| Two/three source, one destination | 10 | 5 bits |
| Two source, no destination | 1110 | 4 bits |
| One source, one destination | 110 | 5 bits |

In some embodiments, Operand 0 Encoding 2513 describes a source and/or destination operand, according to the table following. In some embodiments, Operand 1 Encoding 2714 describes a source operand.

| Instruction Family | Operand 0 Encoding 2513 | Operand 1 Encoding 2514 |
|---|---|---|
| Two/three source, one destination | Source0 and destination | Source1 |
| Two source, no destination | Source0 | Source1 |
| One source, one destination | Destination | Source1 |

In some embodiments, Operand 0 2513.2 and Operand 1 2514.2 comprise respective 4-bit fields. In some embodiments, Operand 0 Type 2513.1 and Operand 1 Type 2514.1 comprise respective 2-bit fields and respectively determine how to interpret Operand 0 2513.2 and Operand 1 2514.2. For a two/three source operand, one destination operand instruction, Operand 0 Type 2513.1 is interpreted according to the table following.

| Value of 2513.1 | Operand 0 Encoding 2513 |
|---|---|
| 0 | Source0 is S0DSR[Operand 0 2513.2], destination is S0DSR[Operand 0 2513.1] |
| 1 | Source0 is S0DSR[Operand 0 2513.2], destination is DDSR[Operand 0 2513.1] |
| 2 | Source0 is GPR[Operand 0 2513.2], destination is GPR[Operand 0 2513.1] |
| 3 | Source0 is GPR[Operand 0 2513.2], destination is DDSR[Operand 0 2513.1] if Operand 1 Type 2514.1 is 0, destination is GPR[0] otherwise |

For example, if the value of Operand 0 Type 2513.1 is "1" and the value of Operand 0 2513.2 is "4", then Operand 0 Encoding 2513 specifies that the source0 operand is a vector described by S0DSR[4] and the destination operand is a vector described by DDSR[4].

For a two source operand, no destination operand instruction, Operand 0 Type 2513.1 is interpreted according to the table following.

| Value of 2513.1 | Operand 0 Encoding 2513 |
|---|---|
| 0 | Source0 is S0DSR[Operand 0 2513.2] |
| 1 | Source0 is GPR[Operand 0 2513.2] |

For example, if the value of Operand 0 Type 2513.1 is "0" and the value of Operand 0 2513.2 is "4", then Operand 0 Encoding 2513 specifies that the source0 operand is a vector described by S0DSR[4].

For a one source operand, one destination operand instruction, Operand 0 Type 2513.1 is interpreted according to the table following.

| Value of 2513.1 | Operand 0 Encoding 2513 |
|---|---|
| 0 | Destination is DDSR[Operand 0 2513.2] |
| 1 | Destination is GPR[Operand 0 2513.2] |

For example, if the value of Operand 0 Type 2513.1 is "0" and the value of Operand 0 2513.2 is "4", then Operand 0 Encoding 2513 specifies that the destination operand is a vector described by DDSR[4].

For Multiple Operand Instruction 2510, Operand 1 Type 2514.1 is interpreted according to the table following.

| Value of 2514.1 | Operand 1 Encoding 2514 |
|---|---|
| 0 | Source1 is S1DSR[Operand 1 2514.2] |
| 1 | Source1 is the data in memory at the address specified by GPR[6] |
| 2 | Source1 is GPR[Operand 1 2514.2] |
| 3 | Source1 is an immediate |

For example, if the value of Operand 0 Type 2513.1 is "0" and the value of Operand 0 2513.2 is "4", then Operand 0 Encoding 2513 specifies that the destination operand is a vector described by DDSR[4].

In various embodiments, a source1 operand that is an immediate specifies one of: several predetermined values (e.g., 0, 1, and −1) and a pseudo-random number generated by an LFSR. For example, if the value of Operand 1 Type 2514.1 is "3" and the value of Operand 1 2514.2 is "8", then Operand 1 Encoding 2514 specifies a PRNG generated by an LFSR.

In some embodiments, Terminate 2515 comprises a 1-bit field specifying that the instruction is the last instruction in a task. When the instruction finishes execution, the task is terminated, enabling selection and execution of a new task (e.g., via Terminate 812 and Picker 830).

FIG. 25B illustrates selected details of an embodiment of a one source, no destination operand instruction, as One Source, No Destination Instruction 2520. One Source, No Destination Instruction 2520 comprises Instruction Type 2521, Opcode 2522, Operand 1 Encoding 2523, Immediate High 2524, and Terminate 2525. Operand 1 Encoding 2523 describes a source operand and comprises Operand 1 Type 2523.1 and Operand 1 2523.2. In some embodiments, One Source, No Destination Instruction 2520 comprises 20 bits.

In some embodiments, Instruction Type 2521 comprises four bits, "1111", specifying that the instruction is a one source, no destination operand instruction, and Opcode 2522 comprises a 4-bit field specifying a particular operation (e.g., block, unblock, activate, set active PRNG, data filter, conditional branch, and jump).

In some embodiments, Immediate High 2524 comprises a 4-bit field. In some scenarios, Immediate High 2524 concatenated with Operand 1 2523.2 forms an 8-bit immediate.

In some embodiments, Operand 1 Type 2523.1 comprises a 2-bit field that determines how Operand 1 2523.2 is interpreted. If Operand 1 Type 2523.1 is "0", then Operand 1 Encoding 2523 specifies a vector (e.g., a fabric vector of data elements from Qs 897, or a memory vector of data elements in one of Memory 854 and D-Store 854) and the value of Operand 1 2523.2 identifies which one of the 12 S1DSRs of DSRs 846 describe the vector. If Operand 1 Type 2523.1 is "1", then Operand 1 Encoding 2523 describes a value in memory (e.g., one of Memory 854 and D-Store 848) at an 8-bit address formed by a concatenation of Immediate High 2524 with Operand 1 2523.2. If Operand 1 Type 2523.1 is "2", then Operand 1 Encoding 2523 describes a value in a register (e.g., one of RF 842) identified by the value of Operand 1 2523.2. If Operand 1 Type 2523.1 is "3", then Operand 1 Encoding 2523 describes an immediate. If Opcode 2522 specifies an operation (e.g., block, unblock, or activate) that operates on 16-bit integer operands, then the immediate comprises eight bits and is a concatenation of Immediate High 2524 and Operand 1 2523.2.

In some embodiments, Terminate 2525 comprises a 1-bit field specifying that the instruction is the last instruction in a task. When the instruction finishes execution, the task is terminated, enabling selection and execution of a new task (e.g., via Terminate 812 and Picker 830. If One Source, No Destination Instruction 2520 is a conditional branch, then the task is only terminated if the conditional branch is not taken.

FIG. 25C illustrates selected details of an embodiment of an immediate instruction, as Immediate Instruction 2530. Immediate Instruction 2530 comprises Instruction Type 2531, Opcode 2532, Operand 0 2533.2, and Immediate 2534. In some embodiments, Immediate Low 2534.1 comprises a 9-bit field and Immediate High 2534.2 comprises a 1-bit field. The concatenation of Immediate Low 2534.1 and Immediate High 2534.2 is collectively referred to (and illustrated as) as Immediate 2534. In some embodiments, Immediate Instruction 2520 comprises 20 bits.

In some embodiments, Instruction Type 2531 comprises a 1-bit field, "0", specifying that the instruction is an immediate instruction, and Opcode 2532 comprises a 5-bit field specifying a particular operation (e.g., load source0 DSR, load source1 DSR, load destination DSR, store source0 DSR, store source1 DSR, and store destination DSR). In some scenarios, execution of an Immediate Instruction 2530 (e.g., a load DSR instruction, and a load XDSR instruction) loads data from one of Memory 854 and D-Store 848 to a DSR of DSRs 846. In other scenarios, execution of an Immediate Instruction 2530 (e.g., a store DSR instruction, and a store XDSR instruction) stores data from a DSR of DSRs 846 to one of Memory 854 and D-Store 848.

In some embodiments, Operand 0 2533.2 comprises a 4-bit field and Opcode 2532 determines how Operand 0 2533.2 is interpreted. In some scenarios (e.g., if Operand 0 2533.2 specifies an operation without a register operand such as a jump operation), Immediate Low 2534.1, Operand 0 2533.2, and Immediate High 2534.2 are concatenated to form a 14-bit immediate. In some other scenarios, Immediate 2534 is sign extended to form a 16-bit immediate. In yet other scenarios, Immediate 2534 is sign extended to form a 15-bit address. In yet other scenarios, Immediate 2534 is shifted one bit to the left and sign extended to form a 15-bit address (e.g., for 32-bit data).

Deep Learning Accelerator Example Uses

In various embodiments and/or usage scenarios, as described elsewhere herein, a deep learning accelerator, such as a fabric of PEs (e.g., as implemented via wafer-scale integration and as illustrated, for example, in FIG. 4) is usable to train a neural network, and/or to perform inferences with respect to a trained neural network. The training, in some circumstances, comprises determining weights of the neural network in response to training stimuli. Various techniques are usable for the training, such as Stochastic Gradient Descent (SGD), Mini-Batch Gradient Descent (MBGD), Continuous Propagation Gradient Descent (CPGD), and Reverse CheckPoint (RCP). Following, CPGD is contrasted with other techniques, and then each of SGD, MBGD, CPGD, and RCP are described in more detail.

Past deep neural network training approaches (e.g., SGD and MBGD) have used so-called anchored-delta learning. That is, the delta derived weight updates have been 'anchored' or held fixed until processing of all activations for a training set batch or a mini-batch are completed. In some circumstances, the layer-sequential nature of anchored-delta learning resulted in high-latency sequential parameter updates (including for example, weight updates), which in turn led to slow convergence. In some circumstances, anchored-delta learning has limited layer-parallelism and thus limited concurrency.

In contrast, in some circumstances, use of a continuous propagation (aka immediate-delta) learning rule for deep neural network training, as taught herein, provides faster convergence, decreases the latency of parameter updates, and increases concurrency by enabling layer-parallelism. Deltas computed from the immediate network parameters use updated information corresponding to the current parameter slope. Continuous propagation enables layer parallelism by enabling each layer to learn concurrently with others without explicit synchronization. As a result, parallelization along the depth of a network enables more computing resources to be applied to training Parallelism available in continuous propagation realizes up to a 10× wall clock time improvement, as compared to MBGD techniques, in some usage scenarios. The continuous propagation approach also enables avoiding using extra memory to store the model parameter values for multiple vectors of activations.

In some embodiments and/or usage scenarios, a neural network is trained using continuous propagation of stimuli to perform SGD. In some embodiments of training via CPGD, RCP enables reducing the number of activations held in memory (thus reducing the memory footprint) by recomputing selected activations. In some scenarios, recomputing activations also improves the accuracy of the training estimates for the weights. In training without RCP, every layer of neurons receives activations during one or more forward passes, and saves the activations to re-use for computations performed during the one or more backward passes associated with the forward passes (e.g., the one or more delta, chain, and weight update passes associated with the forward passes). In some scenarios (e.g., relatively deep neural networks), the time between saving the activations and the associated backward pass is relatively long and saving all activations uses relatively more memory than saving fewer than all the activations.

For example, only some of the layers of neurons (e.g., every even layer) save the respective activations and the other layers discard the respective activations (e.g., every odd layer). The layers with saved activations (e.g., every even layer) use the most recent weights to recompute and transmit the recomputed activations to the layers that discarded activations (e.g., every odd layer). In some scenarios, the recomputed activations differ from the discarded activations because the most recent weights are different from the weights that were available during the forward pass (e.g., one or more weight updates occurred between the forward pass and the associated backward pass). In various embodiments, the number and type of layers that save and discard activations is selected to optimize for the desired balance of reduced memory usage and increased computation. As one example, every fourth layer saves activations and all other layers discard activations. As another example, convolutional layers are selected to save activations and other layers are selected to discard activations.

In various embodiments and/or usage scenarios, any one or more of SGD, MBGD, and CPGD, with or without RCP, are implemented via one or more of: a fabric of processing elements (e.g., as illustrated in FIG. 4), one or more GPUs, one or more CPUs, one or more DSPs, one or more FPGAs, and one or more ASICs.

SGD, e.g., with back-propagation, is usable (as described elsewhere herein) for training a neural network. However, learning via gradient descent is inherently sequential, because each weight update uses information from a gradient measurement made after completion of a full forward pass through the neural network. Further, weight updates are made during a corresponding backward pass through the neural network (following and corresponding to the forward pass), and thus the last weight update occurs after completion of the entire corresponding backward pass.

MBGD enables more parallelism than SGD by gradient averaging over a mini-batch, processing several (a 'mini-batch' of) activations in parallel. However, speed of sequential updates, compared to SGD, is unchanged, and weight updates, as in SGD, are completed after completion of all corresponding backward passes through the neural network. As mini-batch size increases by processing more activations in parallel, gradient noise is reduced. Beyond a point the reduction in gradient noise, in some scenarios, results in poor generalization.

CPGD enables parallel processing and updating of weights in all layers of a neural network, while activations propagate through the layers in a stream. Thus CPGD overcomes, in some embodiments and/or usage scenarios, sequential processing limitations of SGD and MBGD.

RCP enables reduced memory usage via (re)computing activations that would otherwise be stored, and is usable in combination with SGD, MBGD, and CPGD.

Pipeline flow diagrams are usable to compare and contrast various SGD, MBGD, CPGD, and CPGD with RCP techniques. Information flows and concurrency in training techniques are visible with the pipeline flow diagrams FIGS. 26A-D illustrate embodiments of pipeline flows for layers of a neural network flow from left to right, e.g., activations enter from the left and forward pass propagation of layer computations flows to the right. A gradient computation is performed in the rightmost layer to begin the backward pass propagation of layer computations including weight updates from right to left. Time advances from top to bottom.

Figure 26A:
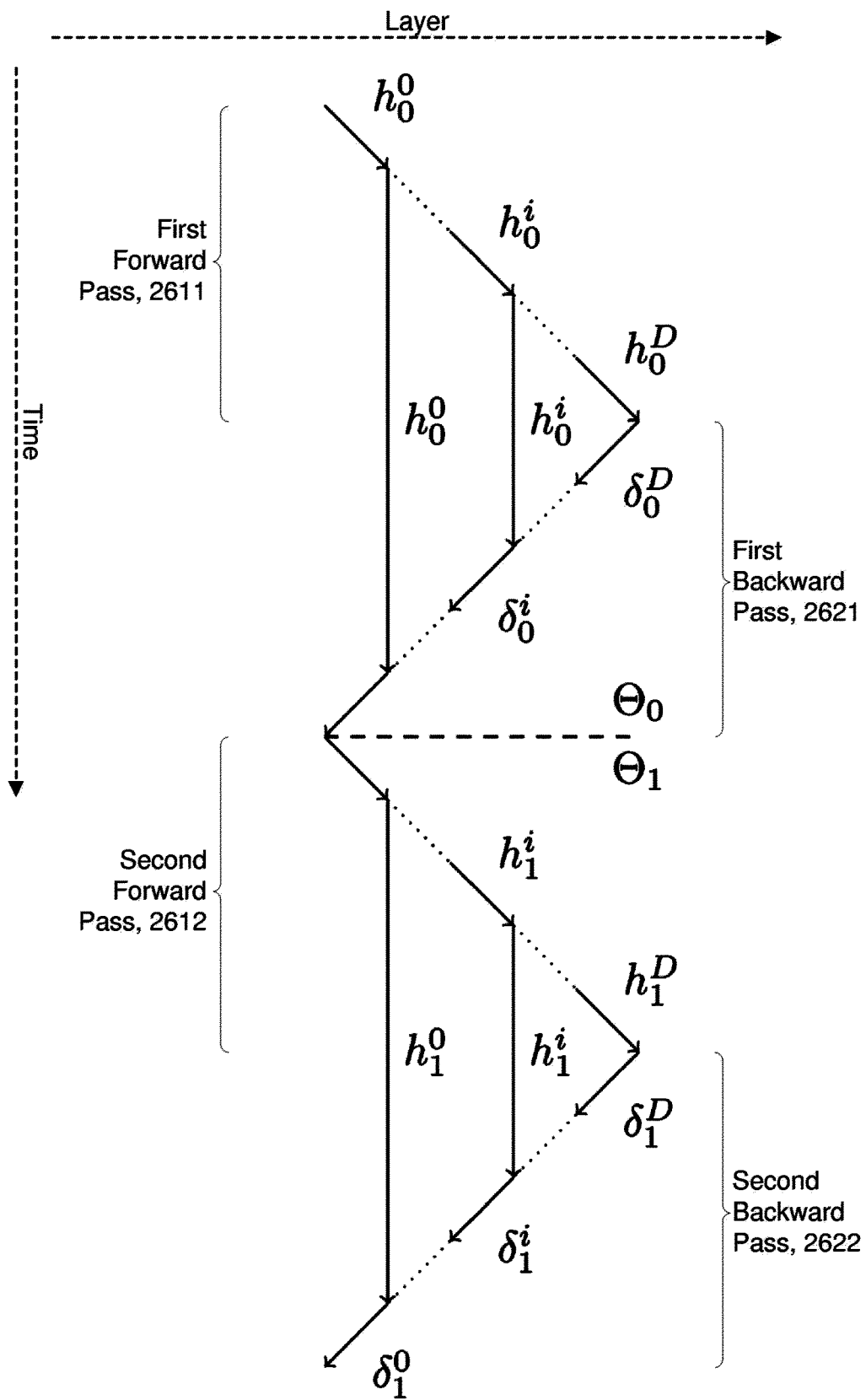
FIG. 26A illustrates an embodiment of a pipeline flow for Stochastic Gradient Descent (SGD).

FIG. 26A illustrates an embodiment of a pipeline flow for SGD. Weight updates of layers of a neural network are completed after completion of a corresponding full forward pass and a corresponding full backward pass through all the layers of the neural network. A next forward pass begins only after completion of weight updates corresponding with an immediately preceding forward pass. As illustrated, First Forward Pass 2611 is performed (from the first layer to the last layer, illustrated left to right in the figure). Then First Backward Pass 2621 is performed (from the last layer to the first layer, illustrated right to left in the figure). During First Backward Pass 2621, weights are updated, from the last layer to the first layer. The last weight update (of the first layer) is completed as First Backward Pass 2621 completes. Then Second Forward Pass 2612 is performed (using the weights updated during First Backward Pass 2621), followed by Second Backward Pass 2622, during which weight updates are performed.

Figure 26B:
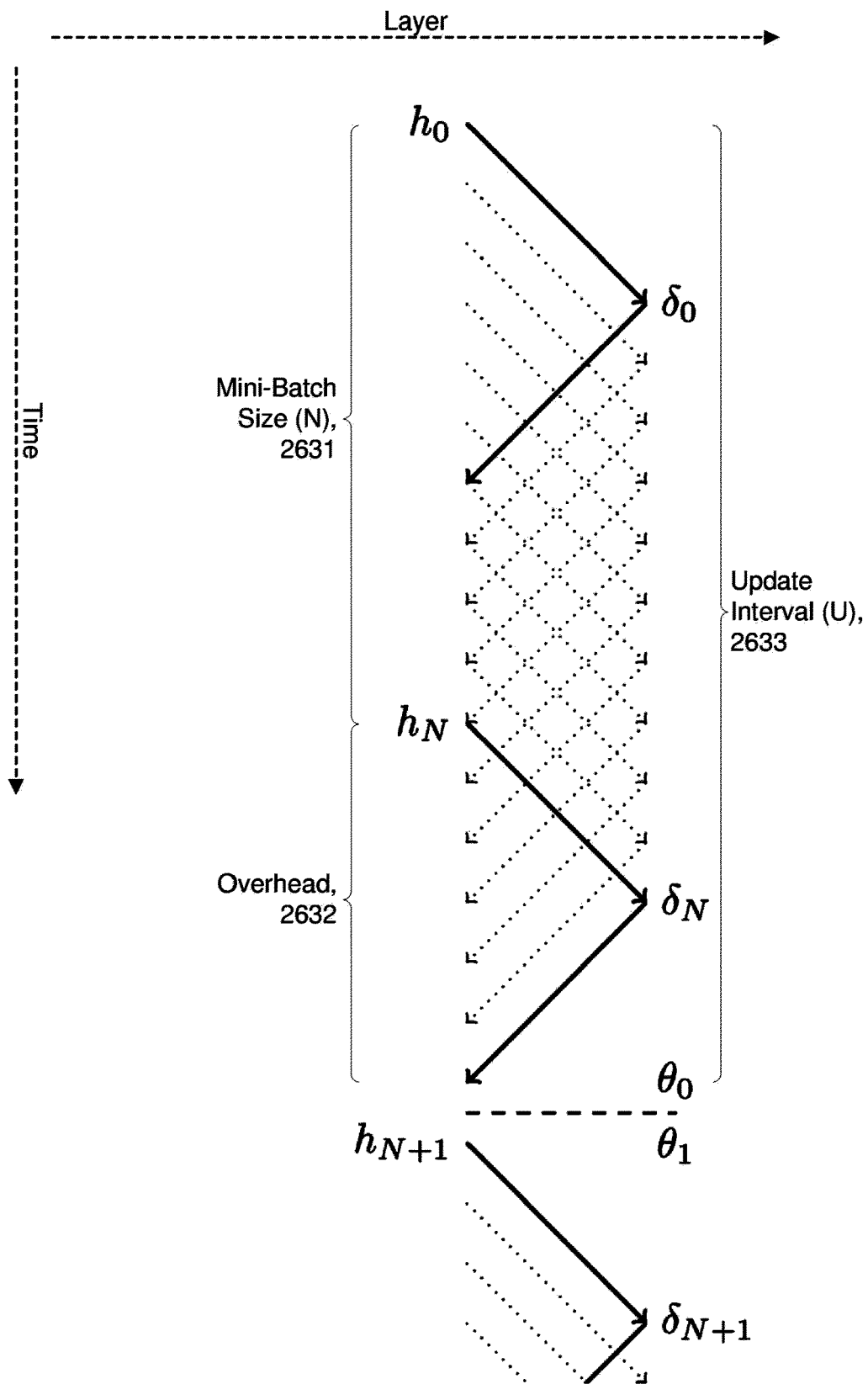
FIG. 26B illustrates an embodiment of a pipeline flow for Mini-Batch Gradient Descent (MBGD).

FIG. 26B illustrates an embodiment of a pipeline flow for MBGD. A plurality of activations are processed with identical weights. Coordinated quiet times are used to synchronize weight updates. In some embodiments and/or usage scenarios, MBGD processing is characterized by Mini-Batch Size (N) 2631, Overhead 2632, and Update Interval (U) 2633.

Unlike gradient-descent techniques (e.g., SGD and MBGD) that use a full forward pass and a full backward pass through a network to compute a gradient estimate, and thus result in a sequential dependency, CPGD uses a differential construction to replace the sequential dependency with a continuous model that has sustained gradient generation. In some embodiments and/or usage scenarios, CPGD enables layer parallelism by enabling each layer of a neural network to be trained (e.g., to 'learn') concurrently with others of the layers without explicit synchronization. Thus, parallelization along the depth of a neural network enables applying more computing resources to training In various embodiments and/or usage scenarios, CPGD provides comparable accuracy and improved convergence rate expressed in epochs of training compared to other techniques.

Figure 26C:
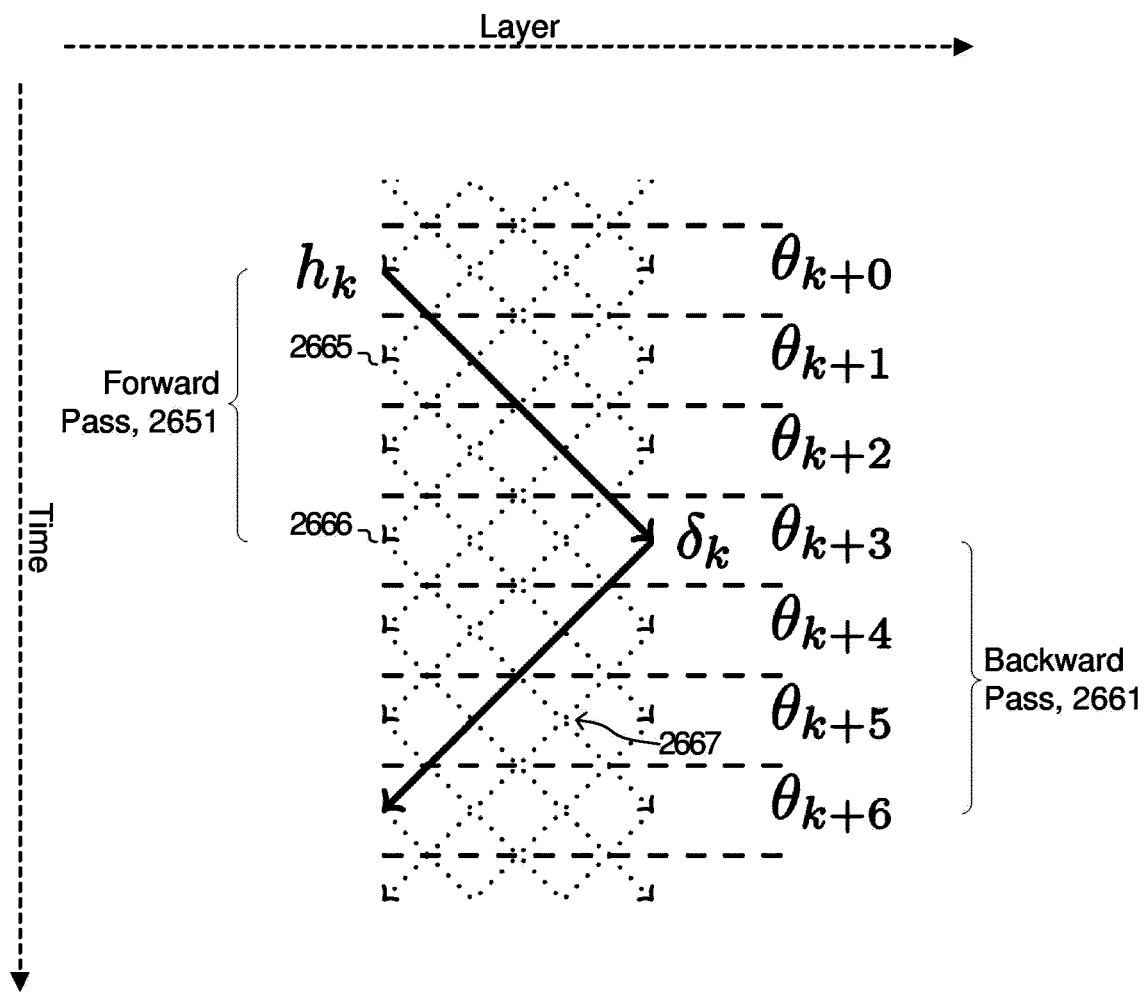
FIG. 26C illustrates an embodiment of a pipeline flow for Continuous Propagation Gradient Descent (CPGD).

FIG. 26C illustrates an embodiment of a pipeline flow for CPGD. CPGD processing maintains a model in flux. Hidden representations and deltas enter every layer at every time step, and weights update at every time step. The CPGD processing is a coordinated synchronous operation. In some embodiments and/or usage scenarios, CPGD processing is characterized by Forward Pass 2651 and a corresponding Backward Pass 2661, respectively representing one of a number of forward passes and one of a number of corresponding backward passes. In operation, respective forward passes of a plurality of forward passes operate in parallel with each other, respective backward passes of a plurality of backward passes operate in parallel with each other, and the pluralities of forward passes and the pluralities of backward passes operate in parallel with each other. Weight updates (made during backward passes) are used by forward passes and backward passes as soon as the weight updates are available.

As a specific example, Forward Pass 2665 begins, and later Forward Pass 2666 begins. At least a portion of Forward Pass 2665 operates in parallel with at least a portion of Forward Pass 2666. At least a portion of a corresponding backward pass for Forward Pass 2665 operates in parallel with at least a portion of Forward Pass 2666. Further, the corresponding backward pass completes at least some weight updates that are used by Forward Pass 2666, as shown by example Weight Update Use 2667.

Figure 26D:
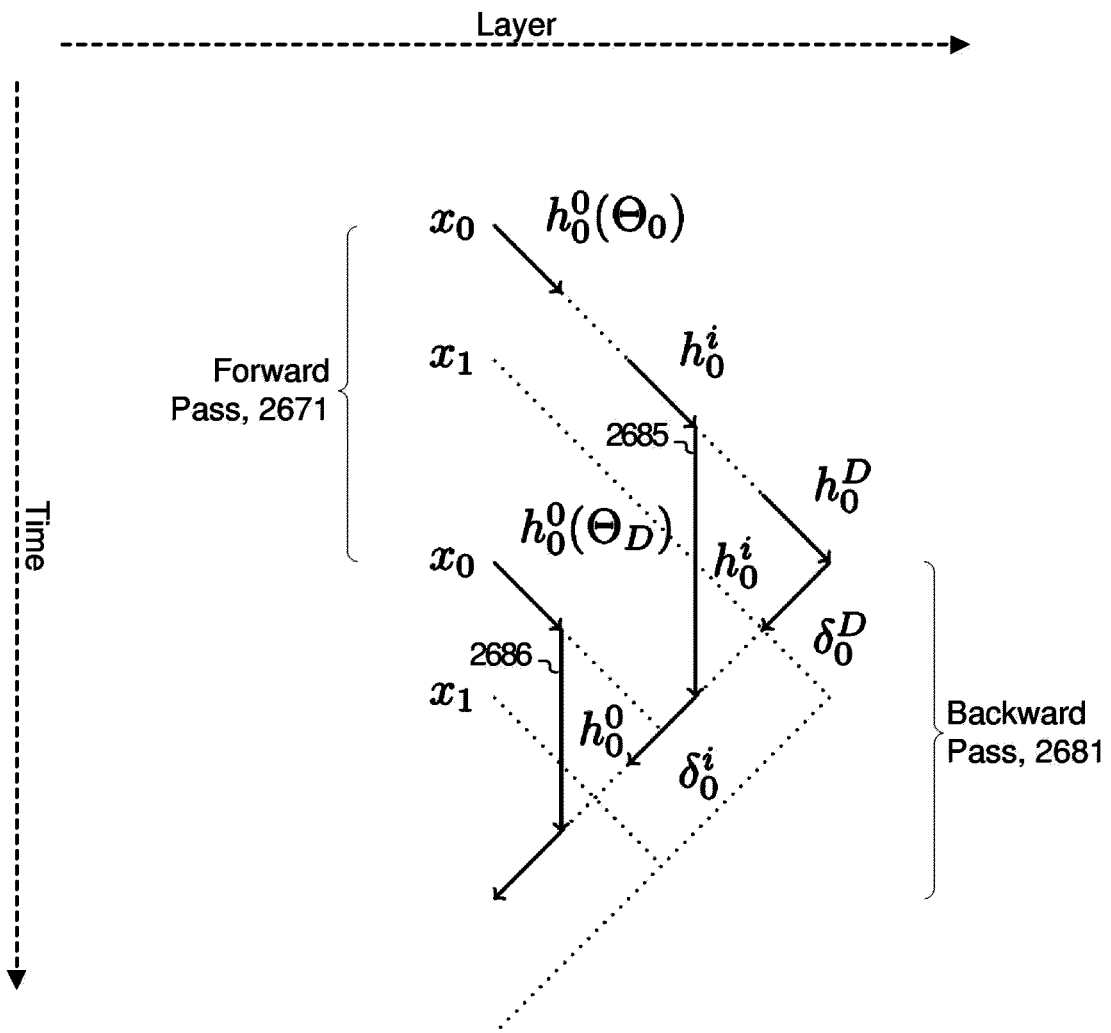
FIG. 26D illustrates an embodiment of a pipeline flow for Continuous Propagation Gradient Descent (CPGD) with Reverse CheckPoint (RCP).

FIG. 26D illustrates an embodiment of a pipeline flow for CPGD with RCP. CPGD with RCP omits saving selected activations, instead recomputing the selected activations. In some embodiments and/or usage scenarios, the recomputing is performed with updated weights. Thus, reverse checkpoint enables reduced memory (illustrated as reduced area covered by vertical lines passing saved hidden representations forward in time) and reduces time disparity between calculated hidden representations and corresponding deltas.

As a specific example, CPGD with RCP processing is characterized by Forward Pass 2671 and a corresponding Backward Pass 2681. A first activation is computed during the Forward Pass and stored in a layer for use in the corresponding Backward Pass, as illustrated by Activation Storage 2685. Activation Storage 2685 is occupied during portions of Forward Pass and Backward Pass and unavailable for other uses. A specific example of memory reduction is illustrated by Recomputed Activation Storage 2686. A second activation is computed during the Forward Pass, but is discarded and does not require any storage. During the Backward Pass the second activation is recomputed and stored in a layer for use in the Backward Pass as illustrated by Recomputed Activation Storage 2686. Recomputed Activation Storage 2686 is unoccupied throughout the entire Forward Pass and available for other uses (e.g., other forward passes, other backward passes), thereby reducing the memory required.

Considering parallelization more generally, in some embodiments and/or usage scenarios, parallelizing a computation (e.g., neural network training) spreads the computation over separate computation units operating simultaneously. In a model-parallel regime, separate units simultaneously evaluate a same neural network using distinct model parameters. In a data-parallel regime, separate workers simultaneously evaluate distinct network inputs using the same formal model parameters. Some scaling techniques use fine-grained data parallelism across layers and among units in a cluster.

MBGD, in some embodiments and/or usage scenarios, improves accuracy of a gradient estimate as a function of a mini-batch size, n. However, computation to perform MBGD for mini-batch size n is approximately equal to computation to perform SGD for n steps. In some situations, SGD for n steps is more efficient than MBGD for a mini-batch size n by approximately the square root of n. Thus, higher parallelism (e.g., as in MBGD) and higher efficiency (e.g., as in SGD) are sometimes mutually exclusive.

In some embodiments and/or usage scenarios, a deep neural network is a high-dimensional parameterized function, sometimes expressed as a directed acyclic graph. Back propagation techniques are sometimes expressed by a cyclic graph. The cycle in the graph is a feedback iteration. Gradients produced by a first full network evaluation change weights used in a next iteration, because the iteration is a discrete approximation of a continuous differential system. The discrete approximation comprises an unbiased continuous-noise process with time-varying statistics. The noise process provides regularization to enable the continuous system to model phenomena observed in discrete-time learning systems. In the discrete case, regularization is provided by a sampling procedure (e.g., SGD), by learning rate, and/or by other explicit mechanisms. A time-dependent noise process enables using a learning-rate schedule that erases local high-frequency contours in parameter space. As a correct region is approached, regularization is reduced, leading, in some circumstances, to a better final solution.

CPGD, in a conceptual framework of an arbitrary feedforward neural network, expresses all nodes as functions of time and applies functional composition to formulate representations in terms of internal state and stimuli the internal state is subjected to. A factorization results with individual layers as systems with independent local dynamics. Two dimensions are depth of the network and time evolution of parameters. In some embodiments and/or usage scenarios implementing acceleration by mapping network layers to computational units separated in space, there is latency communicating between the network layers. Thus there is a time delay communicating between the layers. Some implementations of CPGD are synchronous implementations that account for the time delays.

During CPGD processing, an activation vector and associated hidden representations are combined with model parameters at different time steps during the forward pass of the activation vector. The difference between model parameters at different time steps versus a same time step is not detectable by the activation vector going forward. Conceptually it is as if a fixed set of parameters from successive time steps were used to form an aggregate parameter state that is then used for learning.

There is a choice during the backward pass (e.g., delta propagation) to use either immediate parameters (e.g., weights) after updating or to retrieve historical parameters anchored to when the corresponding forward pass was performed. Deltas computed from the immediate parameters use updated information corresponding to a current parameter slope. Some embodiments and/or usage scenarios use immediate parameters. Some embodiments and/or usage scenarios use historical parameters.

Some implementations of CPGD use memory on an order similar to SGD. Reverse checkpoint (as described elsewhere herein) is usable with CPGD, such as to reduce memory usage. Some embodiments and/or usage scenarios of reverse checkpoint use immediate parameters (e.g., weights) to recompute activations. Some embodiments and/or usage scenarios of reverse checkpoint use historical parameters to recompute activations. In some embodiments and/or usage scenarios using immediate parameters to recompute activations, a time disparity between parameters used for computing forward propagating activations and backward-propagating deltas is reduced in the aligning wavefronts.

Continuous propagation techniques are usable in conjunction with mini-batch style processing (e.g., MBGD). In some embodiments and/or usage scenarios, a subsequent batch is started before an immediately preceding batch is completed, conceptually similar to asynchronous SGD. Parameter inconsistency within the pipeline is limited to no more than one batch boundary.

In some embodiments and/or usage scenarios, enabling data to stream through a neural network and to perform computations without a global synchronization boundary, enables extracting learning information not otherwise extracted. In some embodiments and/or usage scenarios, a lower learning rate dominates using larger batch sizes. In some embodiments and/or usage scenarios, hidden activity and/or delta arcs are conceptually interpreted as individual vectors or alternatively batch matrices. The batch matrices interpretation enables implementing techniques as described herein directly on GPUs, CPUs, DSPs, FPGAs, and/or ASICs.

FIGS. 27A-27E illustrate various aspects of forward pass and backward pass embodiments in accordance with SGD, MBGD, CPGD, and RCP processing. In the figures, two layers of neurons are illustrated, representing respective layers of, e.g., a portion of a deep neural network. In various embodiments and/or usage scenarios, the deep neural network comprises thousands or more layers and thousands or more neurons per layer. In various embodiments and/or usages scenarios, the first layer is an input layer receiving activations for training from an agent external to the deep neural network. In various embodiments and/or usage scenarios, the second layer is an output layer where the forward pass completes, and the backward pass begins. In various embodiments and/or usage scenarios, the first layer and the second layer are internal layers.

Figure 27A:
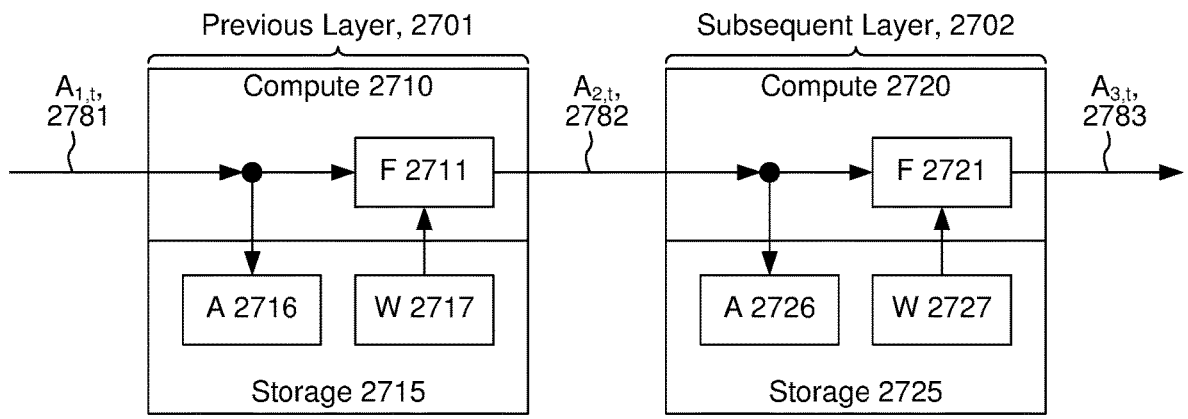
FIGS. 27A-27E illustrate various aspects of forward pass and backward pass embodiments in accordance with SGD, MBGD, CPGD, and RCP processing.
Figure 27B:
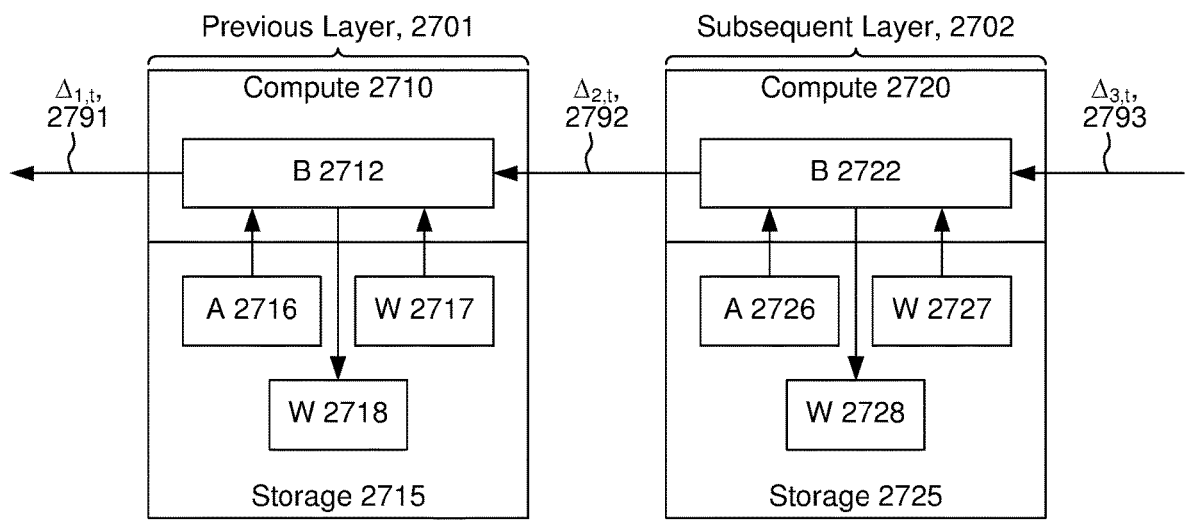

FIG. 27A and FIG. 27B respectively illustrate forward pass and backward pass embodiments in accordance with SGD, MBGD, and CPGD, without RCP. The two layers are illustrated as Previous Layer 2701 and Subsequent Layer 2702. Previous Layer 2701 comprises Compute 2710 and Storage 2715. Subsequent Layer 2702 comprises Compute 2720 and Storage 2725. Compute 2710 and Compute 2720 are examples of compute resources and Storage 2715 and Storage 2725 are examples of storage resources.

Figure 27C:
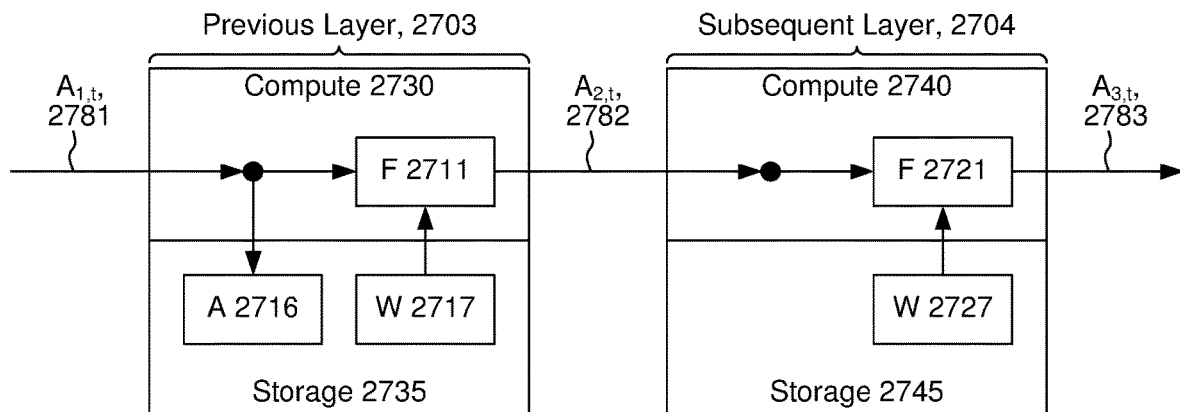
Figure 27D:
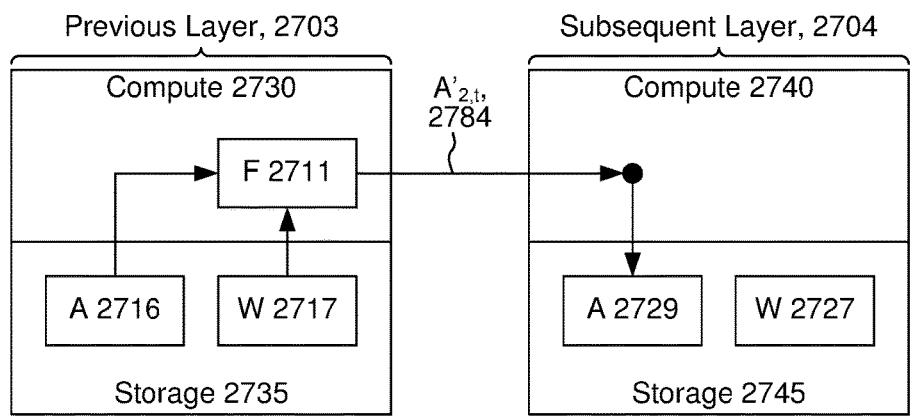
Figure 27E:
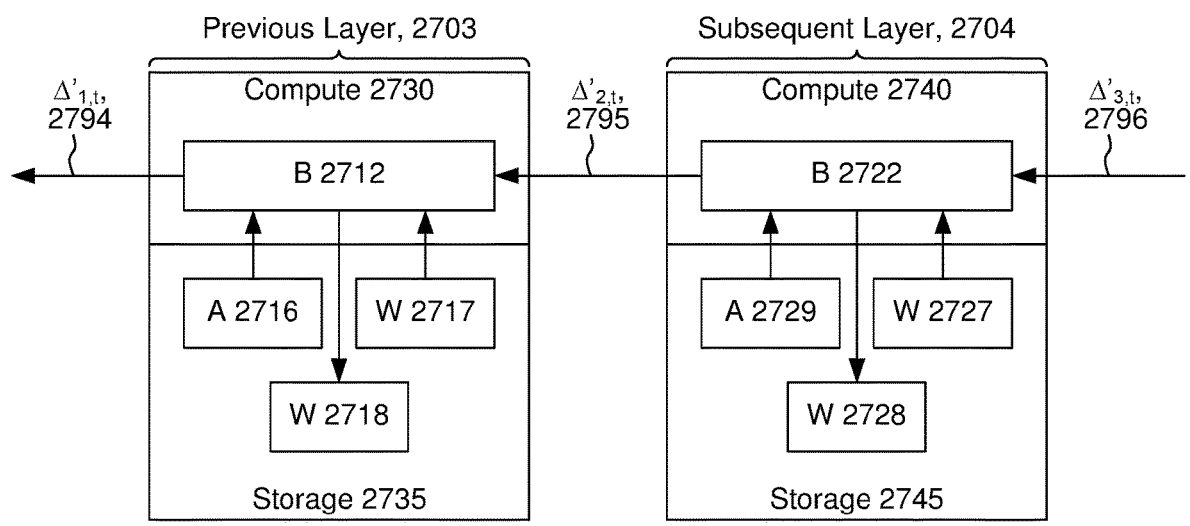

FIGS. 27C-27E illustrate forward pass and backward pass embodiments in accordance with SGD, MBGD, and CPGD, with RCP. The two layers are illustrated as Previous Layer 2703 and Subsequent Layer 2704. Previous Layer 2703 comprises Compute 2730 and Storage 2735. Subsequent Layer 2704 comprises Compute 2740 and Storage 2745. Compute 2730 and Compute 2740 are examples of compute resources and Storage 2735 and Storage 2745 are examples of storage resources.

Like-numbered elements in FIGS. 27A-27E have identical structure and operation, although the compute resources produce different results dependent on differing inputs, and the storage resources store and subsequently provide different values dependent on differing values stored. Other embodiments are envisioned with differing compute resources and/or differing storage resources usable for forward pass and backward pass computation and storage. E.g., a backward pass uses a transpose weight storage not used by a forward pass. Other embodiments are envisioned with differing compute and/or storage resources usable for differing forward pass and backward pass implementations. E.g., an RCP-based embodiment uses an additional compute resource (not illustrated) than used for forward pass or backward pass processing without RCP.

Regarding FIG. 27A, Compute 2710 is enabled to perform computations, such as forward pass computations F 2711. Storage 2715 is enabled to store activations, such as in A 2716. Storage 2715 is further enabled to store weights, such as in W 2717. Compute 2720, F 2721, Storage 2725, A 2726, and W 2727, are, in various embodiments and/or usage scenarios, substantially similar or identical in structure and/or operation respectively to Compute 2710, F 2711, Storage 2715, A 2716, and W 2717.

In forward pass operation for SGD or MBGD, activation $A_{1,t}$ 2781 is received by Previous Layer 2701 and stored in A 2716 (for later use during the backward pass). $A_{1,t}$ 2781 and a weight $W_{1,t}$, previously stored in W 2717, are then processed in accordance with F 2711 to produce activation $A_{2,t}$ 2782. $A_{2,t}$ 2782 is then passed to Subsequent Layer 2702. Similarly to the Previous Layer, $A_{2,t}$ 2782 is received by Subsequent Layer 2702 and stored in A 2726 (for later use during the backward pass). $A_{2,t}$ 2782 and a weight $W_{2,t}$ previously stored in W 2727 are then processed in accordance with F 2721 to produce activation $A_{3,t}$ 2783. $A_{3,t}$ 2783 is then provided to a next subsequent layer (if present) for processing, and so forth, until the forward pass is complete and the backward pass commences. If Subsequent Layer 2702 is the output layer, then the forward pass is completed and the backward pass corresponding to the forward pass is initiated.

Regarding FIG. 27B, for clarity, elements of Compute 2710 and Compute 2720 dedicated to forward pass processing (F 2711 and F 2721) are omitted. With respect to structure and operation illustrated and described with respect to FIG. 27A, FIG. 27B illustrates that Compute 2710 is further enabled to perform additional computations, such as backward pass computations B 2712, and Compute 2720 is further enabled to perform additional computations, such as backward pass computations B 2722. Storage 2715 is further enabled to store a computed weight, such as in W 2718, and Storage 2725 is further enabled to store a computed weight, such as in W 2728. B 2722 and W 2728 are, in various embodiments and/or usage scenarios, substantially similar or identical in structure and/or operation respectively to B 2712 and W 2718.

In backward pass operation for SGD or MBGD, delta $\Delta_{3,t}$ 2793 is received from the next subsequent layer (if present) during backward pass processing. If Subsequent Layer 2702 is the output layer, then Subsequent Layer 2702 computes delta $\Delta_{3,t}$ according to the delta rule, e.g., as a function of the difference between the output of the Subsequent Layer (e.g., the estimated output) and the training output (e.g., desired output). $\Delta_{3,t}$ 2793, the weight $W_{2,t}$ previously stored in W 2727, and the activation $A_{2,t}$ previously stored in A 2726, are then processed in accordance with B 2722 (e.g., in accordance with the delta rule) to produce delta $\Delta_{2,t}$ 2792 and a new weight $W_{2,t+1}$ that is then stored in W 2728 for use in a next forward pass. $\Delta_{2,t}$ 2792 is then passed to Previous Layer 2701. Similarly to the Subsequent Layer, delta $\Delta_{2,t}$ 2792, the weight $W_{1,t}$ previously stored in W 2717, and the activation $A_{1,t}$ previously stored in A 2716, are then processed in accordance with B 2712 to produce delta $\Delta_{1,t}$ 2791 and a new weight $W_{1,t+1}$ that is then stored in W 2718 for use in the next forward pass. $\Delta_{1,t}$ 2791 is then passed to a next previous layer (if present) for processing, and so forth, until the backward pass is complete and a next forward pass commences. If Previous Layer 2701 is the input layer, then the backward pass is complete, and the next forward pass commences.

In SGD and MBGD (and unlike CPGD), the next forward pass is delayed until the previous backward pass completes, e.g., W 2717 and W 2727 are respectively updated with W 2718 and W 2728 after W 2717 and W 2727 have been used for a same forward pass and a same corresponding backward pass. Therefore, the next forward pass is performed using weights that are from the same backward pass.

FIG. 27A, in addition to illustrating SGD and MBGD forward pass processing, also illustrates CPGD forward pass processing. However, operation for CPGD is different compared to SGD and MBGD, in that weight updates and the next forward pass are performed as soon as possible, rather than being delayed until completion of the previous backward pass. E.g., W 2717 and W 2727 are respectively updated with W 2718 and W 2728 as soon as possible. Therefore, the next forward pass has selective access to weights from prior iterations, and thus selectively produces activations differing from those produced under the same conditions by SGD and MBGD.

More specifically, in Previous Layer 2701, $A_{1,t}$ 2781 is received and stored in A 2716, identically to SGD and MBGD. $A_{1,t}$ 2781 and a weight $W_{1,t-k-j}$ previously stored in W 2717 are then processed in accordance with F 2711 to produce activation $A_{2,t}$ 2782. The weight $W_{1,t-k-j}$ was produced and stored by a backward pass corresponding to a forward pass preceding the instant forward pass by k-j forward passes. $A_{2,t}$ 2782 is then passed to Subsequent Layer 2702, and similarly to the Previous Layer, $A_{2,t}$ 2782 is received and stored in A 2726, identically to SGD and MBGD. $A_{2,t}$ 2782 and a weight $W_{2,t-k}$ previously stored in W 2727 are then processed in accordance with F 2721 to produce activation $A_{3,t}$ 2783. The weight $W_{2,t-k}$ was produced and stored by a backward pass corresponding to a forward pass preceding the instant forward pass by k forward passes. Note that the Previous Layer and the Subsequent Layer, for processing of a same forward pass, use weights from different backward passes. As in SGD and MBGD, $A_{3,t}$ 2783 is then provided to a next subsequent layer (if present) for processing, and so forth, until the forward pass is complete and the backward pass commences. If Subsequent Layer 2702 is the output layer, then the forward pass is completed and the backward pass corresponding to the forward pass is initiated. In some embodiments and/or usage scenarios, the value of j is 0 and (k-j) and (k) are equal. In various embodiments and/or usage scenarios, the Previous Layer and the Subsequent Layer simultaneously process one of: different forward passes, different backward passes, and a forward pass and a different backward pass.

FIG. 27B, in addition to illustrating SGD and MBGD backward pass processing, also illustrates CPGD backward pass processing. Processing of the backward pass in CPGD is identical to that of SGD and MBGD. However, selected results (e.g., selected weights) are used earlier than in SGD and MBGD. For example, $W_{1,t-k-j}$, as produced by backward pass t-k-j, and $W_{1,t-k}$, as produced by backward pass t-k are used earlier than in SGD and MBGD, e.g., forward pass t.

FIG. 27C illustrates an embodiment of forward pass processing of any of SGD, MBGD, and CPGD, in combination with RCP. Compute 2730 and Storage 2735, are, in various embodiments and/or usage scenarios, substantially similar or identical in structure and/or operation respectively to Compute 2710 and Storage 2715. Compute 2740 and Storage 2745, are, in various embodiments and/or usage scenarios, substantially similar or identical in structure and/or operation respectively to Compute 2720 and Storage 2725, other than omission of storage for activations A 2726 of Storage 2725 having no counterpart in Storage 2745.

In forward pass operation, with respect to Previous Layer 2703, activation $A_{1,t}$ 2781 is received and processed in accordance with forward pass processing in Compute 2730, and stored in Storage 2735 as described with respect to FIG. 27A. However, with respect to Subsequent Layer 2704, activation $A_{2,t}$ 2782 is received, and processed in accordance with forward pass processing in Compute 2740, but is not stored (instead it is recomputed in accordance with RCP during backward pass processing).

FIG. 27D and FIG. 27E respectively illustrate first and second portions of an embodiment of backward pass processing of any of SGD, MBGD, and CPGD, in combination with RCP. For clarity, elements of Compute 2730 and Compute 2740 dedicated to forward pass processing (F 2721) are omitted. With respect to structure and operation illustrated and described with respect to FIG. 27C, FIG. 27D and FIG. 27E illustrate that Compute 2730 is further enabled to perform additional computations, such as backward pass computations B 2712, and Compute 2740 is further enabled to perform additional computations, such as backward pass computations B 2722. Storage 2735 is further enabled to store a computed weight, such as in W 2718, and Storage 2745 is further enabled to store a computed weight, such as in W 2728, as well as a recomputed activation, such as in A 2729.

In the first portion of the backward pass operation, activations not stored in the corresponding forward pass are recomputed. In SGD and MBGD scenarios, the recomputed activation is formulated in Previous Layer 2703 by processing the activation stored from the forward pass in A 2716 and weight stored in W 2717 in accordance with F 2711 to produce activation $A'_{2,t}$ 2784, that is then stored in A 2729 of Subsequent Layer 2704. Since SGD and MBGD delay weight updates and commencement of a next forward pass until the forward pass and corresponding backward pass are complete, $A'_{2,t}$ 2784 is identical to the value discarded during the forward pass, $A_{2,t}$ 2782.

In a CPGD scenario, the recomputed activation is formulated according to the same topology as the SGD and MBGD scenarios. However, CPGD performs updates without delays and enables commencement of a next forward pass without regard to completion of previous backward passes. Thus, a weight value stored at the time of the backward pass, e.g., in W 2717, according to embodiment and/or usage scenarios, selectively differs from the weight value stored during the corresponding forward pass. As a specific example, in accordance with FIG. 27C, W 2717 stored $W_{1,t-k-j}$ during the forward pass. However, during the backward pass, additional weight updates have occurred, e.g., corresponding to m iterations, and now W 2717 stores $W_{1,t-k-j+m}$. Therefore, $A'_{2,t}$ 2784 selectively differs from the value discarded during the forward pass, $A_{2,t}$ 2782.

In the second portion of backward pass operation, computation proceeds using the recomputed activation. In SGD and MBGD scenarios, since the recomputed activation is identical to the discarded activation (e.g., conceptually the value stored in A 2729 is identical to the value stored in A 2726), the backward processing produces results that are identical to the results described with respect to FIG. 27B. E.g., deltas $\Delta'_{3,t}$ 2796, $\Delta'_{2,t}$ 2795, and $\Delta'_{1,t}$ 2794 are identical, respectively, to $\Delta_{3,t}$ 2793, $\Delta_{2,t}$ 2792, and $\Delta_{1,t}$ 2791. In the CPGD scenario, since the recomputed activation selectively differs from the discarded activation, the backward processing produces results that are selectively different from the results described with respect to FIG. 27B. E.g., deltas $\Delta'_{3,t}$ 2796, $\Delta'_{2,t}$ 2795, and $A'_{1,t}$ 2794 are selectively different, respectively, to $\Delta_{3,t}$ 2793, $\Delta_{2,t}$ 2792, and $\Delta_{1,t}$ 2791.

In some embodiments and/or usage scenarios, W 2717 is distinct from W 2718 (as illustrated), and in some embodiments and/or usage scenarios, W 2718 and W 2717 are a same portion of storage (not illustrated), such that saving a new value in W 2718 overwrites a previously saved value in W 2717. Similarly, W 2727 is variously distinct from or the same as W 2728. In various embodiments and/or usage scenarios, A 2729 is variously implemented to use fewer memory locations and/or use a same number of memory locations for a shorter time than A 2726.

In various embodiments and/or usages scenarios, activations and/or weights are implemented and/or represented by any one or more scalar, vector, matrix, and higher-dimensional data structures. E.g., any one or more of A 2716, A 2726, A 2729, W 2717, W 2727, W 2718, and W 2728 are enabled to store any one or more of one or more scalars, one or more vectors, one or more matrices, and one or more higher-dimensional arrays.

In various embodiments and/or usage scenarios, one or more elements of Previous Layer 2701 and Subsequent Layer 2702 are implemented by respective PEs, e.g., a portion of PE 499 or similar elements of FIG. 4. E.g., PE 497 implements Previous Layer 2701 and PE 498 implements Subsequent Layer 2702. Activation $A_{2,t}$ 2782 and delta $\Delta_{2,t}$ 2792 are communicated via East coupling 431. In some embodiments and/or usage scenarios, one or more elements of Previous Layer 2701 and Subsequent Layer 2702 are implemented by one or more of CPUs, GPUs, DSPs, and FPGAs.

In various embodiments and/or usage scenarios, all or any portions of elements of F 2711, F 2721, B 2712, and B 2722 conceptually correspond to all or any portions of executions of instructions of Task SW on PEs 260 of FIG. 2.

Example Workload Mapping

Conceptually, Deep Learning Accelerator 400 (FIG. 4) is a programmable compute fabric (see, e.g., FIGS. 5-8 and section "Processing Element: Compute Element and Router"). For example, the compute element of each PE 499 element is enabled to execute sequences of instructions of tasks (such as conceptually corresponding to all or any portions of executions of instructions of Task SW on PEs 260 of FIG. 2), and the router element of router element of each PE 499 is configurable to route wavelets between the PEs. The programmable compute fabric enables mapping of workloads onto the compute fabric in various manners. Described following is an example high-level mapping of a workload to the compute fabric to illustrate various techniques and mechanisms implemented by the compute fabric.

The workload is deep neural network training, implemented via SGD. The deep neural network comprises a plurality of layers of neurons. The workload has three mega-phases: a forward pass, a delta pass, and a chain pass. The forward pass propagates activations in a forward direction. The delta pass propagates deltas in a backward direction. The chain pass calculates gradients based on the deltas as the deltas are generated in the delta pass. The three mega-phases have approximately a same amount of compute.

FIG. 4 illustrates an example mapping of the mega-phases to the PEs. Each layer is implemented by blocks of PEs allocated from the compute fabric (aka 'placed') back-to-back (e.g., in a horizontal dimension). Data movement propagates to the end of the fabric during the forward pass (Forward 401), and then circles back in the reverse direction during the delta pass (Delta 402) and chain pass (Chain 403). The placement is directed to reduce data movement since the forward pass saves activations to be used by the delta pass and the chain pass. In the example, all the PEs are time shared three ways between the three mega-phases, with each mega-phase using approximately a same amount of compute. In some circumstances, an entire chain of PEs performing the passes operates as a pipeline such that each layer is a pipe stage (taking roughly a same amount of time to complete) and each activation of a mini-batch is fills the pipeline.

In some embodiments and/or usage scenarios, within a set of the PEs mapped to a single one of the layers, the weights of the single layer are distributed across the PEs such that a single neuron is mapped to multiple PEs. Splitting a single neuron across multiple PEs, in some circumstances, provides a load balancing benefit and provides a communication partitioning benefit (see, e.g., FIGS. 17-20 and section "Neuron Smearing").

Conceptually, processing proceeds as follows (see Forward 401 of FIG. 4). Activations are broadcasted into the layer along the horizontal axis. Activations are received by the PEs and trigger a lookup of the associated weights that are stored local to the PEs (corresponding to the neurons mapped to the PEs). Only non-zero activations are broadcasted, so no compute is wasted for zero activations (an example of activation sparsity harvesting). Each PE performs a local multiply and accumulate of the incoming activation with all the neuron weights producing local partial sums. Since the weights of each neuron are distributed to multiple PEs, partial sums are then accumulated across the PEs in the vertical direction, in accordance with the neuron weight distribution. After the partial sums are accumulated producing a final sum, the activation function is performed and all new non-zero activations are broadcast to the next layer.

The delta pass (see Delta 402 of FIG. 4) and the chain pass (see Chain 403 of FIG. 4) follow a data flow similar to that of the forward pass. In some embodiments and/or usage scenarios, the delta pass and the chain pass are placed offset by one layer so the activations are stored in the same layers as the weights used in the backward direction. Activations are stored by the receiving layer such that in the delta pass and the chain pass, the activations are used directly without additional communication. In addition to storing activations, a weight transpose is performed to implement the delta pass. The weight transpose, in some embodiments and/or usage scenarios, is implemented by replicating the weights, using additional memory capacity and additional communication when updating the weights. In some embodiments and/or usage scenarios, the weight transpose is implemented by transposing the delta broadcast in the vertical dimension.

Figure 28A:
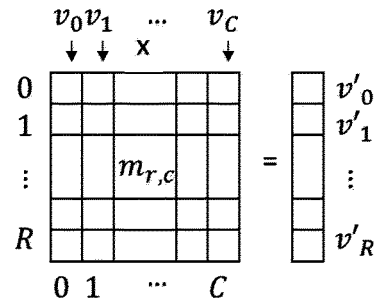
FIG. 28A illustrates a generic operation of a matrix (m) multiplied by a vector (v).
Figure 28B:
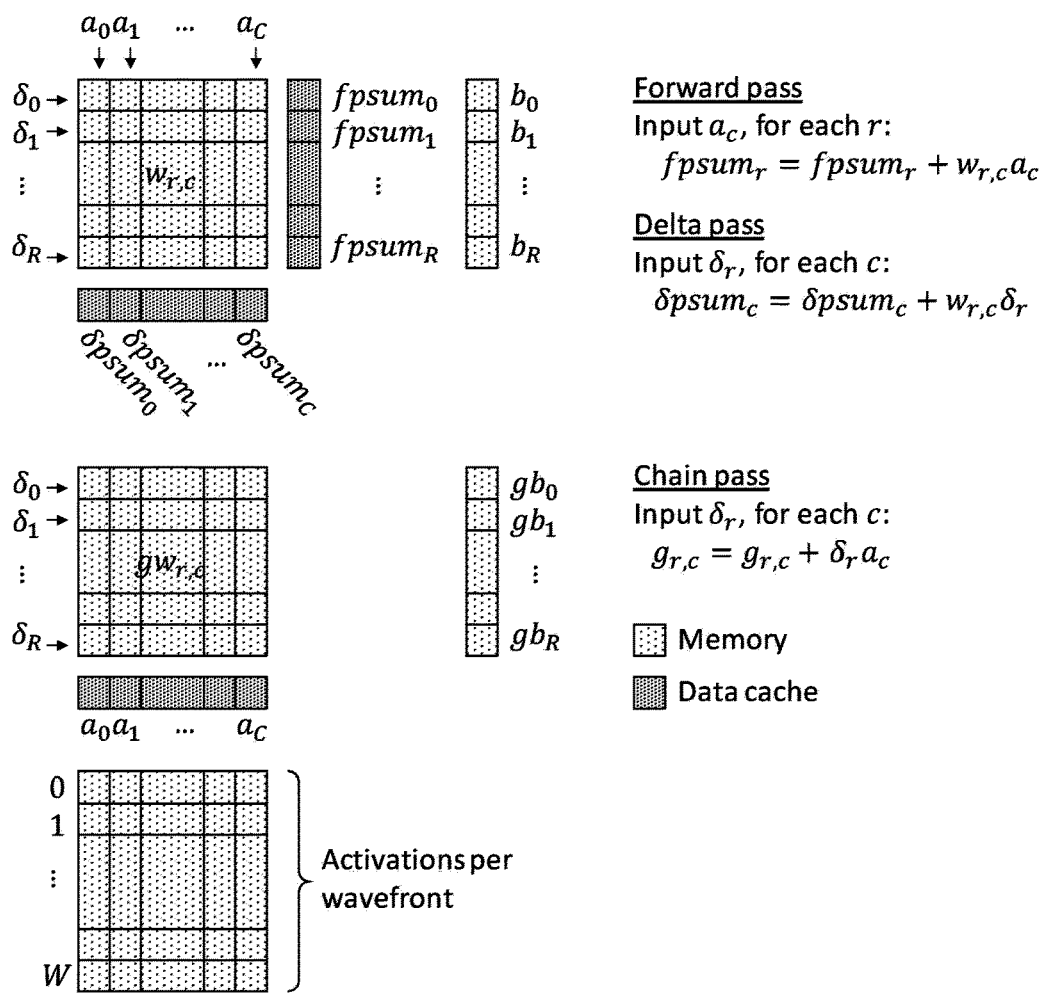
FIG. 28B illustrates various representations of memory structures used in a forward pass, a delta pass, and a chain pass.

FIG. 28A illustrates a generic operation of a matrix (m) multiplied by a vector (v). FIG. 28B illustrates, in the style of FIG. 28A, various representations of memory structures used in the three mega-phases in some embodiments (e.g., a fully connected neural network). In various embodiments, the weight (w) and the gradient accumulation (g) data structures are two-dimensional matrices. In some embodiments, the forward partial sum (fpsum) and delta partial sum (δpsum) and forward pass activations (a) are one-dimensional vectors. The two-dimensional matrices are stored in memory (e.g., Memory 854 of FIG. 8) since in some embodiments and/or usage scenarios the two-dimensional matrices are relatively large. In some embodiments, the one-dimensional vectors are stored in higher-throughput storage (e.g., D-Store 848 of FIG. 8) to enable, usage scenarios, full datapath performance for the multiply-accumulate vector operation in each of the three passes.

Figure 29:
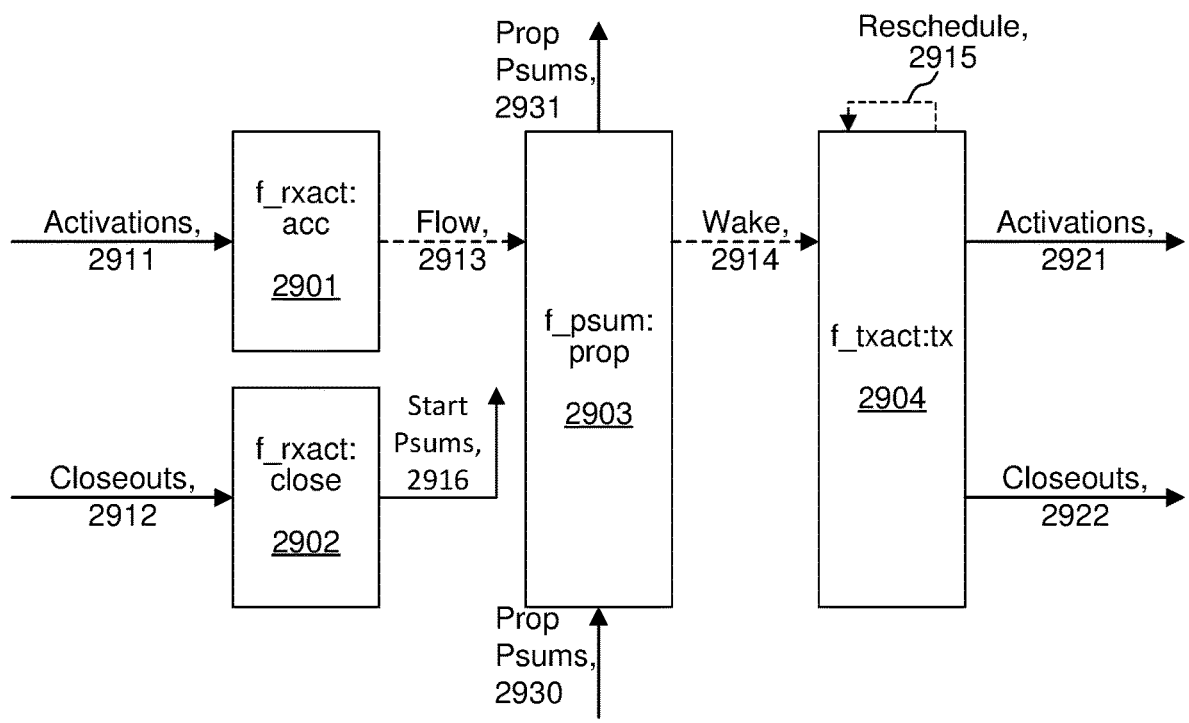
FIG. 29 illustrates an embodiment of tasks as used in a forward pass state machine.

FIG. 29 illustrates an embodiment of tasks (see, e.g., FIGS. 9-12 and section "Tasks") as used in a forward pass state machine. In some embodiments and/or usage scenarios, each of the PEs implements an instantiation of the state machine. In some embodiments and/or usage scenarios, various portions of the state machine are implemented by respective PEs (see, e.g., FIGS. 17-20 and section "Neuron Smearing"). There are four tasks in the state machine: f_rxact:acc 2901, f_rxact:close 2902, f_psum:prop 2903, and f_txact:tx 2904. Conceptually, activations arrive from a PE to the "left" of the instant PE (corresponding to a previous layer). Incoming (non-closeout) activations on the activation broadcast wire (Activations 2911) trigger f_rxact:acc 2901. The instant PE executes instructions of the task, looking up (e.g., from memory local to the instant PE) the weights associated with the activation and performing the local weight multiply and accumulate into partial sums. Control flow dependencies exist between f_rxact:acc 2901 and f_psum:prop 2903 (Flow 2913). Example data structures the task references are wrow, fpsum, and fact.

An incoming activation closeout on the activation broadcast wire (Closeouts 2912) triggers f_rxact:close 2902. The closeout signals the end of all activations for the current wavefront. The instant PE executes instructions of the task, starting the partial sum accumulation ring with the partial sums in a start list of the instant PE (Start Psums 2916). Example data structures the task references are fpsum_acc_mem, and fpsum_acc_fab.

An incoming partial sum (Prop Psums 2930) triggers f_psum:prop 2903. The instant PE executes instructions of the task, adding the incoming partial sum to the local partial sum of the instant PE, and then forwarding the result to the next hop on the ring (Prop Psums 2931). If the instant PE is the end of the ring, then the final sum is generated. In some embodiments and/or usage scenarios, additional processing is performed to prevent deadlock. Example data structures the task references are fpsum_acc_mem, fpsum_acc_fab, and f_txact_wake.

When there are queued activations to transmit, f_txact:tx 2904 is self-triggered (Wake 2914). The instant PE executes instructions of the task, de-queuing an activation and transmitting the activation on the broadcast wire to the next layer (Activations 2921). When more items remain in the queue, the instant PE reschedules the task (Reschedule 2915). When the queue is empty, the instant PE sends a closeout wavelet to close the wavefront (Closeouts 2922).

The activations (incoming and outgoing) and the partial sums (incoming and outgoing), as well as the closeout wavelets are communicated as wavelets (see, e.g., FIGS. 13A-15B and section "Wavelets"). In some embodiments and/or usage scenarios, one or more of the wavelets correspond to one or more elements of fabric vectors as described by one or more DSDs and/or XDSDs.

Data structures for the various state machines are referenced via a plurality of DSDs stored in respective DSRs (see, e.g., FIGS. 21A-24 and section "Vectors and Data Structure Descriptors"), as described by the following table.

| DSR | Data Structure Name | Description |
| --- | --- | --- |
| DS1 | Wrow | Weight matrix, rows |
| DS2 | Wcol | Weight matrix, cols (points to same data as DS2) |
| DS3 | Fpsum | Forward partial sum vector – full vector of all psums<br>Length: number of neurons<br>Stride: 1 |
| DS4 | fpsum_acc_mem | Forward partial sum vector – subset for psum accumulate<br>Same data as psum but organized as 2d array<br>Length: number of neurons in subset<br>Stride: 1 |
| DS5 | fpsum_acc_fab | Forward partial sum vector – subset for psum accumulate<br>Fabric type: col:ep=f_psum:prop<br>Length: number of neurons in subset |
| DS6 | Fact | Forward activation storage vector<br>Length: 1<br>Stride: 1 |
| DS7 | fact_fab | Forward activation fabric transmit<br>Fabric type: col:ep=f_txact:acc<br>Length: 1 |
| DS8 | f_txact_wake | Self reschedule wake up wavelet<br>Fabric type: col:ep=f_txact:tx |
| DS9 | fact_close_fab | Forward activation close out fabric transmit<br>Fabric type: col:ep=f_txact:close<br>Length: 1 |

The foregoing example workload mapping is with respect to SGD. However, the techniques are readily applicable to MBGD and CPGD, with and without RCP.

Other Embodiment Details

Embodiments and usage scenarios described with respect to FIGS. 1-29 are conceptually with respect to a PE comprising a CE that is programmable, e.g., that processes data according to instructions. Other embodiments are contemplated with one or more of the CEs being partially or entirely hardwired, e.g., that process data according to one or more fixed-circuit processing elements operable without instructions. As a specific example, a particular CE comprises a hardware logic unit circuit that implements all or a portion of an LSTM unit. The particular CE is comprised with a router in a particular PE that is operable in a fabric with other PEs. Some of the other PEs are similar to or identical to the particular PE and some of the other PEs are similar to or identical to PE 499 of FIG. 4.

Example Implementation Techniques

In some embodiments, various combinations of all or any portions of operations performed for and/or structure associated with any of accelerated deep learning; SGD, MBGD, CPGD with and without RCP for accelerated deep learning; data structure descriptors and fabric vectors for accelerated deep learning; neuron smearing for accelerated deep learning; task synchronization for accelerated deep learning; dataflow triggered tasks for accelerated deep learning; a control wavelet for accelerated deep learning; and/or a wavelet representation for accelerated deep learning; as well as portions of a processor, microprocessor, system-on-a-chip, application-specific-integrated-circuit, hardware accelerator, or other circuitry providing all or portions of the aforementioned operations, are specified by a specification compatible with processing by a computer system. The specification is in accordance with various descriptions, such as hardware description languages, circuit descriptions, netlist descriptions, mask descriptions, or layout descriptions. Example descriptions include: Verilog, VHDL, SPICE, SPICE variants such as PSpice, IBIS, LEF, DEF, GDS-II, OASIS, or other descriptions. In various embodiments, the processing includes any combination of interpretation, compilation, simulation, and synthesis to produce, to verify, or to specify logic and/or circuitry suitable for inclusion on one or more integrated circuits. Each integrated circuit, according to various embodiments, is compatible with design and/or manufacture according to a variety of techniques. The techniques include a programmable technique (such as a field or mask programmable gate array integrated circuit), a semi-custom technique (such as a wholly or partially cell-based integrated circuit), and a full-custom technique (such as an integrated circuit that is substantially specialized), any combination thereof, or any other technique compatible with design and/or manufacture of integrated circuits.

In some embodiments, various combinations of all or portions of operations as described by a computer readable medium having a set of instructions stored therein, are performed by execution and/or interpretation of one or more program instructions, by interpretation and/or compiling of one or more source and/or script language statements, or by execution of binary instructions produced by compiling, translating, and/or interpreting information expressed in programming and/or scripting language statements. The statements are compatible with any standard programming or scripting language (such as C, C++, Fortran, Pascal, Ada, Java, VBscript, and Shell). One or more of the program instructions, the language statements, or the binary instructions, are optionally stored on one or more computer readable storage medium elements. In various embodiments, some, all, or various portions of the program instructions are realized as one or more functions, routines, sub-routines, in-line routines, procedures, macros, or portions thereof.

CONCLUSION

Certain choices have been made in the description merely for convenience in preparing the text and drawings, and unless there is an indication to the contrary, the choices should not be construed per se as conveying additional information regarding structure or operation of the embodiments described. Examples of the choices include: the particular organization or assignment of the designations used for the figure numbering and the particular organization or assignment of the element identifiers (the callouts or numerical designators, e.g.) used to identify and reference the features and elements of the embodiments.

Various forms of the words "include" and "comprise" are specifically intended to be construed as abstractions describing logical sets of open-ended scope and are not meant to convey physical containment unless described explicitly (such as followed by the word "within").

Although the foregoing embodiments have been described in some detail for purposes of clarity of description and understanding, the invention is not limited to the details provided. There are many embodiments of the invention. The disclosed embodiments are exemplary and not restrictive.

It will be understood that many variations in construction, arrangement, and use are possible consistent with the description, and are within the scope of the claims of the issued patent. For example, interconnect and function-unit bit-widths, clock speeds, and the type of technology used are variable according to various embodiments in each component block. The names given to interconnect and logic are merely exemplary, and should not be construed as limiting the concepts described. The order and arrangement of flowchart and flow diagram process, action, and function elements are variable according to various embodiments. Also, unless specifically stated to the contrary, value ranges specified, maximum and minimum values used, or other particular specifications (such as file types; and the number of entries or stages in registers and buffers), are merely those of the described embodiments, are expected to track improvements and changes in implementation technology, and should not be construed as limitations.

Functionally equivalent techniques known in the art are employable instead of those described to implement various components, sub-systems, operations, functions, routines, sub-routines, in-line routines, procedures, macros, or portions thereof. It is also understood that many functional aspects of embodiments are realizable selectively in either hardware (e.g., generally dedicated circuitry) or software (e.g., via some manner of programmed controller or processor), as a function of embodiment dependent design constraints and technology trends of faster processing (facilitating migration of functions previously in hardware into software) and higher integration density (facilitating migration of functions previously in software into hardware). Specific variations in various embodiments include, but are not limited to: differences in partitioning; different form factors and configurations; use of different operating systems and other system software; use of different interface standards, network protocols, or communication links; and other variations to be expected when implementing the concepts described herein in accordance with the unique engineering and business constraints of a particular application.

The embodiments have been described with detail and environmental context well beyond that required for a minimal implementation of many aspects of the embodiments described. Those of ordinary skill in the art will recognize that some embodiments omit disclosed components or features without altering the basic cooperation among the remaining elements. It is thus understood that much of the details disclosed are not required to implement various aspects of the embodiments described. To the extent that the remaining elements are distinguishable from the prior art, components and features that are omitted are not limiting on the concepts described herein.

All such variations in design are insubstantial changes over the teachings conveyed by the described embodiments.

It is also understood that the embodiments described herein have broad applicability to other computing and networking applications, and are not limited to the particular application or industry of the described embodiments. The invention is thus to be construed as including all possible modifications and variations encompassed within the scope of the claims of the issued patent.

What is claimed is:

1. A system comprising:
a fabric of processor elements, each processor element comprising a fabric router and a compute engine enabled to perform dataflow-based and instruction-based processing;
wherein each processor element selectively communicates fabric packets with others of the processor elements; and
wherein each compute engine selectively performs the processing in accordance with a virtual channel specifier and a task specifier of each fabric packet the compute engine receives.

2. The system of claim 1, wherein:
each compute engine is configured to perform a predefined set of basic operations in response to receiving a corresponding basic instruction selected from a predefined native instruction set of codes; and further comprising
a training workload comprising
a first set of machine codes selected from the native instruction set for performing a mapping of at least a part of a neuron onto the compute engine of the processor element, the mapping comprising managing at least one partial-neuron weight,
a second set of machine codes selected from the native instruction set for performing a forward pass to propagate activations in a forward logical direction based at least in part on the at least one partial-neuron weight, the forward pass initiated responsive to an input sample,
a third set of machine codes selected from the native instruction set for performing a delta pass in a backward logical direction to generate deltas, the delta pass initiated responsive to completion of the forward pass,
a fourth set of machine codes selected from the native instruction set for performing a chain pass to calculate gradients based on the deltas, and
a fifth set of machine codes selected from the native instruction set for performing a selective update of the at least one partial-neuron weight in accordance with a predetermined learning rule and based at least in part on the deltas; and
wherein each compute engine comprises storage for the at least one partial-neuron weight.

3. The system of claim 2, wherein the mapping is in accordance with initializing the fabric to implement a partitioning of a neural network into a plurality of layers, the neuron is a first neuron of a plurality of neurons of the neural network, the first neuron is comprised in a first layer of the plurality of layers, and each of the plurality of neurons is mapped in a distributed manner across a plurality of the processor elements of the fabric.

4. The system of claim 3, wherein the plurality of layers operates as a logical fabric pipeline comprising logical fabric pipeline stages, each logical fabric pipeline stage comprising completion of all of the passes for each layer, the completion for each layer taking a time step comprising the same amount of time.

5. The system of claim 3, wherein as each input sample of a training set streams through at least a first plurality of the processor elements across the plurality of layers, the neuron weights are selectively updated in the first plurality of the processor elements across the plurality of layers.

6. The system of claim 2, wherein an iteration of the training workload is performed for each of a plurality of input samples collectively comprising a training set.

7. The system of claim 6, wherein the training set is partitioned into a plurality of so-called mini-batches and the predetermined learning rule specifies that the at least one partial-neuron weight is updated after the completion of all the passes for each input sample of each of the mini-batches.

8. The system of claim 7, wherein the forward pass incorporates weight updates within a first plurality of the processor elements while the mini-batch learning is ongoing within the first plurality of the processor elements.

9. The system of claim 6, wherein for each input sample, the system is enabled to selectively update the at least one partial-neuron weight in accordance with the predetermined learning rule responsive to completion of the forward pass, the delta pass, and the chain pass corresponding to the input sample.

10. The system of claim 9, wherein the system is enabled for each forward pass to use weight information provided by the most recent selective update of the at least one partial-neuron weight.

11. The system of claim 10, wherein the system is enabled to perform the delta pass and the chain pass for each input sample based at least in part on activations that are recomputed based at least in part on a first partial-neuron weight.

12. A method comprising:
in each of a fabric of processor elements, selectively communicating fabric packets with others of the processor elements, each processor element comprising a fabric router and a compute engine enabled to perform dataflow-based and instruction-based processing; and
in each compute engine, selectively performing the processing in accordance with a virtual channel specifier and a task specifier of each fabric packet the compute engine receives.

13. The method of claim 12, wherein:
each compute engine is configured to perform a predefined set of basic operations in response to receiving a corresponding basic instruction selected from a predefined native instruction set of codes; and further comprising
processing a training workload comprising
a first set of machine codes selected from the native instruction set for performing a mapping of at least a part of a neuron onto the compute engine of the processor element, the mapping comprising managing at least one partial-neuron weight,
a second set of machine codes selected from the native instruction set for performing a forward pass to propagate activations in a forward logical direction based at least in part on the at least one partial-neuron weight, the forward pass initiated responsive to an input sample,
a third set of machine codes selected from the native instruction set for performing a delta pass in a backward logical direction to generate deltas, the delta pass initiated responsive to completion of the forward pass,
a fourth set of machine codes selected from the native instruction set for performing a chain pass to calculate gradients based on the deltas, and a fifth set of machine codes selected from the native instruction set for performing a selective update of the at least one partial-neuron weight in accordance with a predetermined learning rule and based at least in part on the deltas; and wherein each compute engine comprises storage for the at least one partial-neuron weight.

14. The method of claim 13, wherein the mapping is in accordance with initializing the fabric to implement a partitioning of a neural network into a plurality of layers, the neuron is a first neuron of a plurality of neurons of the neural network, the first neuron is comprised in a first layer of the plurality of layers, and each of the plurality of neurons is mapped in a distributed manner across a plurality of the processor elements of the fabric.

15. The method of claim 14, wherein the plurality of layers operates as a logical fabric pipeline comprising logical fabric pipeline stages, each logical fabric pipeline stage comprising completion of all of the passes for each layer, the completion for each layer taking a time step comprising the same amount of time.

16. The method of claim 14, wherein as each input sample of a training set streams through at least a first plurality of the processor elements across the plurality of layers, the neuron weights are selectively updated in the first plurality of the processor elements across the plurality of layers.

17. The method of claim 13, further comprising performing an iteration of the training workload for each of a plurality of input samples collectively comprising a training set.

18. The method of claim 17, further comprising partitioning the training set into a plurality of so-called mini-batches and the predetermined learning rule specifies that the at least one partial-neuron weight is updated after the completion of all the passes for each input sample of each of the mini-batches.

19. The method of claim 18, wherein the forward pass incorporates weight updates within a first plurality of the processor elements while the mini-batch learning is ongoing within the first plurality of the processor elements.

20. The method of claim 17, further comprising, for each input sample, selectively updating the at least one partial-neuron weight in accordance with the predetermined learning rule responsive to completion of the forward pass, the delta pass, and the chain pass corresponding to the input sample.

21. The method of claim 20, further comprising, for each forward pass, selectively using weight information provided by the most recent selective update of the at least one partial-neuron weight.

22. The method of claim 21, further comprising selectively performing the delta pass and the chain pass for each input sample based at least in part on activations that are recomputed based at least in part on a first partial-neuron weight.

23. A system comprising:
in each of a fabric of processor elements, means for selectively communicating fabric packets with others of the processor elements, each processor element comprising a fabric router and a compute engine enabled to perform dataflow-based and instruction-based processing; and
in each compute engine, means for selectively performing the processing in accordance with a virtual channel specifier and a task specifier of each fabric packet the compute engine receives.

24. The system of claim 23, wherein:
each compute engine is configured to perform a predefined set of basic operations in response to receiving a corresponding basic instruction selected from a predefined native instruction set of codes; and further comprising
a training workload comprising
a first set of machine codes selected from the native instruction set for performing a mapping of at least a part of a neuron onto the compute engine of the processor element, the mapping comprising managing at least one partial-neuron weight,
a second set of machine codes selected from the native instruction set for performing a forward pass to propagate activations in a forward logical direction based at least in part on the at least one partial-neuron weight, the forward pass initiated responsive to an input sample,
a third set of machine codes selected from the native instruction set for performing a delta pass in a backward logical direction to generate deltas, the delta pass initiated responsive to completion of the forward pass,
a fourth set of machine codes selected from the native instruction set for performing a chain pass to calculate gradients based on the deltas, and
a fifth set of machine codes selected from the native instruction set for performing a selective update of the at least one partial-neuron weight in accordance with a predetermined learning rule and based at least in part on the deltas; and
wherein each compute engine comprises storage for the at least one partial-neuron weight.

25. The system of claim 24, wherein the mapping is in accordance with initializing the fabric to implement a partitioning of a neural network into a plurality of layers, the neuron is a first neuron of a plurality of neurons of the neural network, the first neuron is comprised in a first layer of the plurality of layers, and each of the plurality of neurons is mapped in a distributed manner across a plurality of the processor elements of the fabric.

26. The system of claim 25, wherein the plurality of layers operates as a logical fabric pipeline comprising logical fabric pipeline stages, each logical fabric pipeline stage comprising completion of all of the passes for each layer, the completion for each layer taking a time step comprising the same amount of time.

27. The system of claim 25, wherein as each input sample of a training set streams through at least a first plurality of the processor elements across the plurality of layers, the neuron weights are selectively updated in the first plurality of the processor elements across the plurality of layers.

28. The system of claim 25, wherein as each input sample of a training set streams through at least a first plurality of the processor elements across the plurality of layers, the neuron weights are selectively updated in the first plurality of the processor elements across the plurality of layers, and the streaming and updating is ongoing for each time step over a plurality of time steps.

29. The system of claim 26, further comprising means for selectively updating the at least one partial-neuron weight within a first plurality of the processor elements in response to changes in backward propagating data within the first plurality of the processor elements for each time step over a plurality of time steps while forward propagation of activations are ongoing.

30. The system of claim 26, further comprising means for selectively updating the at least one partial-neuron weight each time step over a plurality of time steps.

31. The system of claim 27, 28, 29, or 30, wherein the selectively updating is in accordance with a continuous propagation gradient descent process.

32. The system of claim 24, further comprising means for performing an iteration of the training workload for each of a plurality of input samples collectively comprising a training set.

33. The system of claim 32, further means for comprising partitioning the training set into a plurality of so-called mini-batches and the predetermined learning rule specifies that the at least one partial-neuron weight is updated after the completion of all the passes for each input sample of each of the mini-batches.

34. The system of claim 33, wherein the predetermined learning rule is in accordance with a continuous propagation gradient descent process.

35. The system of claim 33, wherein the forward pass incorporates weight updates within a first plurality of the processor elements while the mini-batch learning is ongoing within the first plurality of the processor elements.

36. The system of claim 24, wherein the storage is comprised in a memory local to the compute engine.

37. The system of claim 24, wherein each compute engine further comprises storage for gradient accumulation, forward partial sums, delta partial sums, and forward pass activations.

38. The system of claim 32, further comprising, for each input sample, means for selectively updating the at least one partial-neuron weight in accordance with the predetermined learning rule responsive to completion of the forward pass, the delta pass, and the chain pass corresponding to the input sample.

39. The system of claim 38, wherein the predetermined learning rule is in accordance with a continuous propagation gradient descent process.

40. The system of claim 38, further comprising means for selectively using weight information provided by the most recent selective update of the at least one partial-neuron weight for each forward pass.

41. The system of claim 40, further comprising means for initiating a forward pass of a particular iteration of the training workload independent of whether the selective update of the at least one partial-neuron weight corresponding to a prior iteration of the training workload has occurred.

42. The system of claim 40, further comprising means for selectively initiating a forward pass of a particular iteration of the training workload independent of whether the delta pass of a prior iteration of the training workload has begun.

43. The system of claim 40, further comprising, in at least one of the compute engines, means for performing at least a portion of a forward pass for a subsequent iteration of the training workload after performing at least a portion of a forward pass for a prior iteration of the training workload and before performing a portion of the selective update of the at least one partial-neuron weight corresponding to the prior iteration of the training workload.

44. The system of claim 40, further comprising means for selectively performing the delta pass and the chain pass for each input sample based at least in part on activations that are recomputed based at least in part on a first partial-neuron weight.

45. The system of claim 44, wherein the first partial-neuron weight is the partial-neuron weight produced by the most recent selective update.

46. The system of claim 45, wherein the recomputed activations need not be stored between computations, thereby decreasing the total memory required for a given system training configuration.

47. The system of claim 40, further comprising, in each compute element, means for selectively performing portions of a delta pass and portions of a chain pass for an input sample based at least in part on activations that are recomputed based at least in part on a first partial-neuron weight.

* * * * *